US012553280B2

(12) United States Patent
Davlantes

(10) Patent No.: US 12,553,280 B2
(45) Date of Patent: Feb. 17, 2026

(54) PET DOOR ASSEMBLY AND FLAP

(71) Applicant: George N. Davlantes, Palm Desert, CA (US)

(72) Inventor: George N. Davlantes, Palm Desert, CA (US)

( * ) Notice: Subject to any disclaimer, the term of this patent is extended or adjusted under 35 U.S.C. 154(b) by 0 days.

(21) Appl. No.: 18/557,219

(22) PCT Filed: Apr. 27, 2022

(86) PCT No.: PCT/US2022/026485
§ 371 (c)(1),
(2) Date: Oct. 25, 2023

(87) PCT Pub. No.: WO2022/232234
PCT Pub. Date: Nov. 3, 2022

(65) Prior Publication Data

US 2024/0200400 A1 Jun. 20, 2024

Related U.S. Application Data

(60) Provisional application No. 63/180,462, filed on Apr. 27, 2021.

(51) Int. Cl.
*E06B 7/32* (2006.01)
*E05D 15/48* (2006.01)

(52) U.S. Cl.
CPC ................ *E06B 7/32* (2013.01); *E05D 15/48* (2013.01)

(58) Field of Classification Search
CPC .................................. E06B 7/32; E05D 15/48
USPC .................................................... 49/169, 163
See application file for complete search history.

(56) References Cited

U.S. PATENT DOCUMENTS

| | | | | | |
|---|---|---|---|---|---|
| 2,560,661 | A * | 7/1951 | Poovey | A01K 1/035 119/501 |
| 2,758,646 | A * | 8/1956 | Johnson | E06B 7/32 160/90 |
| 5,287,654 | A * | 2/1994 | Davlantes | E06B 7/32 49/169 |
| 5,946,856 | A * | 9/1999 | Davlantes | E06B 7/32 49/168 |

(Continued)

FOREIGN PATENT DOCUMENTS

GB 2239887 A * 7/1991 ............... E06B 7/32

OTHER PUBLICATIONS

International Search Report and Written Opinion, PCT/US2022/026485, dated Oct. 13, 2022, 16 pages.

(Continued)

*Primary Examiner* — Marcus Menezes
(74) *Attorney, Agent, or Firm* — Nelson Mullins Riley & Scarborough LLP; Anthony A. Laurentano

(57) ABSTRACT

A modular pet door for use with a structure including an interior portion, an exterior portion and defining an opening is disclosed. The modular pet door includes an interior frame to seat on the interior portion of the structure, an exterior frame to seat on the exterior portion of the structure and coupled to the exterior frame, an interchangeable core assembly having a flap. The interchangeable core assembly is removably coupled to the interior frame. The flap is operable between an open position and closed position disposed over the opening. The core assembly is configured to permit operation of the flap.

35 Claims, 115 Drawing Sheets

(56) References Cited

U.S. PATENT DOCUMENTS

| | | | | | |
|---|---|---|---|---|---|
| 6,116,665 | A * | 9/2000 | Subliskey | E05C 3/046 | 292/241 |
| 6,959,511 | B2 * | 11/2005 | Johnson | E06B 7/32 | 160/180 |
| 8,631,605 | B1 * | 1/2014 | Davenport | E06B 7/32 | 49/501 |
| 8,959,850 | B2 | 2/2015 | Ward et al. | | |
| 8,997,400 | B2 * | 4/2015 | Louie | E05C 1/08 | 49/169 |
| 11,525,299 | B2 * | 12/2022 | Vanderbilt-Kay | E06B 7/32 | |
| 2007/0204514 | A1 * | 9/2007 | Grimmett | E06B 7/32 | 49/169 |
| 2008/0184625 | A1 | 8/2008 | Bjorholm et al. | | |

OTHER PUBLICATIONS

International Preliminary Report on Patentability, PCT/US2022/026485, dated Oct. 24, 2023, 11 pages.

* cited by examiner

PET DOOR ASSEMBLY AND FLAP

CROSS-REFERENCE TO RELATED APPLICATIONS

This Application is a § 371 National Stage of Application No. PCT/US2022/026485 filed Apr. 27, 2022, and claims the benefit of U.S. Provisional Application 63/180,462 filed on Apr. 27, 2021. The entire contents of these applications are incorporated herein by reference in their entirety.

FIELD OF THE INVENTION

Embodiments of the present invention relate generally to a modular pet door assembly having an improved flap.

BACKGROUND OF THE INVENTION

Pet doors offer unassisted pet access in and out of a home, garage, or other structure, and this may provide convenience for the pet owner and the pet. Retail sales of pet doors first started in the 1950s. For the first time, consumers were able to buy a readymade alternative to improvised methods of providing unassisted pet access. These pet doors were somewhat simple in design and used rudimentary materials in construction. Today, pet doors are evolving with more sophisticated designs. However, most of these pet doors must be customized significantly during manufacturing of the pet door to ensure that the pet door will fit appropriately at the installation location. Additionally, the flap may possess a poor seal that permits moisture, insects, etc. to enter the home.

BRIEF SUMMARY OF THE INVENTION

Various embodiments provided herein relate to an improved pet door assembly and/or features of the pet door assembly. The pet door assembly may have increased modularity, with a core frame and additional frames that may be used. To adjust to the necessary size of the door or wall, the size and shape of the core frame may remain consistent and other frames may be added or adjusted in size, shape, or relative position to ensure that the pet door assembly fits to a wall or a door. Because the core frame may maintain the same size and shape, this core frame may be mass manufactured more easily, leading to reduced costs of production. Even though the core frame and other components of the pet door assembly may be provided in standard sizes to enable greater efficiency during manufacturing, the pet door assembly may still be easily adjusted to install the pet door assembly so that the appropriate depth is provided. Furthermore, the increased modularity of the pet door assembly may allow for the user to customize the pet door assembly as desired, and the modularity may also increase the ease for users in finding replacement parts to the extent necessary.

The pet door assembly may be locked appropriately to ensure security of the home. The lock may prevent unwanted stray animals entering through the pet door (e.g. the next-door pet, rodents, squirrels, possums, raccoons, and others). The ability to effectively lock the door may also prevent intruders from reaching in through the pet door flap to open the door. The pet door assembly may also be appropriately sealed with seals on the flap and other components. By providing an effective seal, the pet door assembly may prevent water, moisture, insects, etc. from entering. The seal may also aid in insulating the home from the external environment, retaining the warm or cold air within the home.

In an example embodiment, a pet door is provided having increased modularity. The pet door includes a flap and a core frame that is configured to hold the flap. The pet door also includes an interior frame that is configured to be positioned in an interior portion of a structure and an exterior frame that is configured to be positioned in an exterior portion of a structure.

In some embodiments, the core frame may be a standard component. In some related embodiments, the pet door may also include an extension frame provided between the interior frame and the exterior frame, and the extension frame may be added to increase the depth of the pet door.

In some embodiments, the pet door may also include three or more extension frames. Each of the extension frames may include a screw hole. Additionally, a first extension frame of the three or more extension frames may be provided in an upright position. A second extension frame of the three or more extension frames may be positioned adjacent to the first extension frame, and the second extension frame may be provided in an inverted position that is rotated 180 degrees relative to the upright position. A third extension frame of the three or more extension frames may be positioned adjacent to the second extension frame, and the third extension frame may be provided in an upright position. The screw hole of the first extension frame may be offset from the screw hole of the second extension frame, and the screw hole of the second extension frame may be offset from the screw hole of the third extension frame.

In some embodiments, the pet door may include an anchor frame. Additionally, the pet door may be configured to be assembled by installing the anchor frame at the structure; installing the exterior frame on the exterior portion of the structure; inserting the core into the anchor frame after the anchor frame has been installed; and installing the interior frame.

In some embodiments, the pet door may also include a push button assembly that is configured to shift between a locked state and an unlocked state. The flap may be configured to remain locked to prevent the flap from being opened when the push button assembly is in a locked state, and the flap may be configured to be unlocked to permit opening of the flap when the push button assembly is in an unlocked state. In some related embodiments, the pet door assembly may also include a first disk assembly and a second disk assembly, and the push button assembly may be configured cause the first disk assembly and the second disk assembly to lock the flap when the push button assembly is in a locked state.

In some embodiments, the flap may include two or more rigid segments extending vertically. Gaps may be provided between the two or more rigid segments, and elastic material may connect adjacent rigid segments of the two or more rigid segments. Elastic stretch zones may be provided in the gaps, and the elastic stretch zones may be configured to permit vertical bending when the flap is opened. The flap may resist horizontal and vertical bending in locations where a rigid segment is provided.

In some embodiments, the core frame may include a flap holder. The flap holder may be configured to receive and hold the flap without any tools required during installation. In some related embodiments, the core may include two or more rods. The flap may include two or more holes at a top of the flap, and the two or more rods may be configured to be received in the two or more holes to restrain the horizontal movement of the flap. The flap holder may have two or more slots that the two or more rods may extend through.

Additionally, in some embodiments, the pet door may include a circuit board and an actuator cam. The pet door may be configured to be locked or unlocked by a remote operator. The circuit board may be configured to receive a locking command from a remote operator, the circuit board may be configured to cause actuation of the actuator cam, and the actuator cam may be configured to cause the pet door to shift to a locked state in the actuated position. Additionally, in some embodiments, the interior frame may be configured to match the appearance of the structure in which the interior frame is installed or an alternative preferred appearance, and the interior frame may be configured to be used with a specific core frame type.

In some embodiments, the pet door also may include a latch interlock assembly having a latch cam and a cam screw. The latch cam and the cam screw may be positioned in the core frame. Additionally, the cam screw may have a cam portion that has an asymmetrical shape relative to a central axis of the cam screw. The cam screw may be configured to be rotated using a tool, and the cam portion may be configured to engage with the latch cam upon rotation of the cam screw to cause a portion of the latch cam to extend out of the core. The portion of the latch cam extending out of the core may be configured to engage with another frame.

In some embodiments, two glazing flanges may also be included. The pet door may be installed in a glass structure, and this glass structure may be a glass window or a glass patio door. The glazing flanges may be configured to rest flush with the surfaces of the glass of the glass structure once the pet door is installed. The glazing flanges may be configured to ensure that an effective seal is provided between pet door and glass structure. Additionally, the glazing flanges may be configured to strengthen attachment of the pet door with the glass structure.

In some embodiments, the pet door may also include a sill assembly with one or more pistons that are configured to shift within one or more corresponding cavities. The sill assembly may include a sill magnet that is configured to attract the flap magnet. Magnetic attraction between the sill magnet and the flap magnet may be configured to urge the one or more pistons into the one or more corresponding cavities to seal the flap regardless of an amount of thermal expansion or contraction in the flap. The sill assembly may include viscous material in the one or more corresponding cavities, and the pistons may be configured to block viscous material from exiting the one or more corresponding cavities. The sill assembly may also include a drain and a channel extending to the drain. The channel may extend along the length of the sill assembly, and the channel may be sloped downwardly to cause fluids to extend in the channel towards the drain. The drain and the channel may be configured to prevent fluids from contaminating the one or more corresponding cavities.

In some embodiments, the pet door may also include an anchor frame defining an opening and protrusions provided in the opening. The pet door may also include a locking door having interlock sections. The locking door may be configured to be inserted horizontally into the opening within the anchor frame to enable the interlock sections of the locking door to receive the protrusions of the frame. Further, the interlock sections of the locking door may be configured to receive the protrusions to enable the locking door to be shifted to a locked state.

In another example embodiment, a flap is provided for use in a pet door. The flap may include two or more rigid segments that extend vertically, and gaps may be provided between the two or more rigid segments. Elastic material may connect adjacent rigid segments of the two or more rigid segments. Additionally, elastic stretch zones may be provided in the gaps, and the elastic stretch zones may be configured to permit vertical bending when the flap is opened. The flap may resist horizontal and vertical bending in locations where a rigid segment is provided.

In some embodiments, the two or more rigid segments may be part of a first layer and the elastic material may be part of a second layer. The second layer may extend from a top of the flap to a bottom of the flap. In related embodiments, the flap may include a third layer, and this third layer may include additional rigid segments. The second layer may be disposed between the first layer and the third layer.

In some embodiments, opening the flap may cause a tension force to be generated on a portion of the elastic stretch zones, and this tension force may urge the flap to straighten and return to a closed position. Additionally, in some embodiments, the flap may also include a magnet. This magnet may be provided proximate to the bottom of the flap, and the magnet may be configured to assist in shifting the flap to an upright position and maintaining an effective seal at the bottom of the flap.

In another example embodiment, another pet door is provided. The pet door includes a flap having a flap magnet proximate to a bottom of the flap. The pet door also includes a frame that is configured to hold the flap. The frame has a sill assembly with one or more pistons that are configured to shift within one or more corresponding cavities. Additionally, the sill assembly includes a sill magnet that is configured to attract the flap magnet. Magnetic attraction between the sill magnet and the flap magnet is configured to urge the one or more pistons into the one or more corresponding cavities to seal the flap regardless of an amount of thermal expansion or contraction in the flap. Furthermore, the sill assembly includes viscous material in the one or more corresponding cavities, and wherein the pistons are configured to block viscous material from exiting the one or more corresponding cavities.

In some embodiments, the sill assembly may include a drain and a channel extending to the drain. The channel may extend along the length of the sill assembly, and the channel may be sloped downwardly to cause fluids to extend in the channel towards the drain. The drain and the channel may be configured to prevent fluids from contaminating the one or more corresponding cavities. Additionally, in some embodiments, the sill assembly may also include a locking door having interlock sections. The frame may also include protrusions, and the interlock sections of the locking door may be configured to receive the protrusions. Additionally, the bottom surface of the locking door may have protrusions that are configured to engage with slots on the bottom edge of the frame. Furthermore, in some embodiments, the locking door may be configured to be inserted horizontally into an opening within the frame to enable the interlock sections of the locking door to receive the protrusions of the frame, and the locking door may include a lock assembly that is configured to selectively allow or prevent removal.

BRIEF DESCRIPTION OF THE DRAWINGS

Figure 1A:
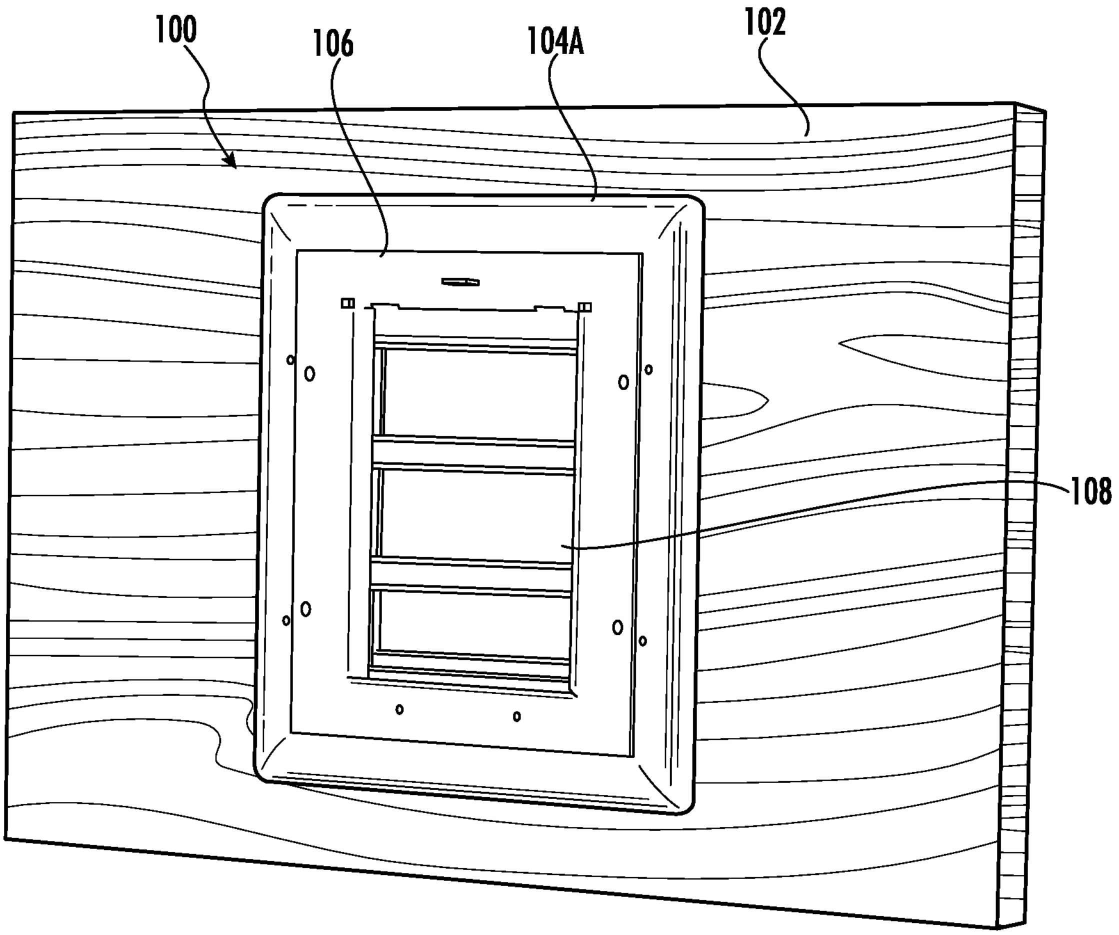
Figure 1B:
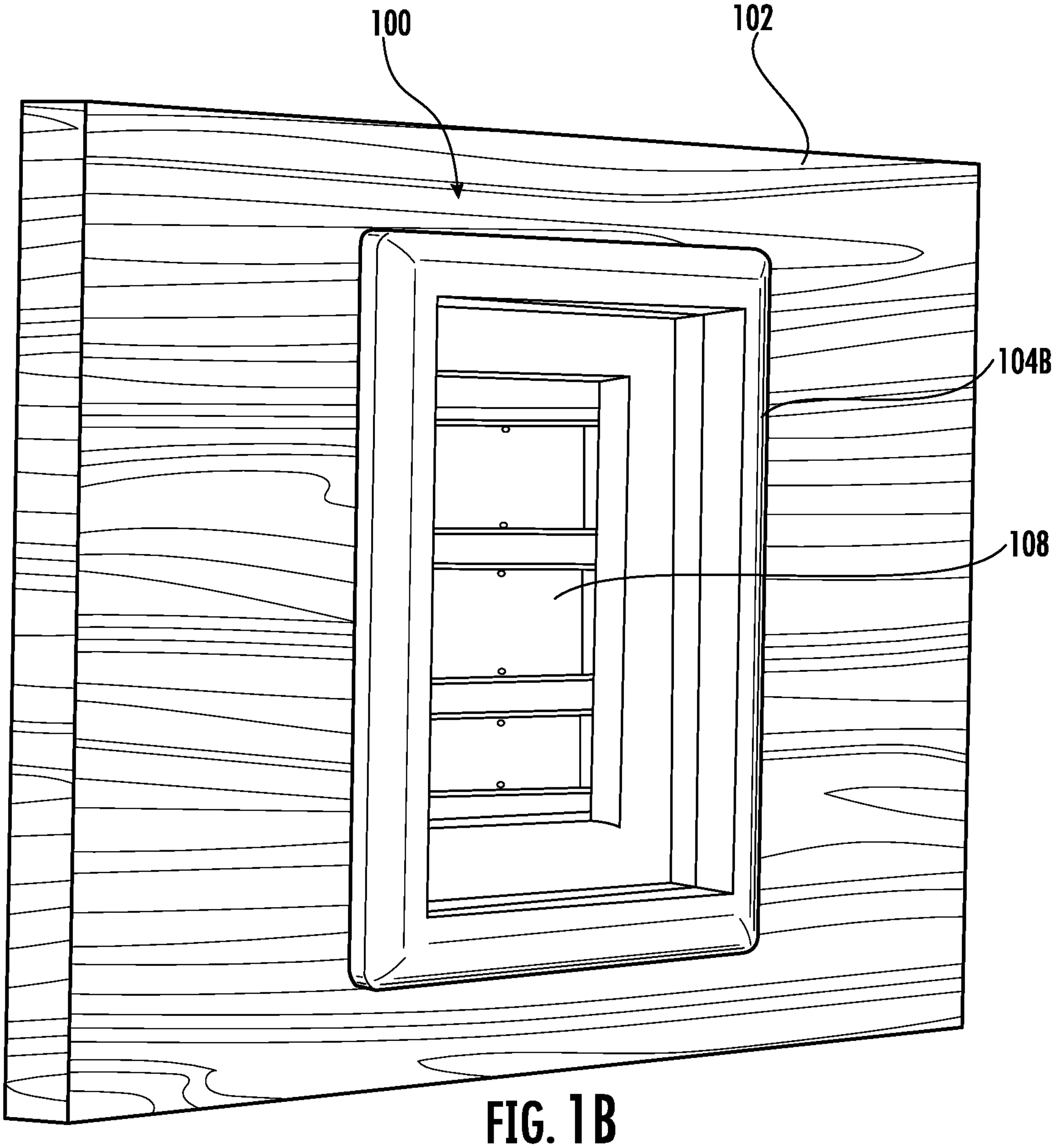
Figure 1C:
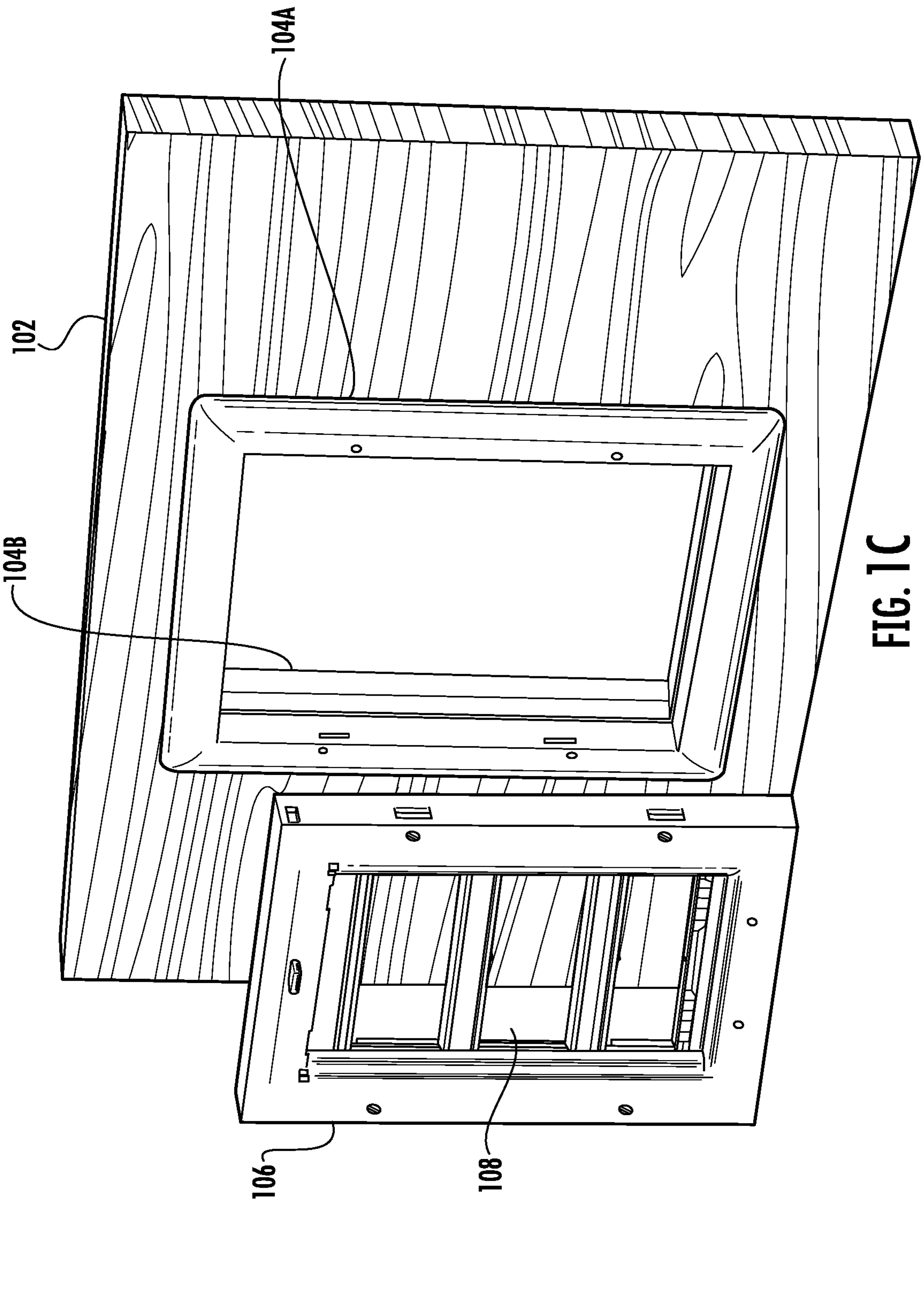
Figure 2A:
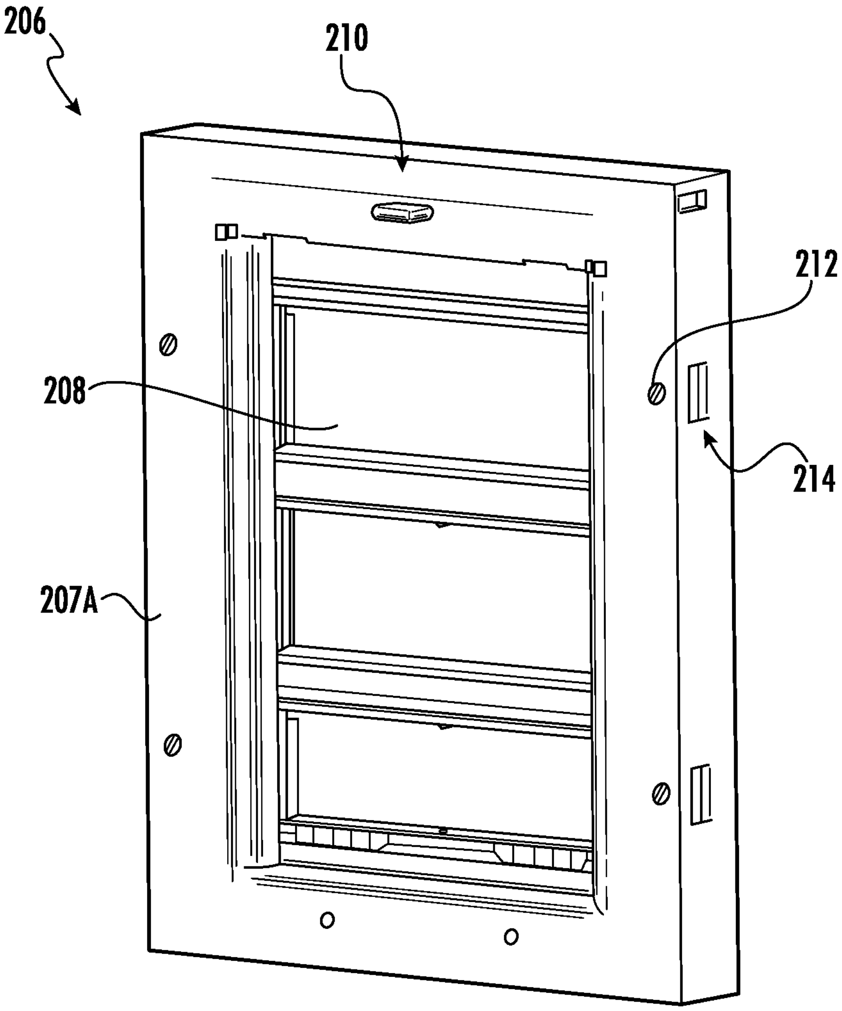
Figure 2B:
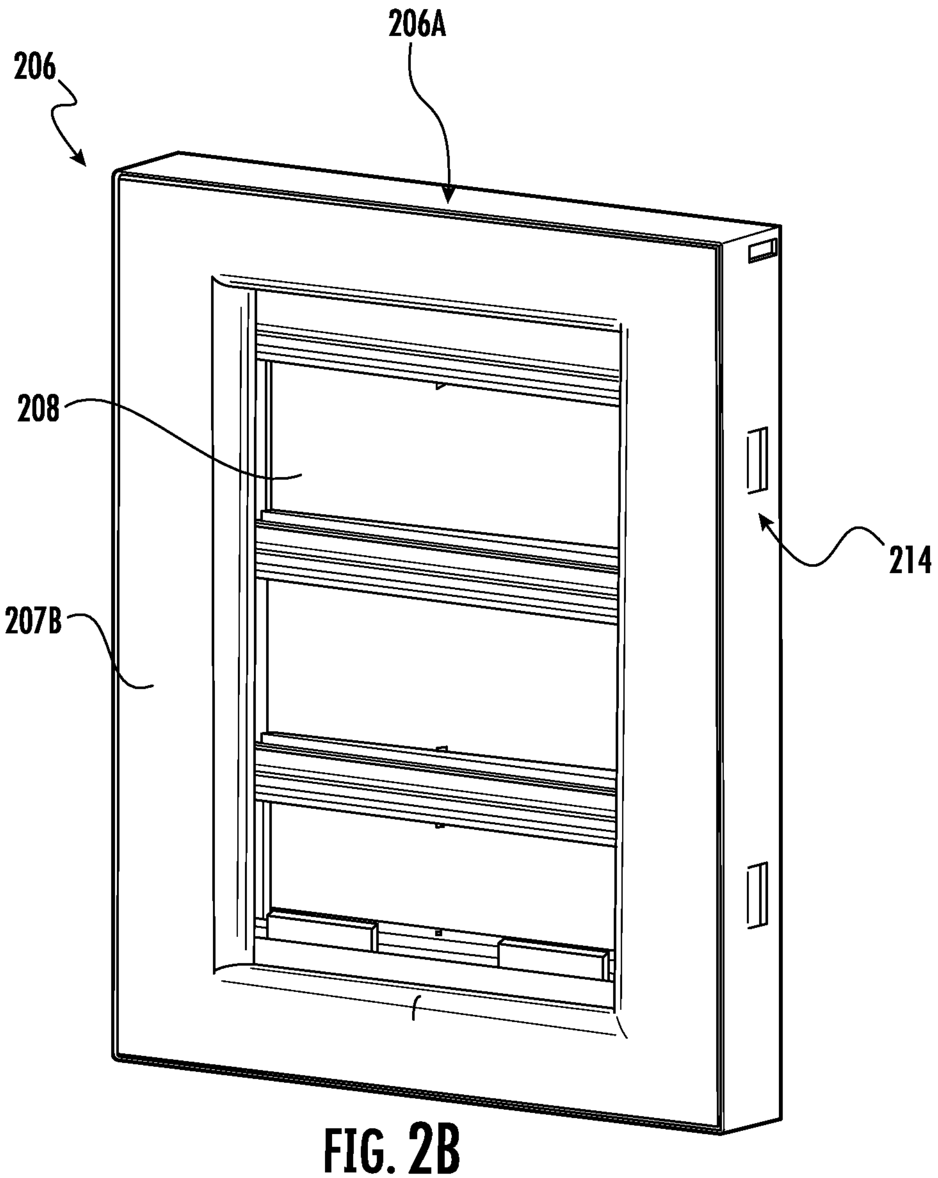
Figure 2C:
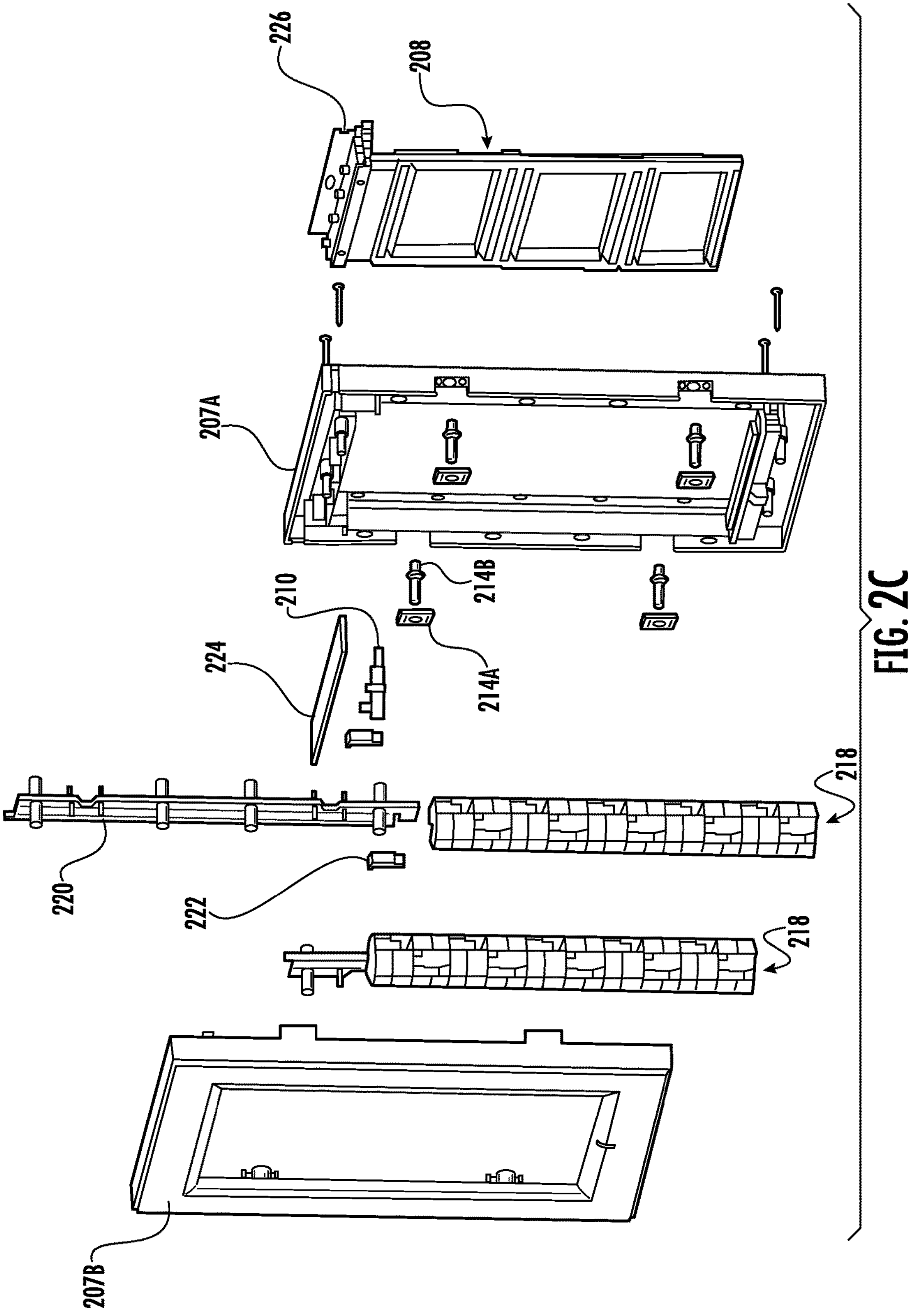
Figure 2D:
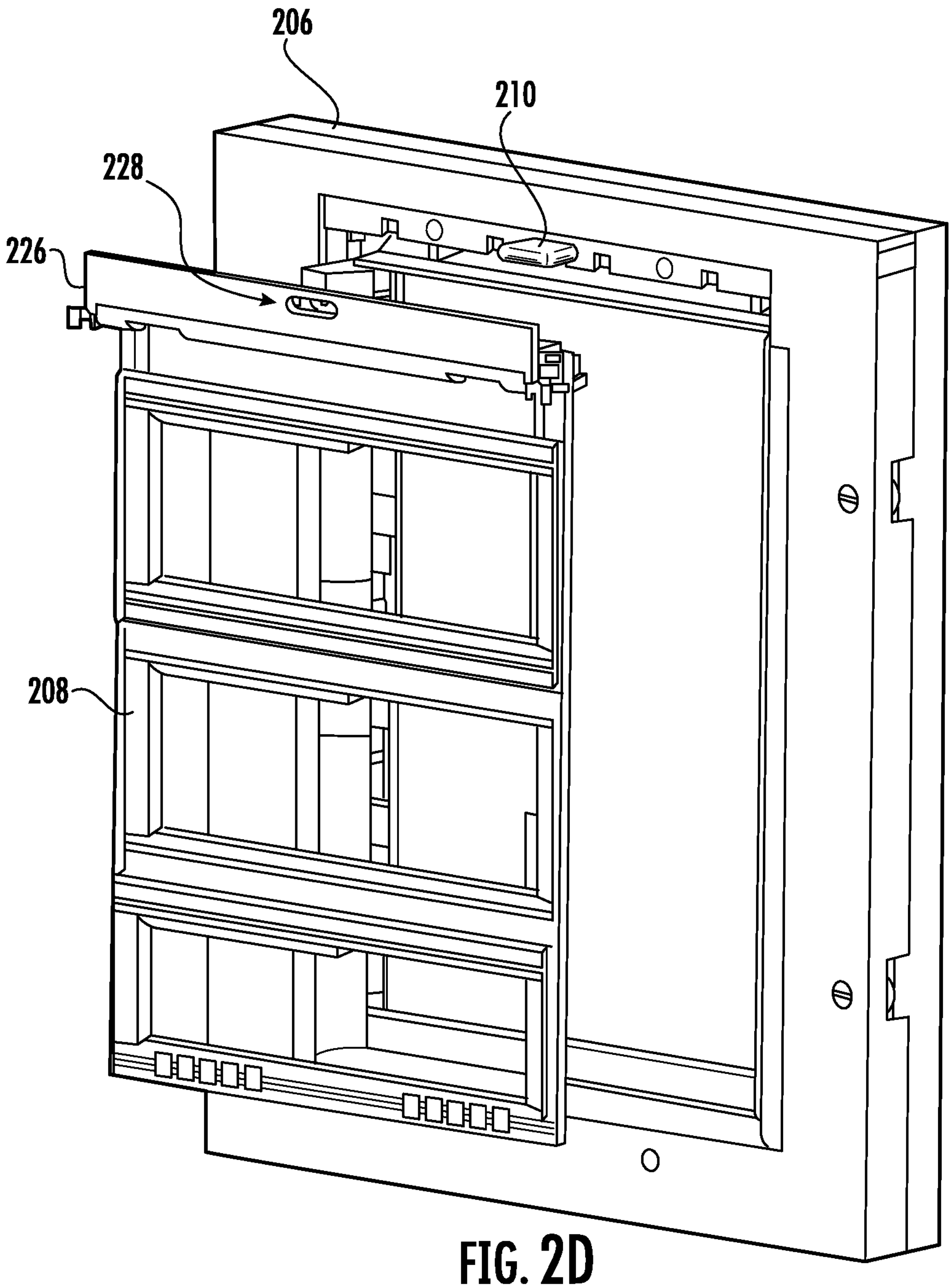
Figure 2E:
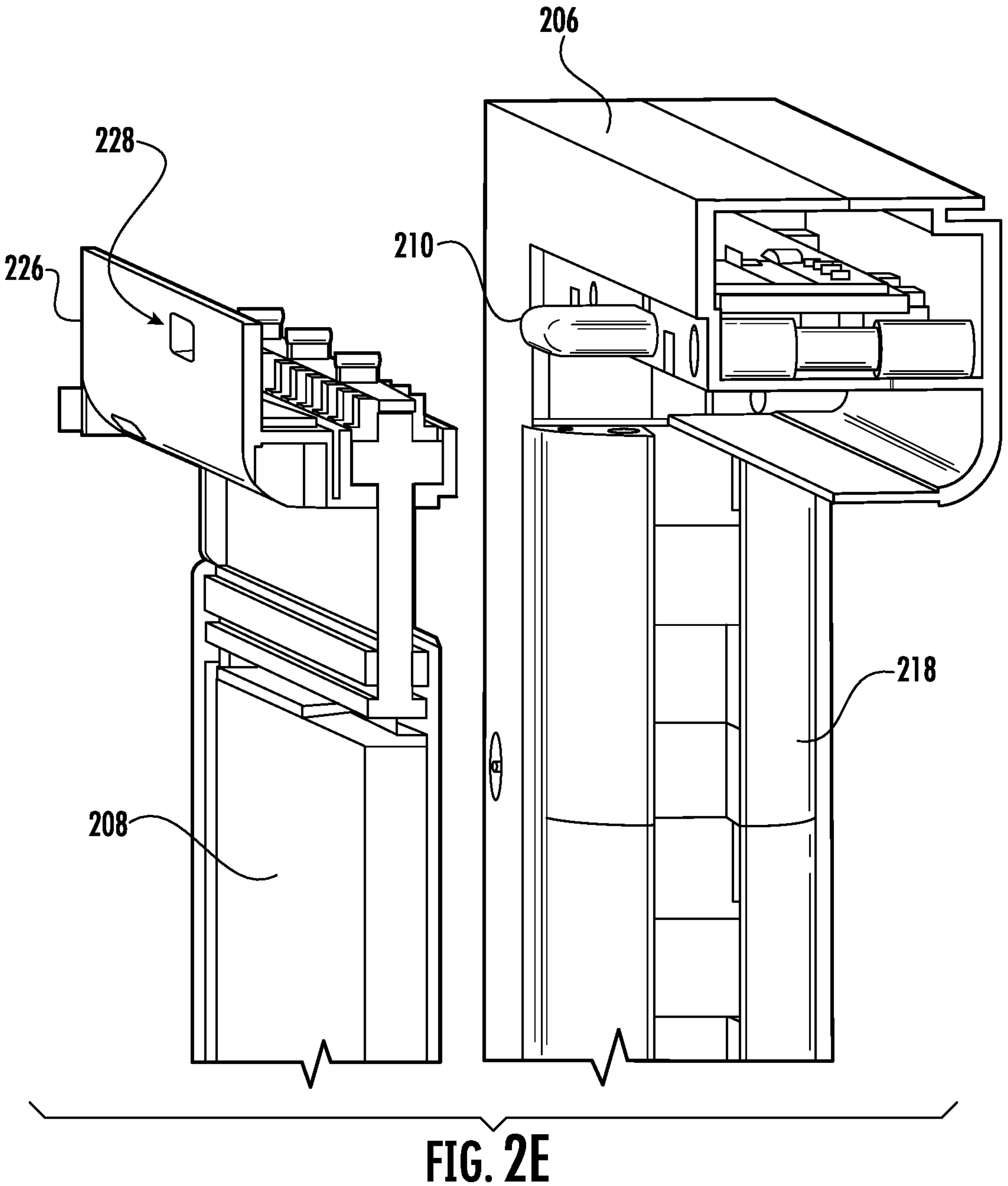
Figure 2F:
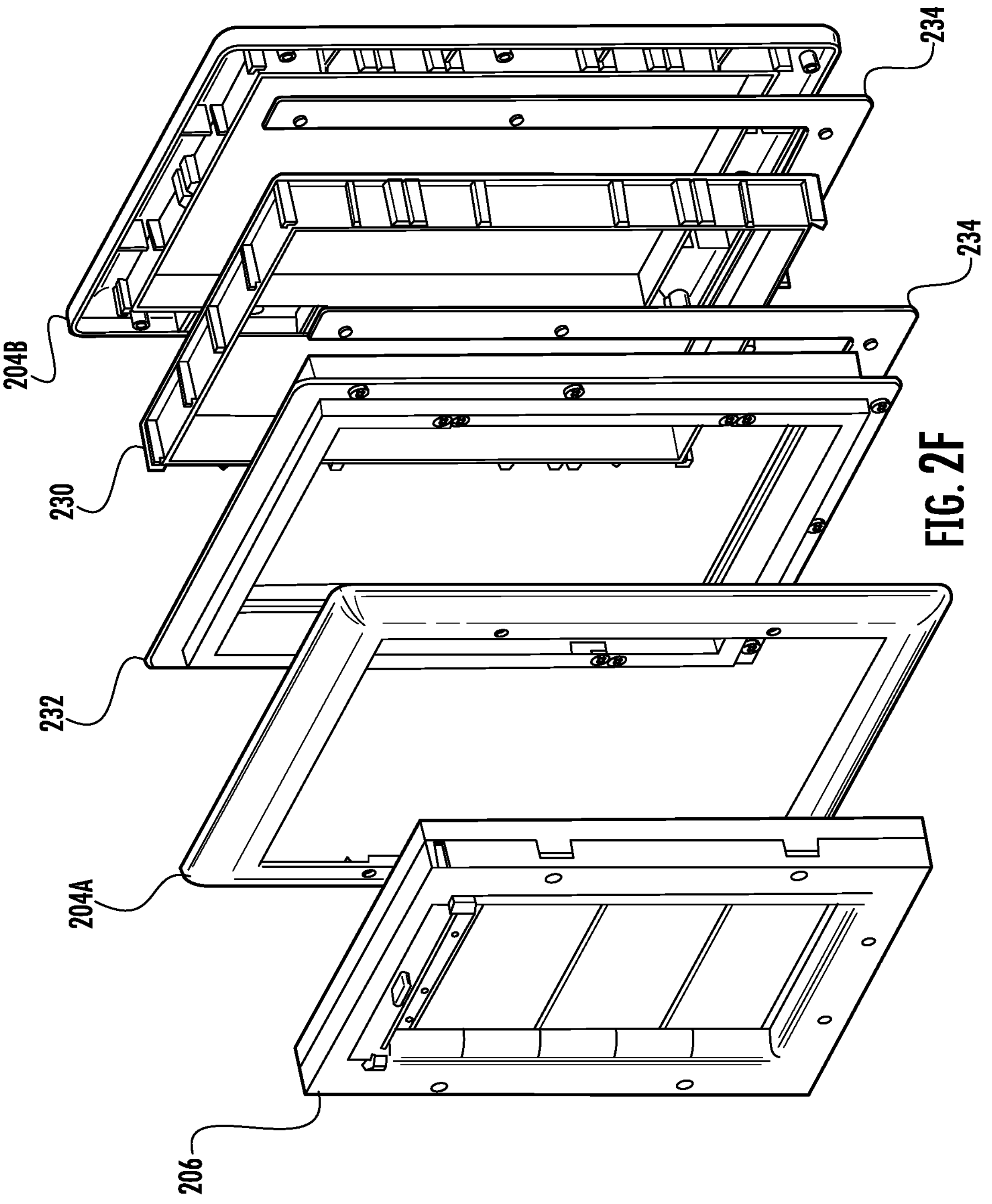
Figure 2G:
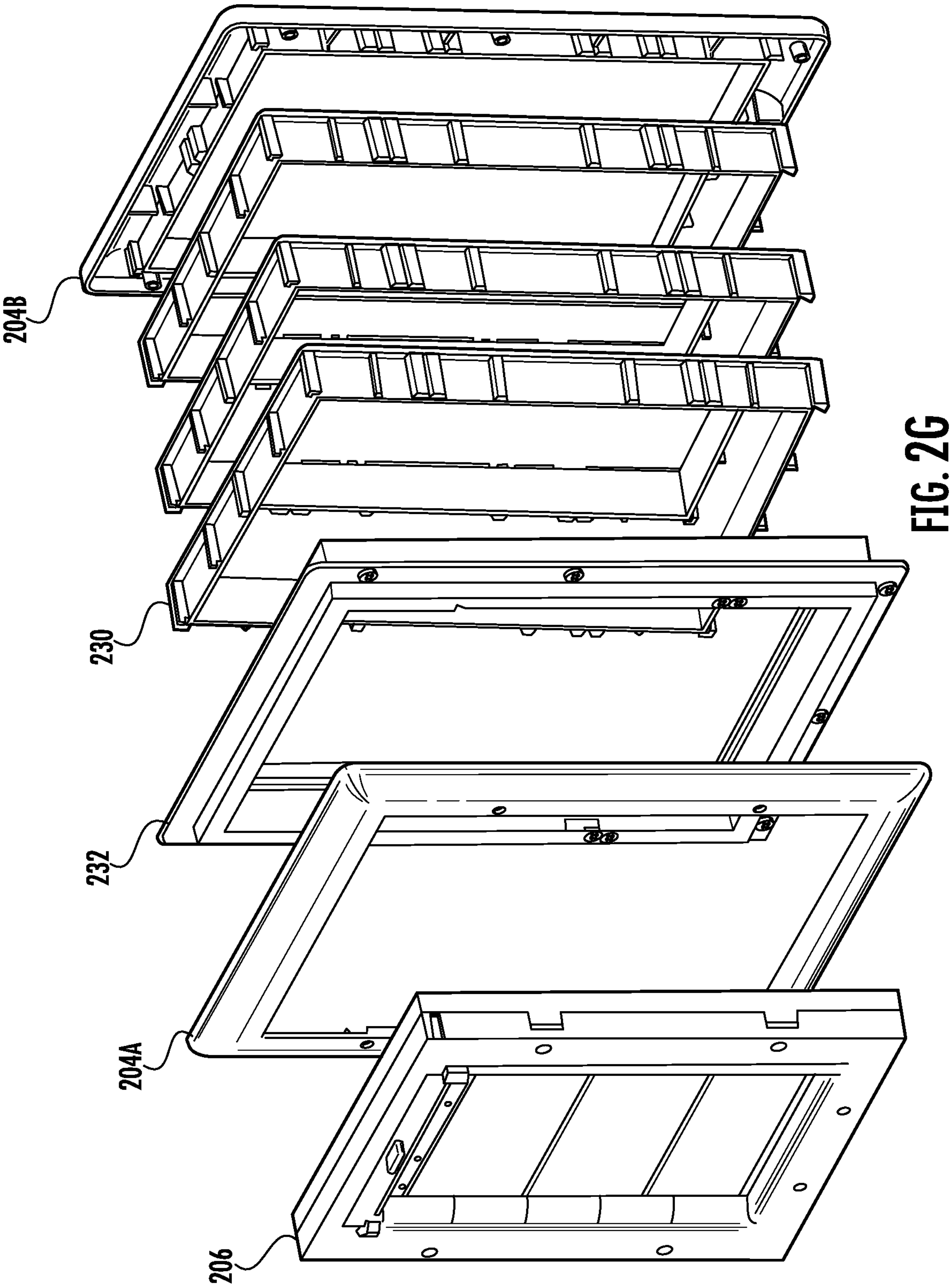
Figure 3A:
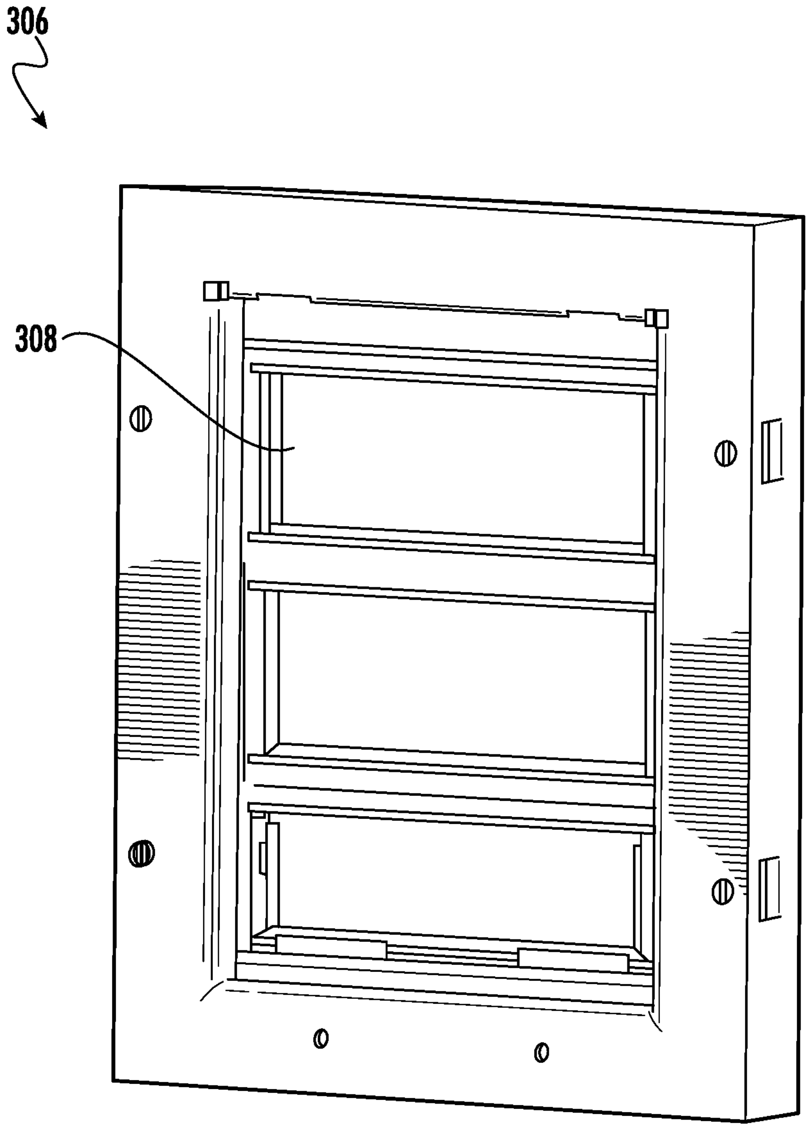
Figure 3B:
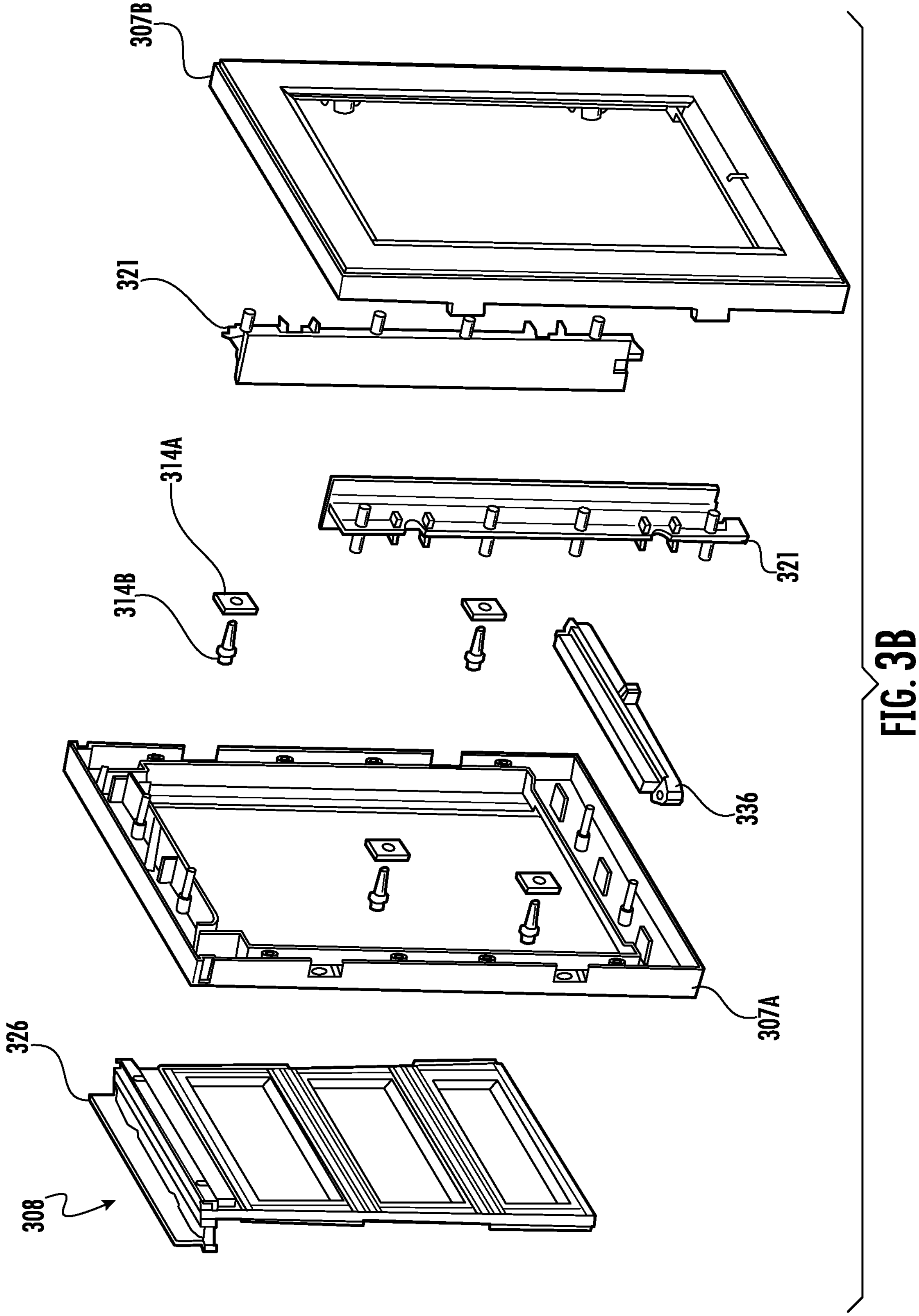
Figure 3C:
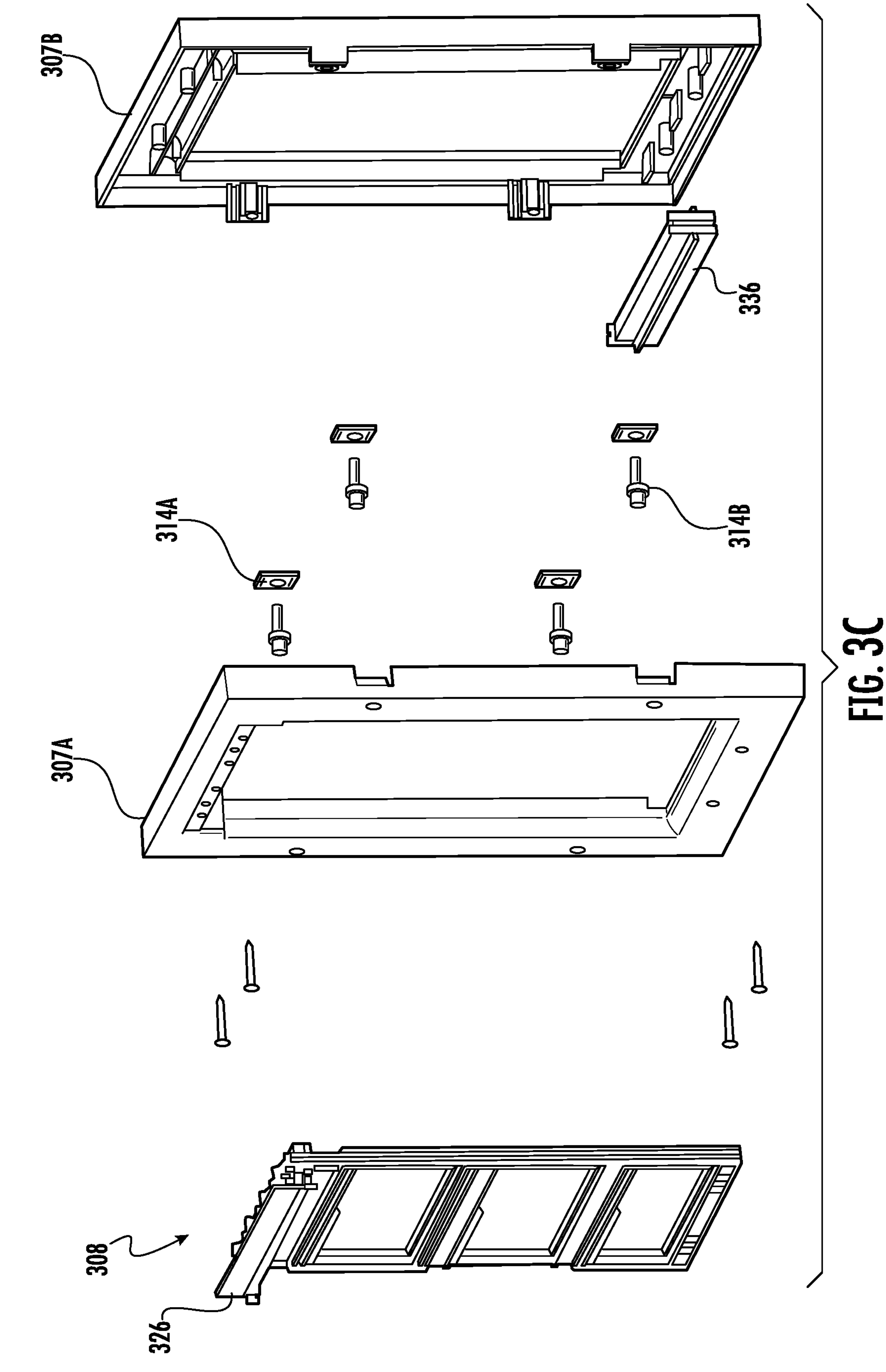
Figure 3D:
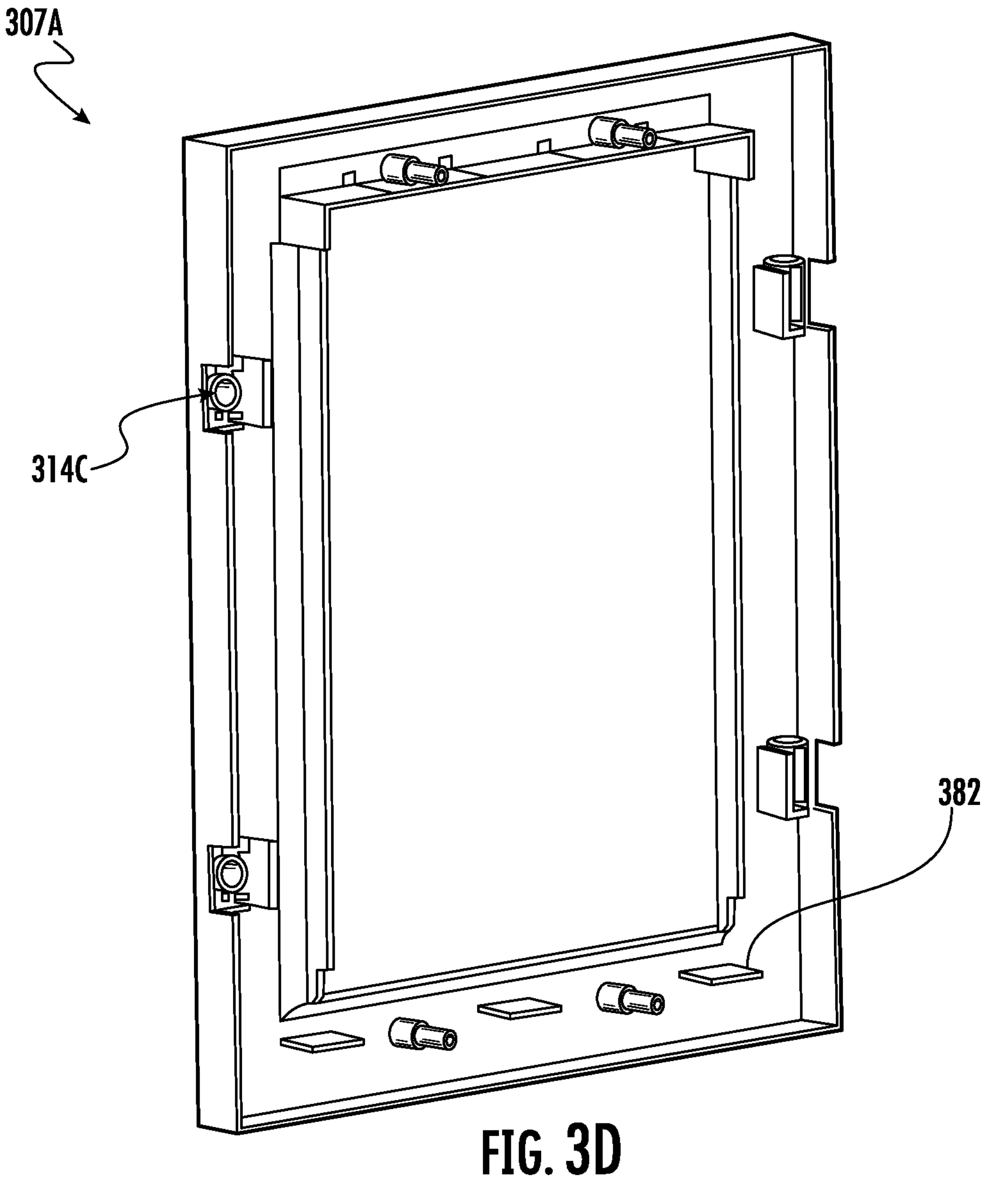
Figure 3E:
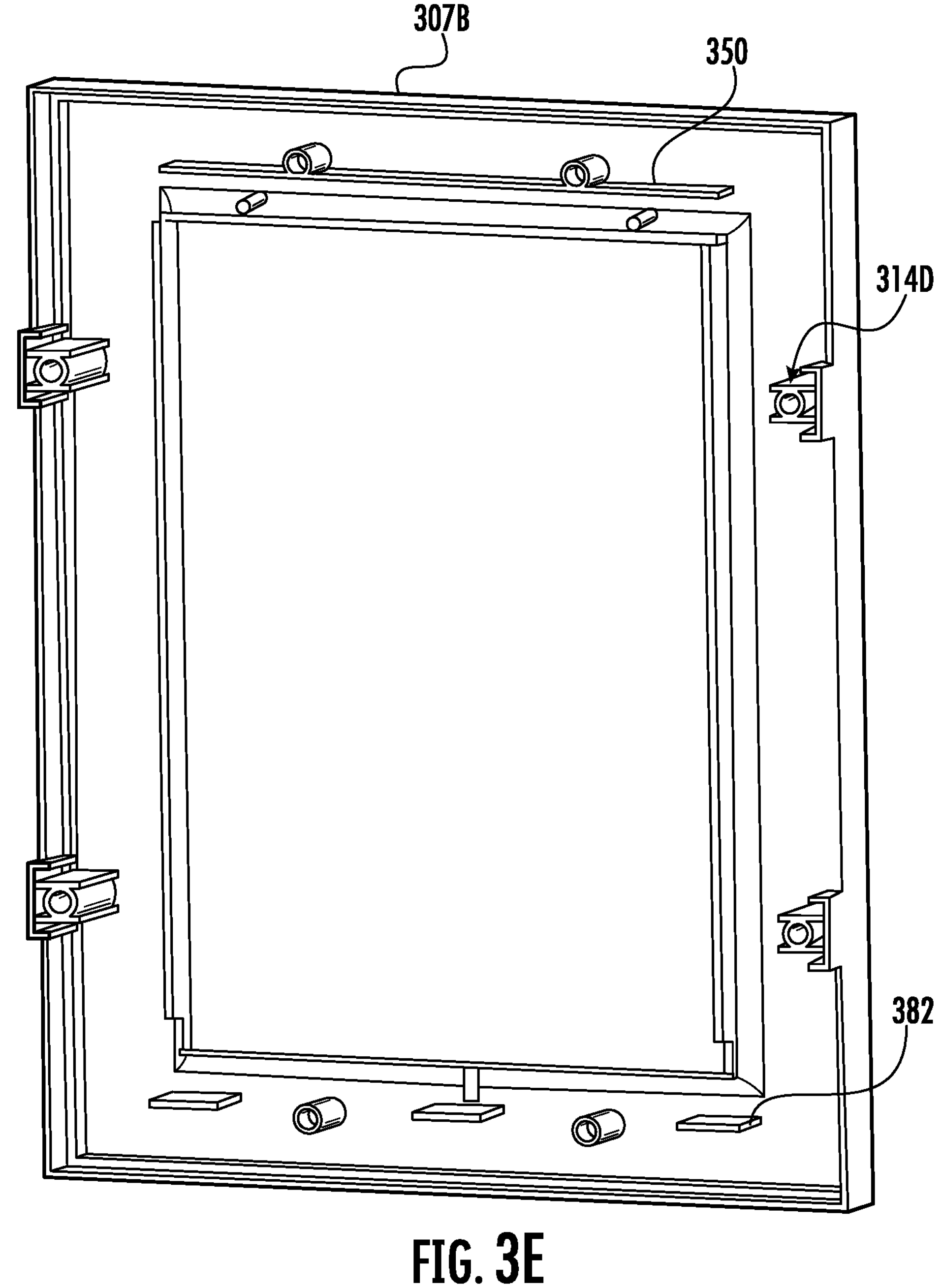
Figure 3F:
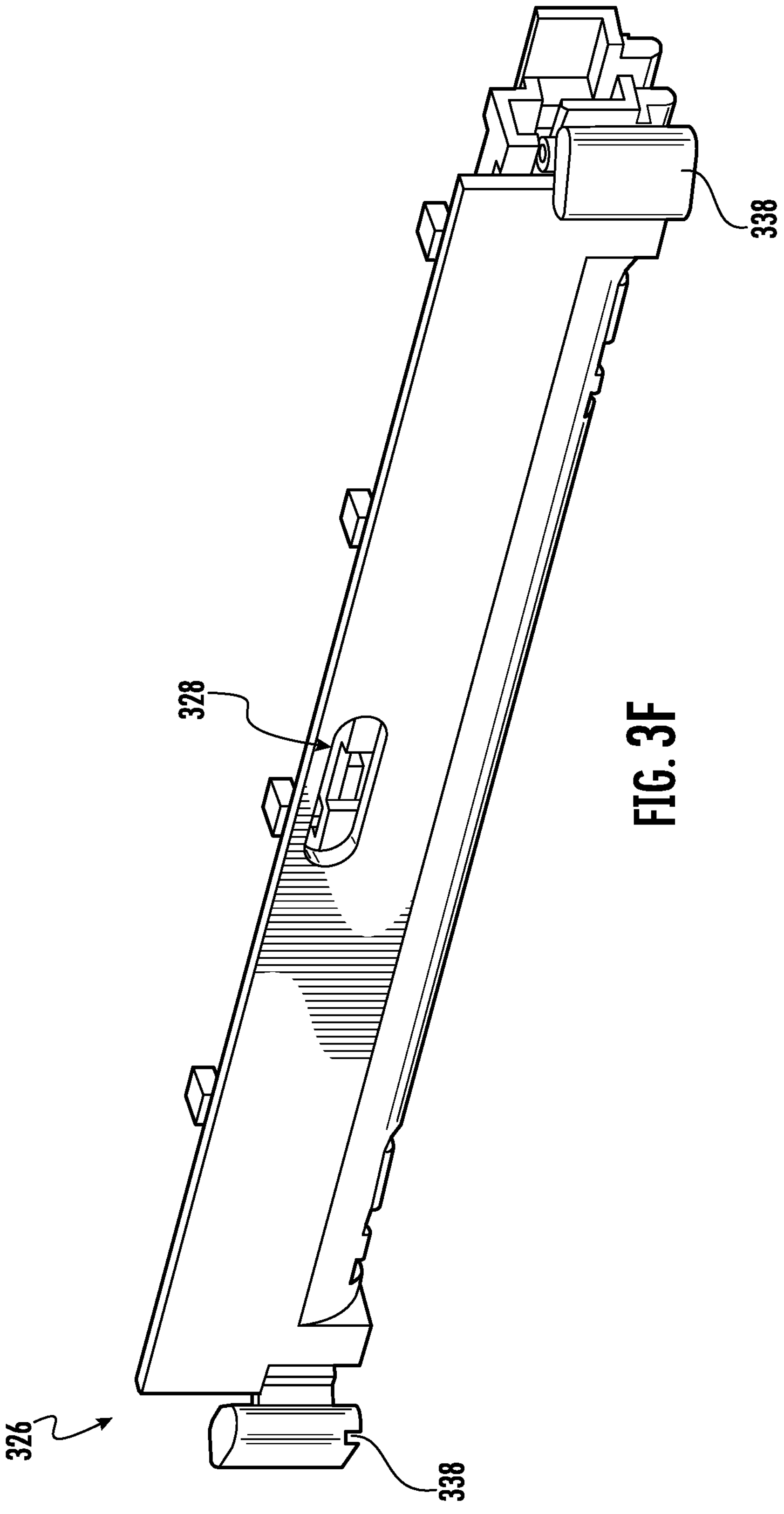
Figure 3G:
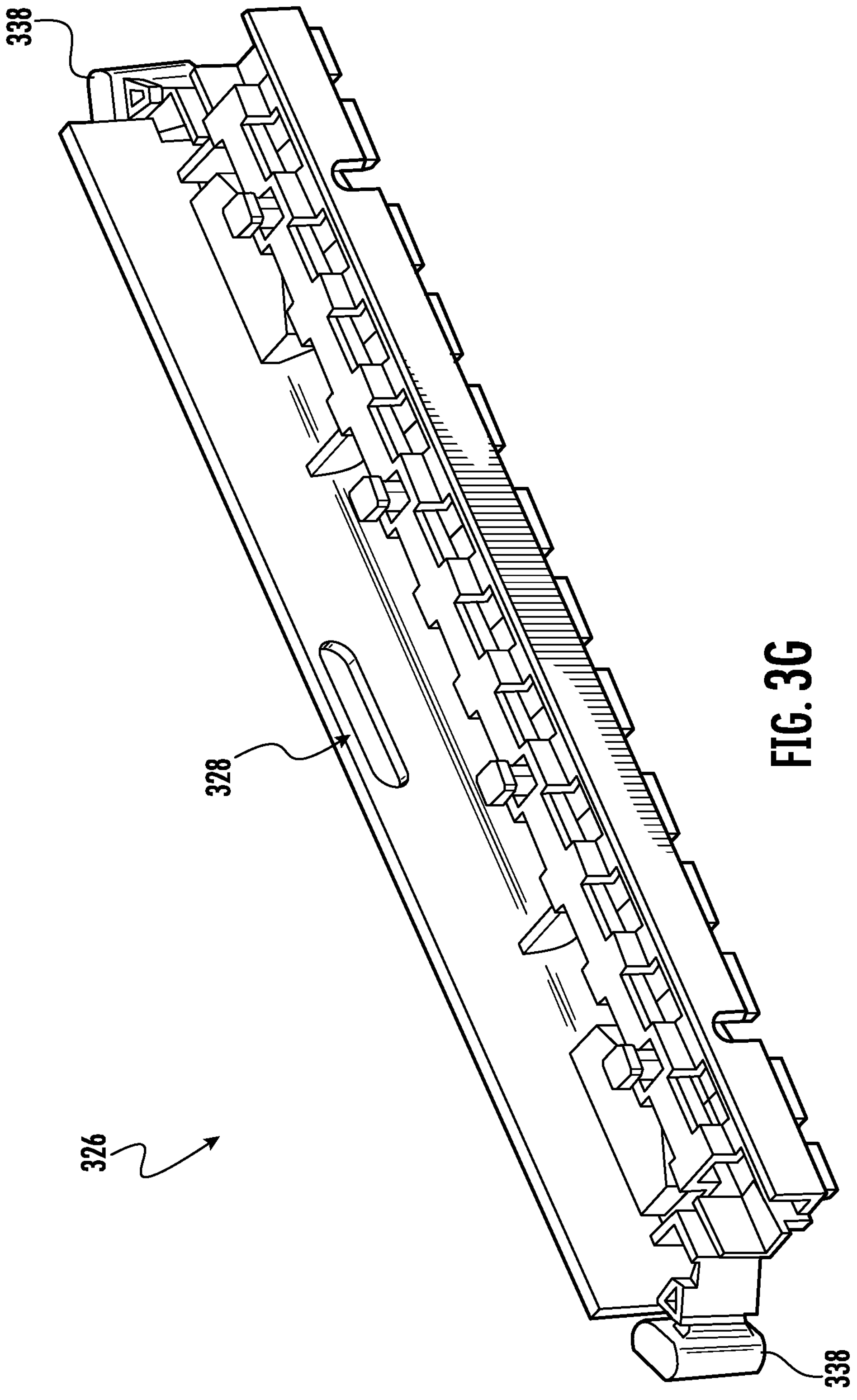
Figure 3H:
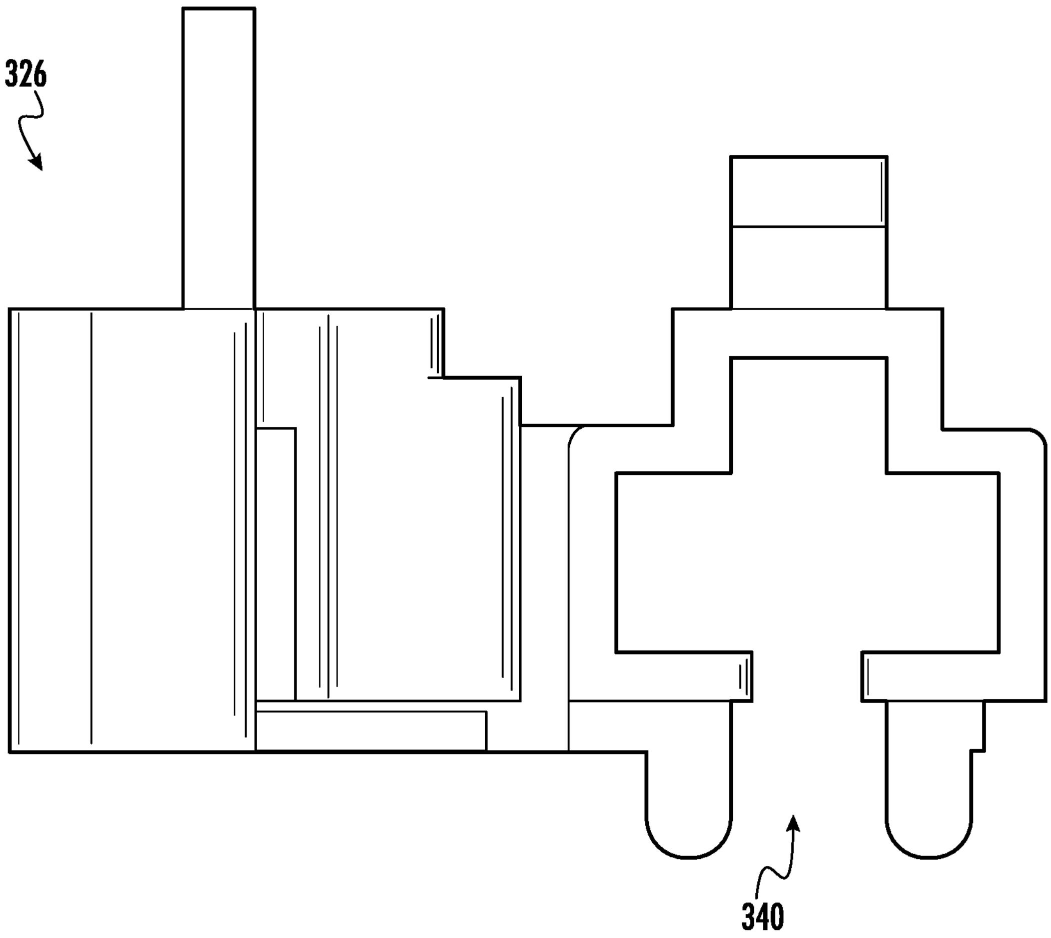
Figure 3I:
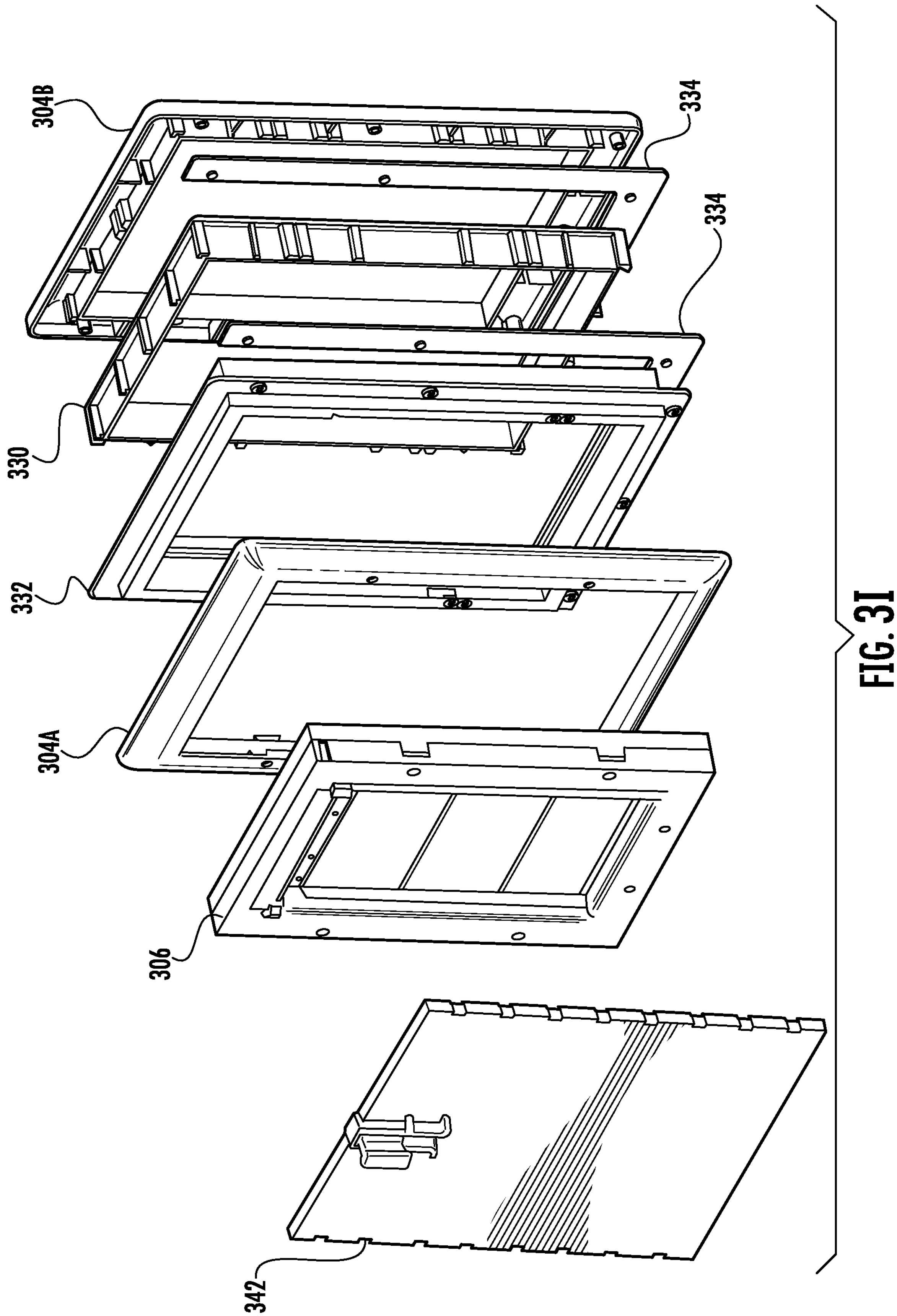
Figure 4A:
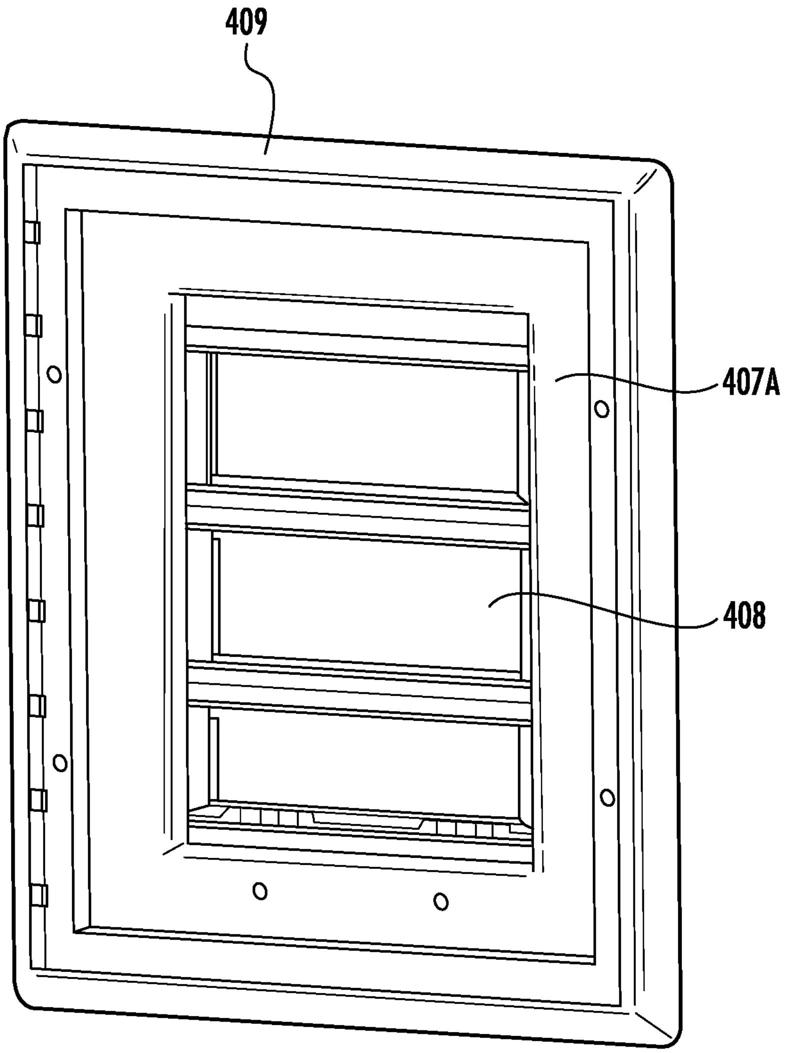
Figure 4B:
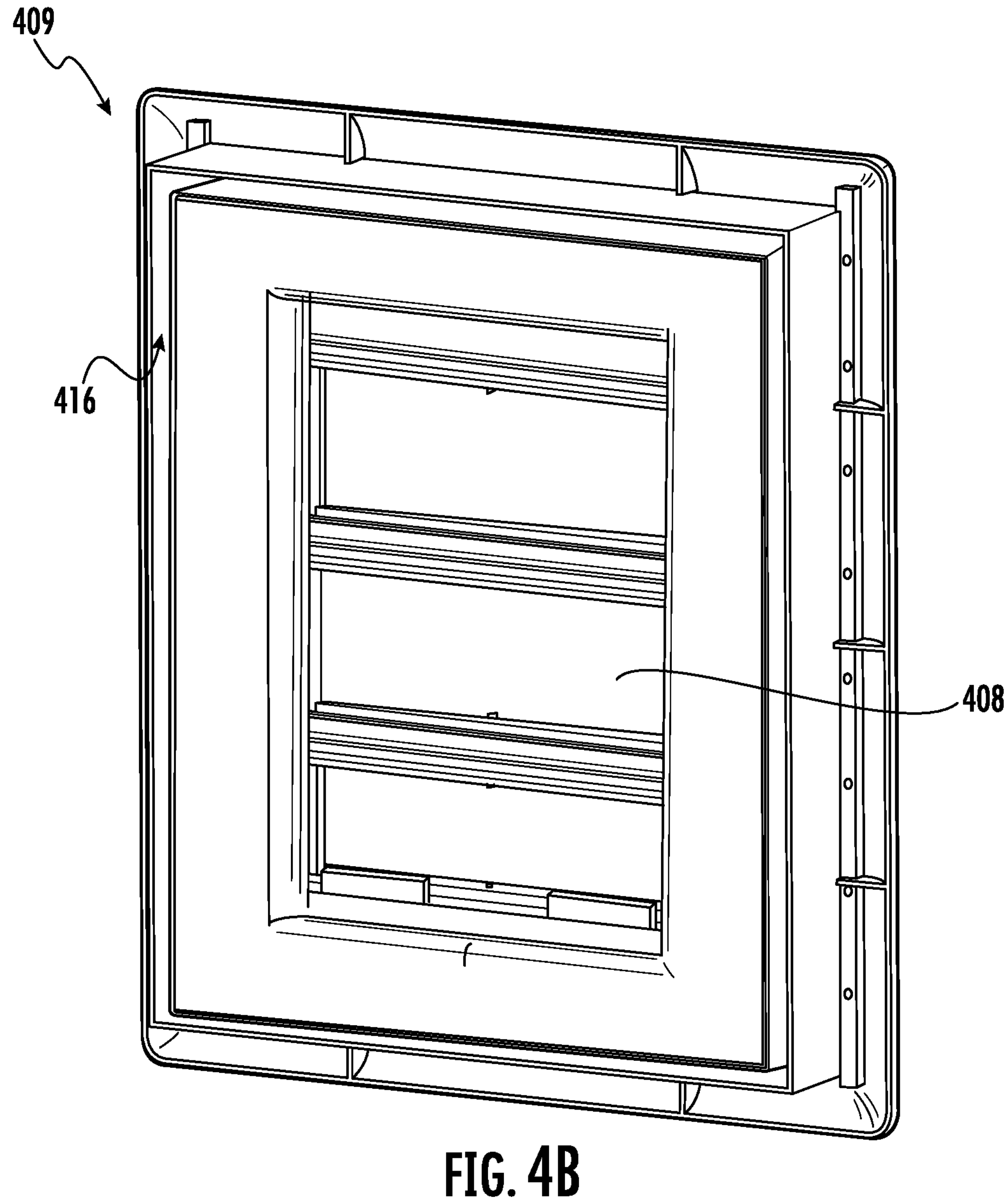
Figure 5A:
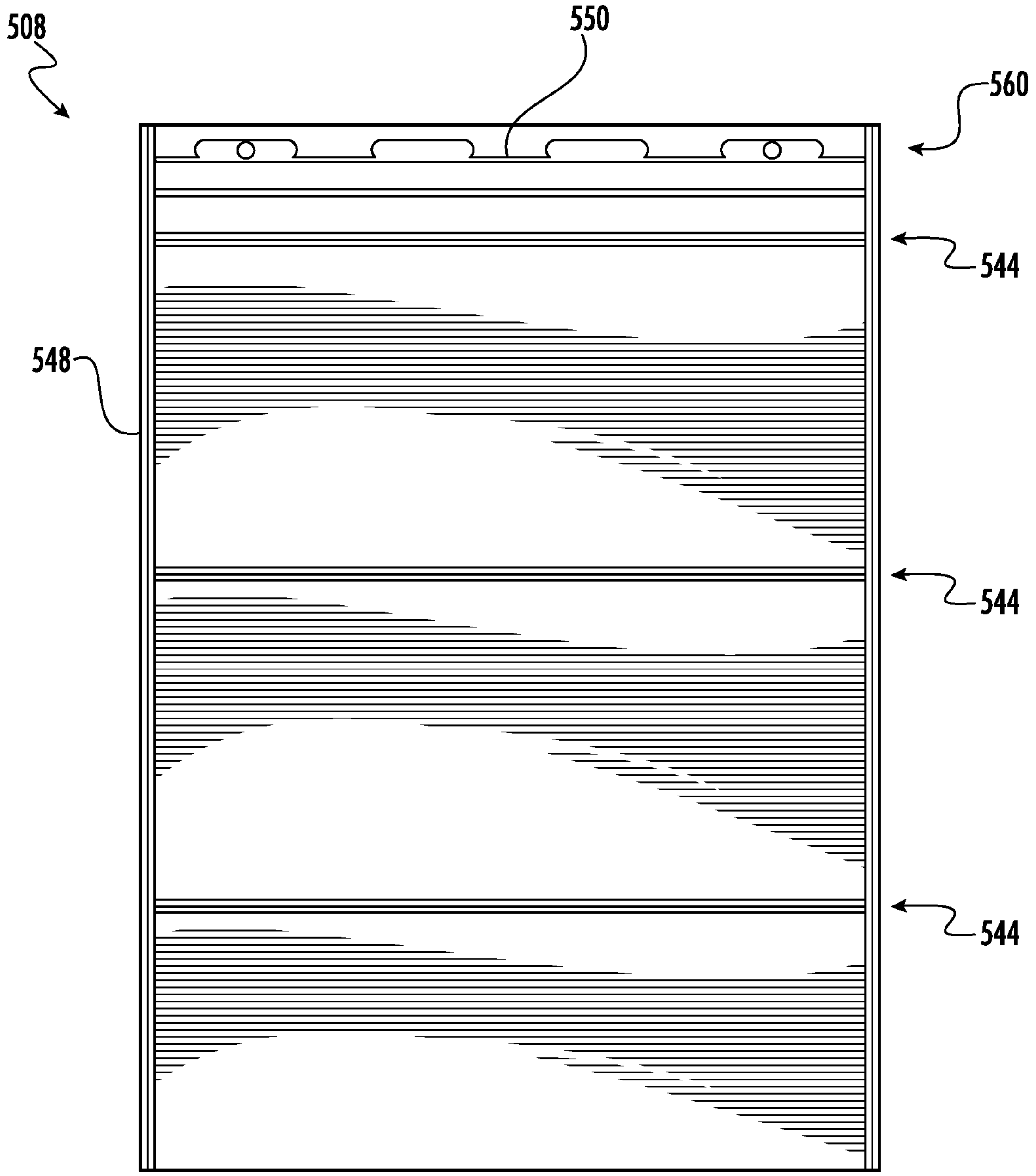
Figure 5B:
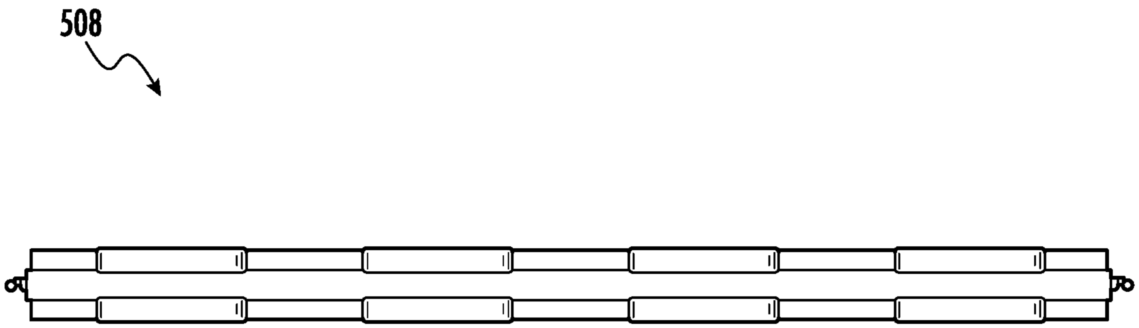
Figure 5C:
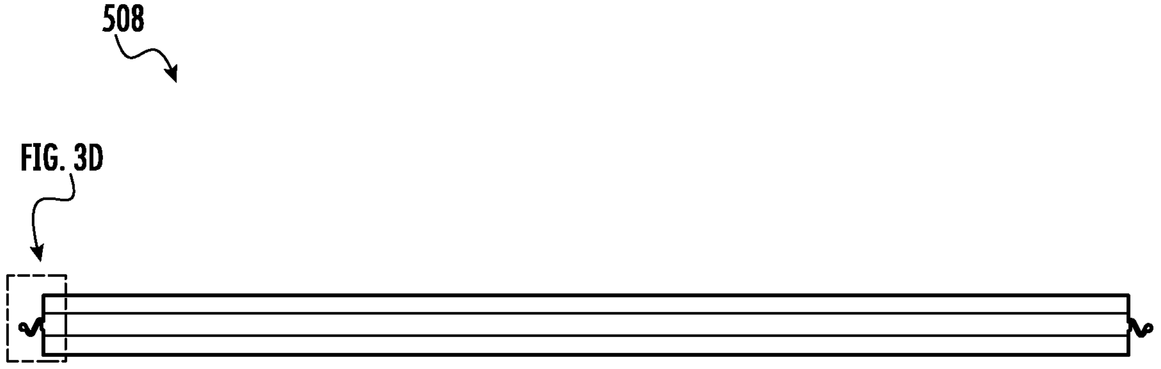
Figure 5D:
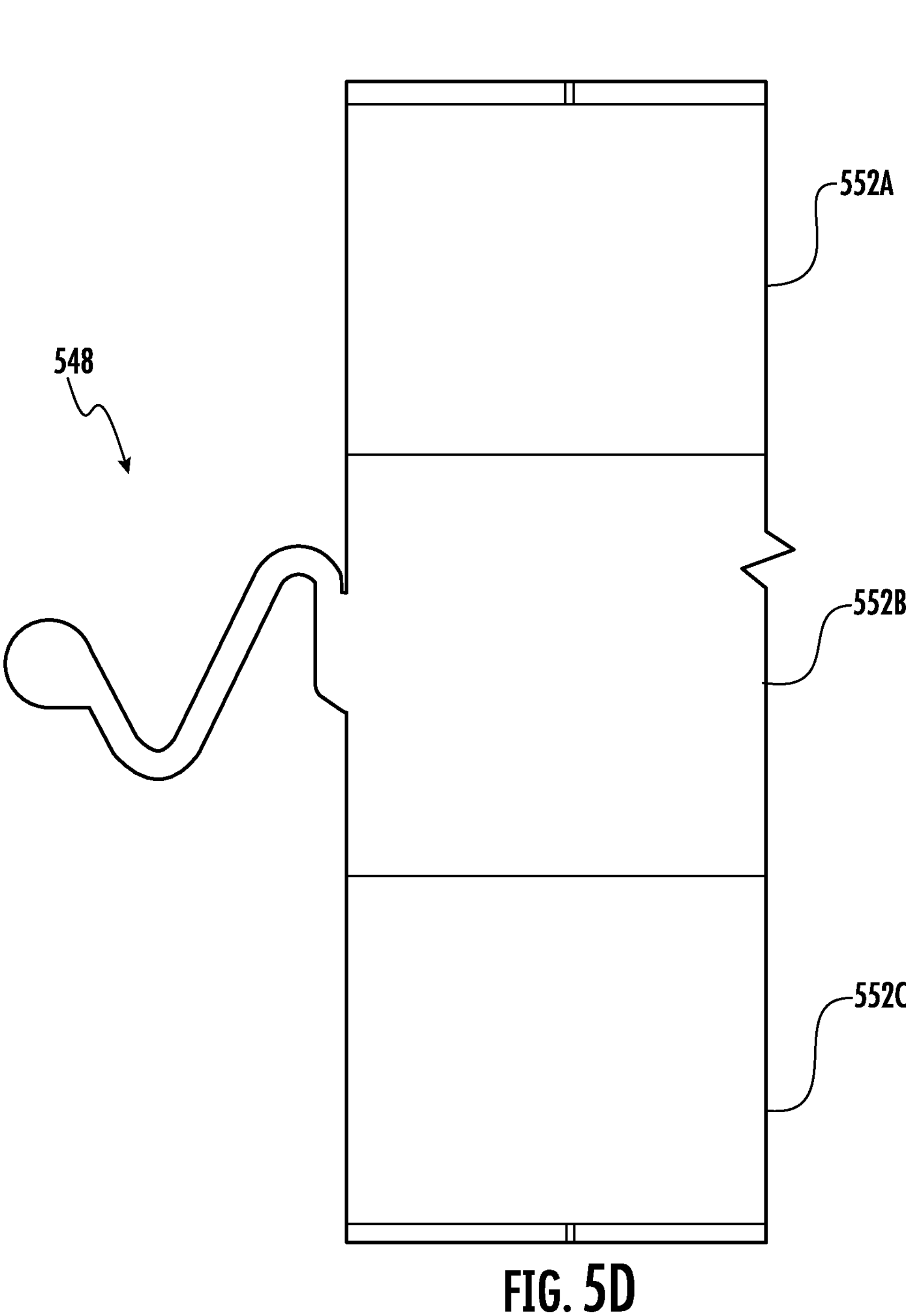
Figure 5E:
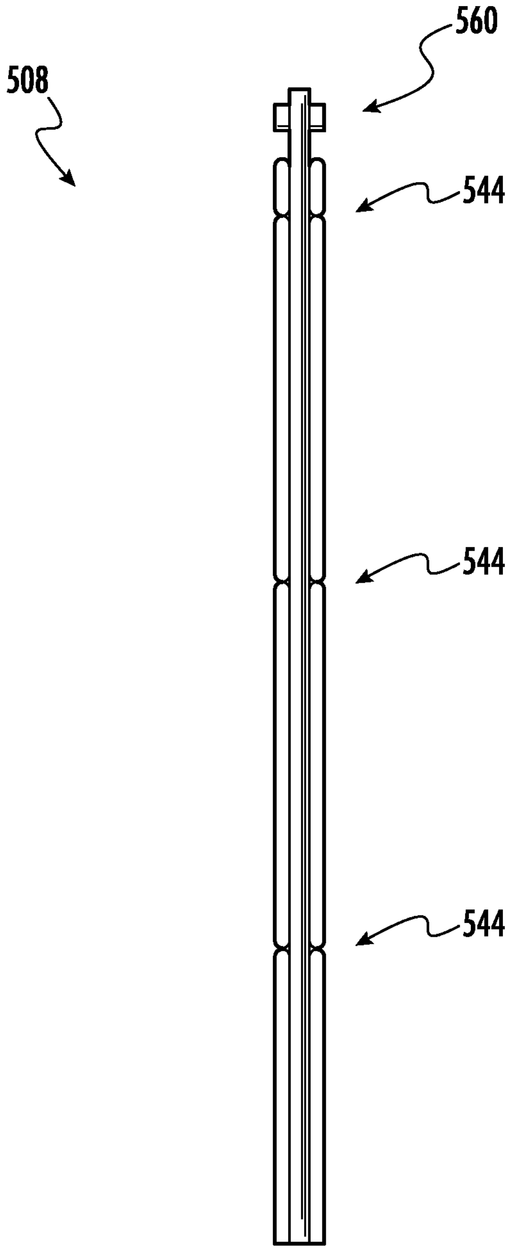
Figure 5F:
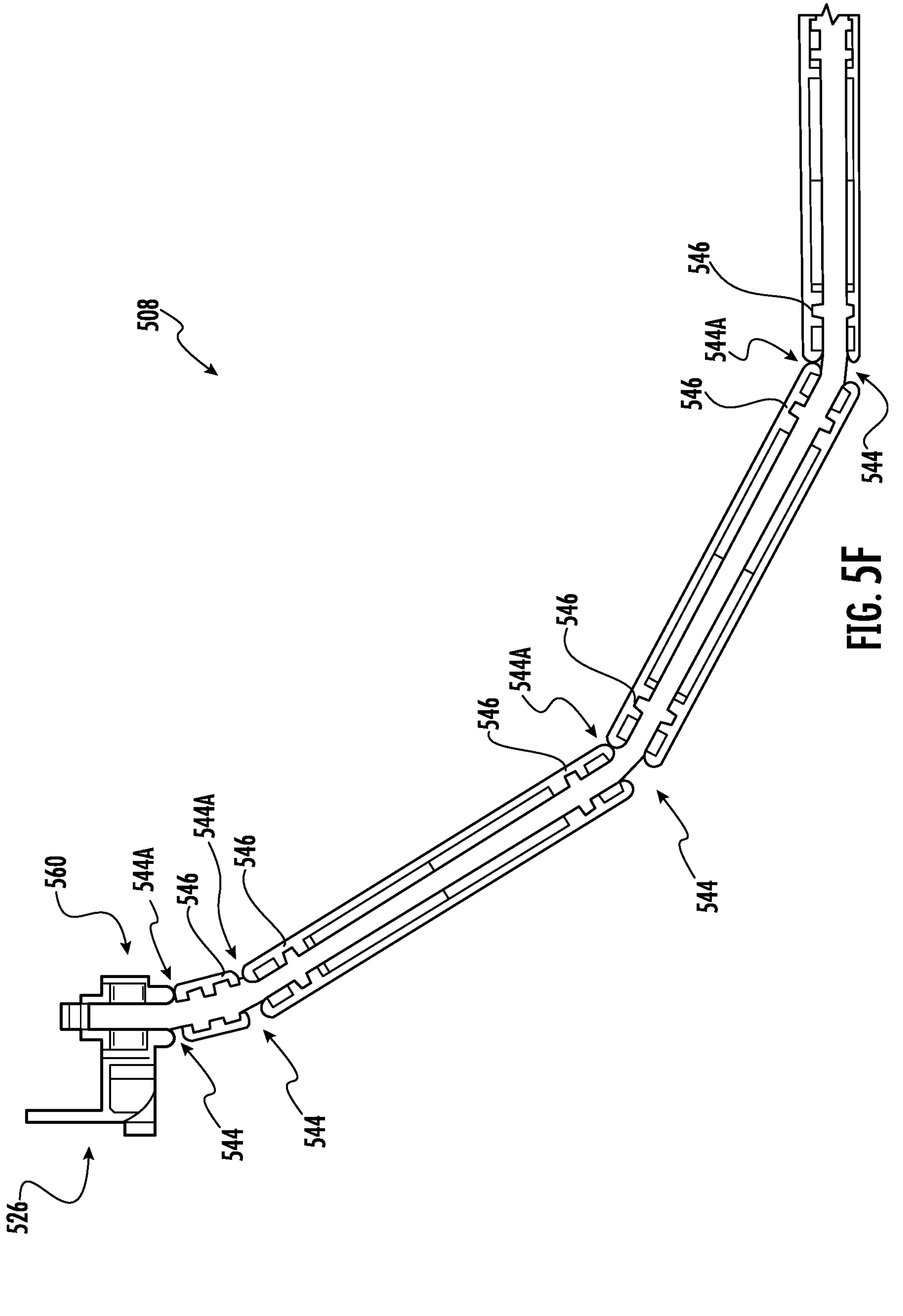
Figure 5G:
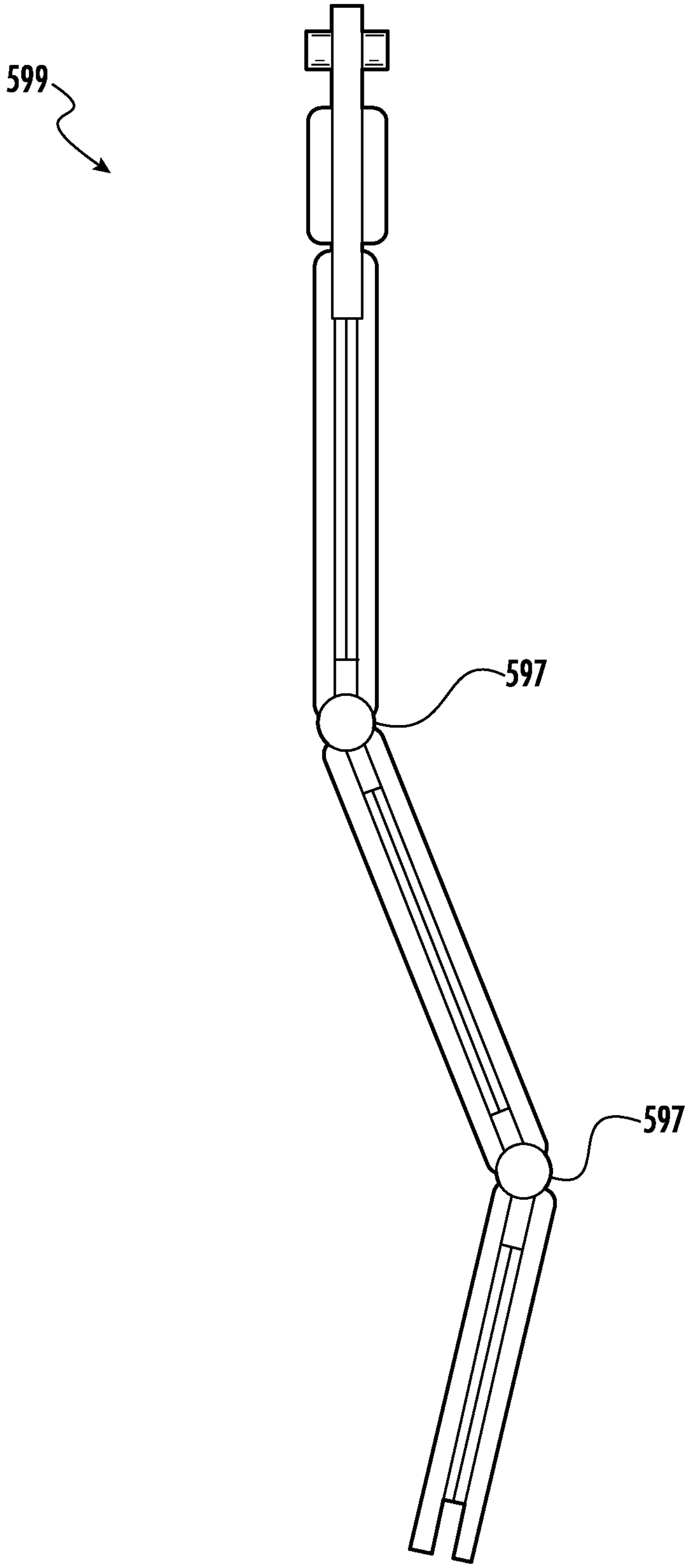
Figure 5H:
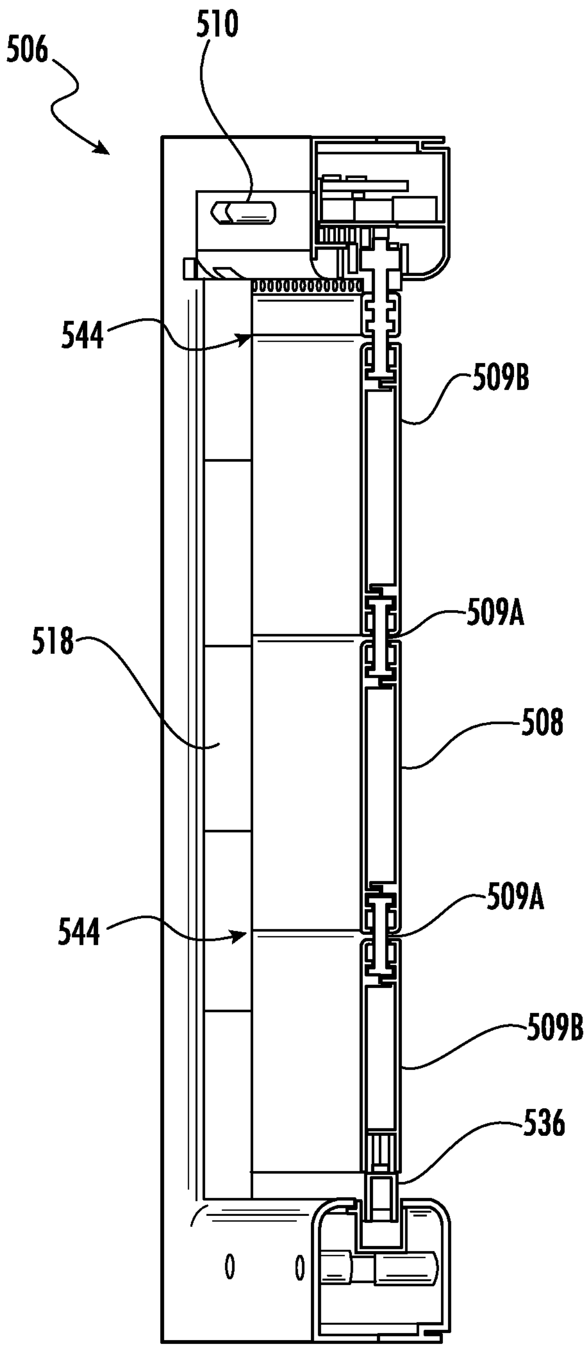
Figure 5I:
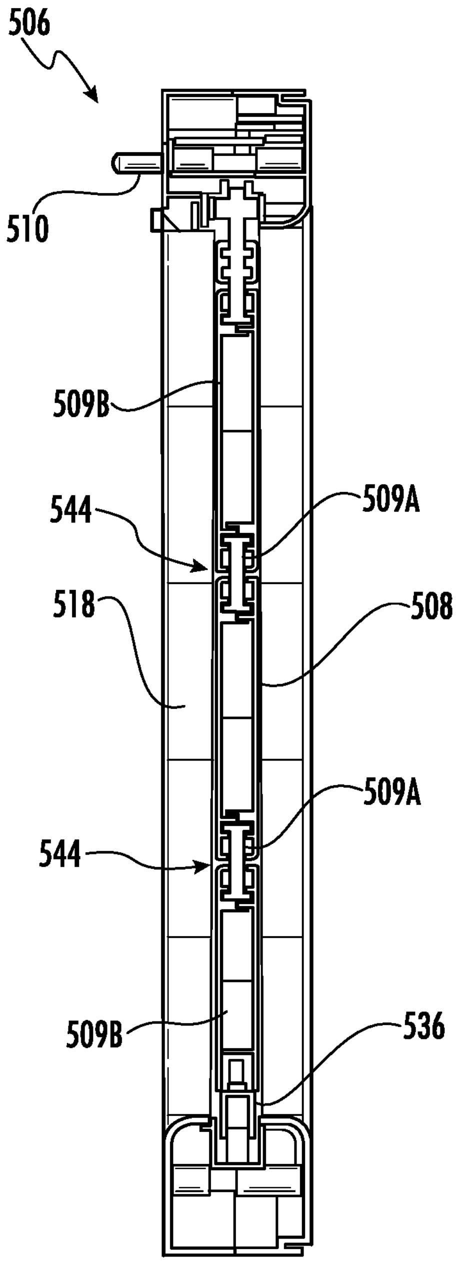
Figure 5J:
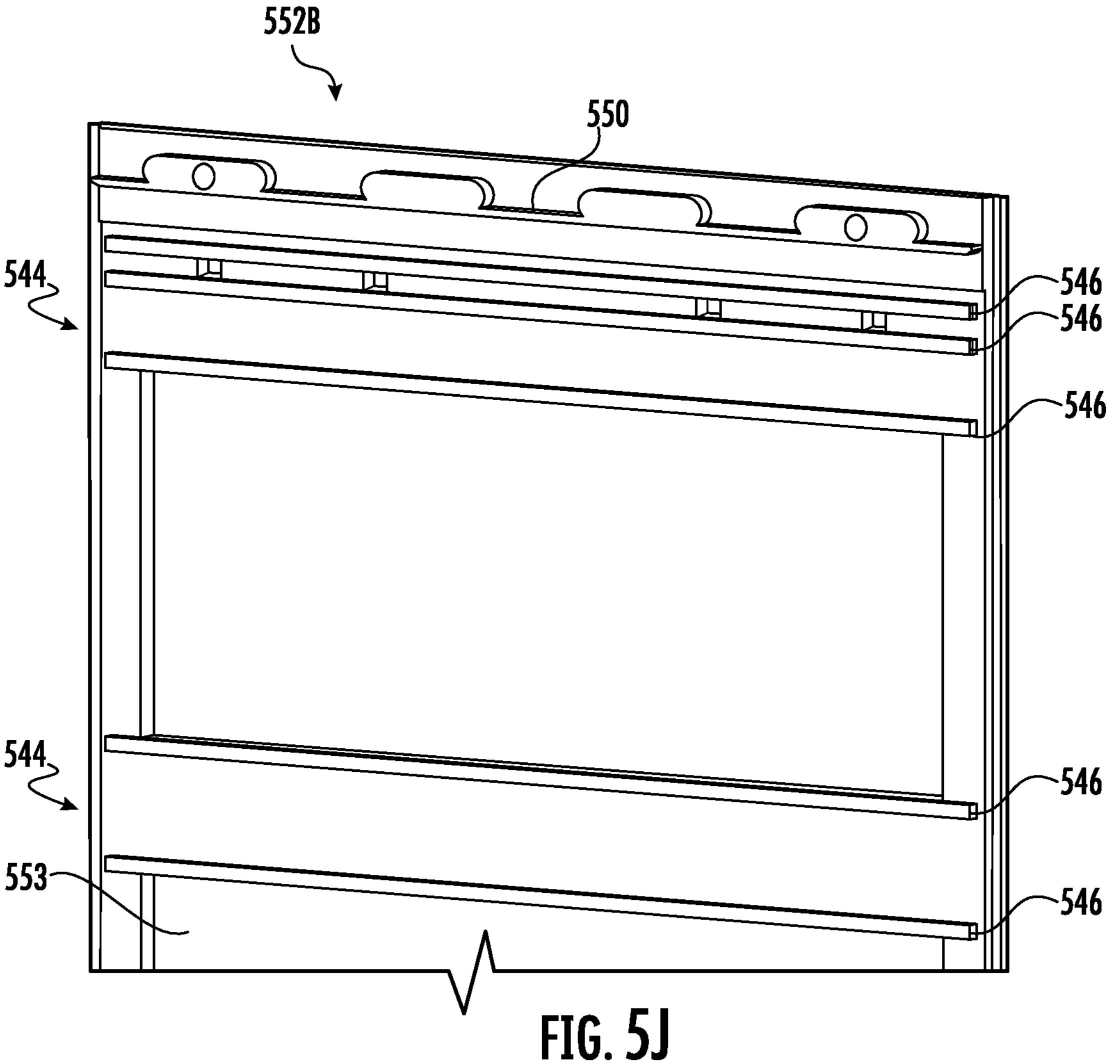
Figure 6A:
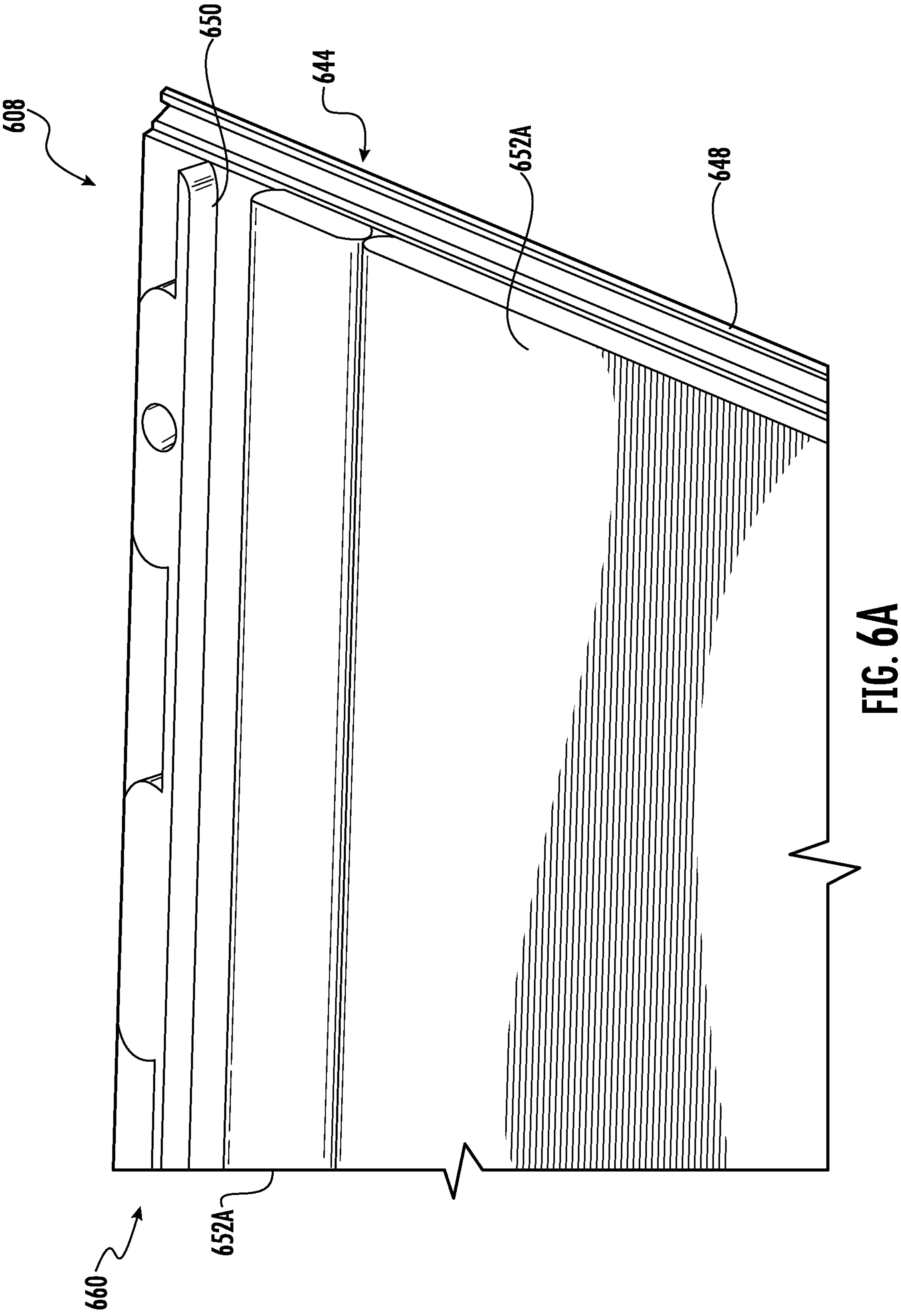
Figure 6B:
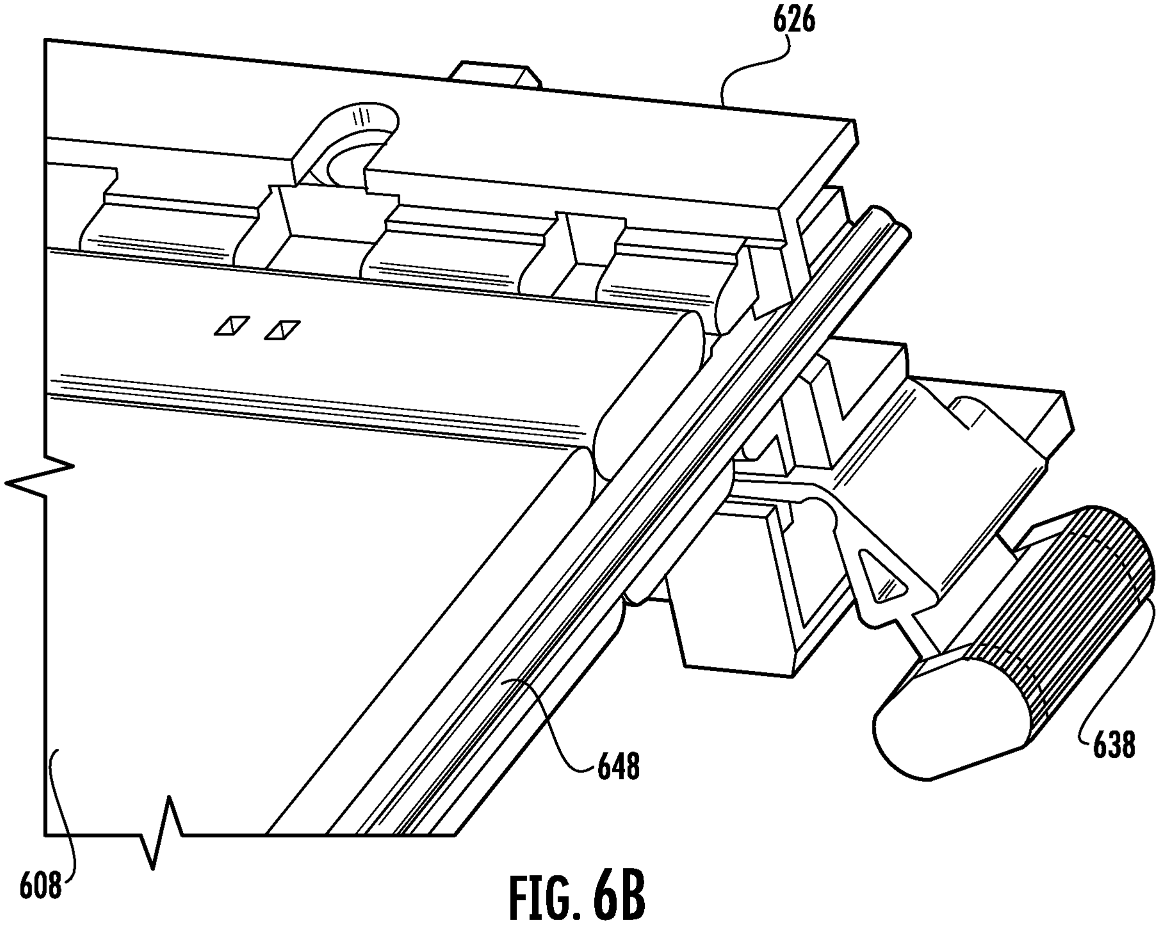
Figure 6C:
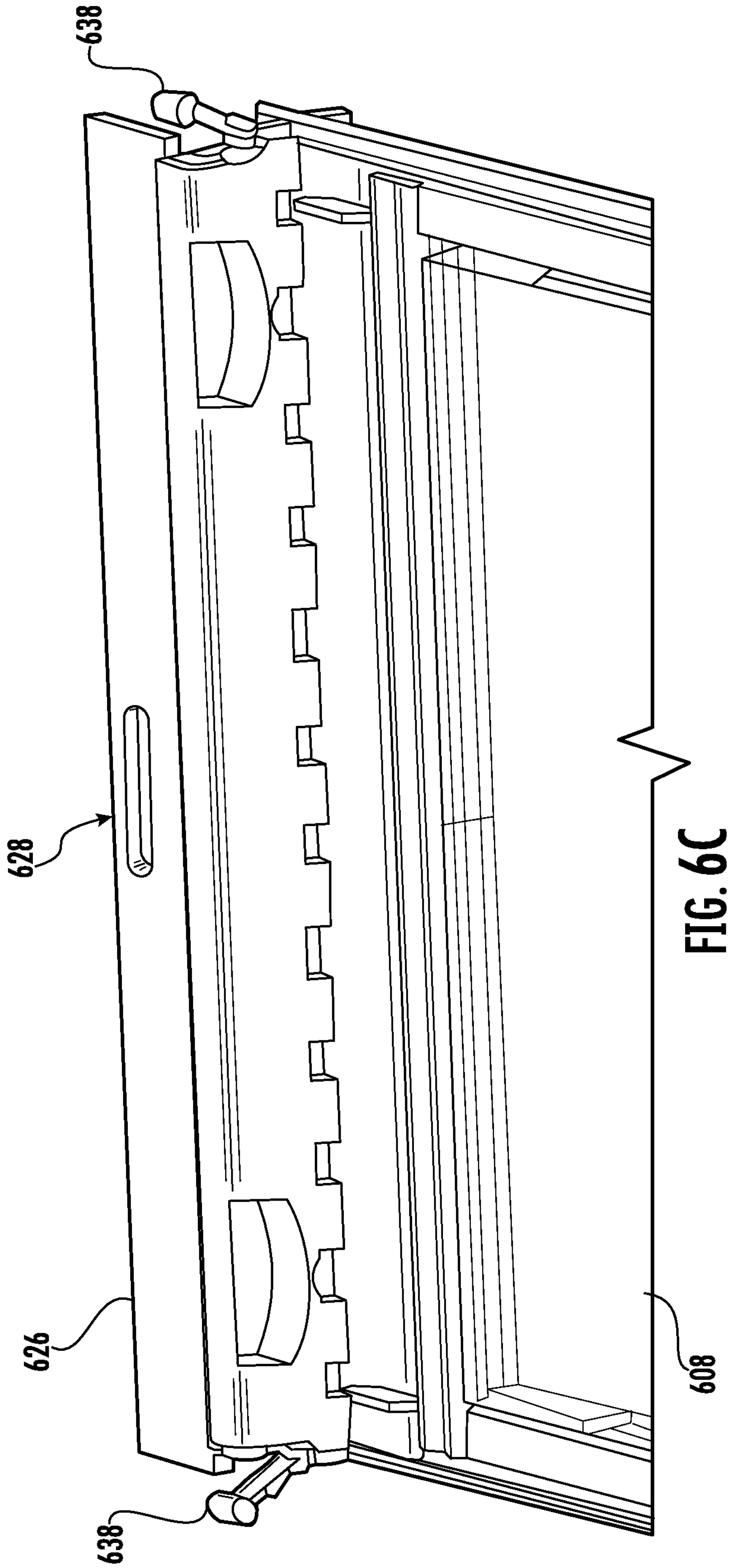
Figure 7A:
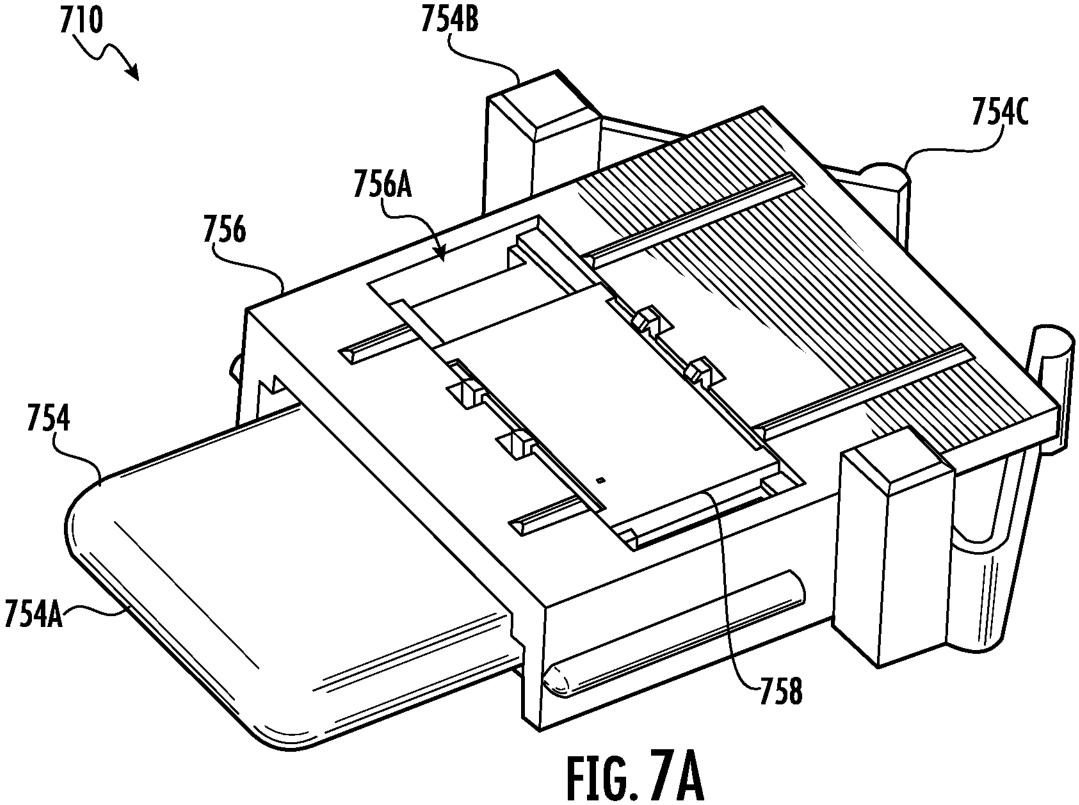
Figure 7B:
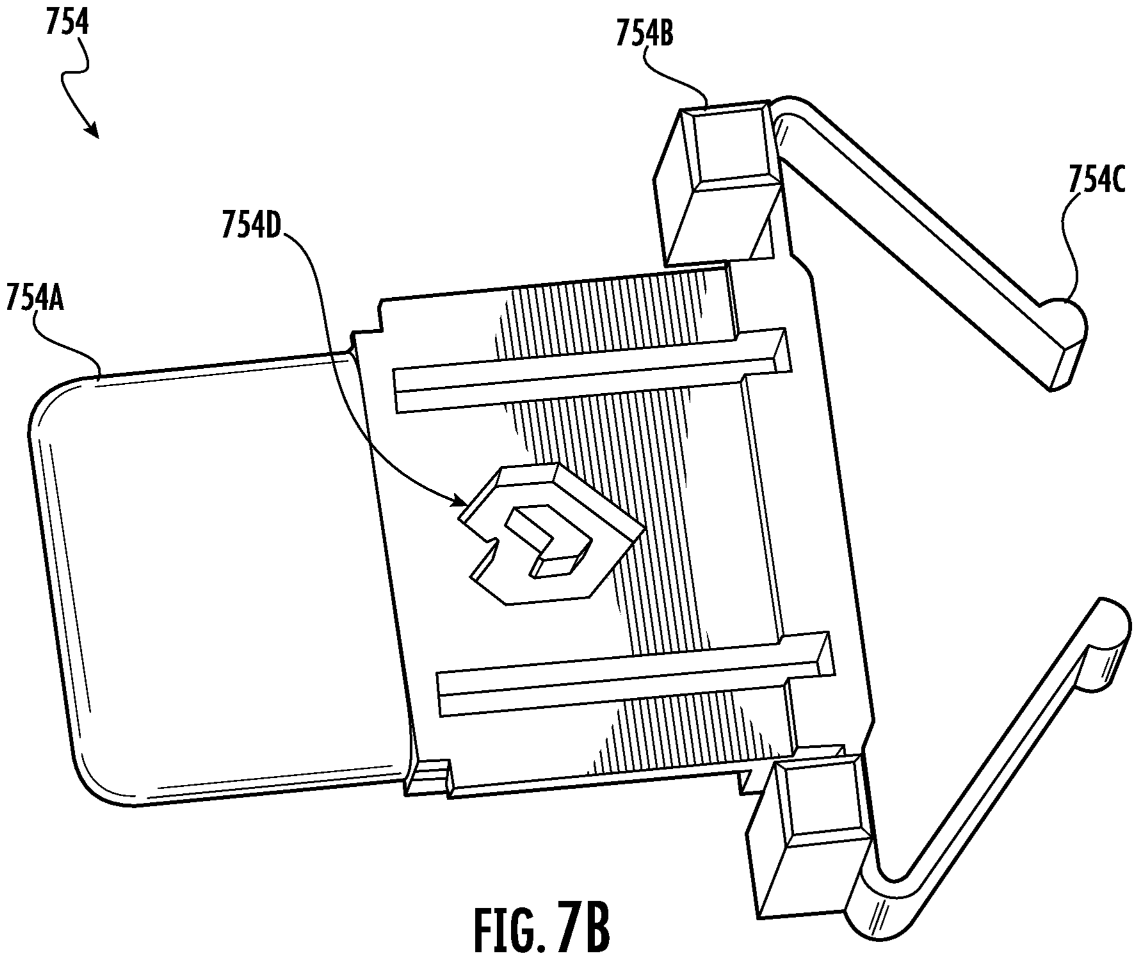
Figure 7C:
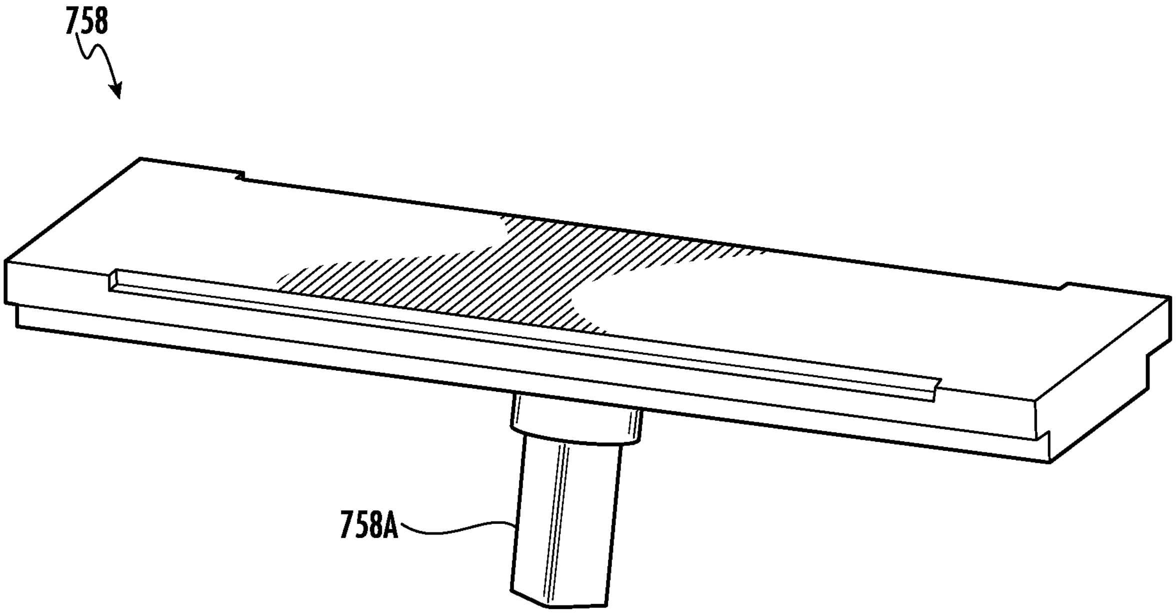
Figure 7D:
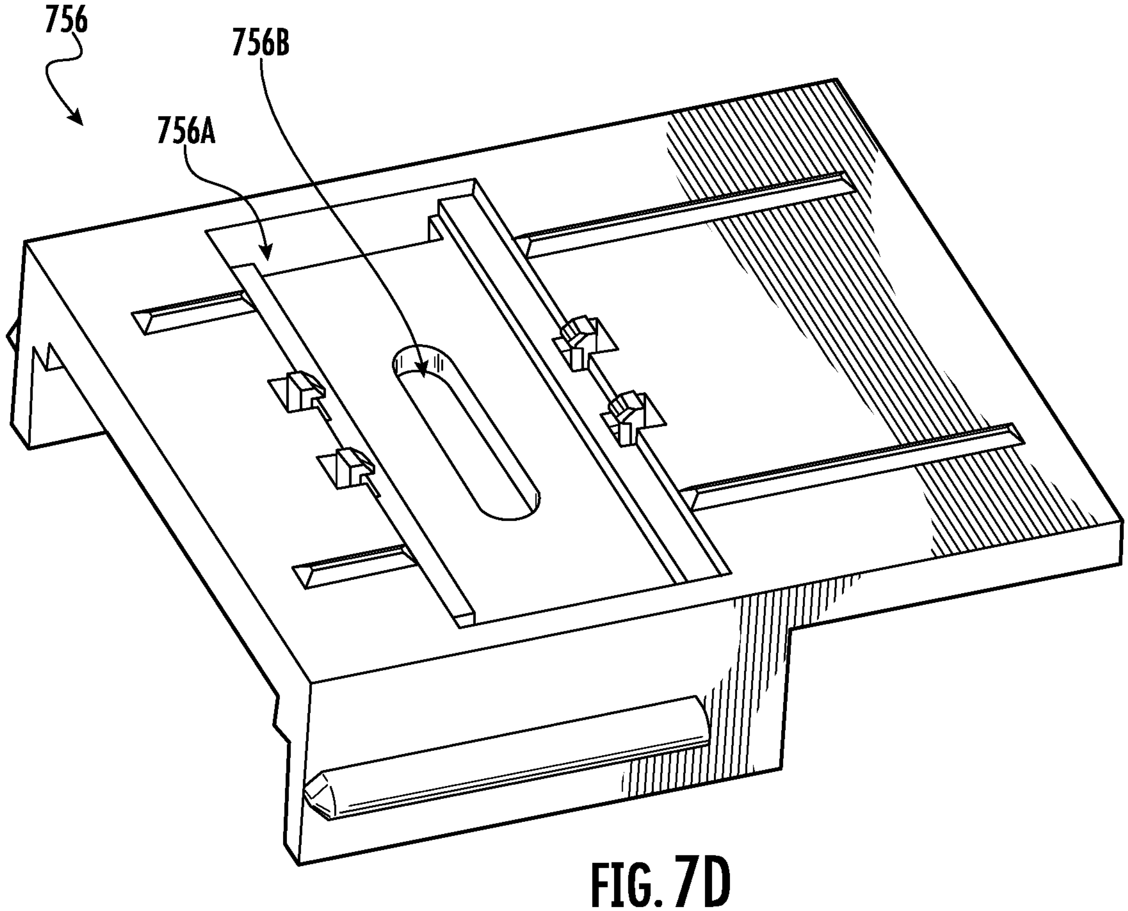
Figure 7E:
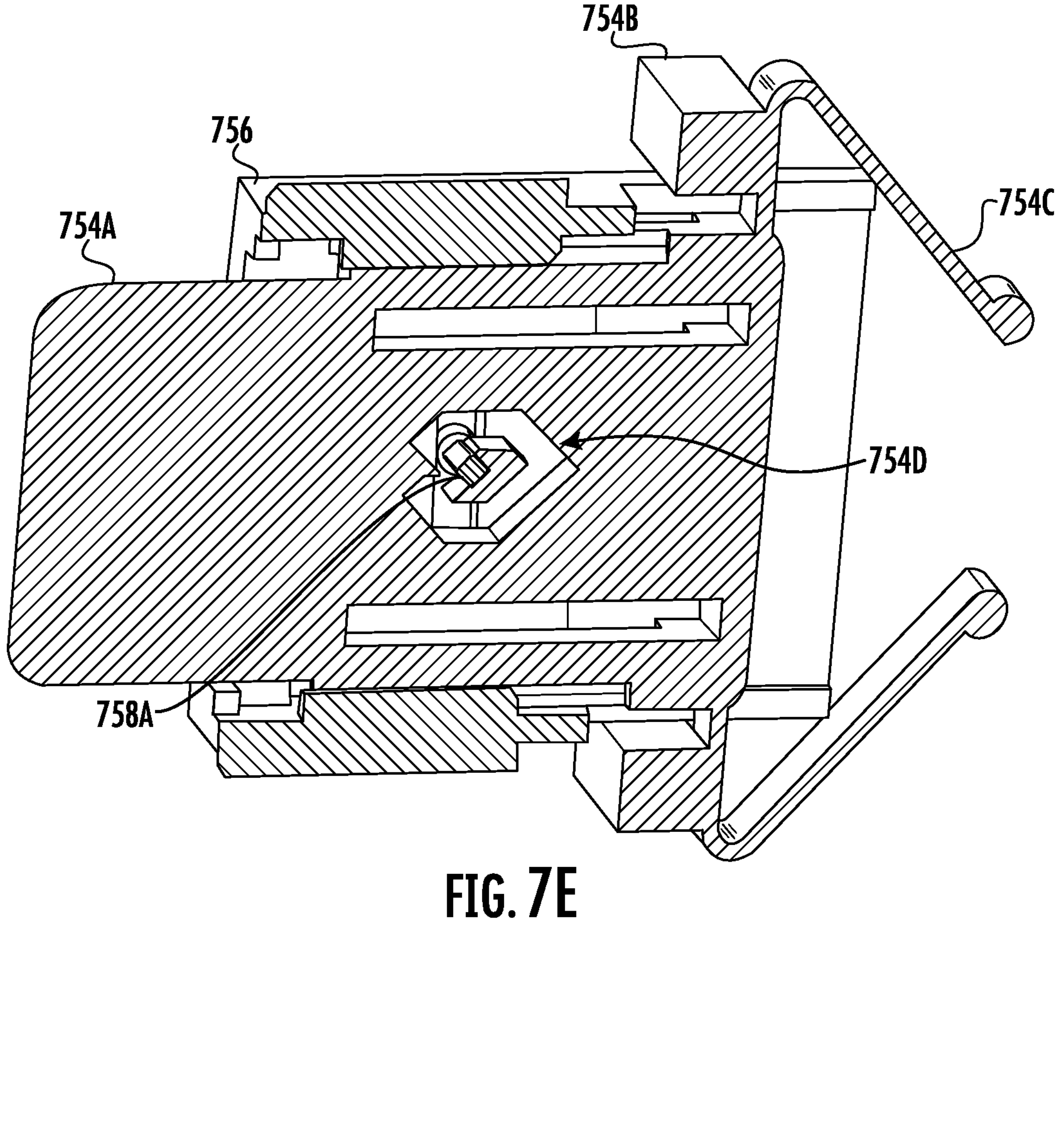
Figure 7F:
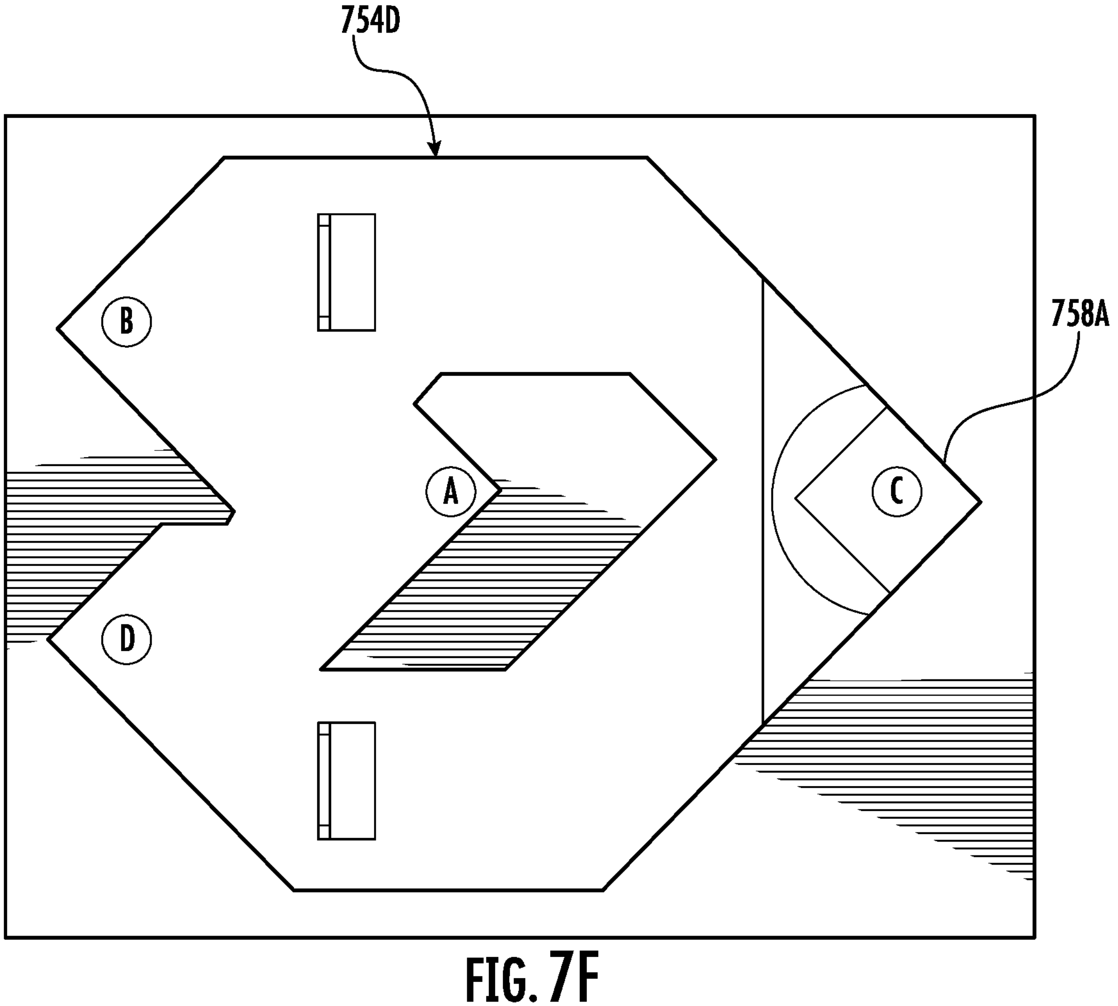
Figure 7G:
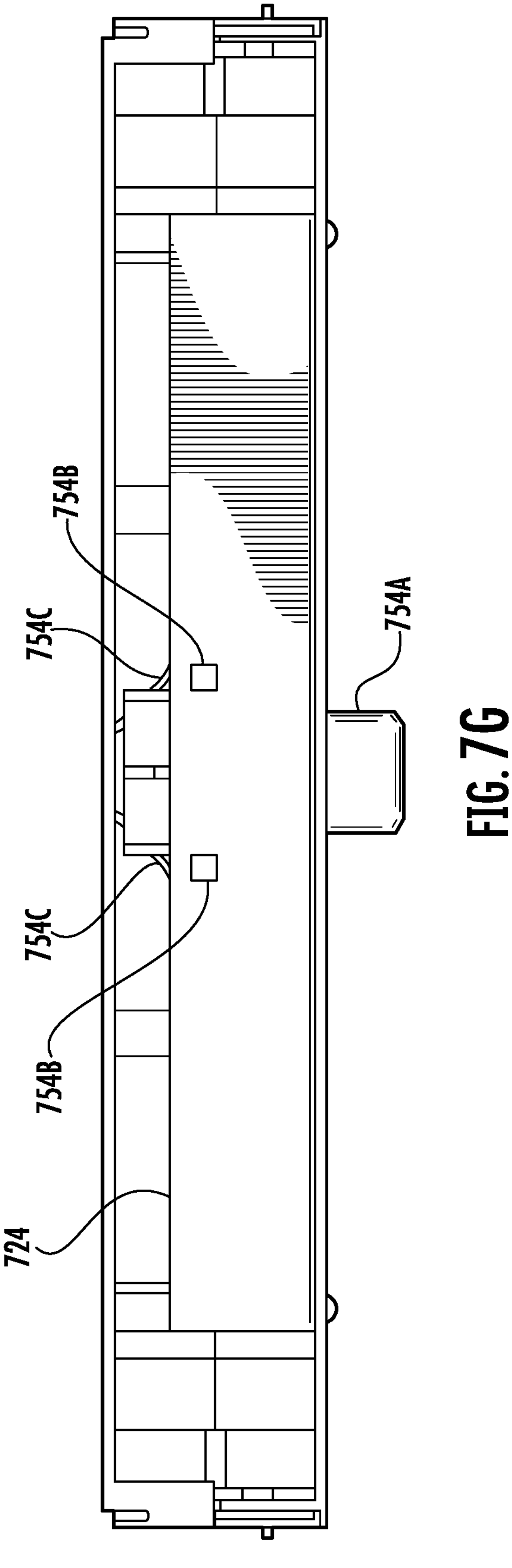
Figure 7H:
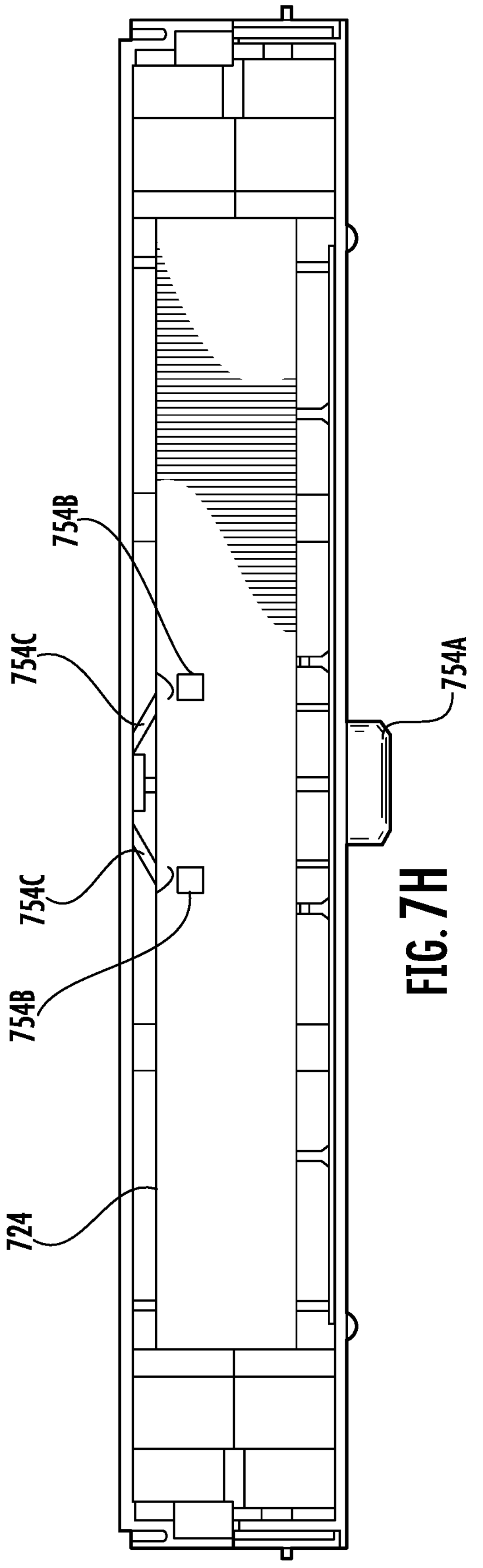
Figure 8A:
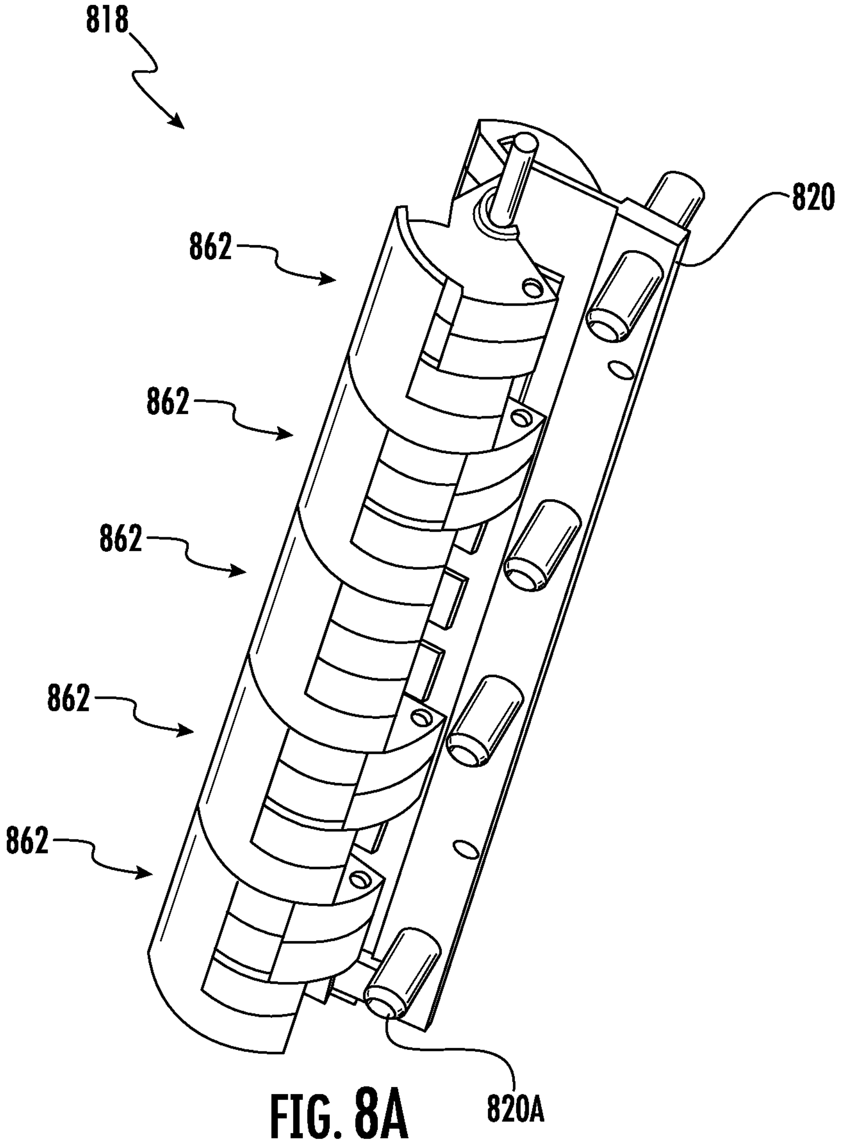
Figure 8B:
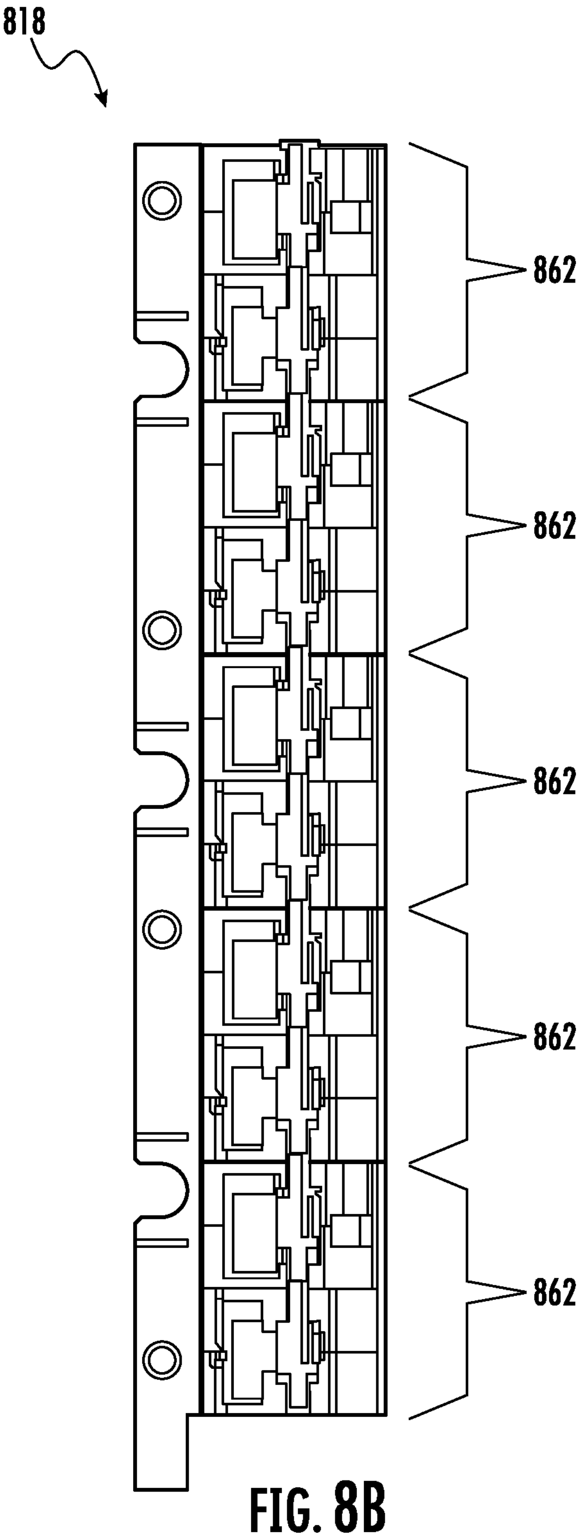
Figure 8C:
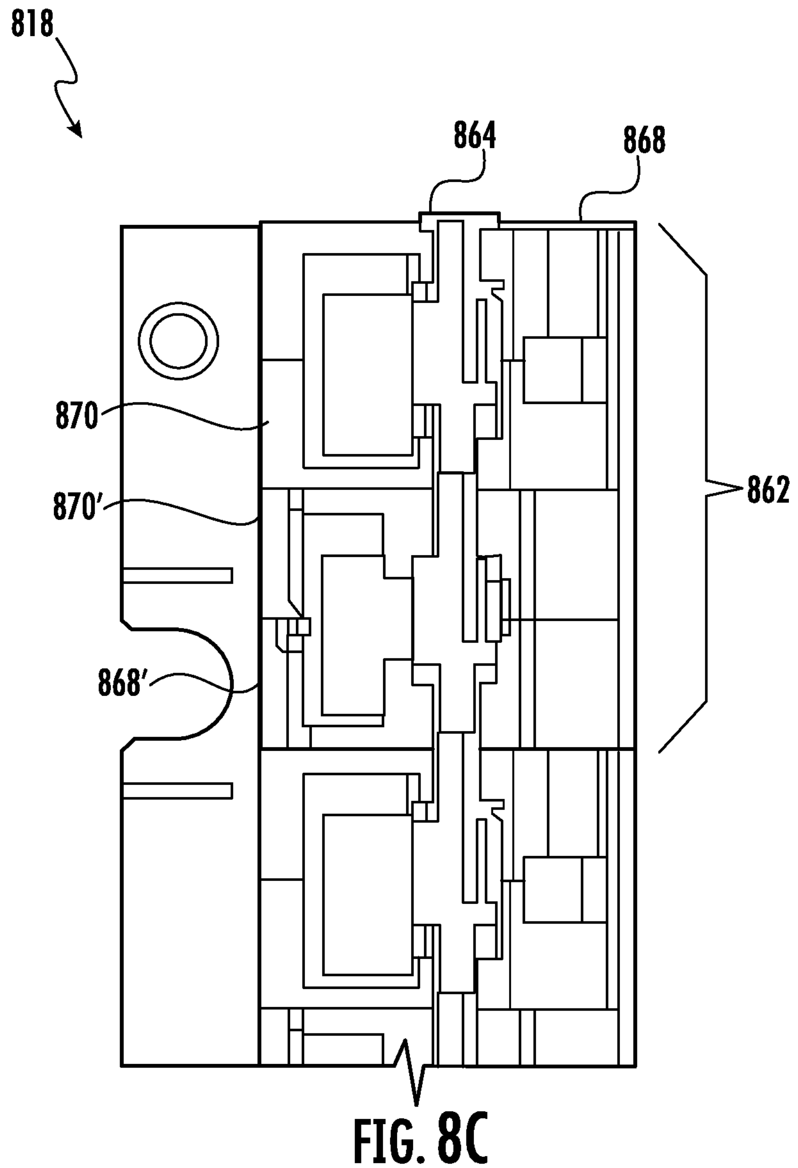
Figure 8D:
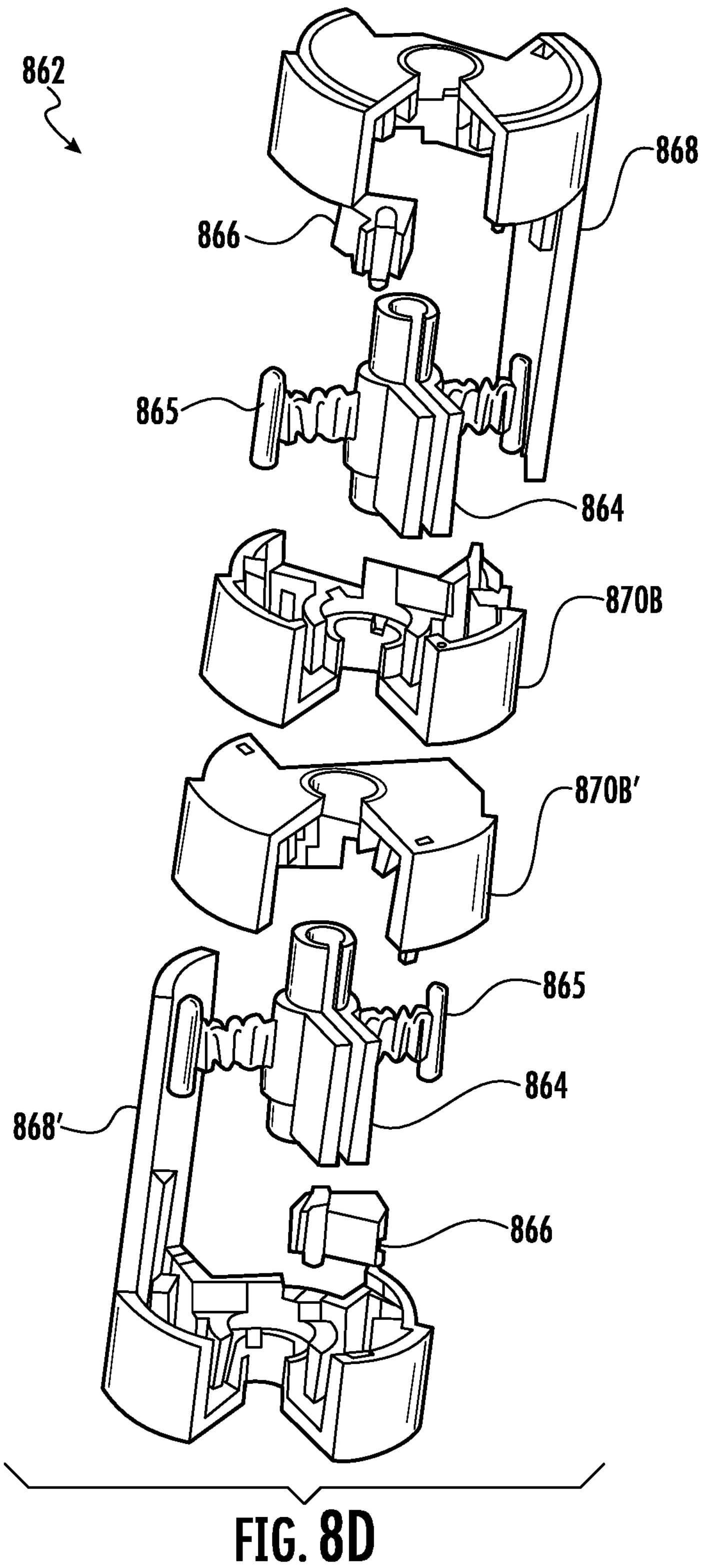
Figure 8E:
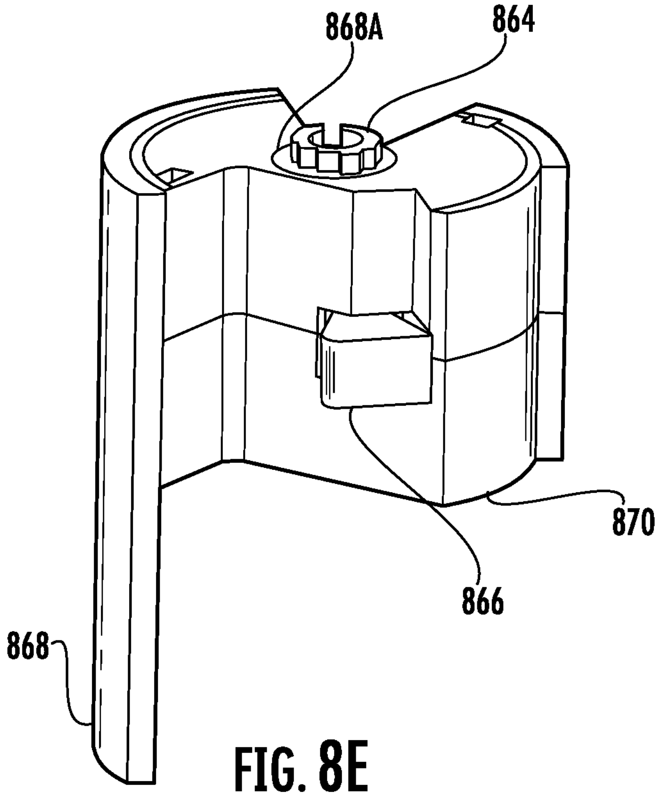
Figure 8F:
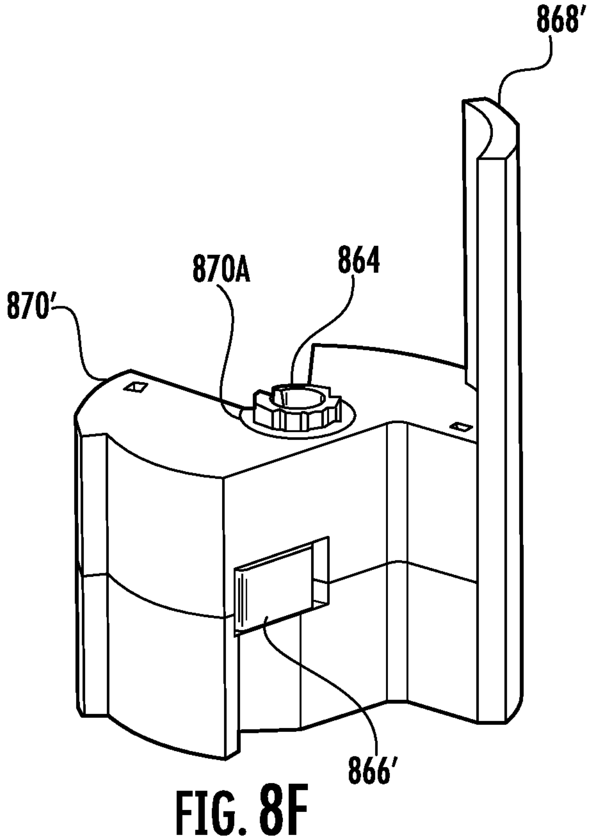
Figure 8G:
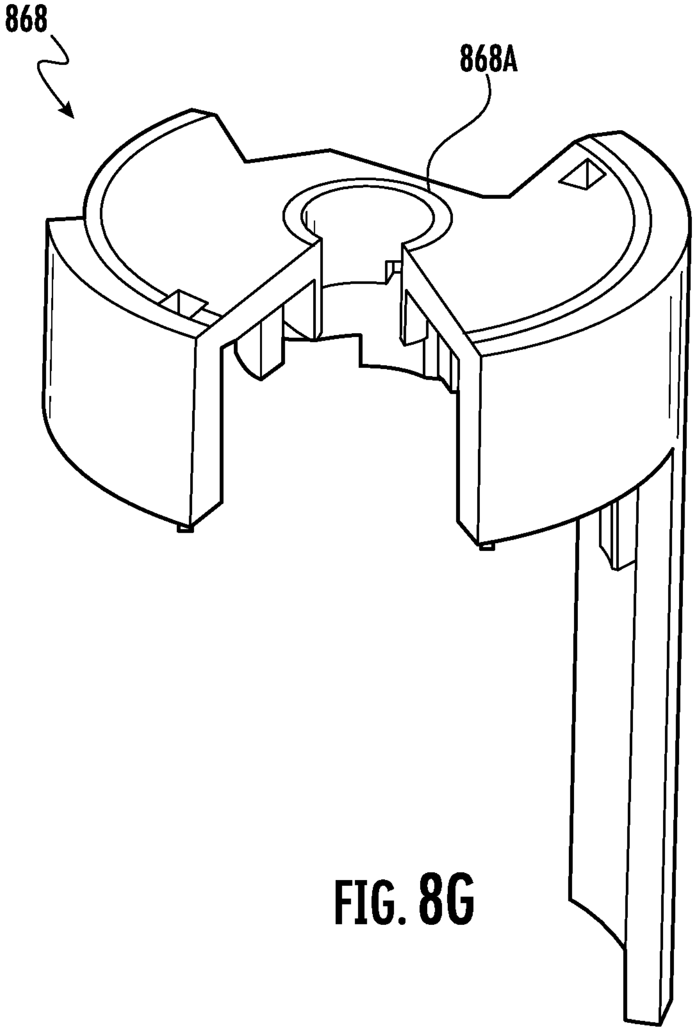
Figure 8H:
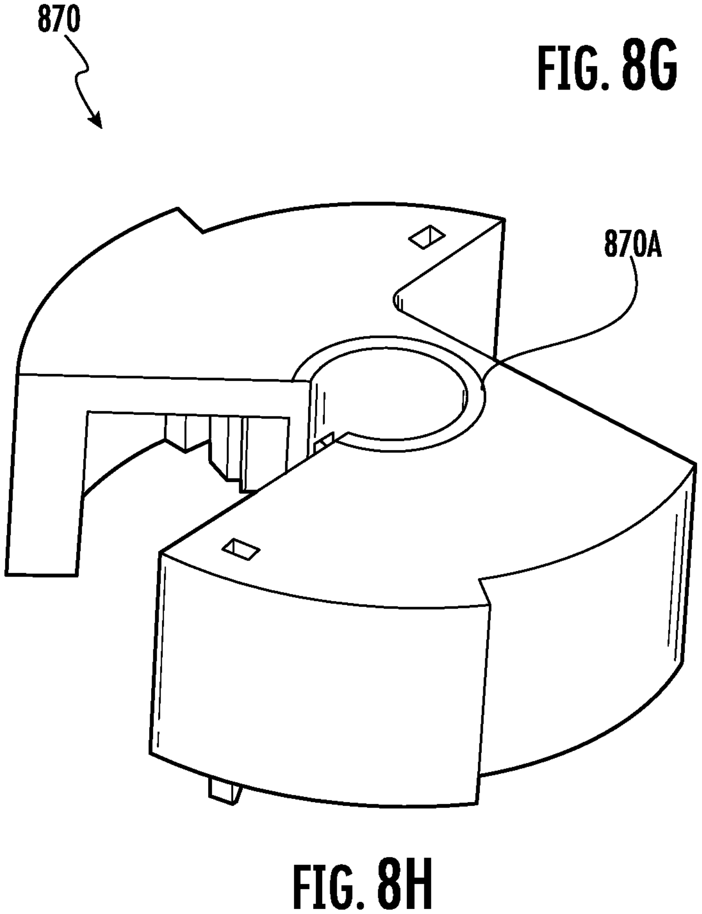
Figure 8I:
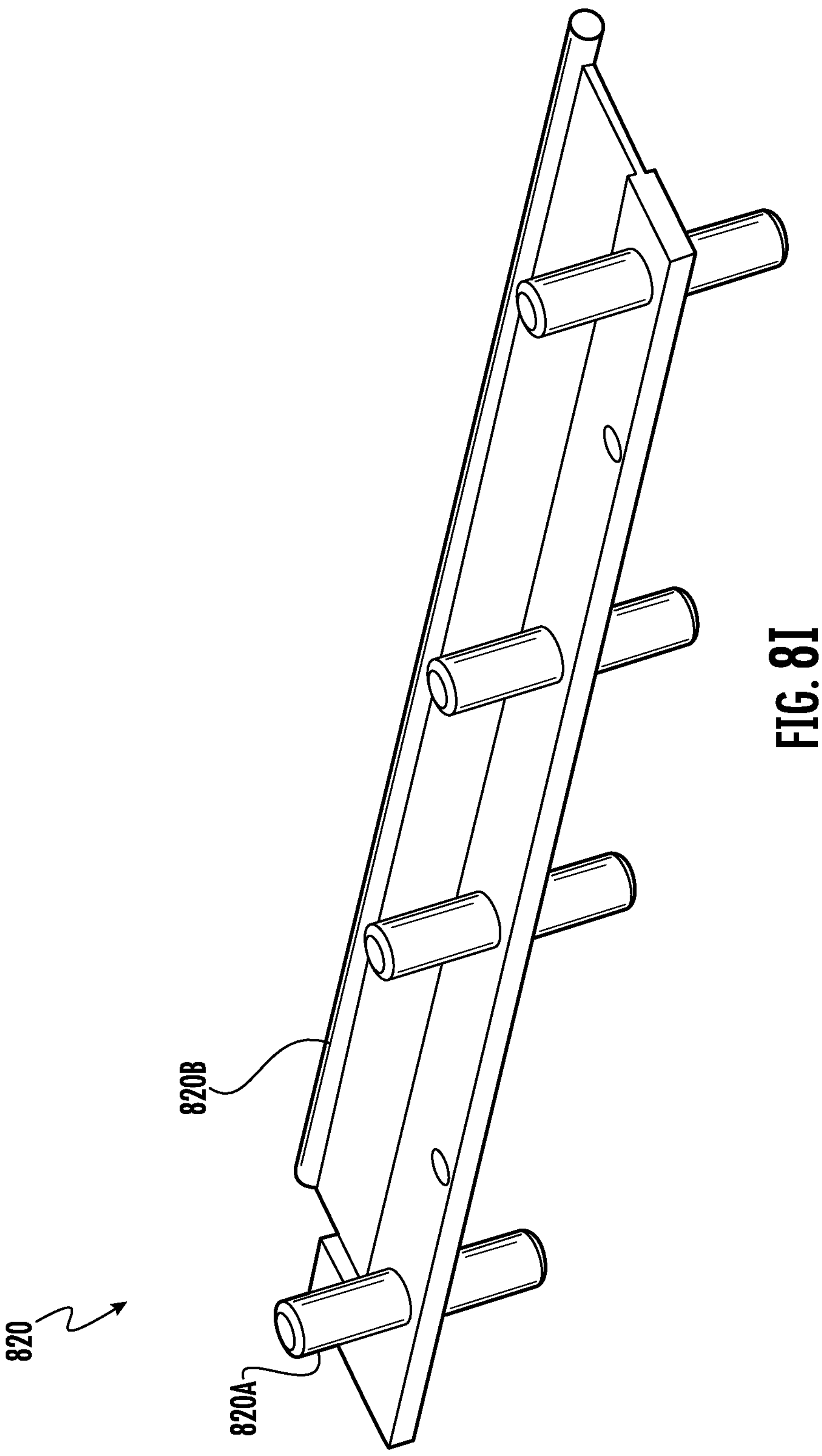
Figure 8K:
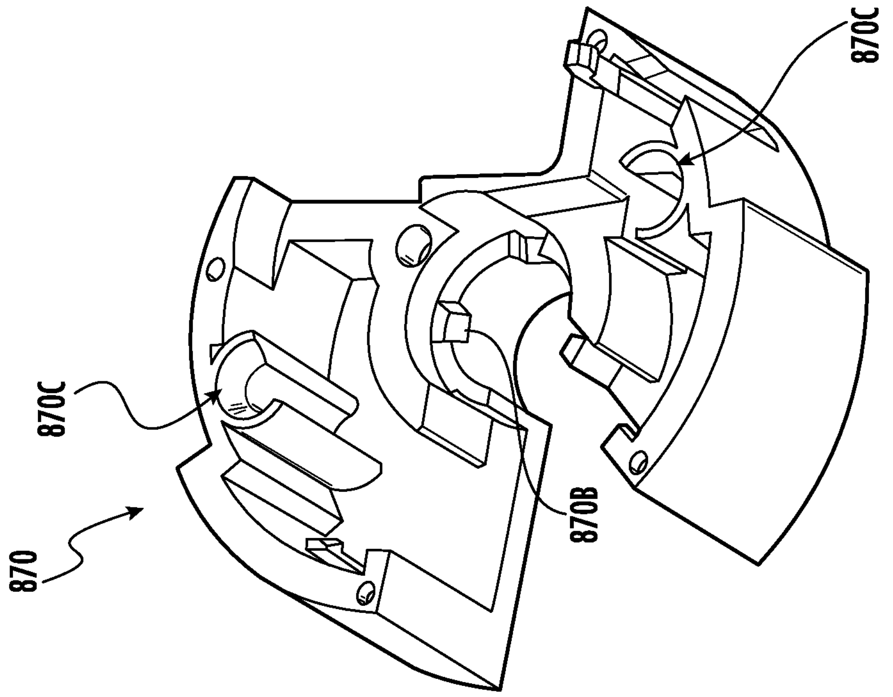
Figure 8J:
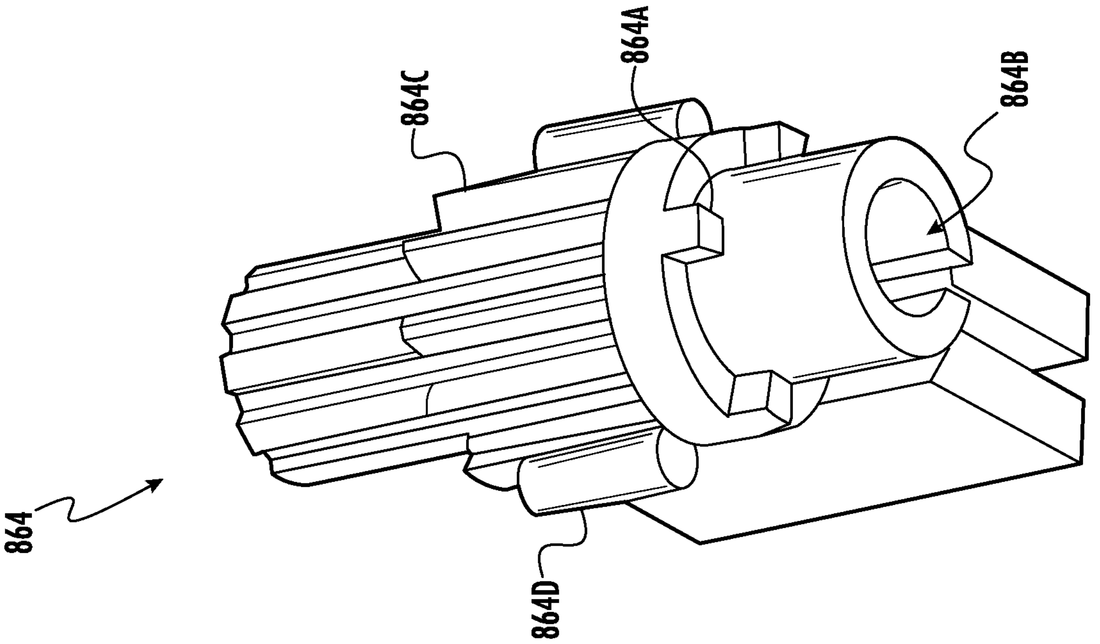
Figure 8L:
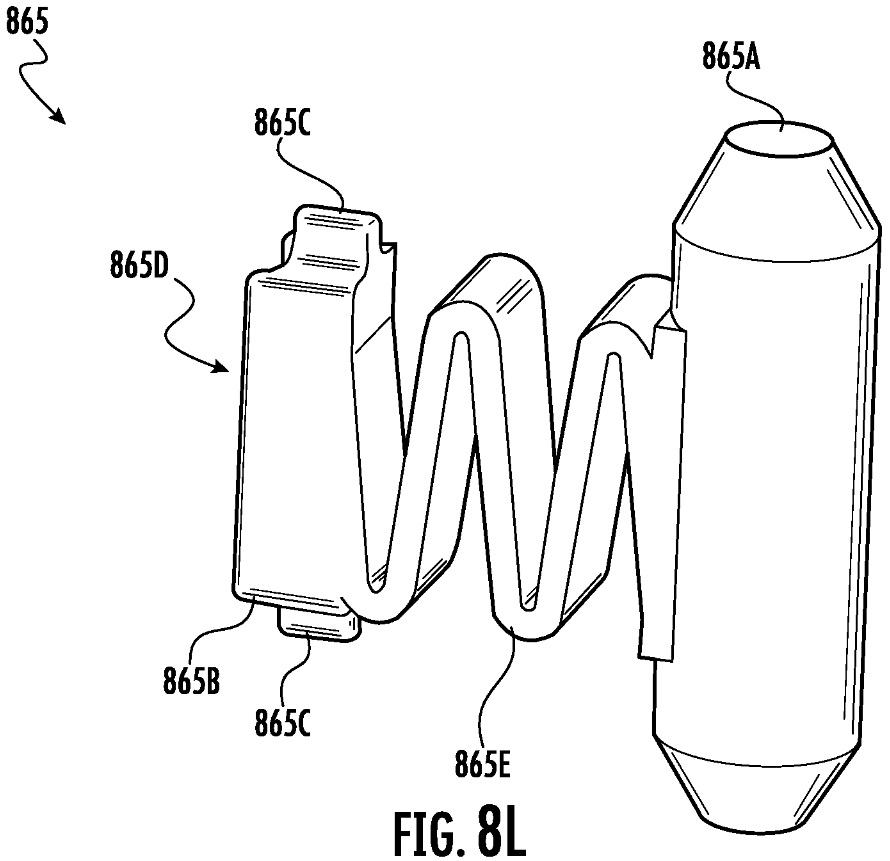
Figure 8M:
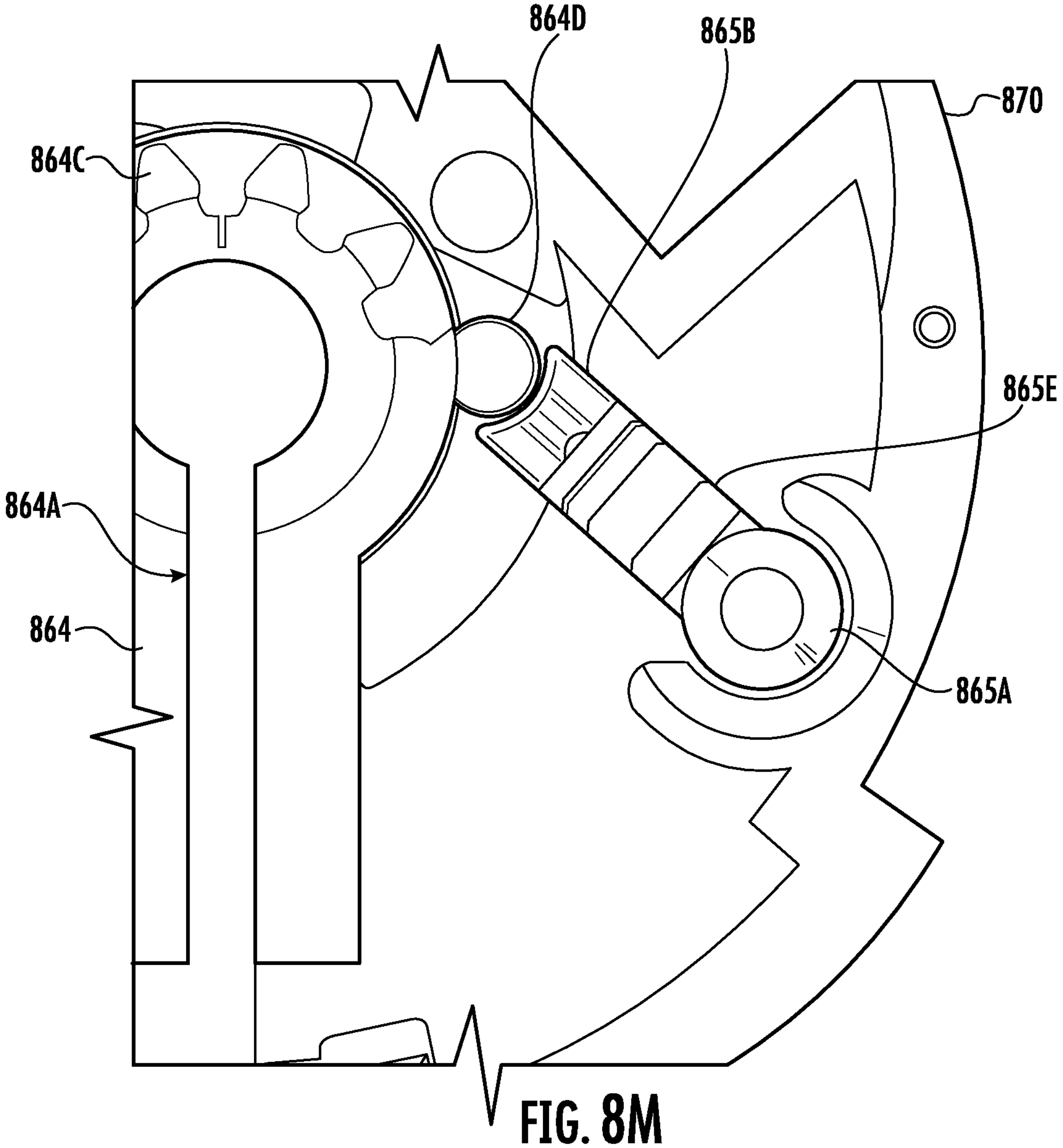
Figure 8N:
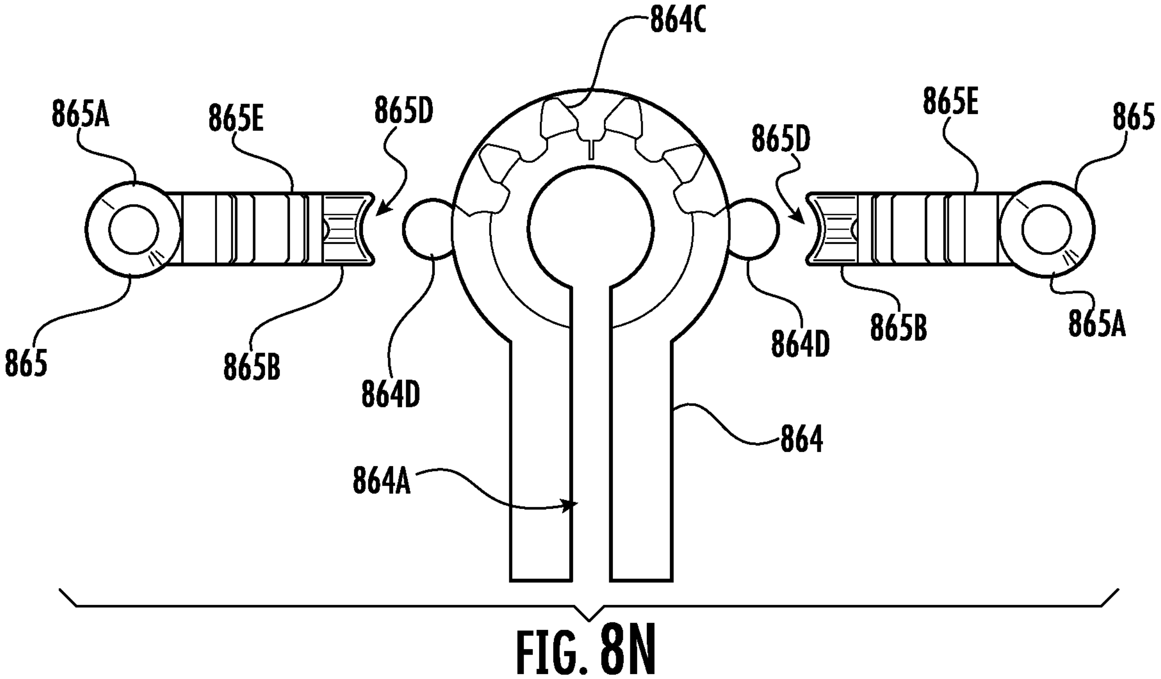
Figure 80:
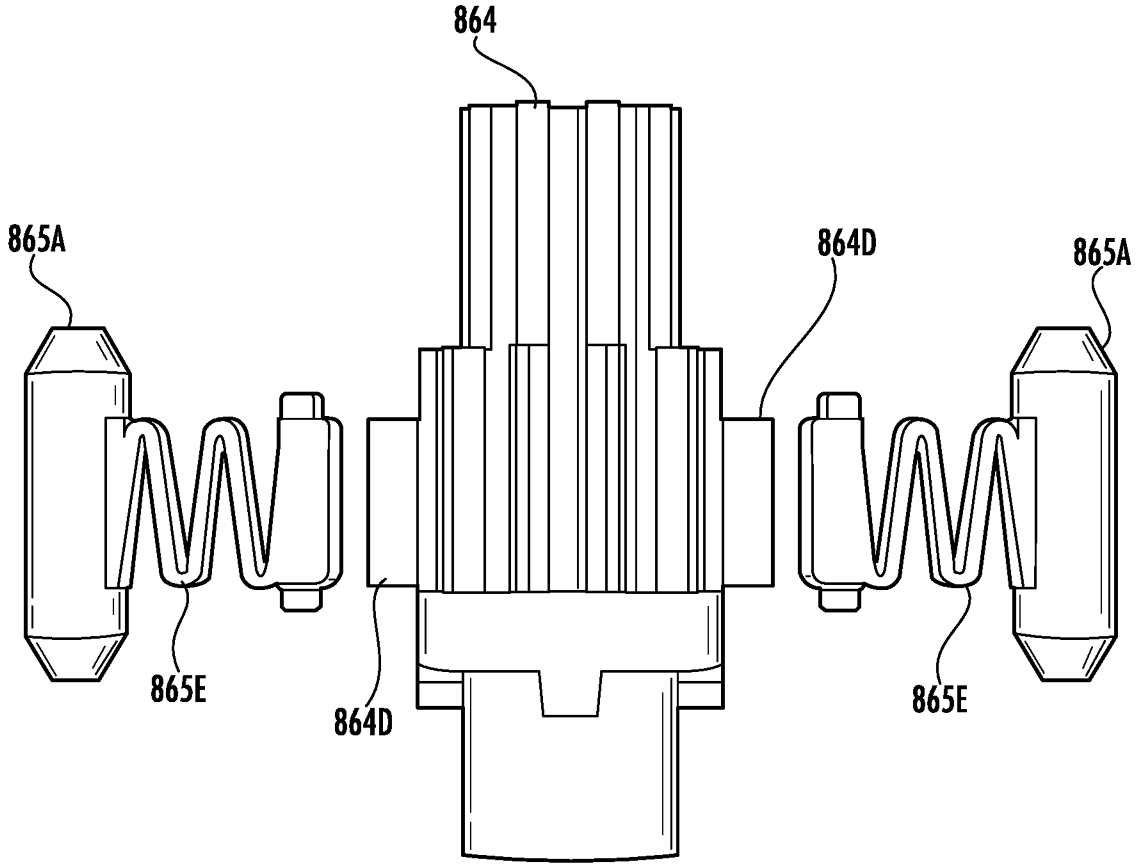
Figure 8P:
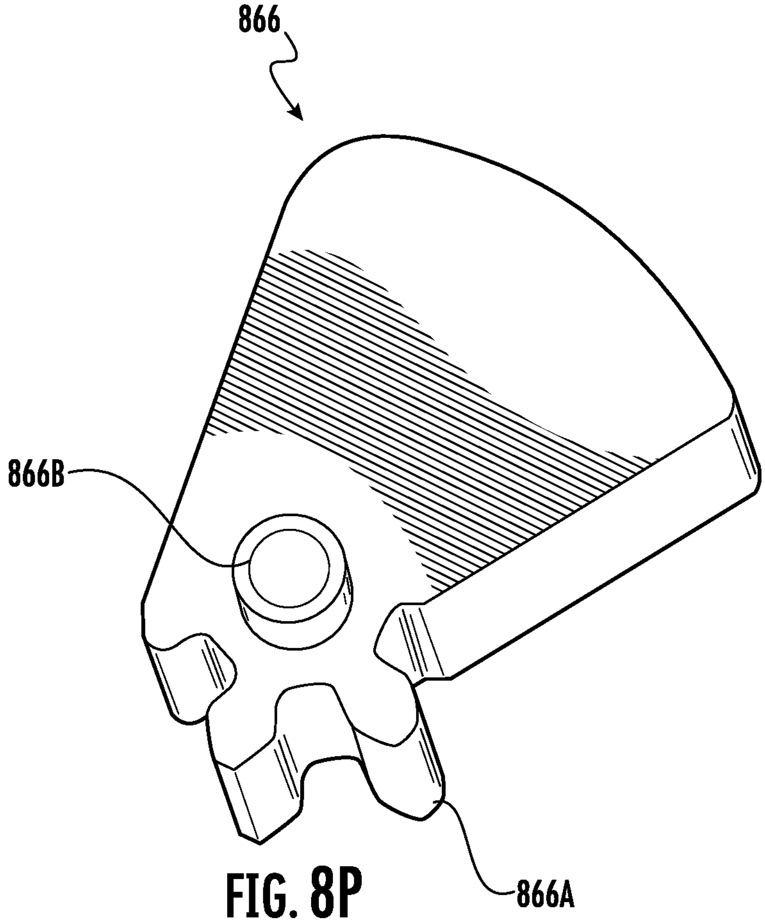
Figure 8Q:
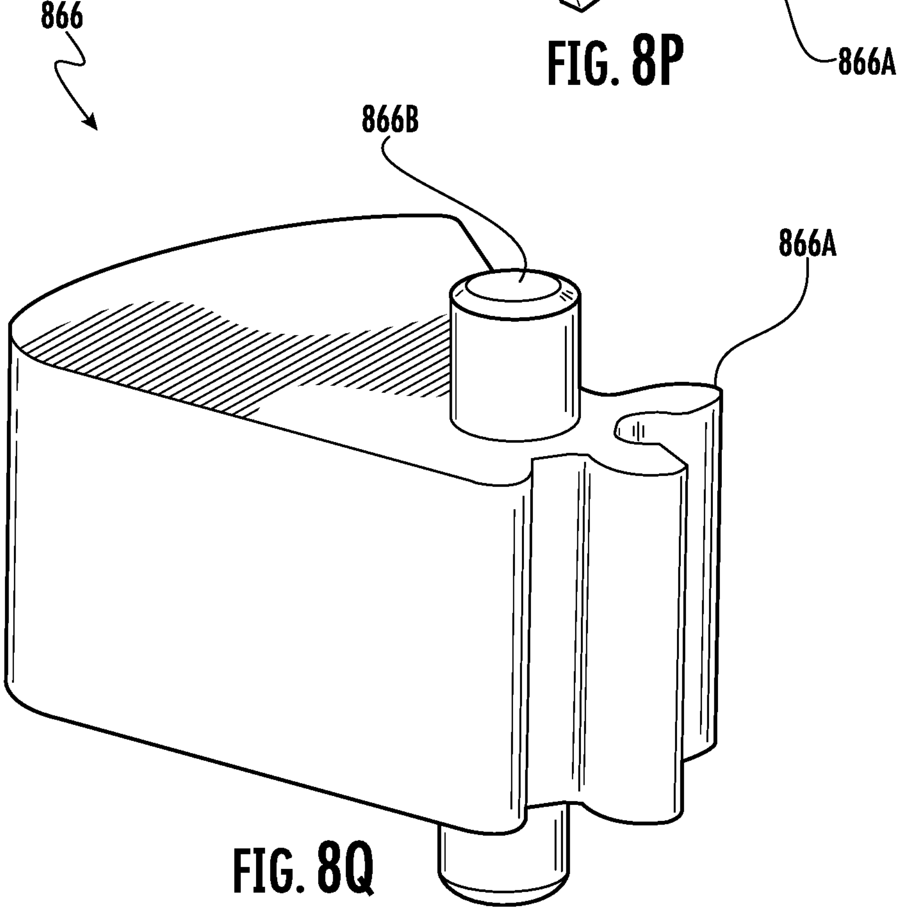
Figure 8R:
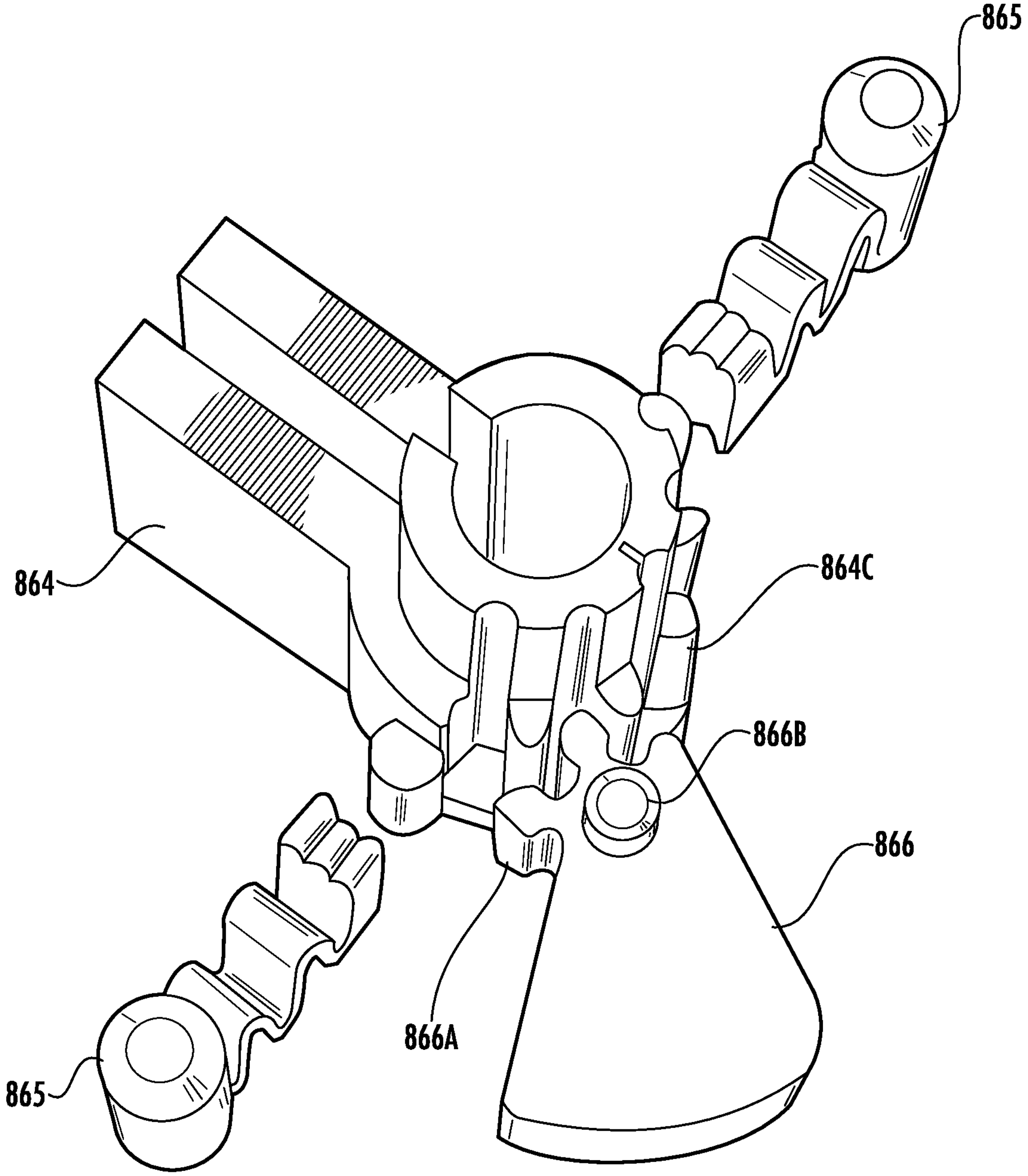
Figure 8S:
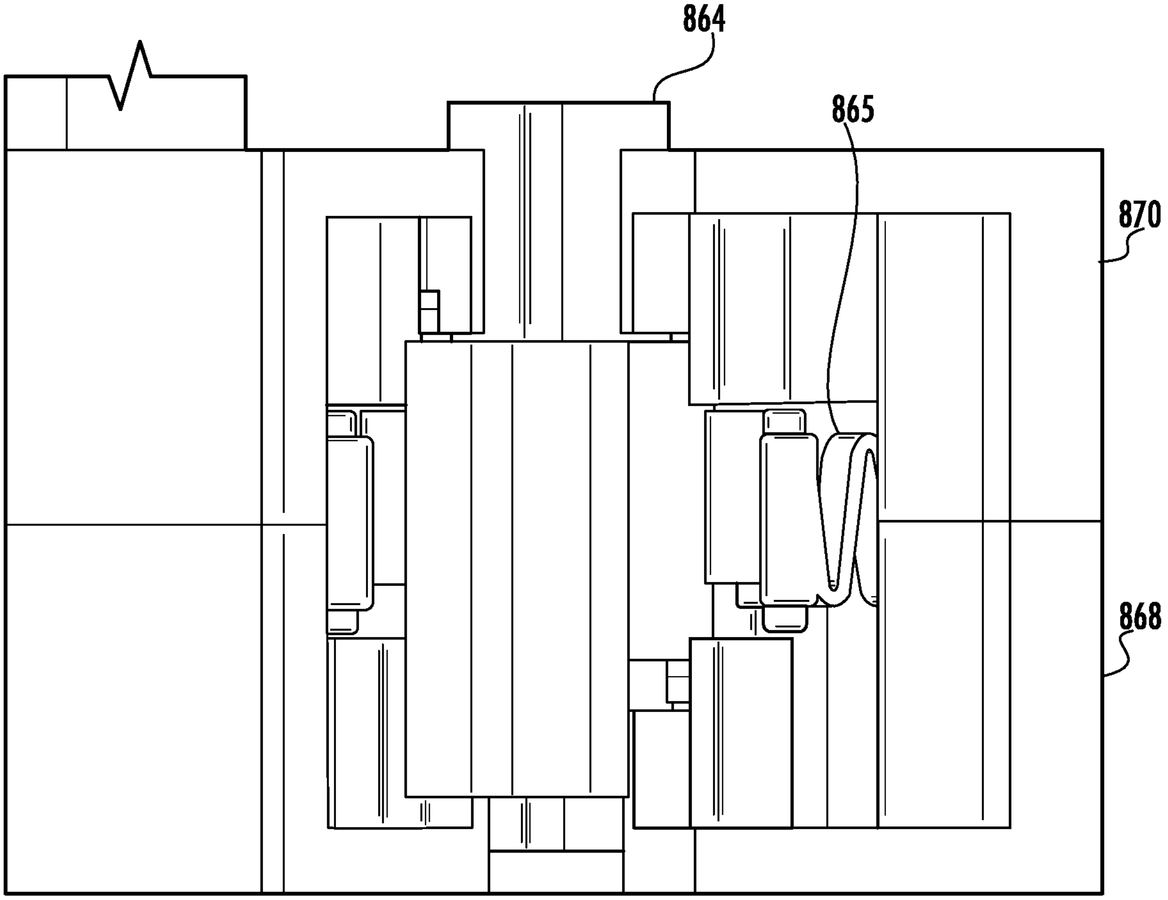
Figure 8T:
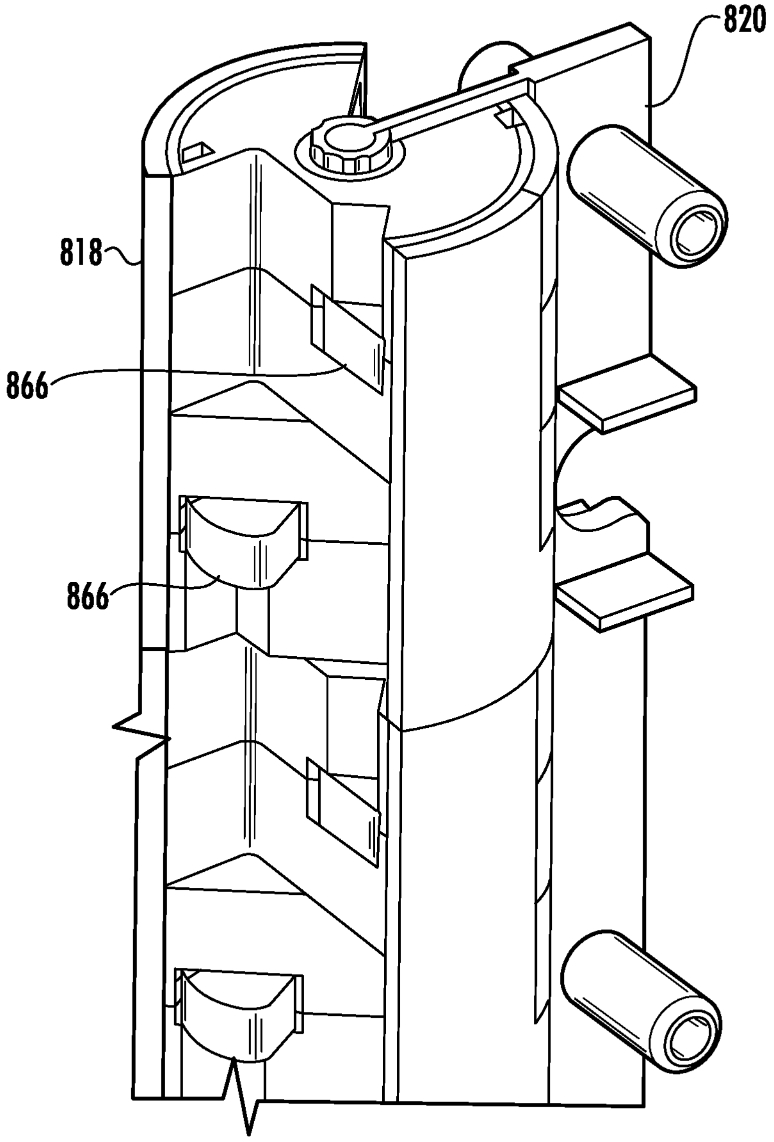
Figure 8U:
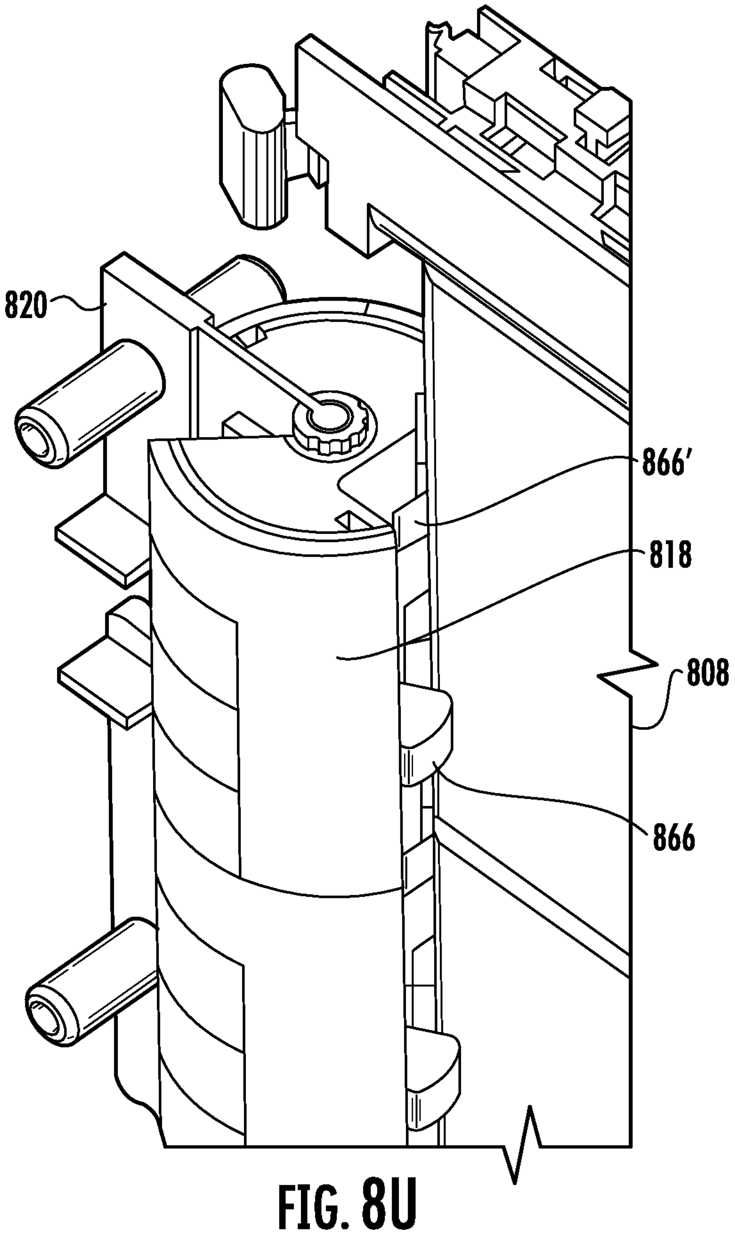
Figure 8V:
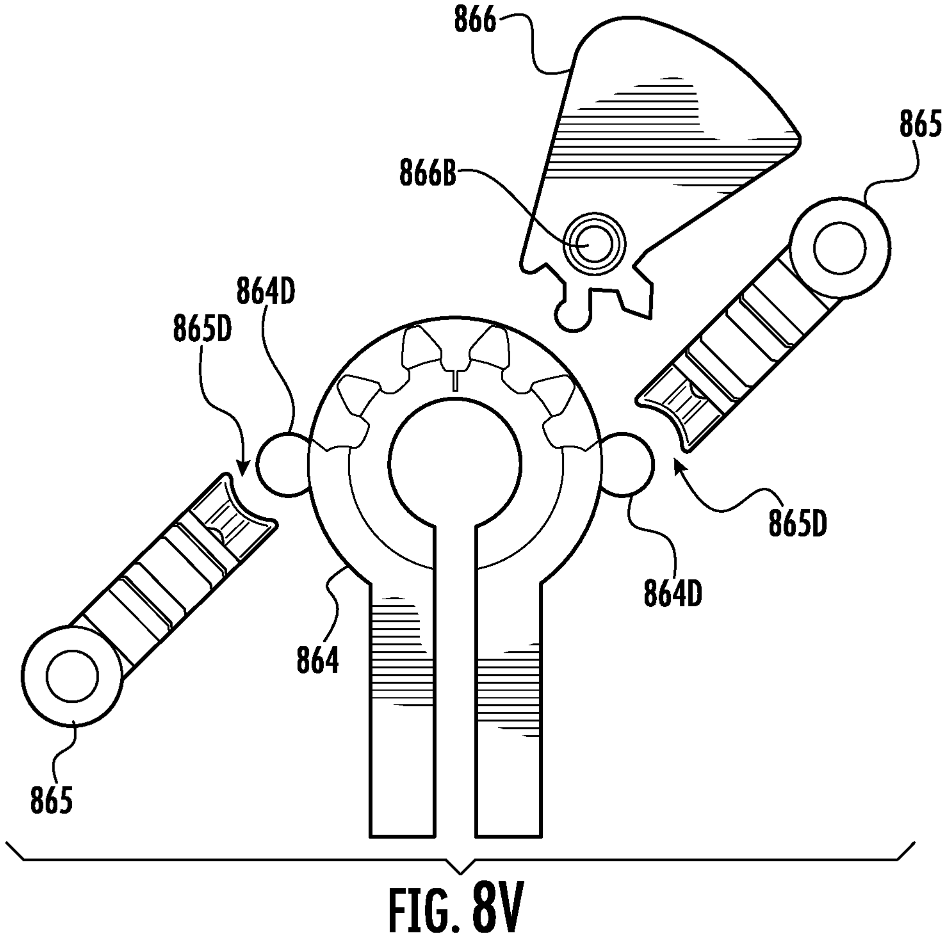
Figure 8W:
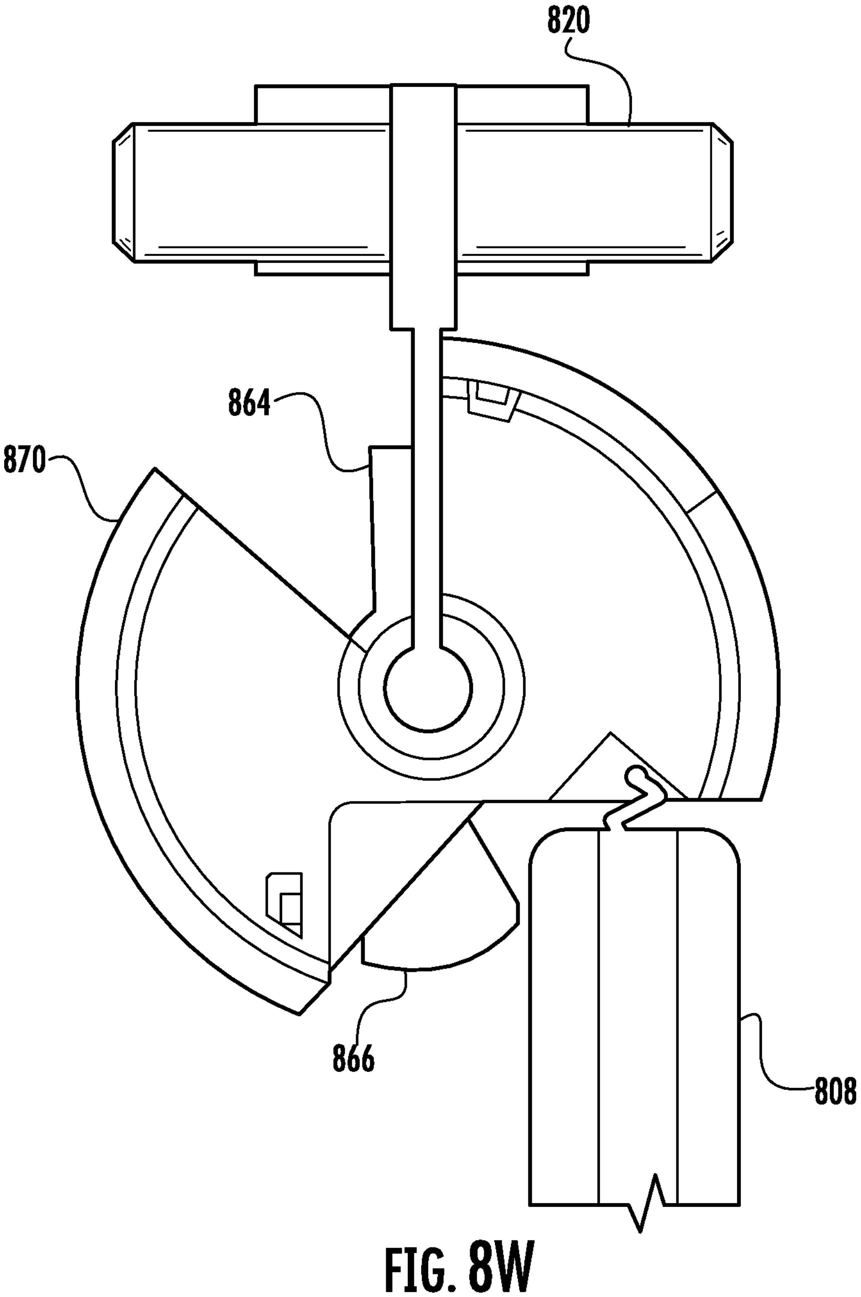
Figure 8X:
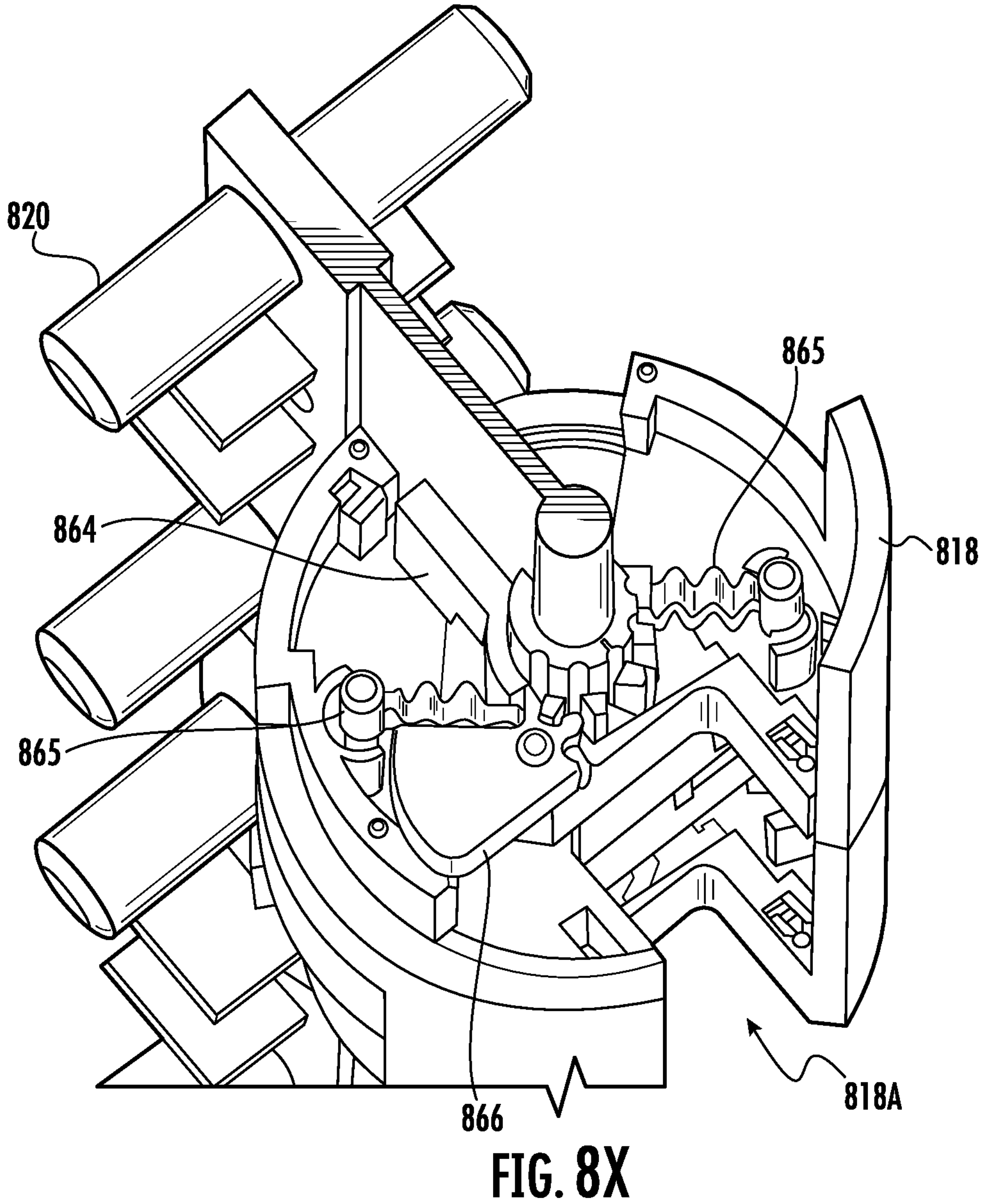
Figure 8Y:
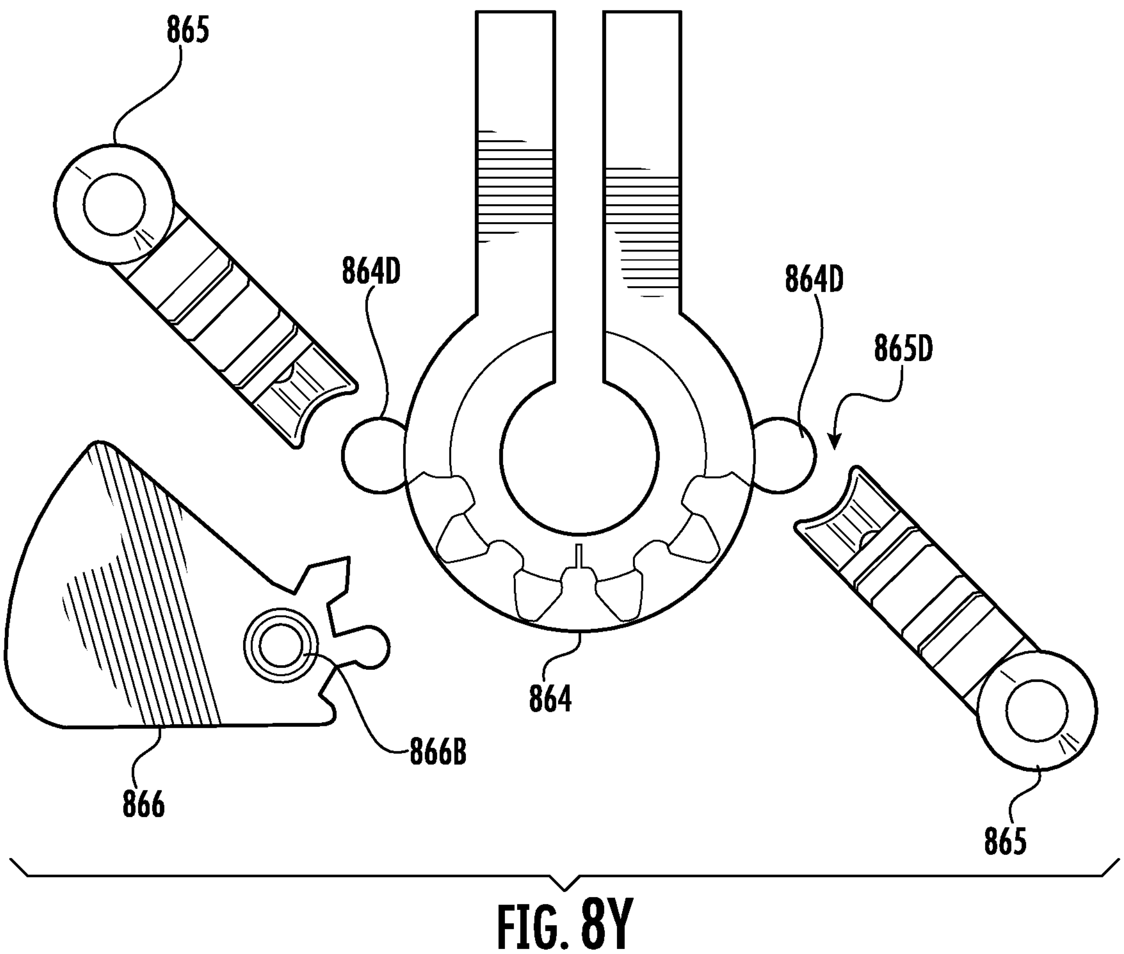
Figure 8Z:
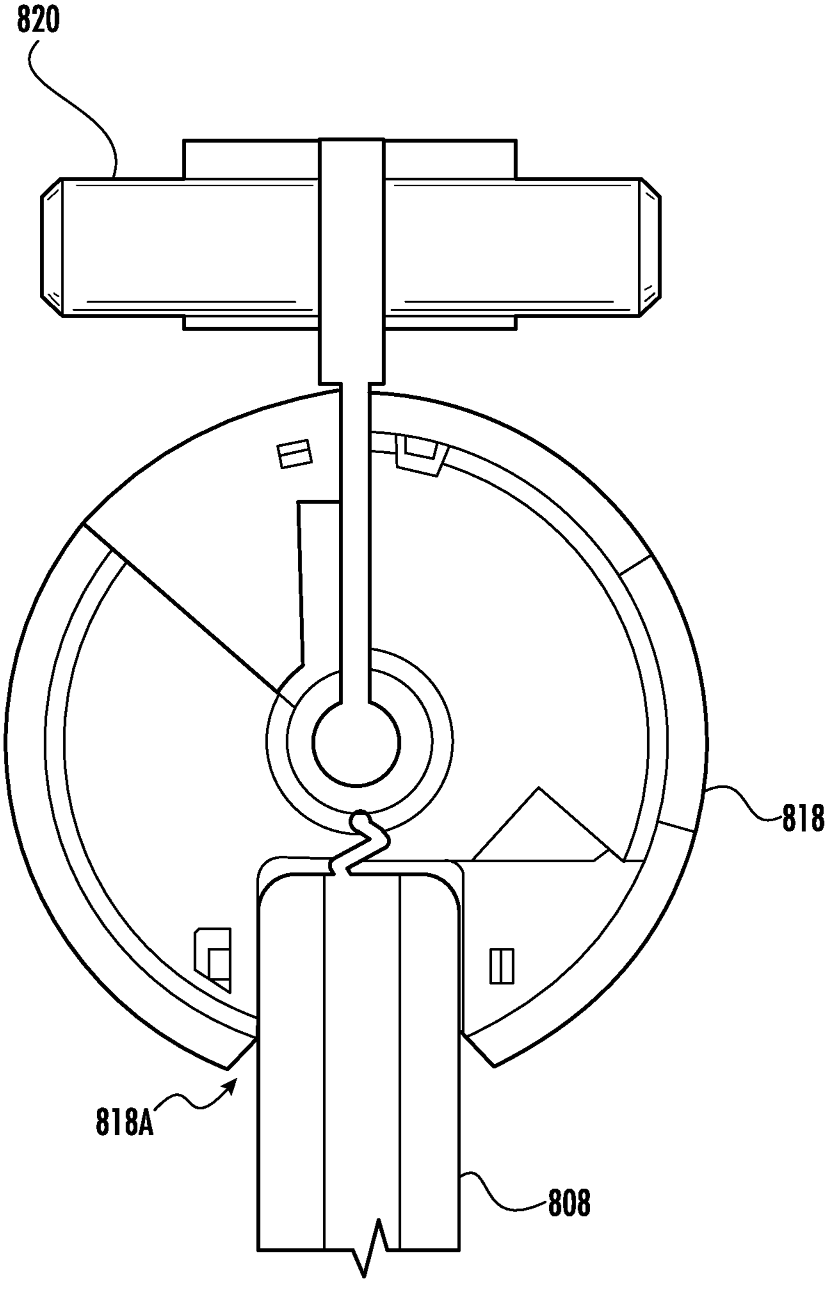
Figure 9A:
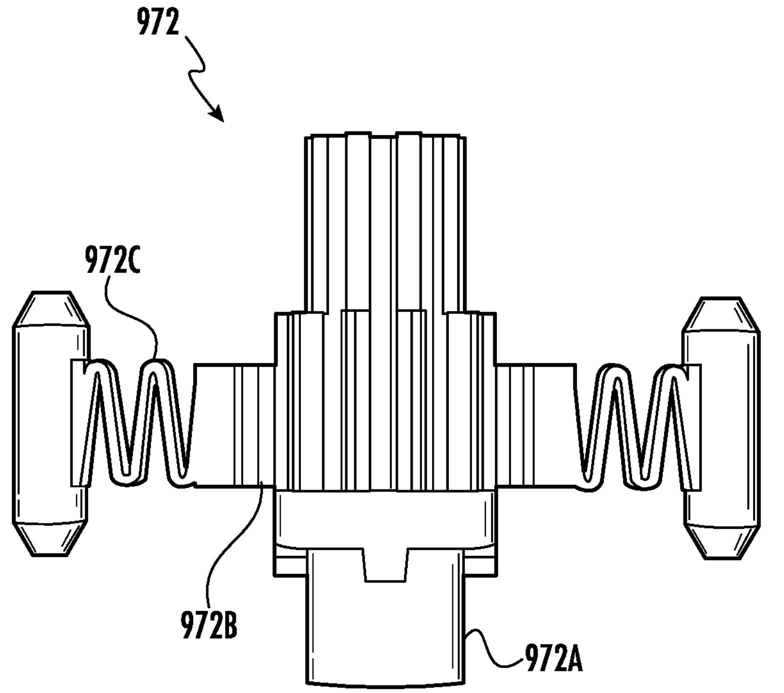
Figure 9B:
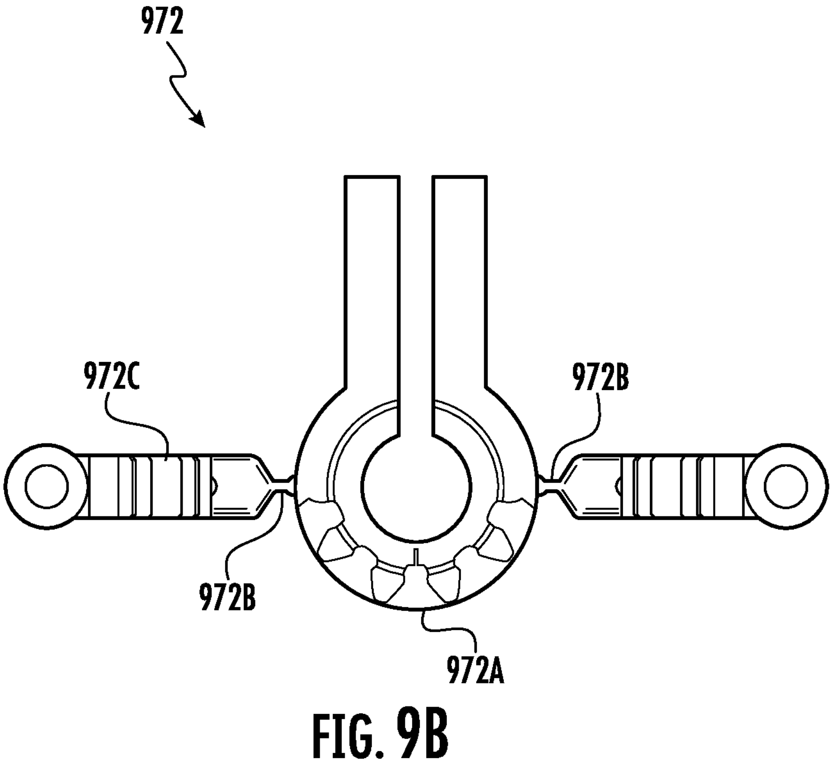
Figure 10A:
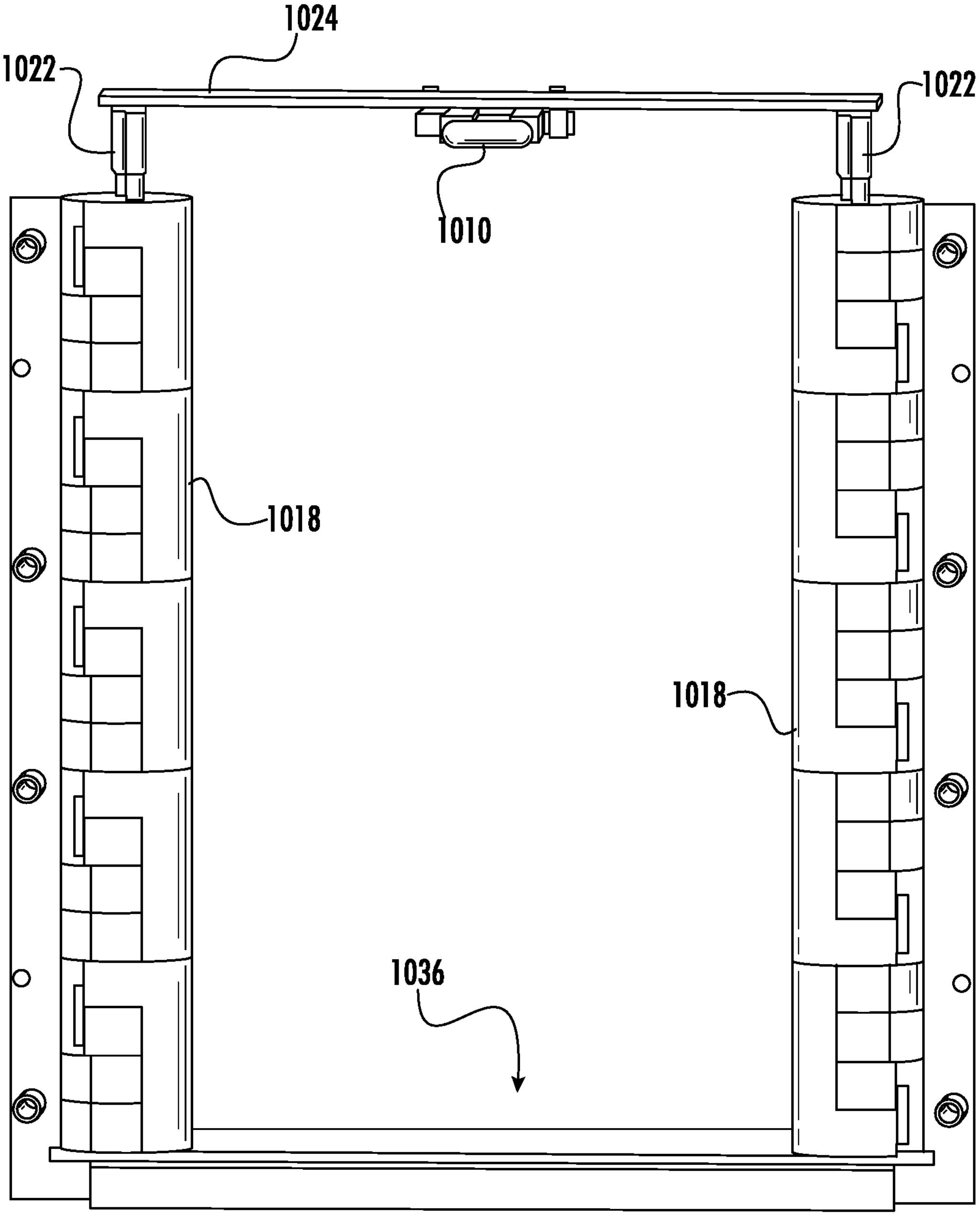
Figure 10B:
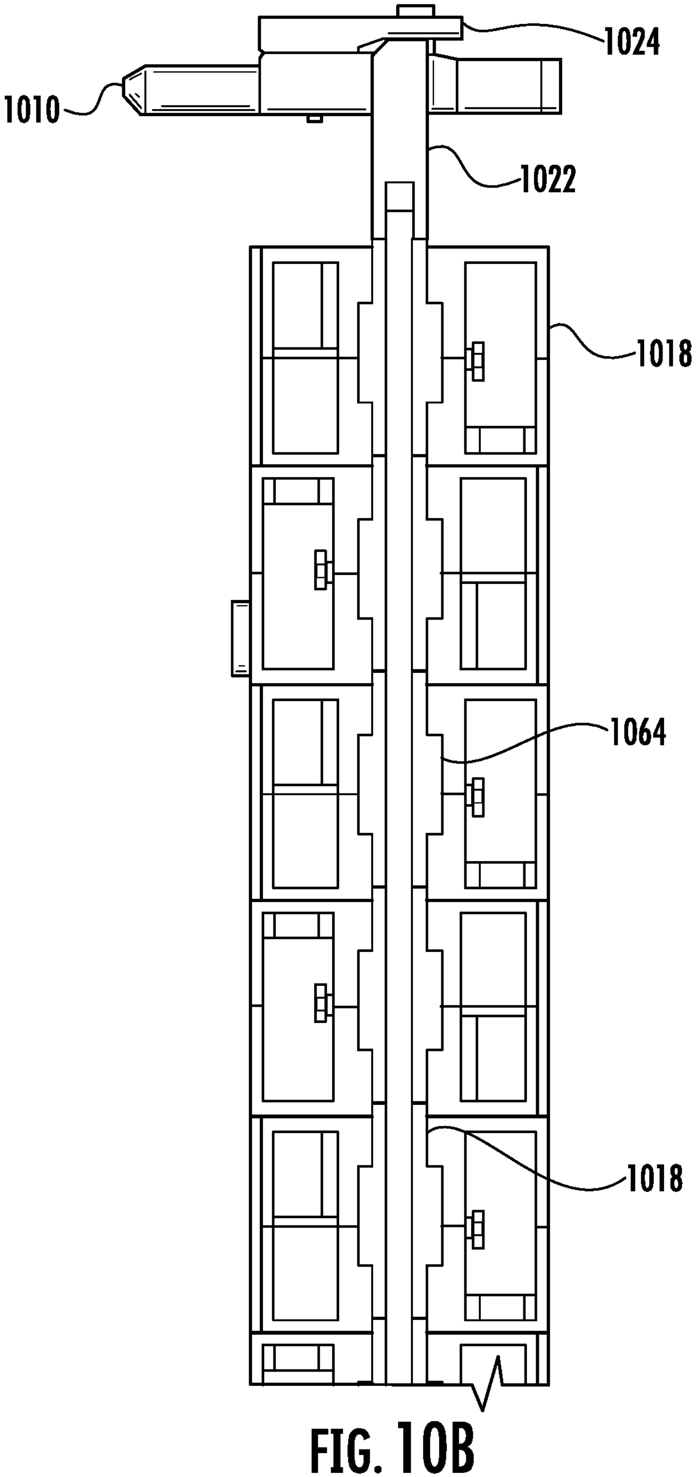
Figure 10C:
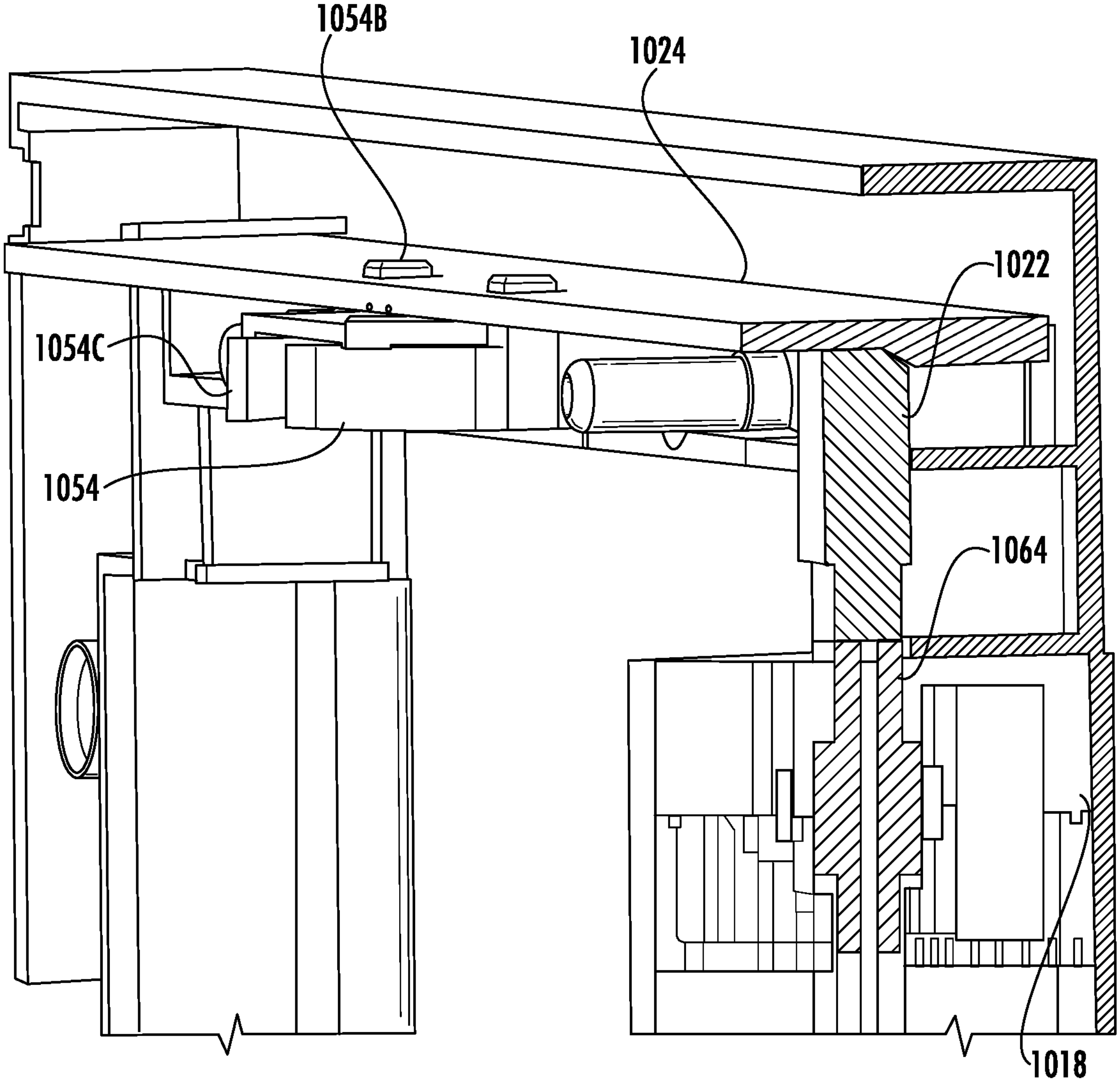
Figure 10D:
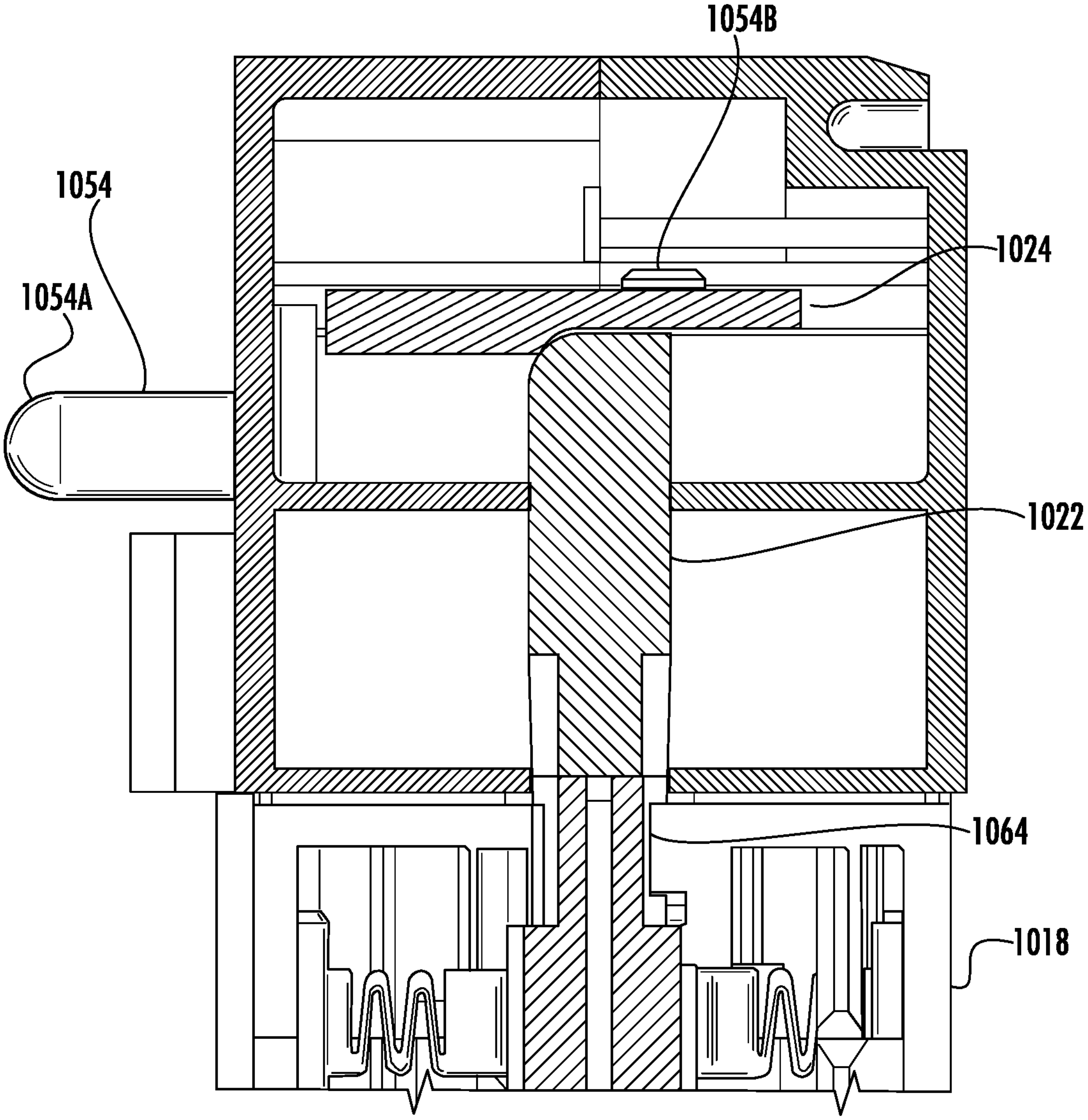
Figure 11B:
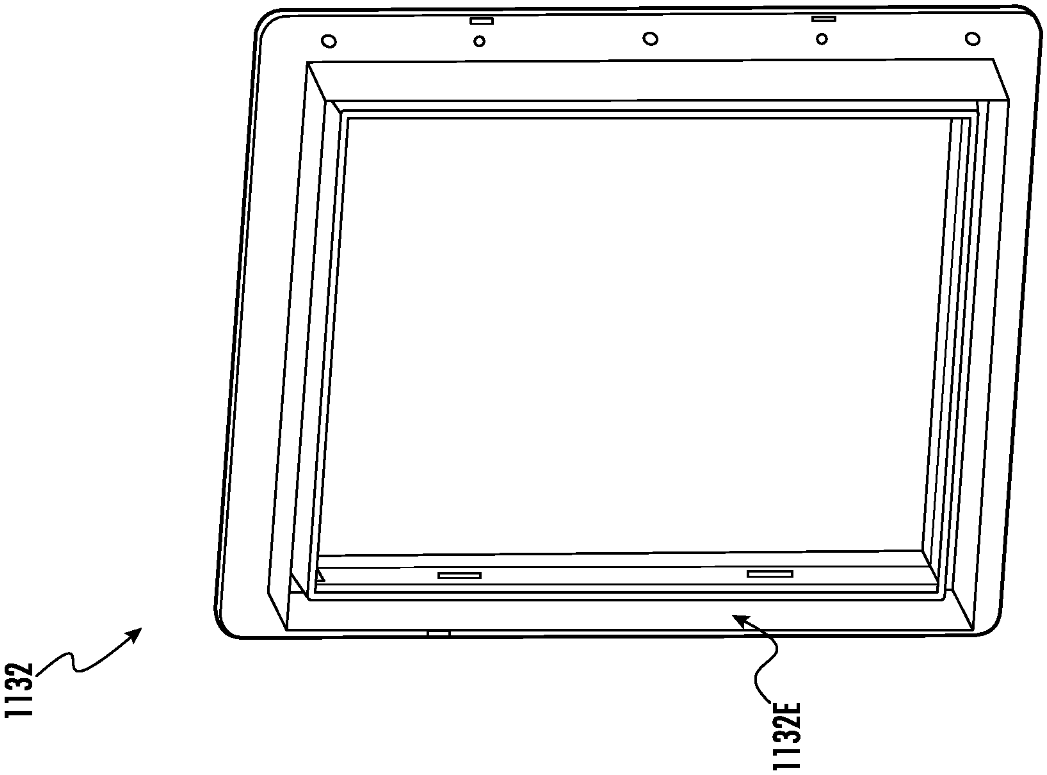
Figure 11A:
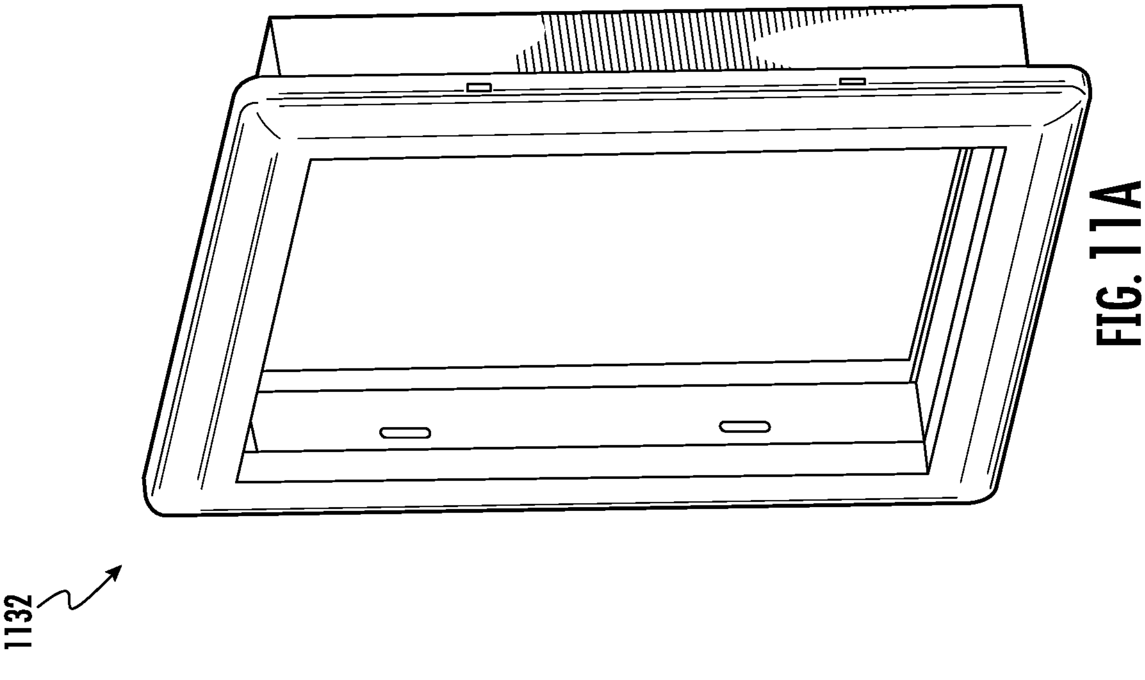
Figure 11D:
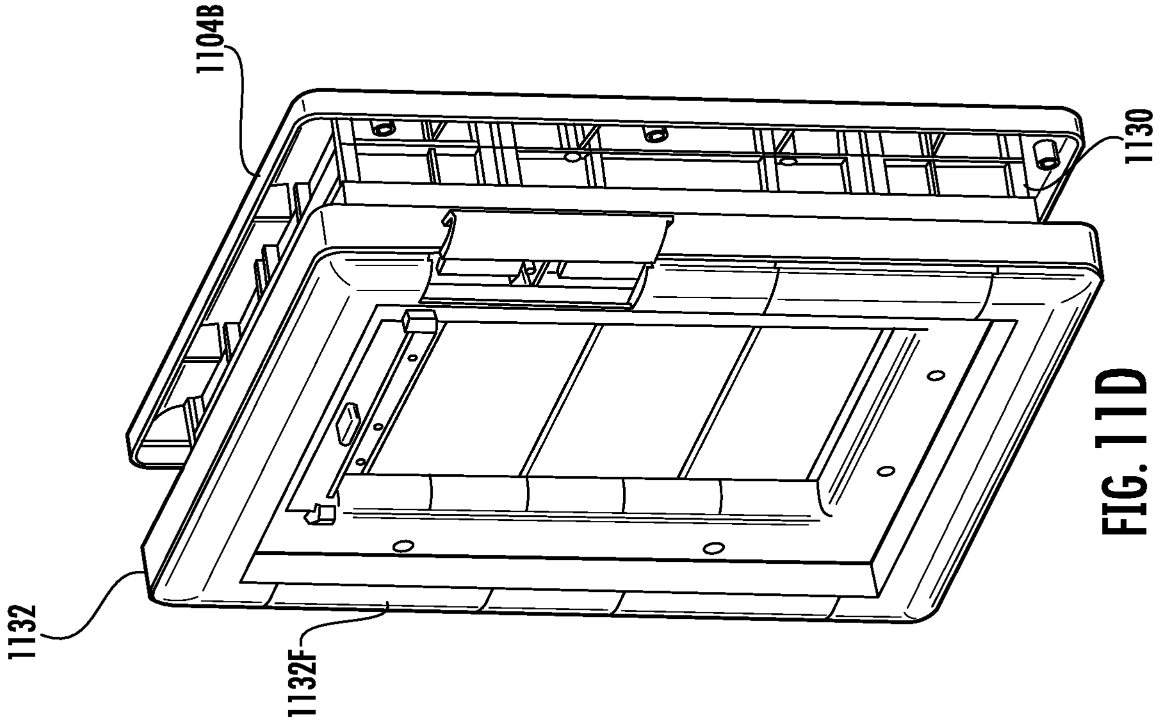
Figure 11C:
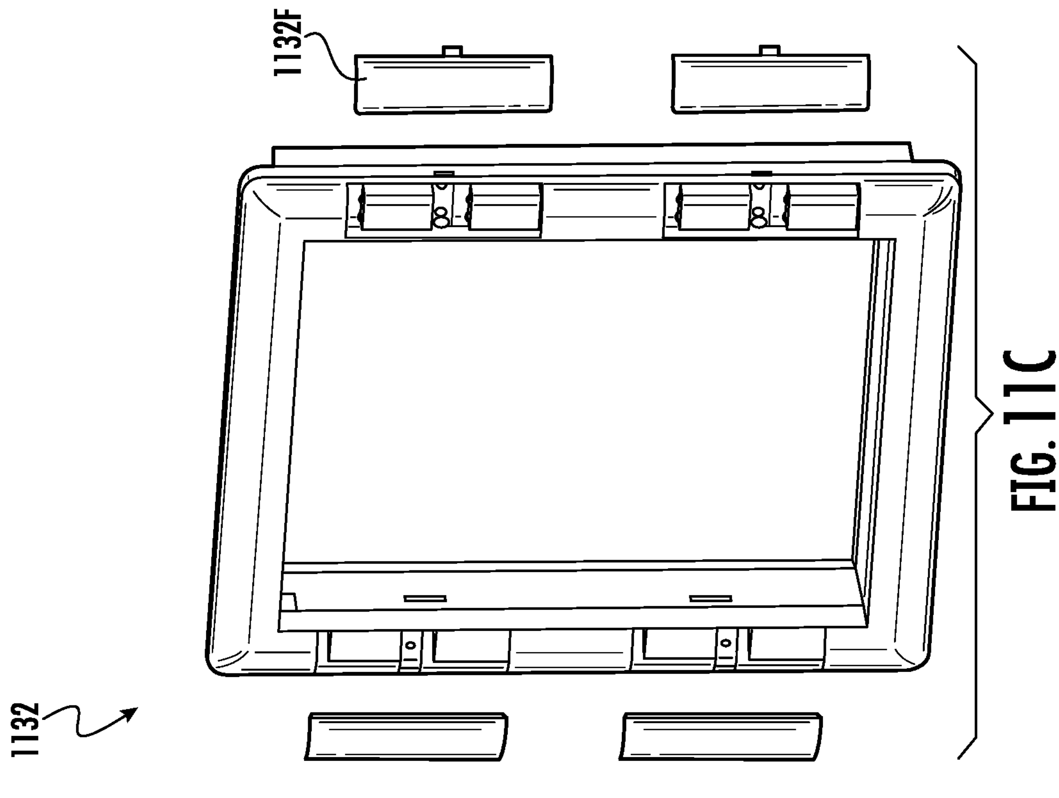
Figure 11E:
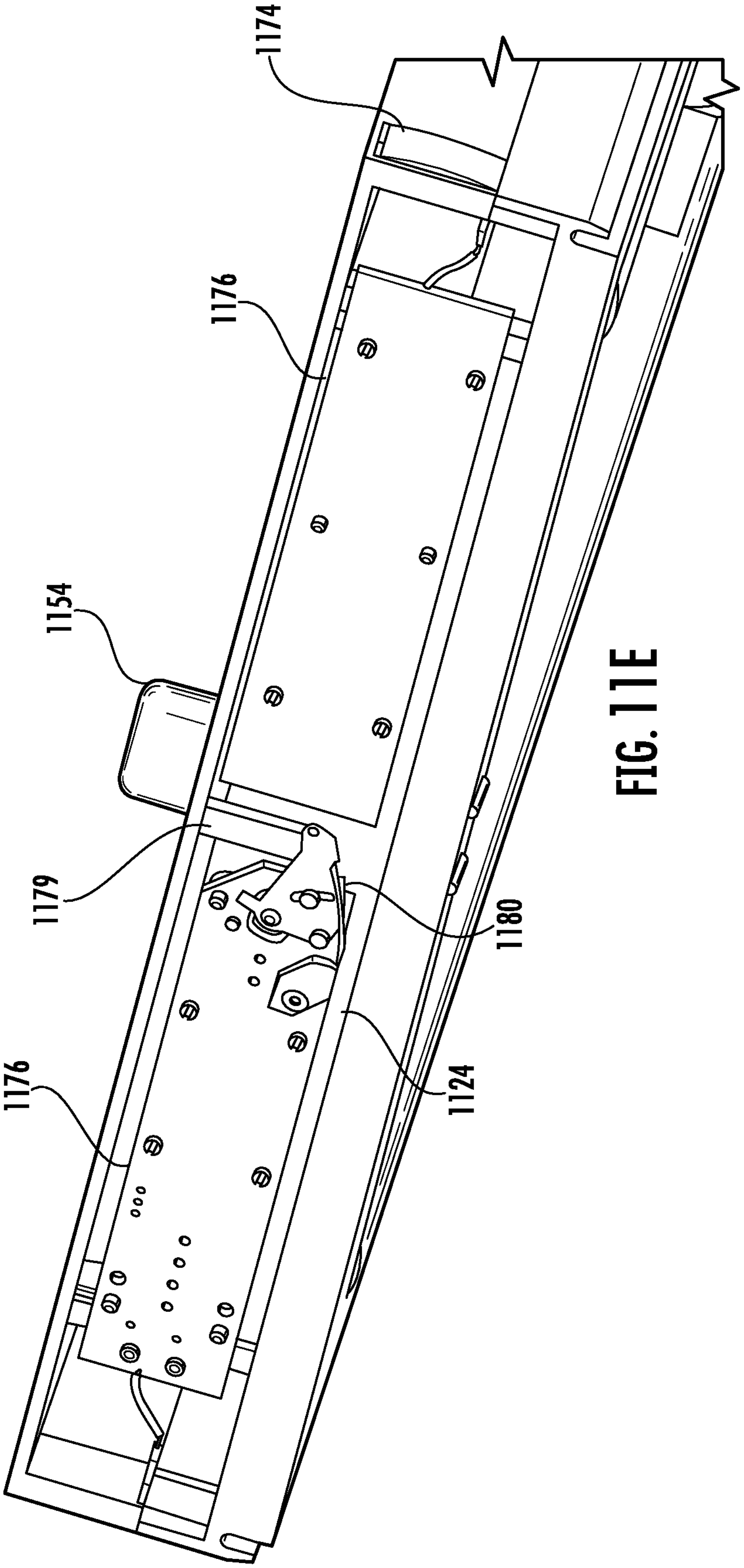
Figure 11F:
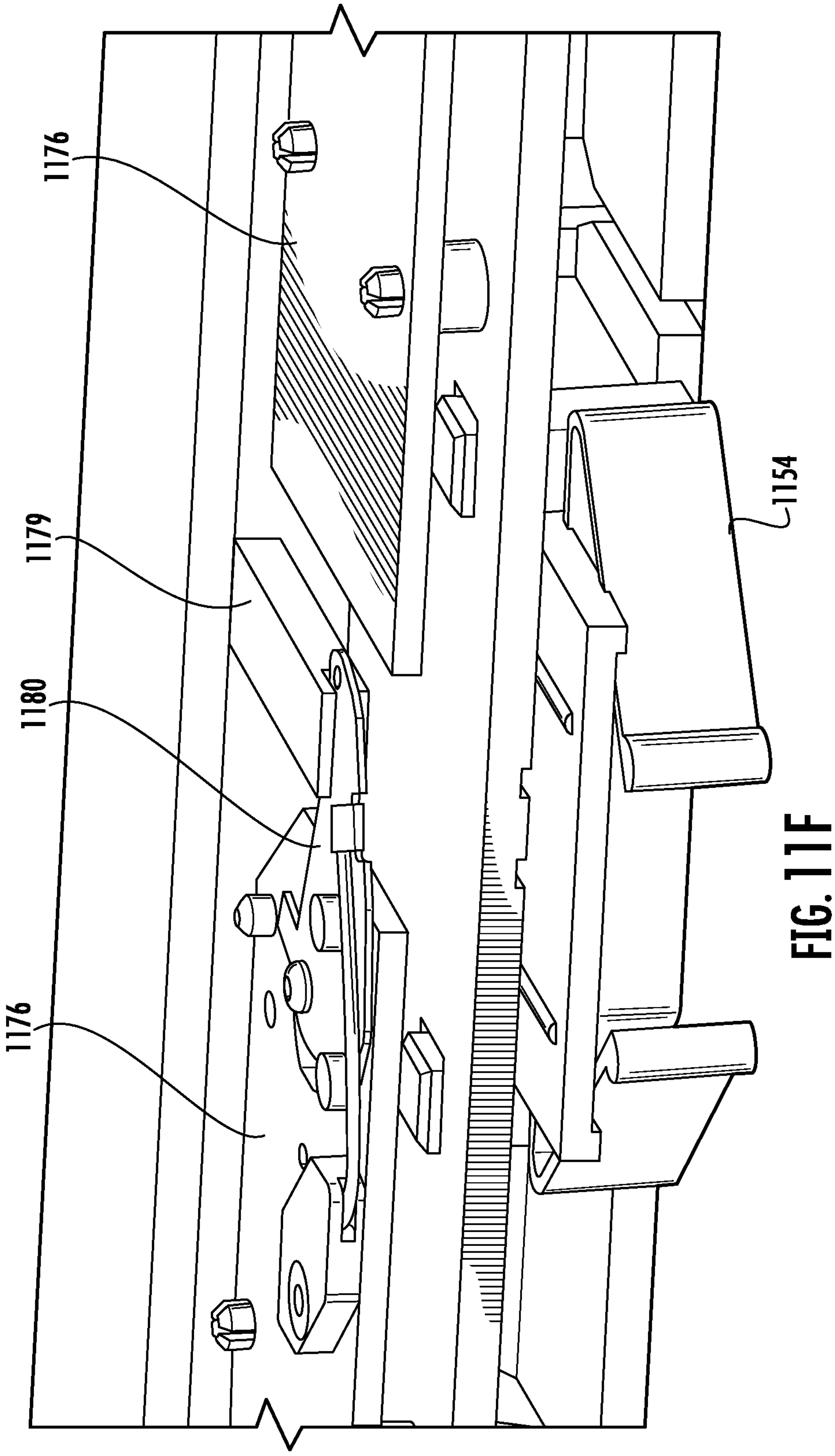
Figure 11G:
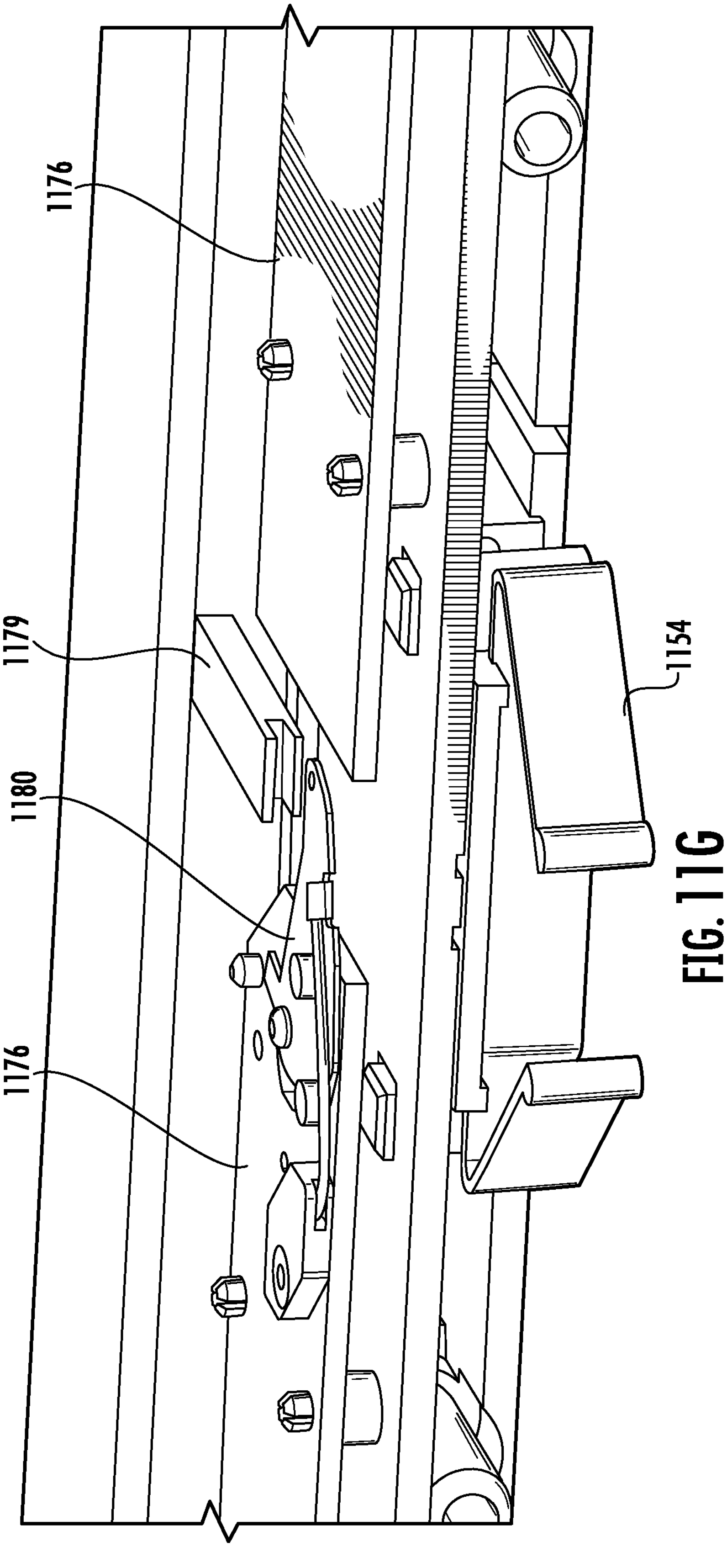
Figure 12A:
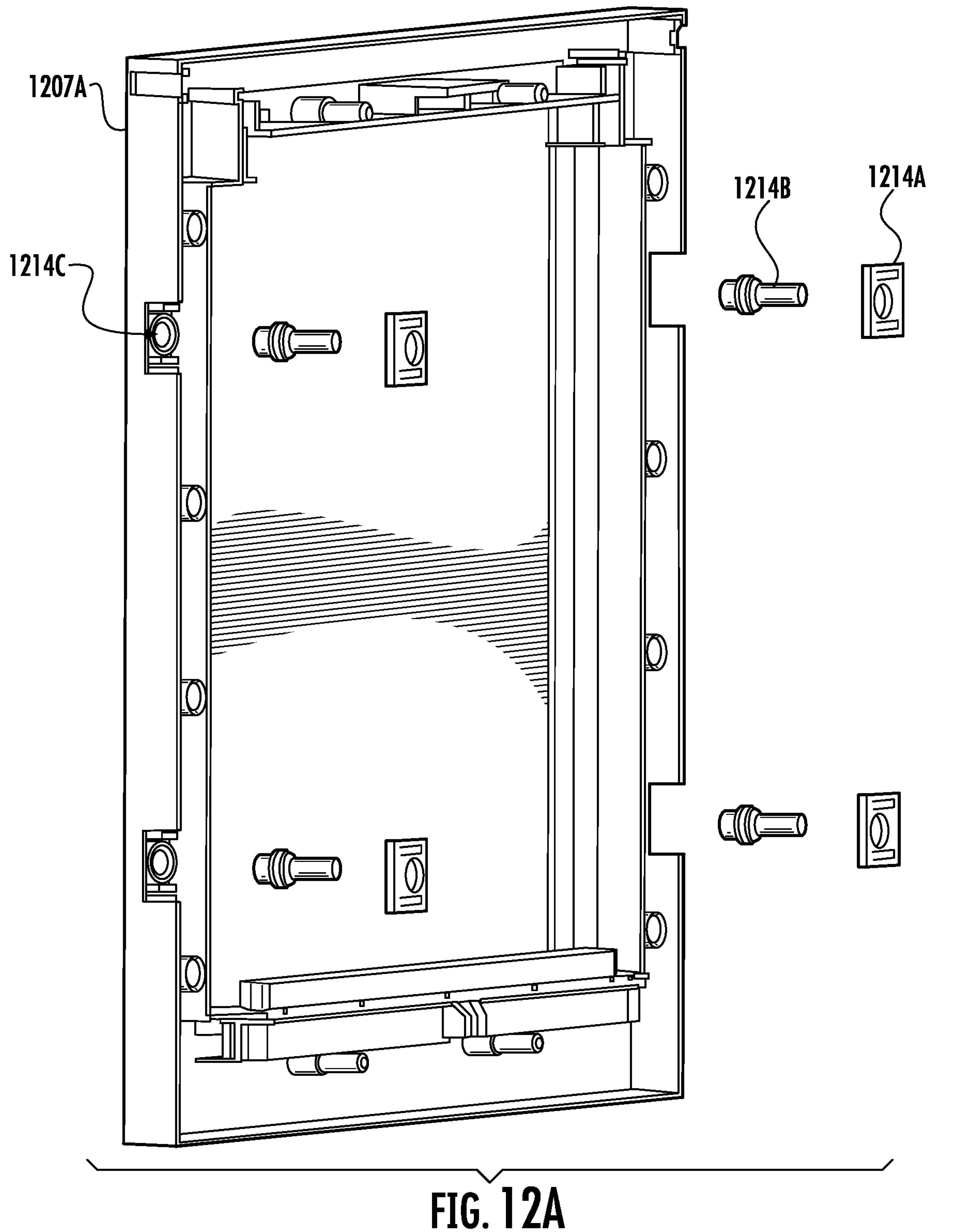
Figure 12B:
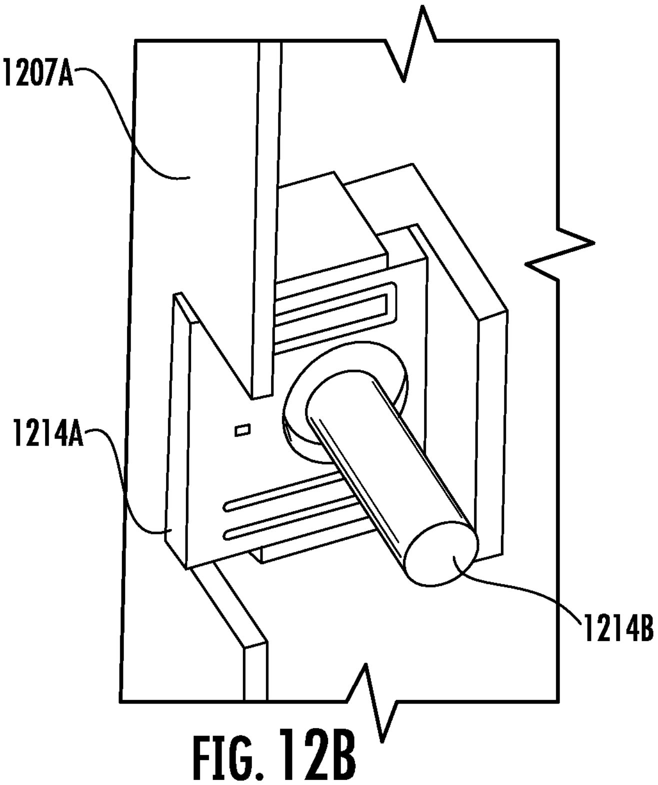
Figure 12C:
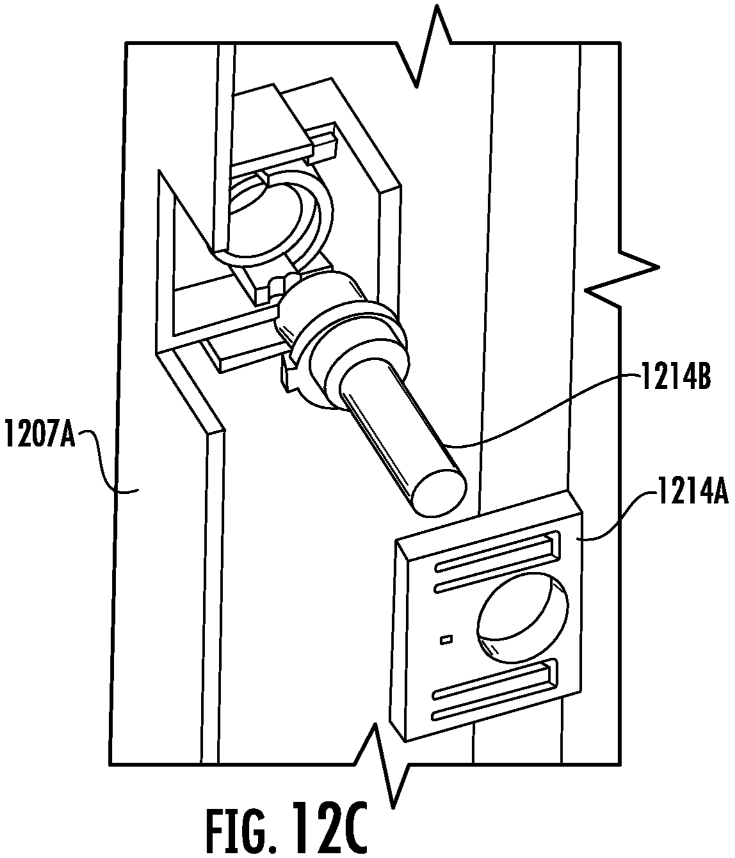
Figure 12D:
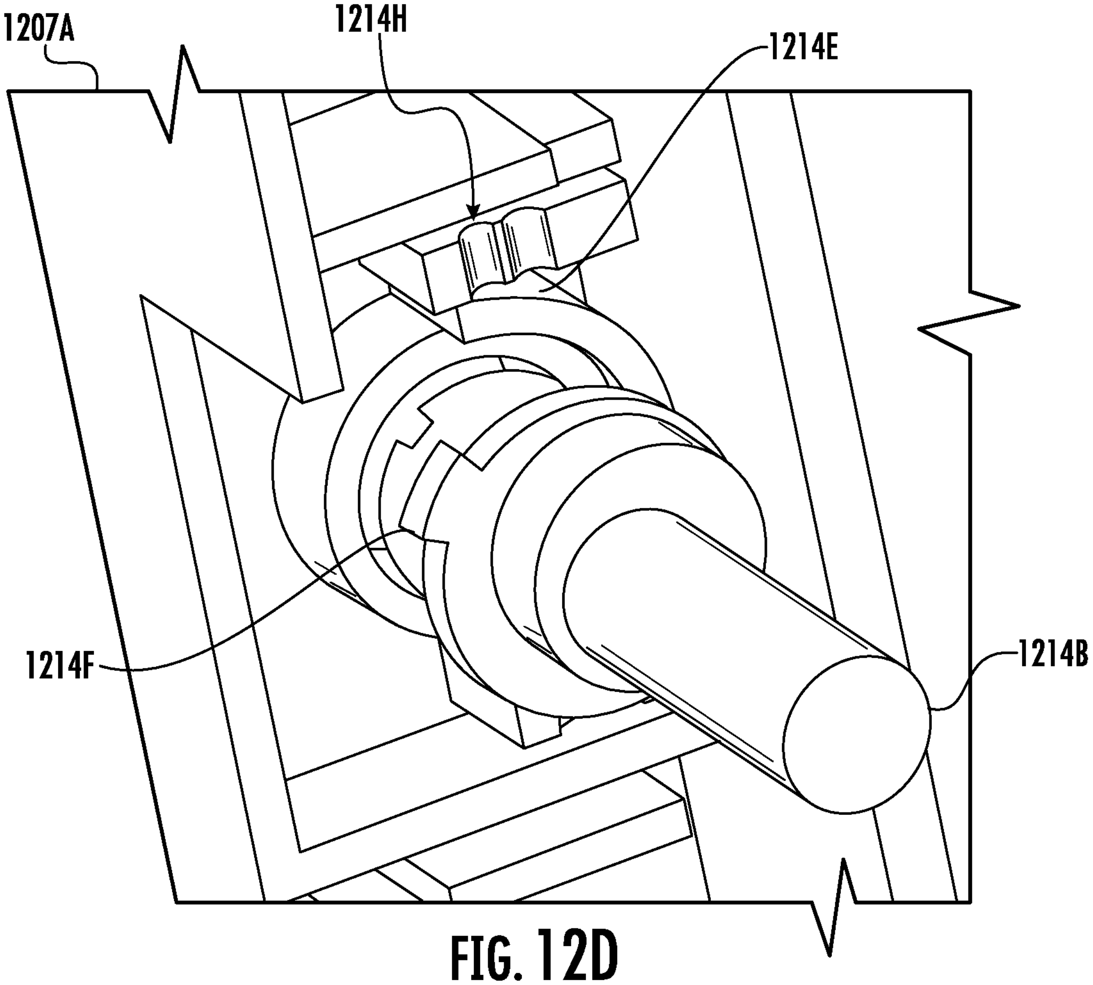
Figure 12E:
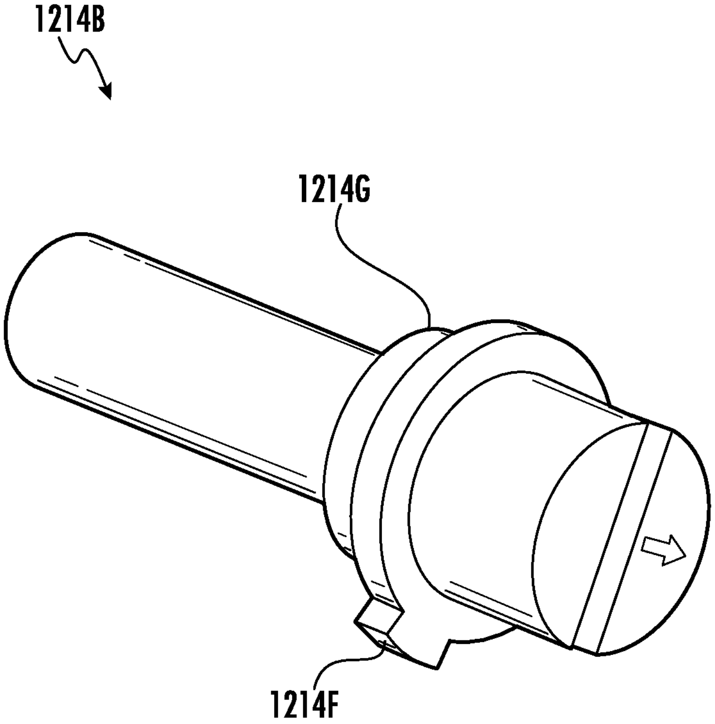
Figure 12F:
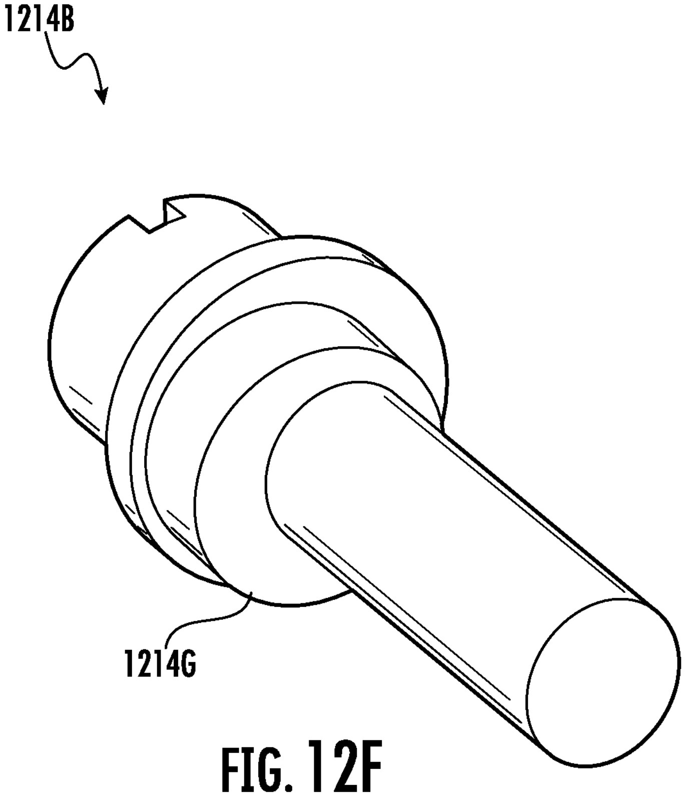
Figure 12G:
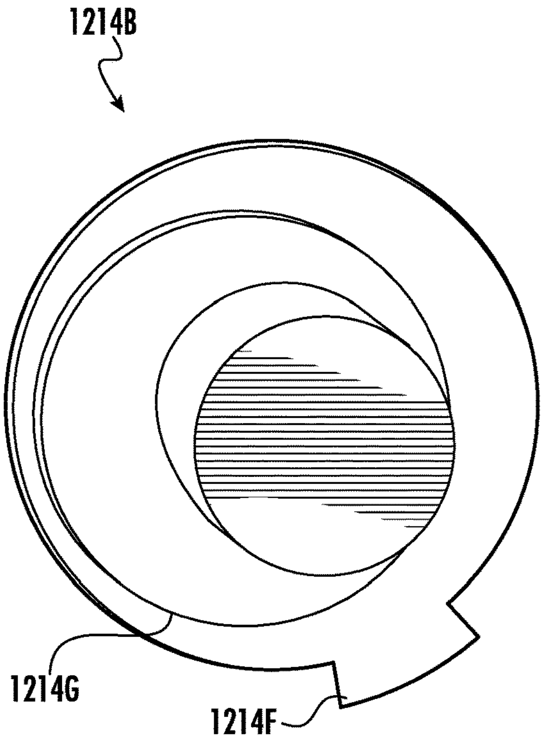
Figure 12H:
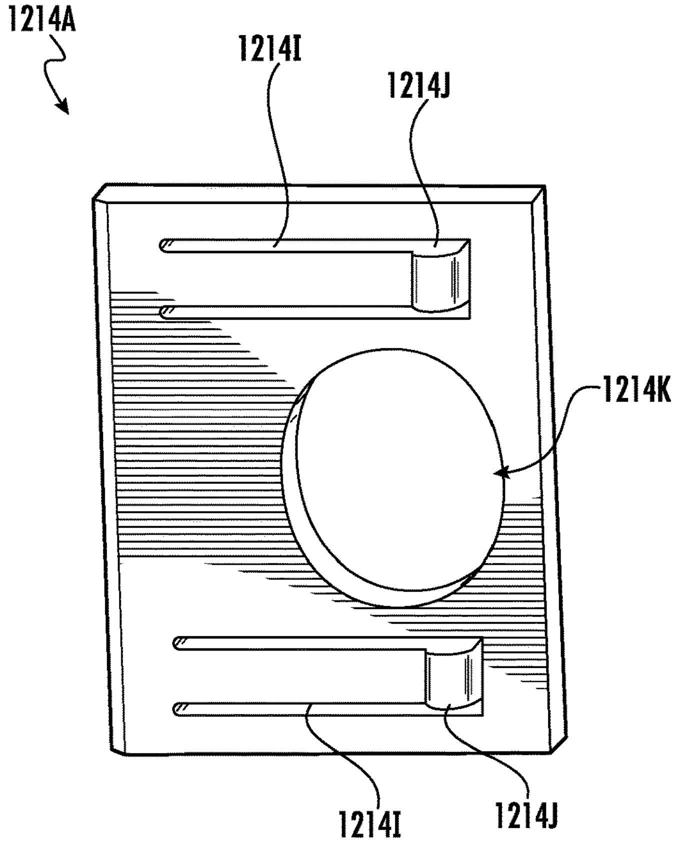
Figure 13A:
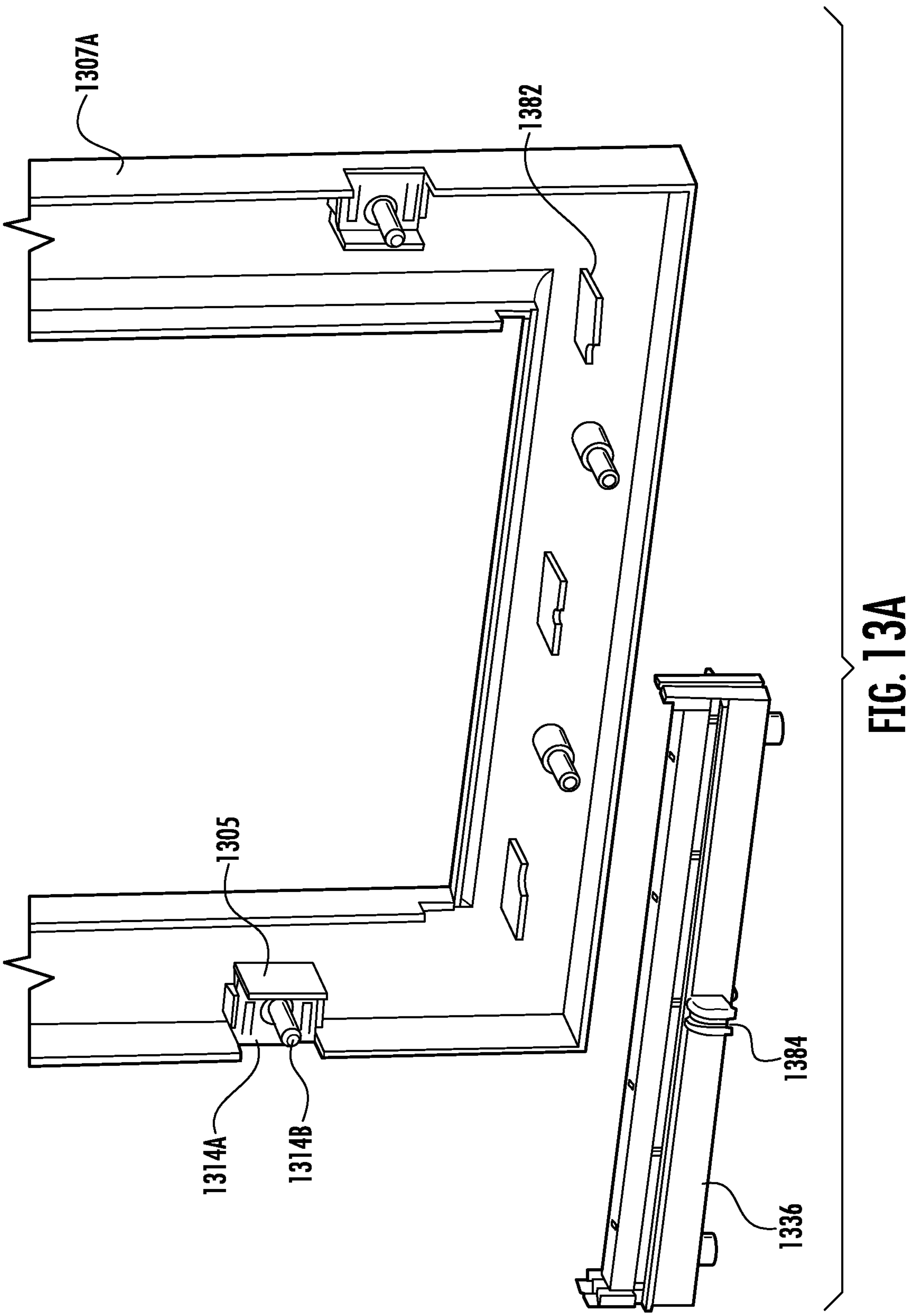
Figure 13B:
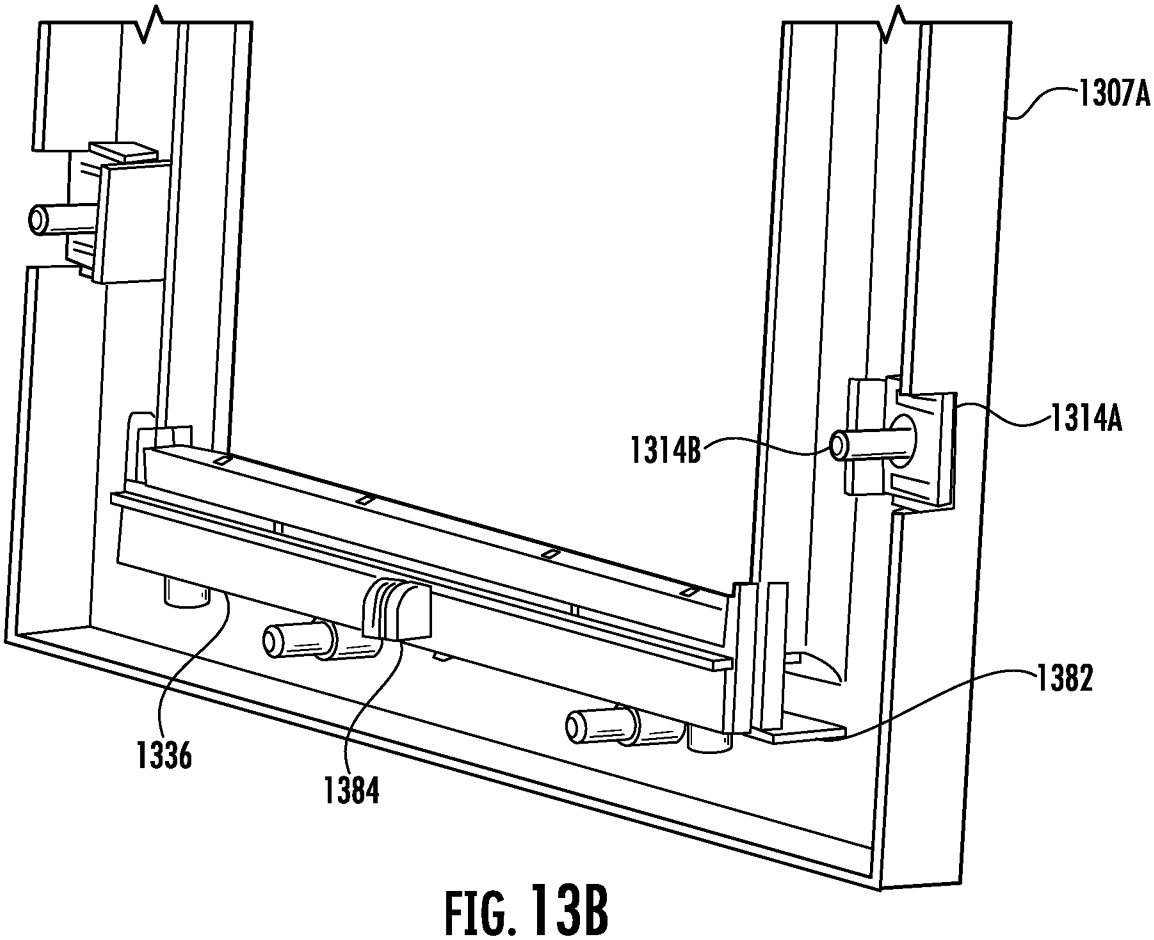
Figure 13C:
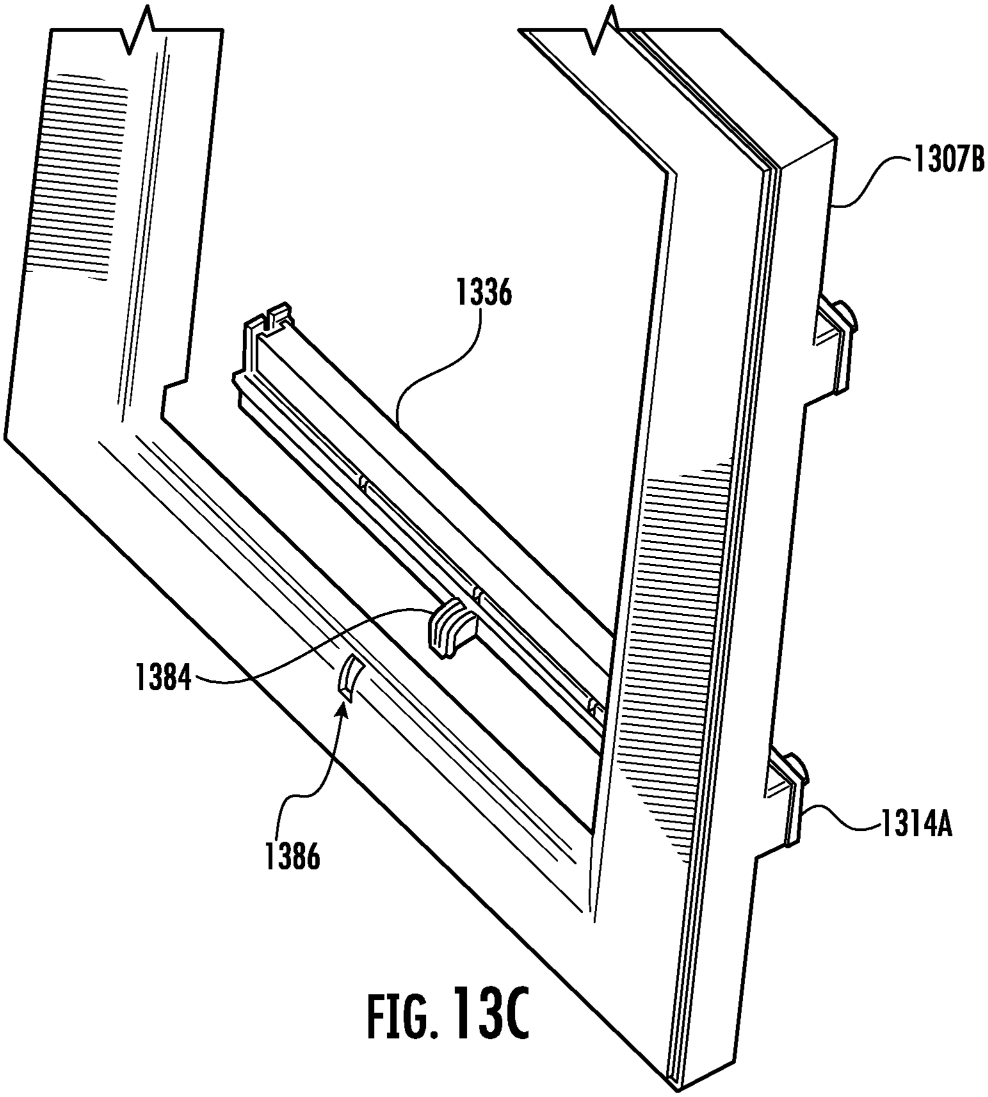
Figure 13D:
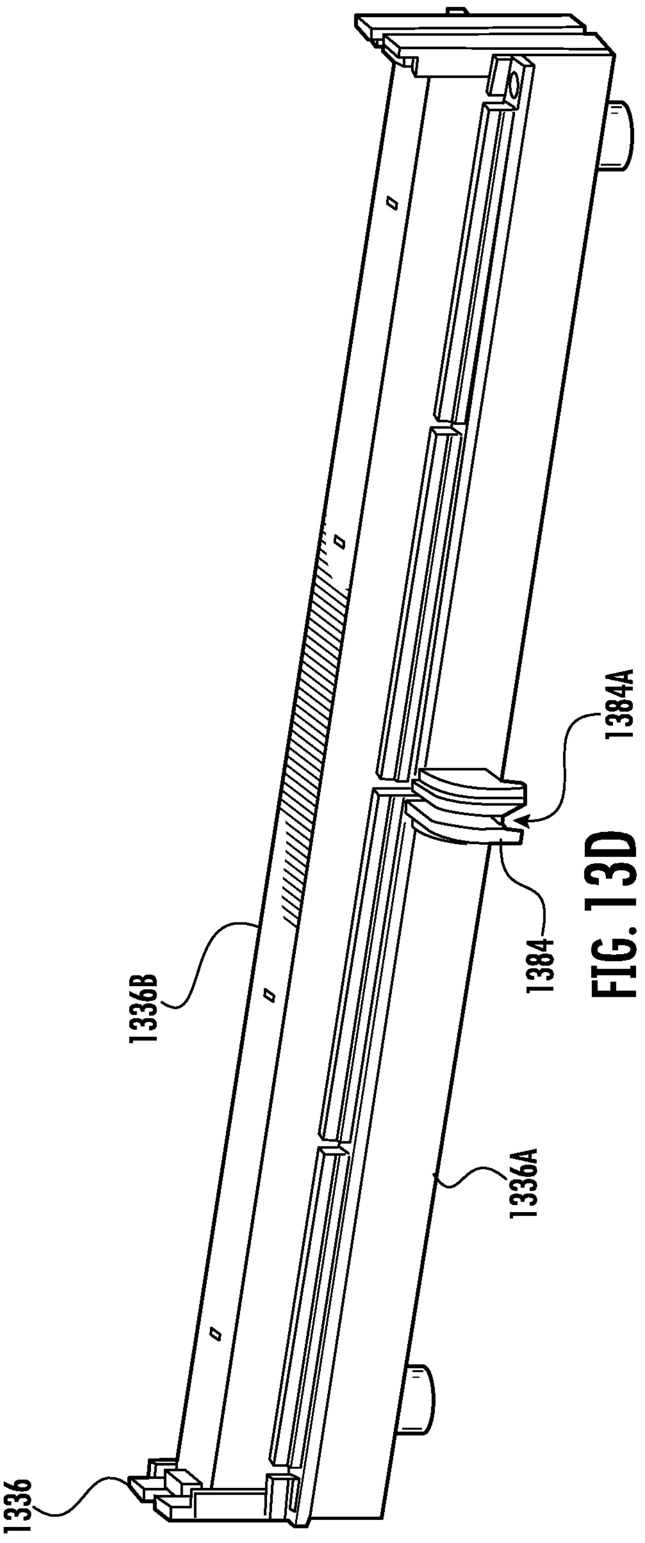
Figure 13E:
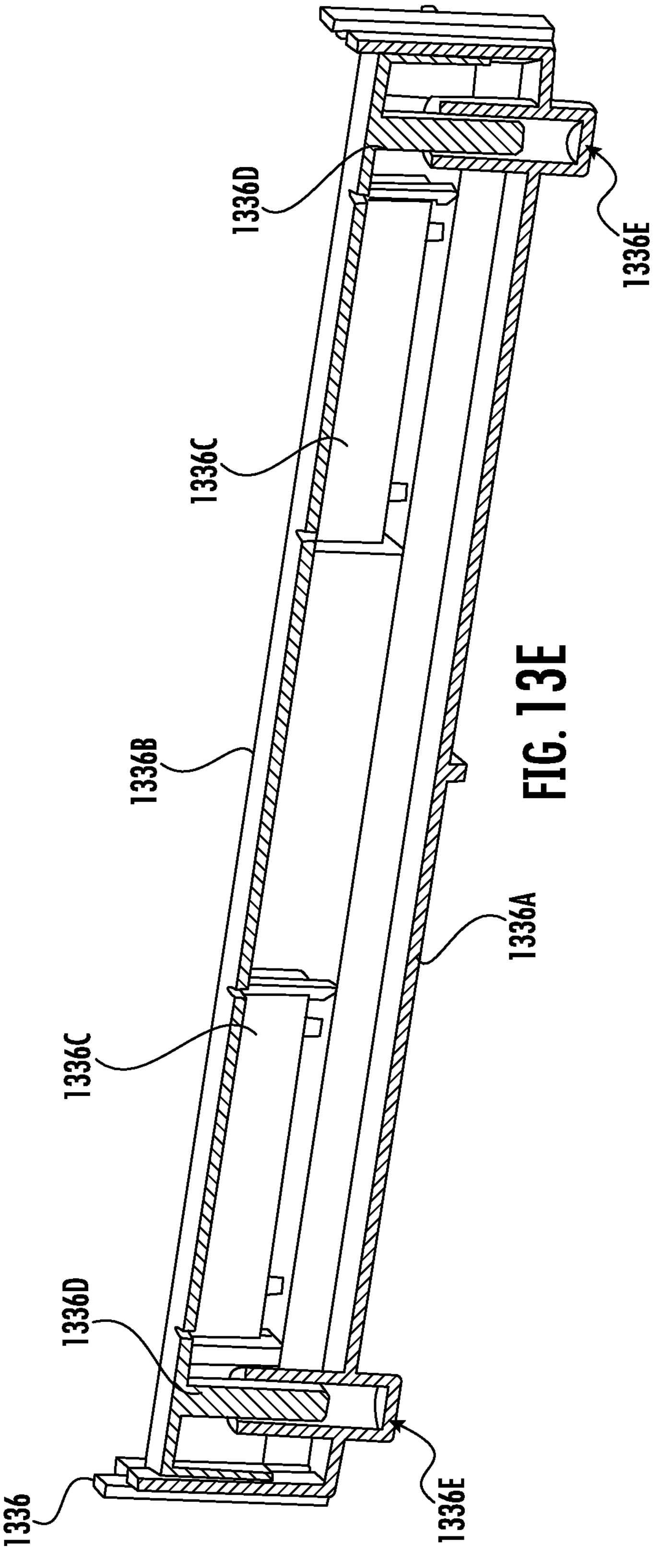
Figure 13F:
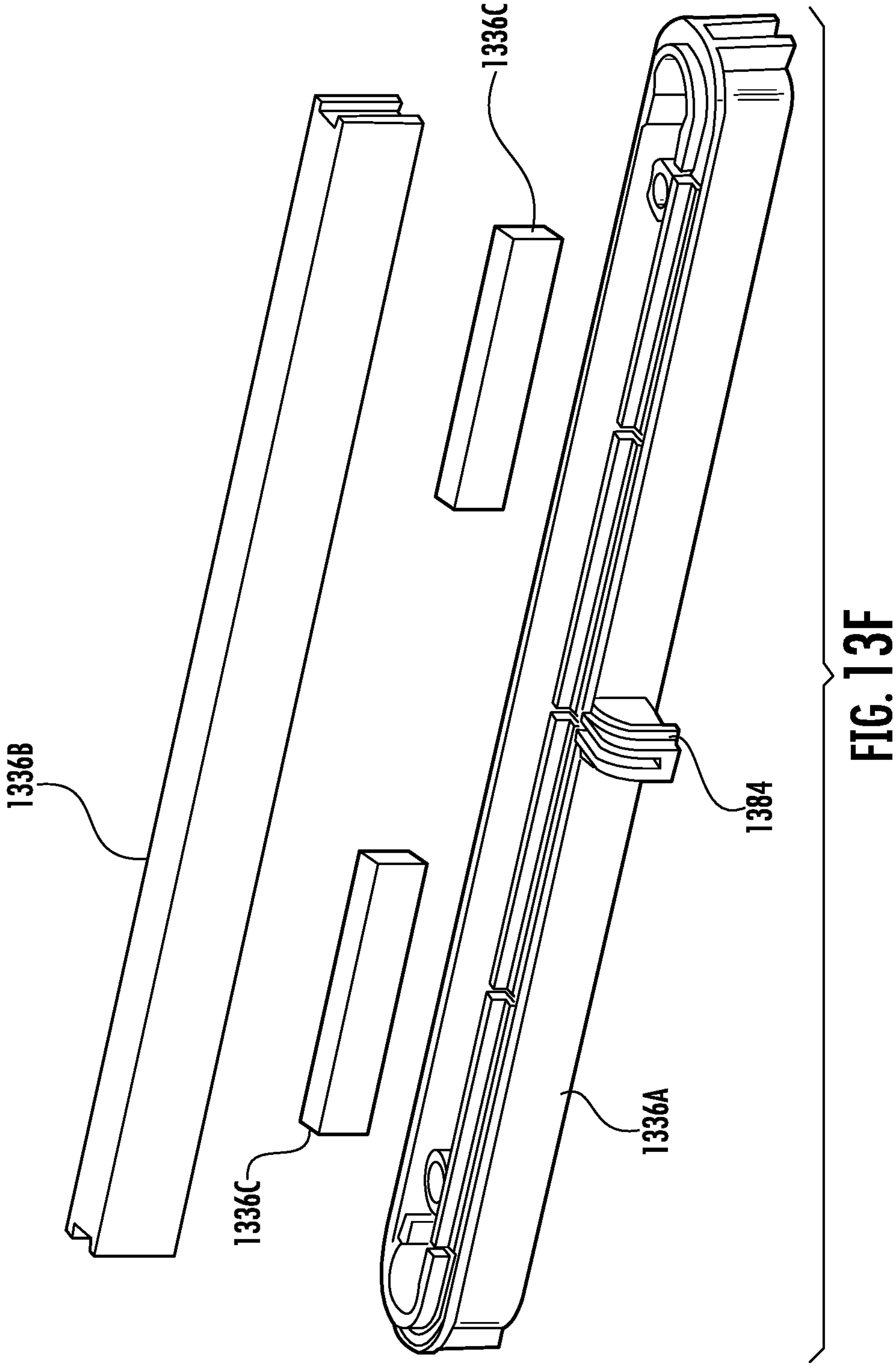
Figure 13G:
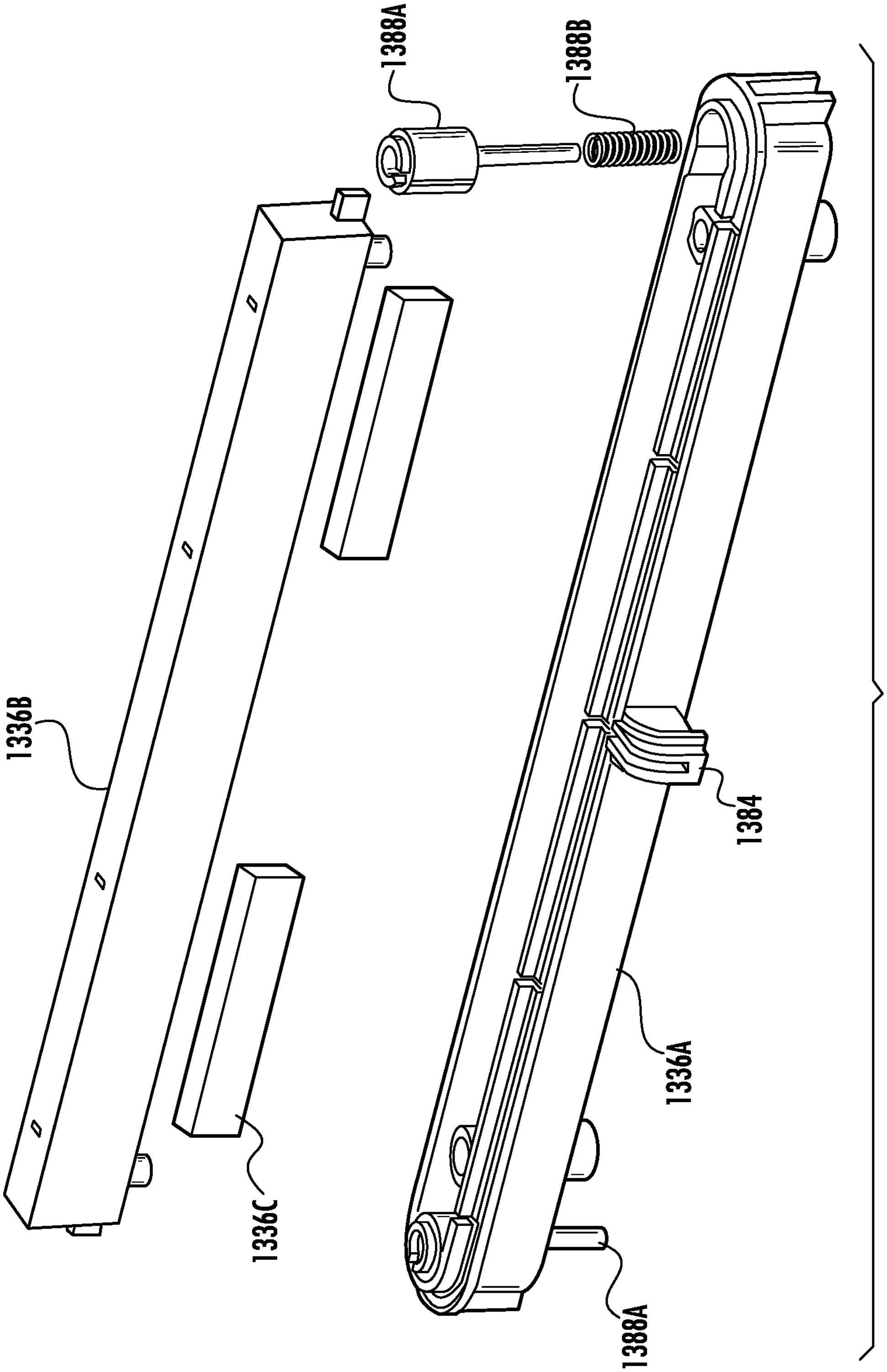
Figure 13H:
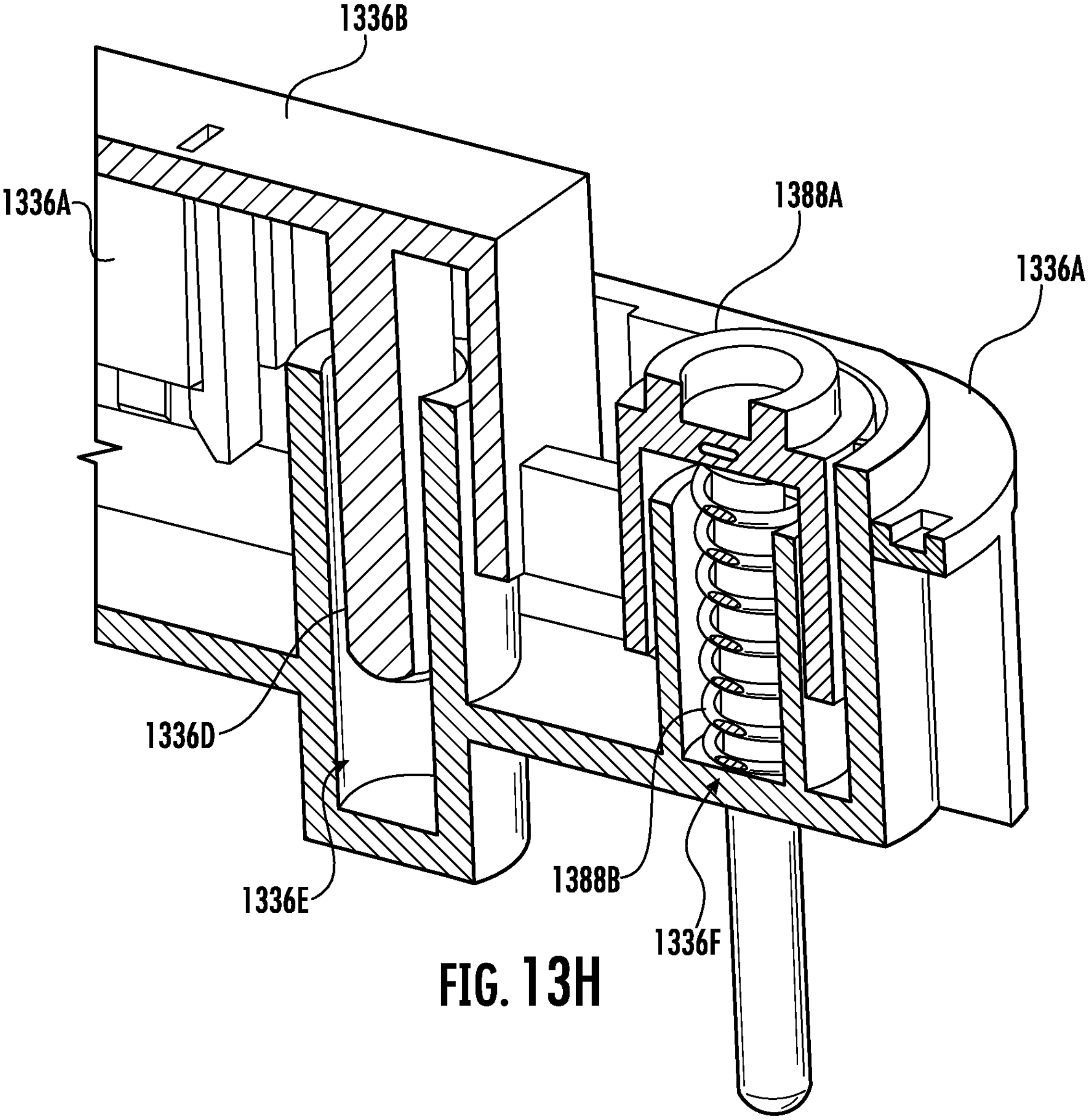
Figure 13I:
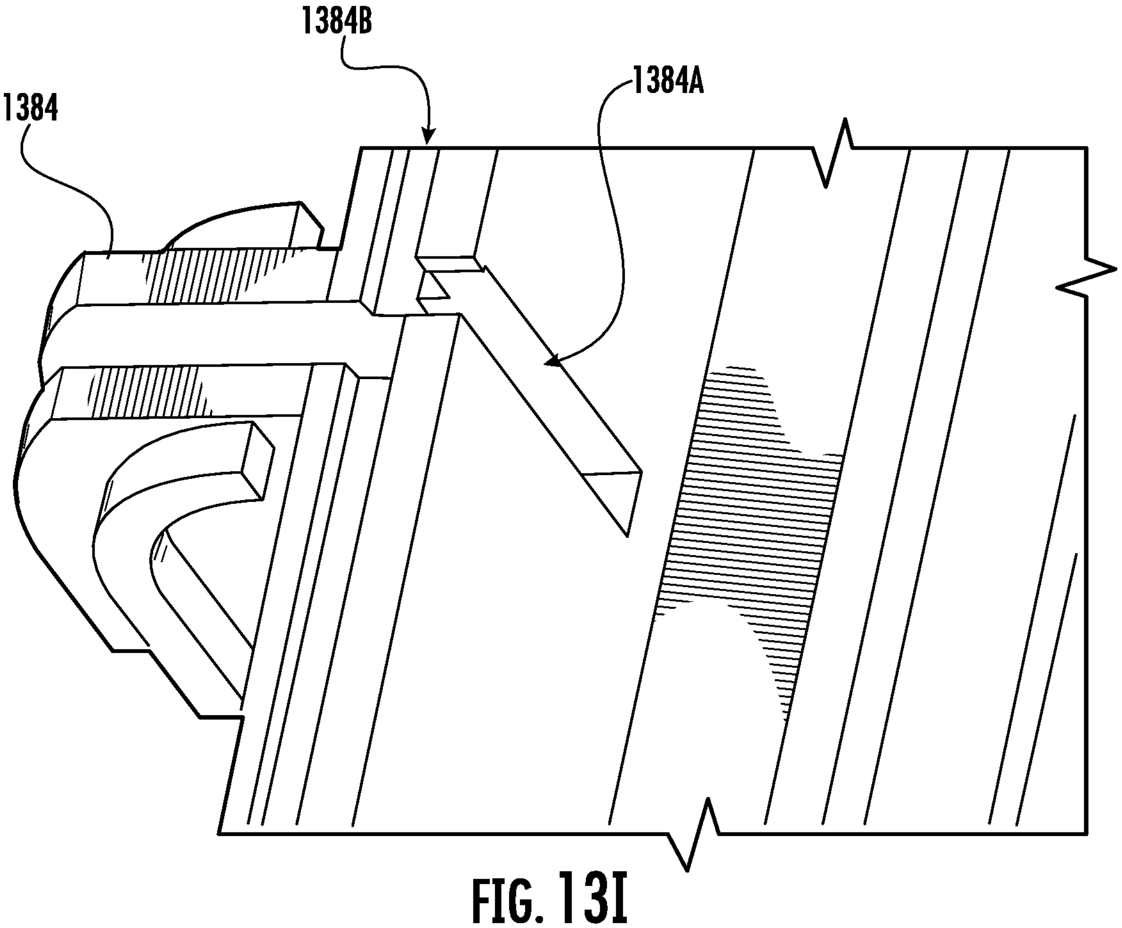
Figure 14A:
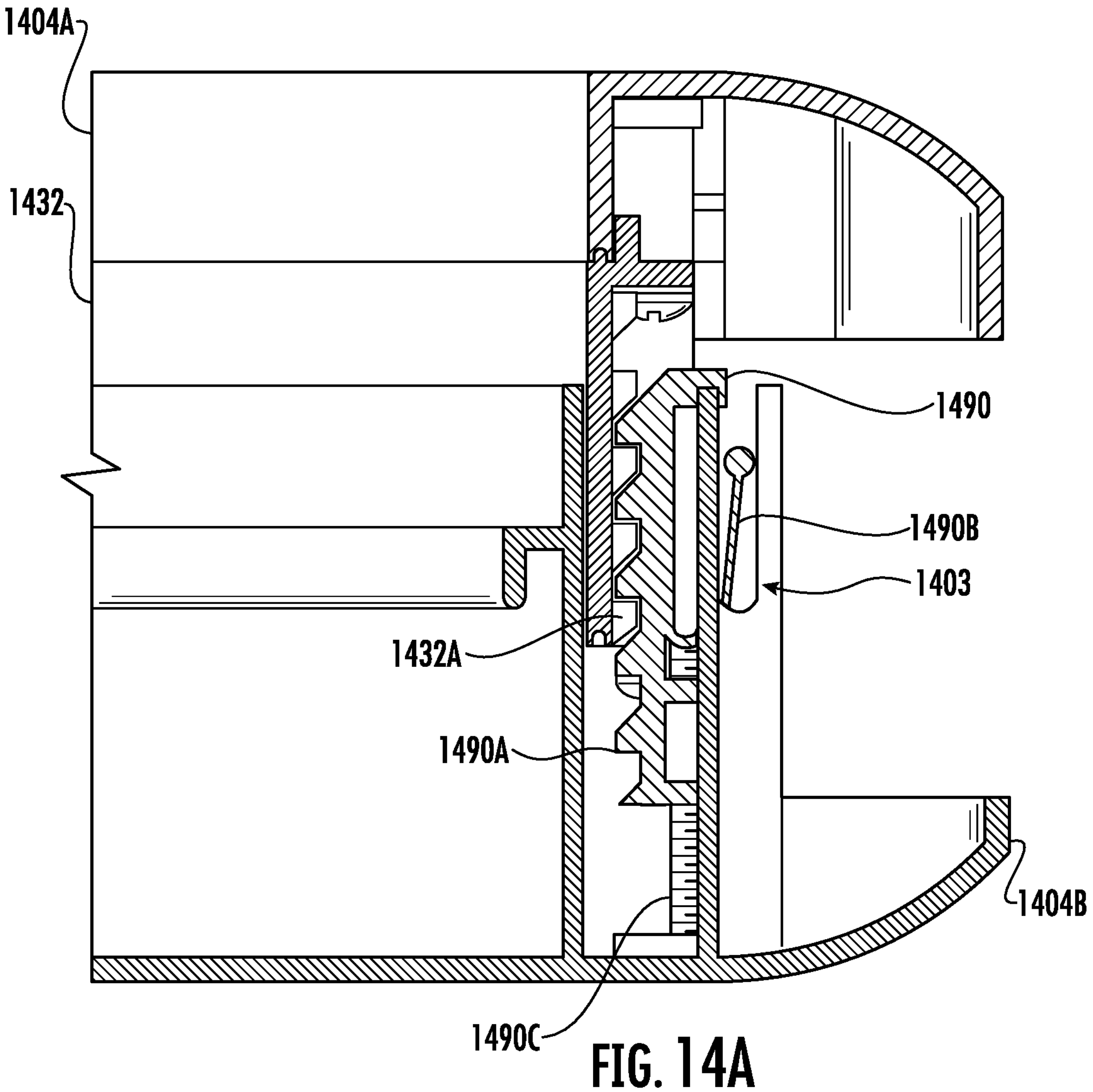
Figure 14B:
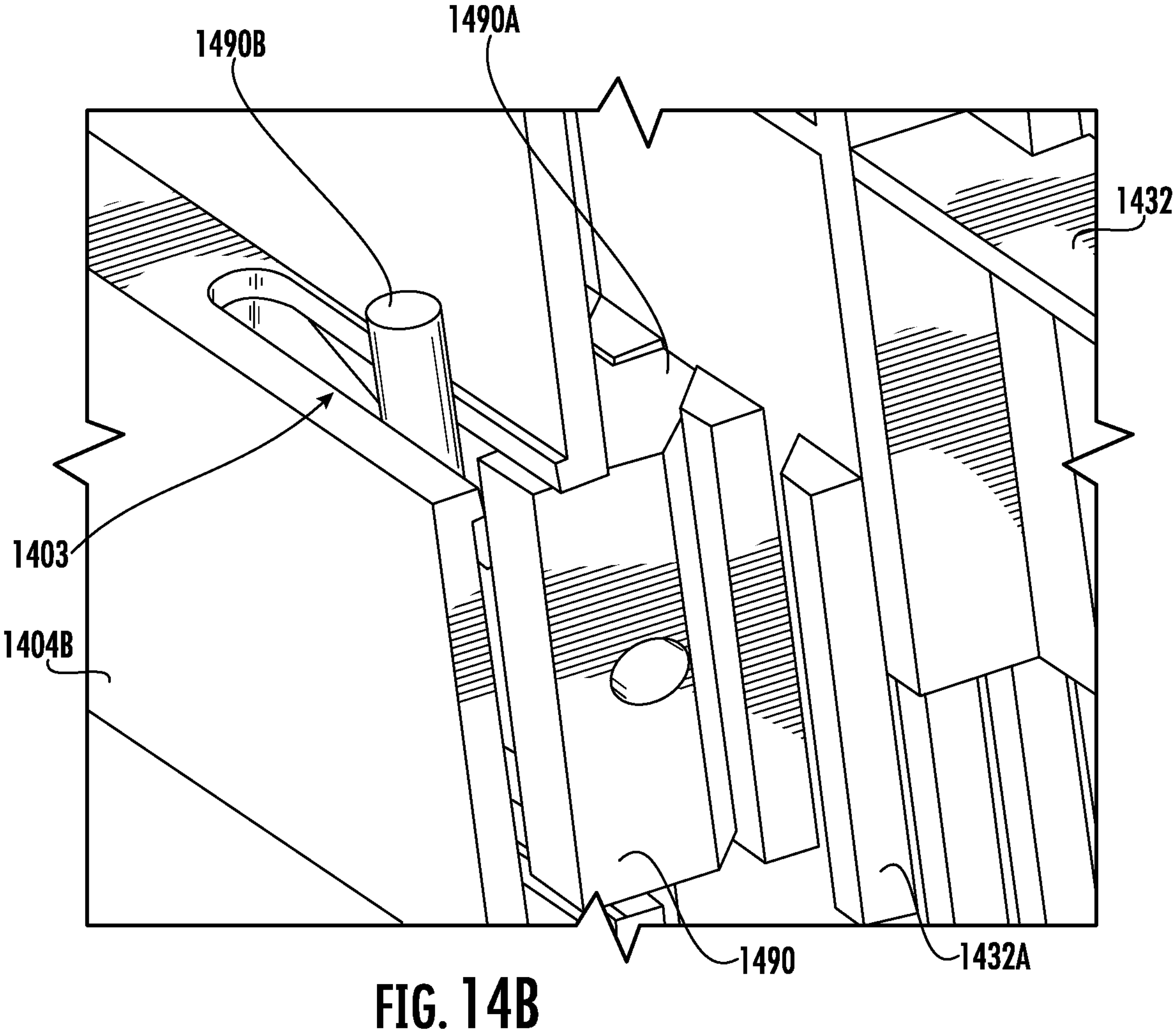
Figure 14C:
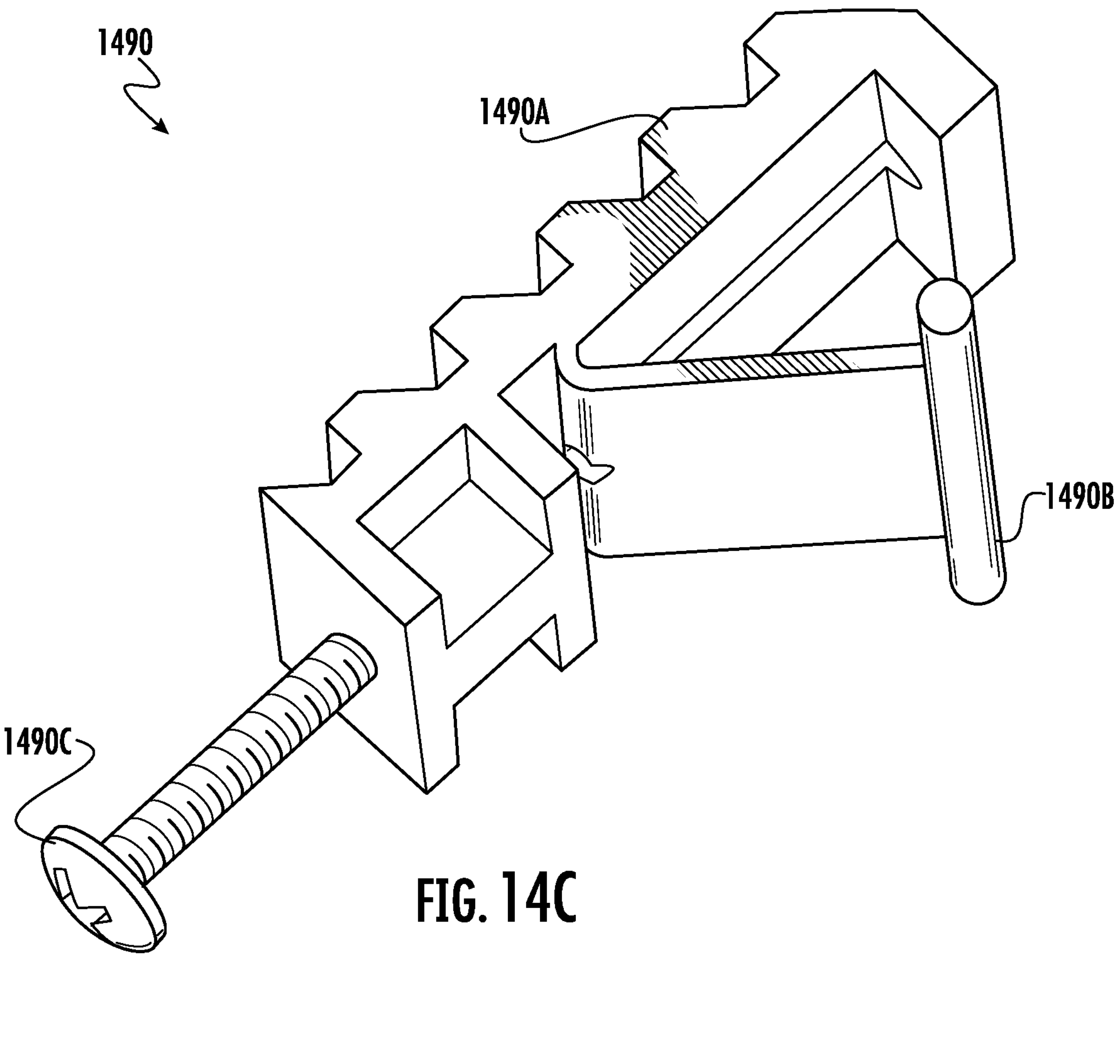
Figure 15A:
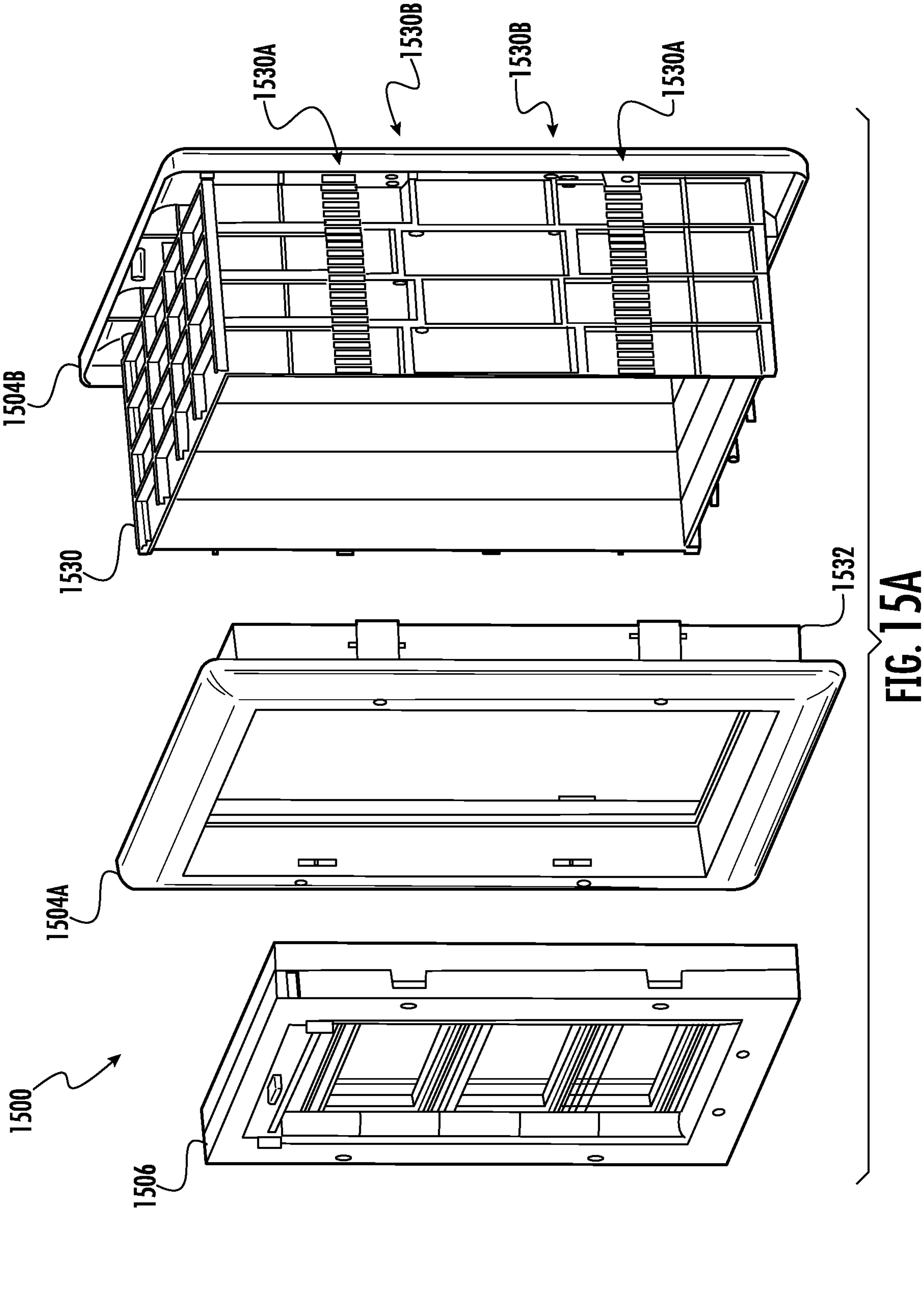
Figure 15B:
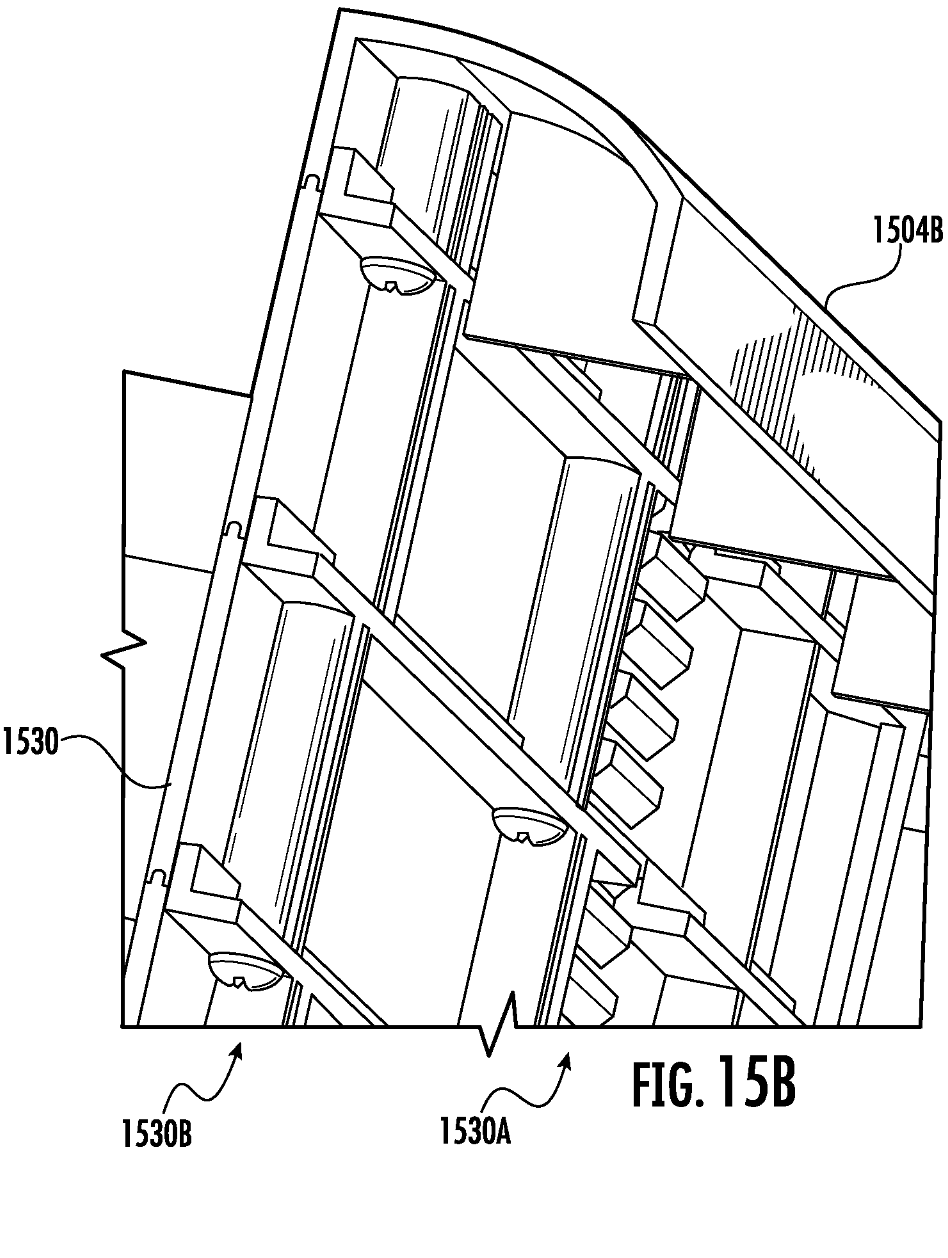
Figure 15C:
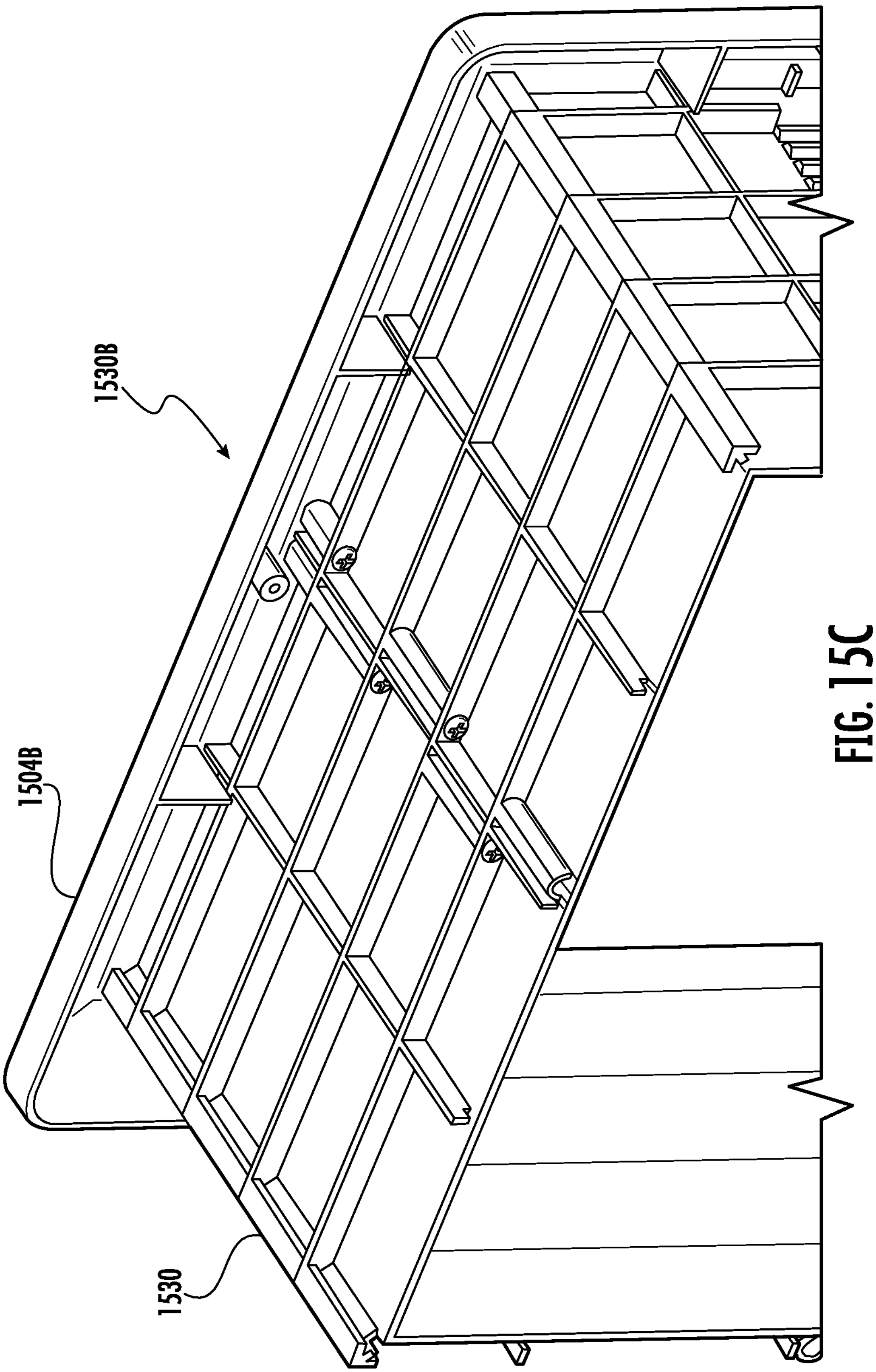
Figure 16A:
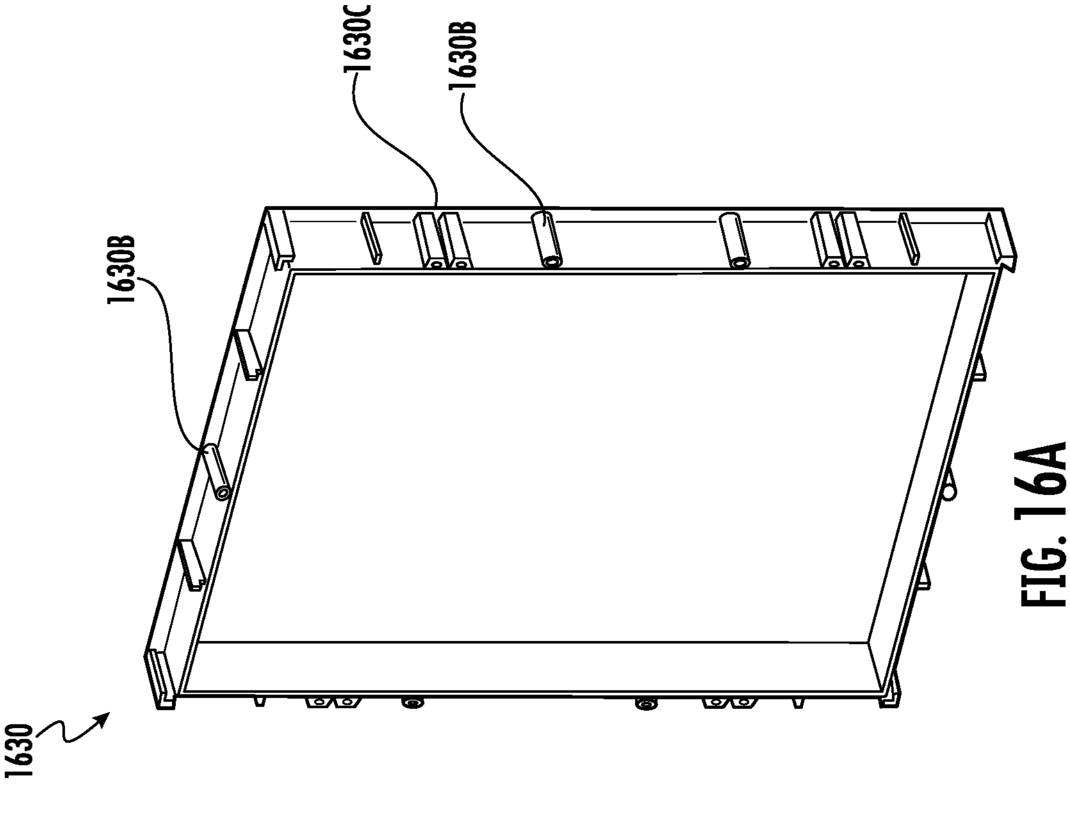
Figure 16B:
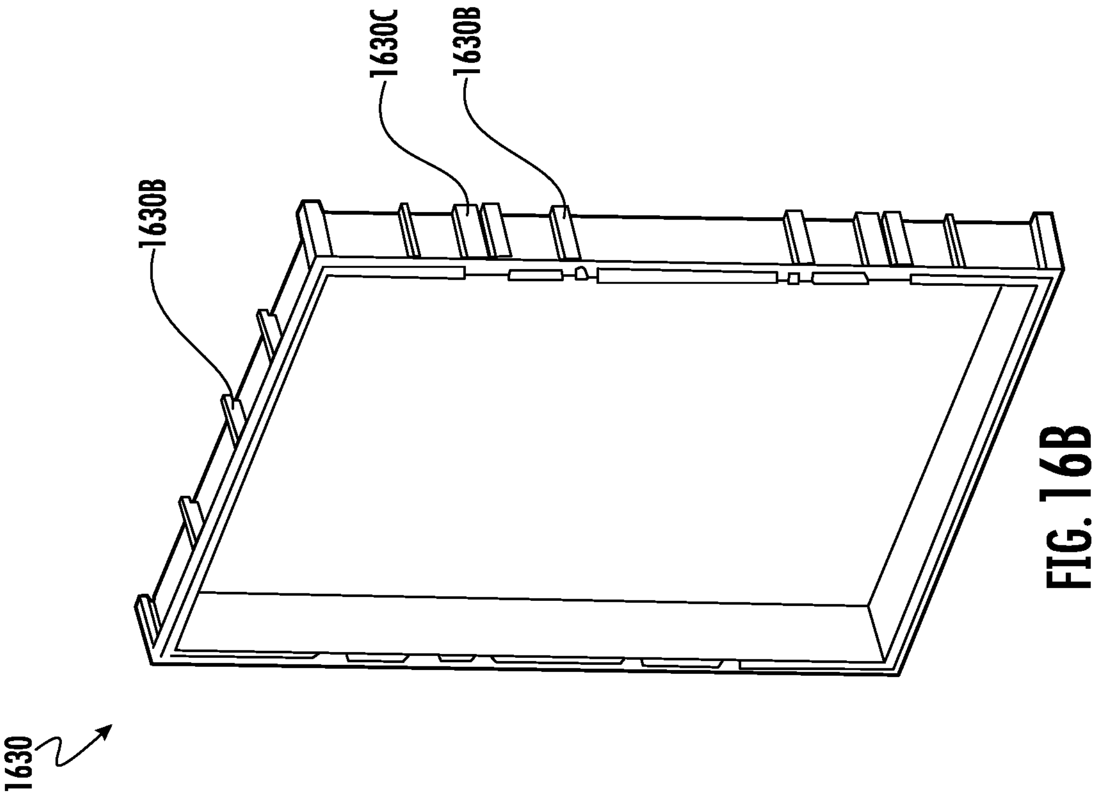
Figure 16D:
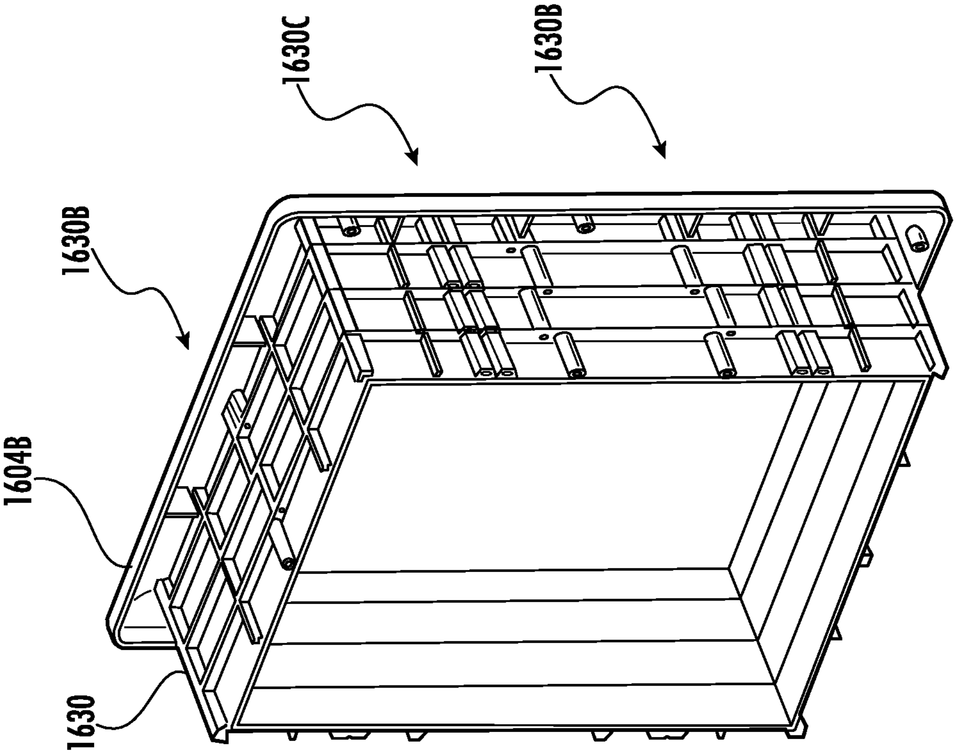
Figure 16C:
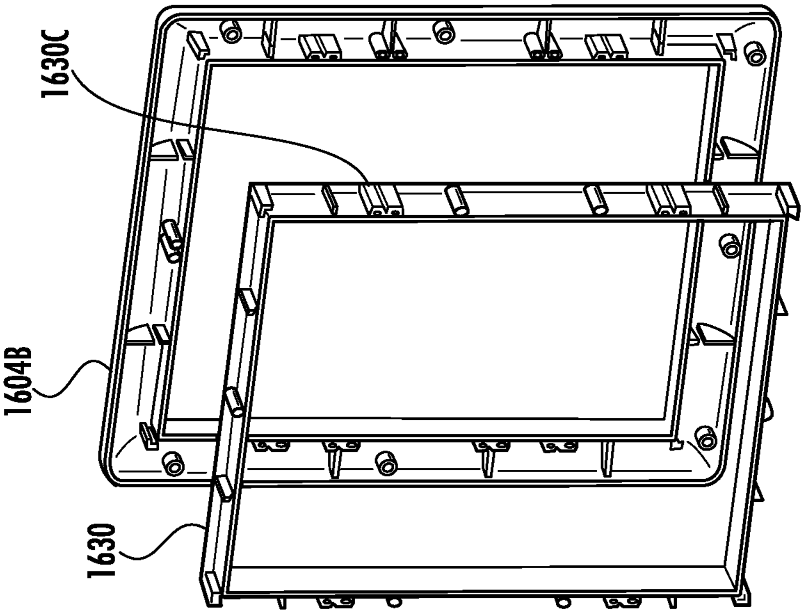
Figure 16E:
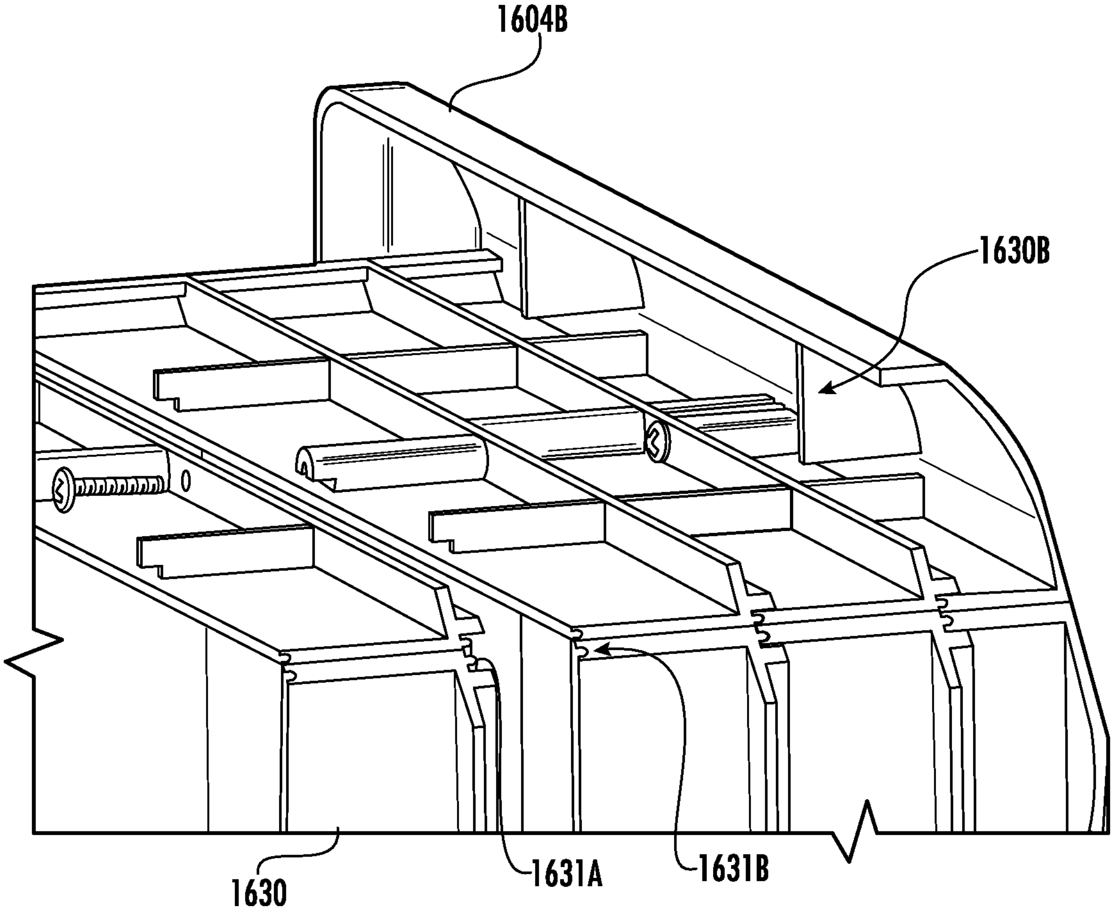
Figure 16F:
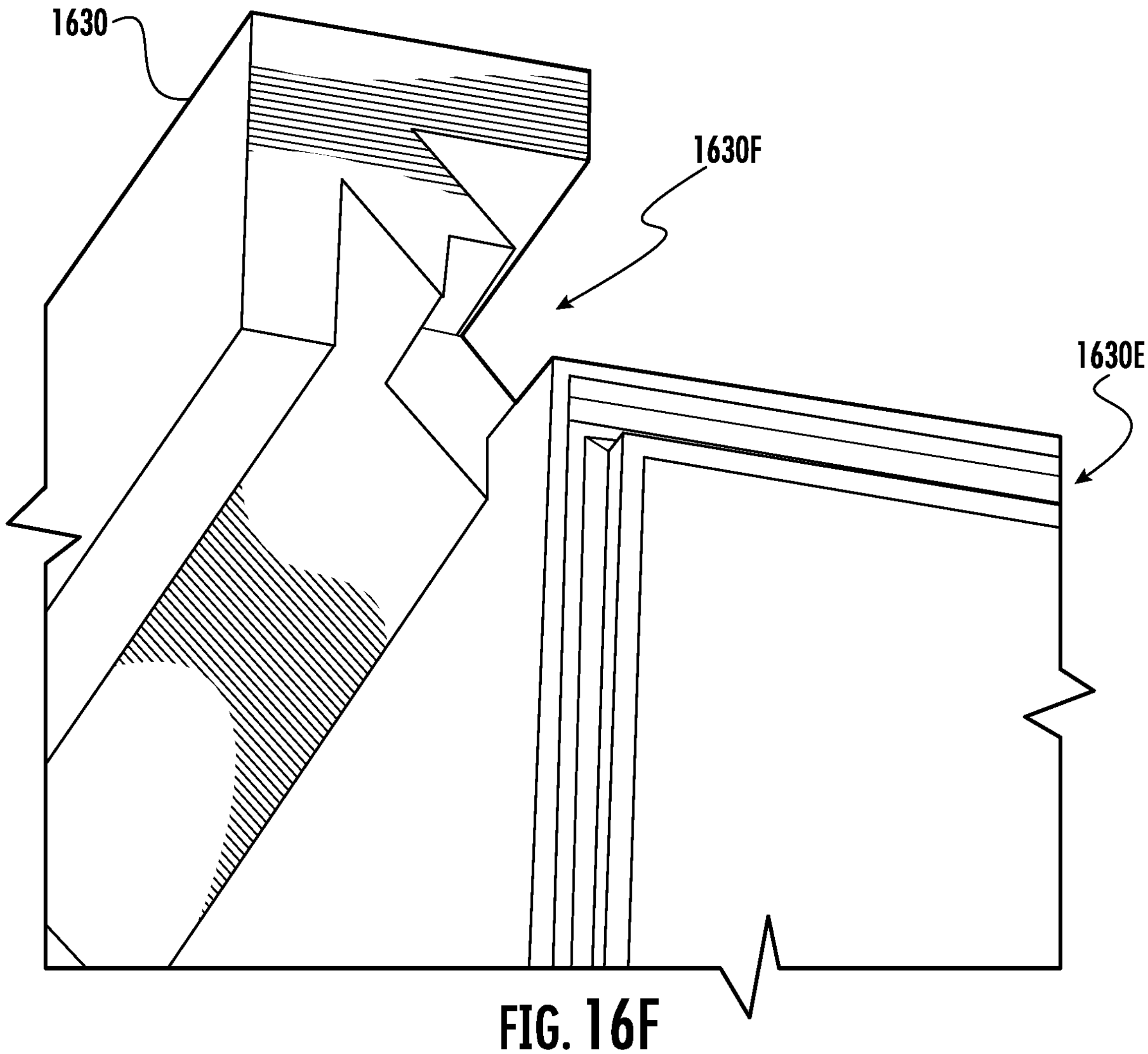
Figure 16G:
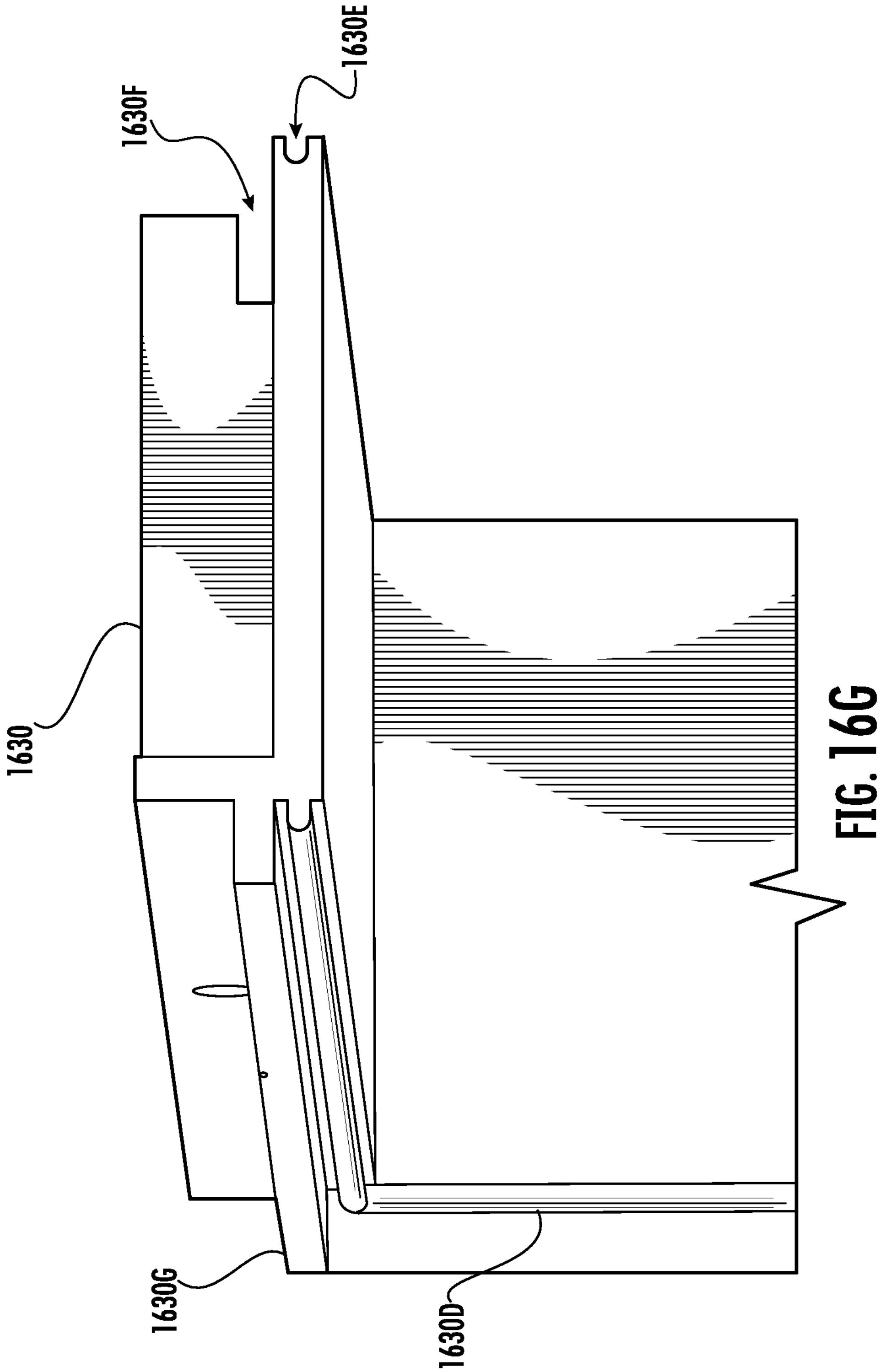
Figure 17B:
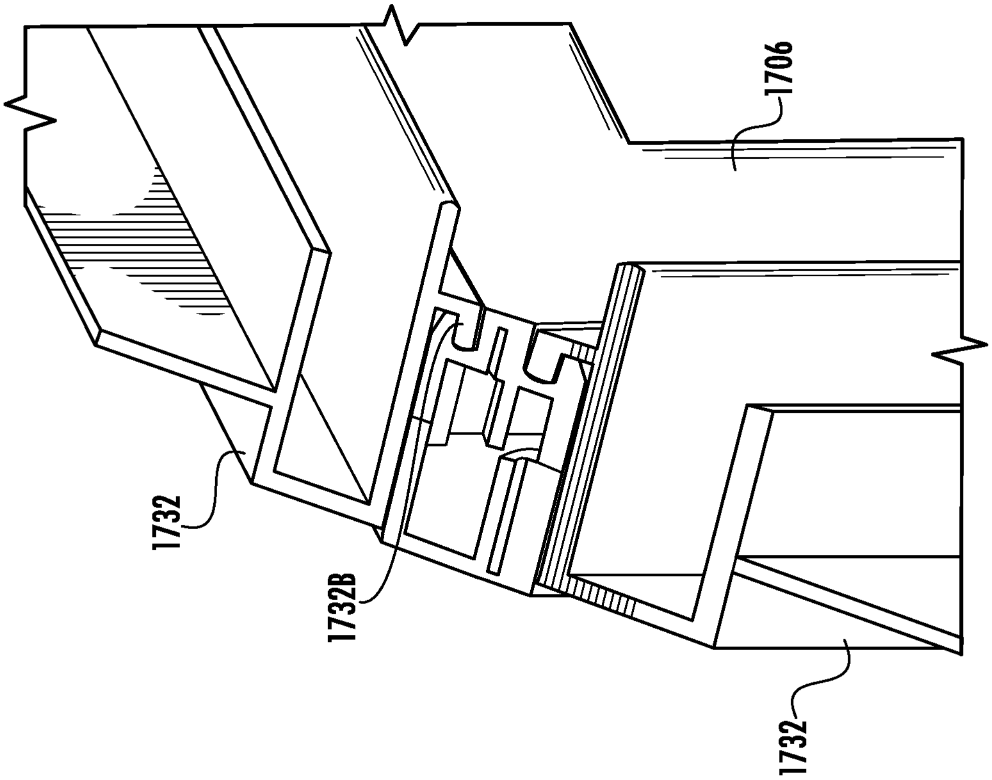
Figure 17A:
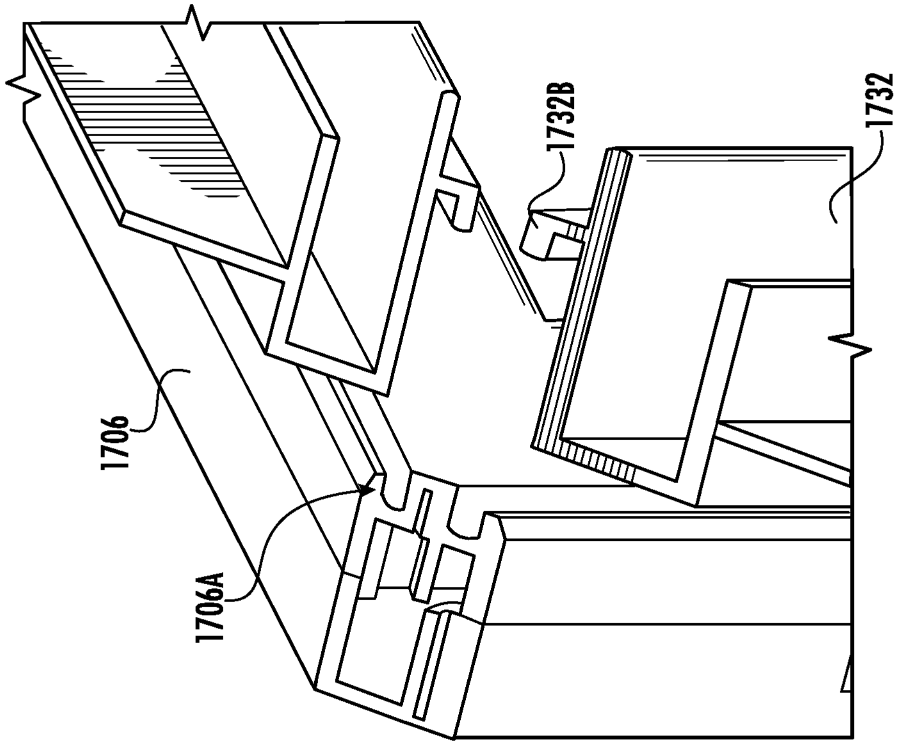
Figure 18A:
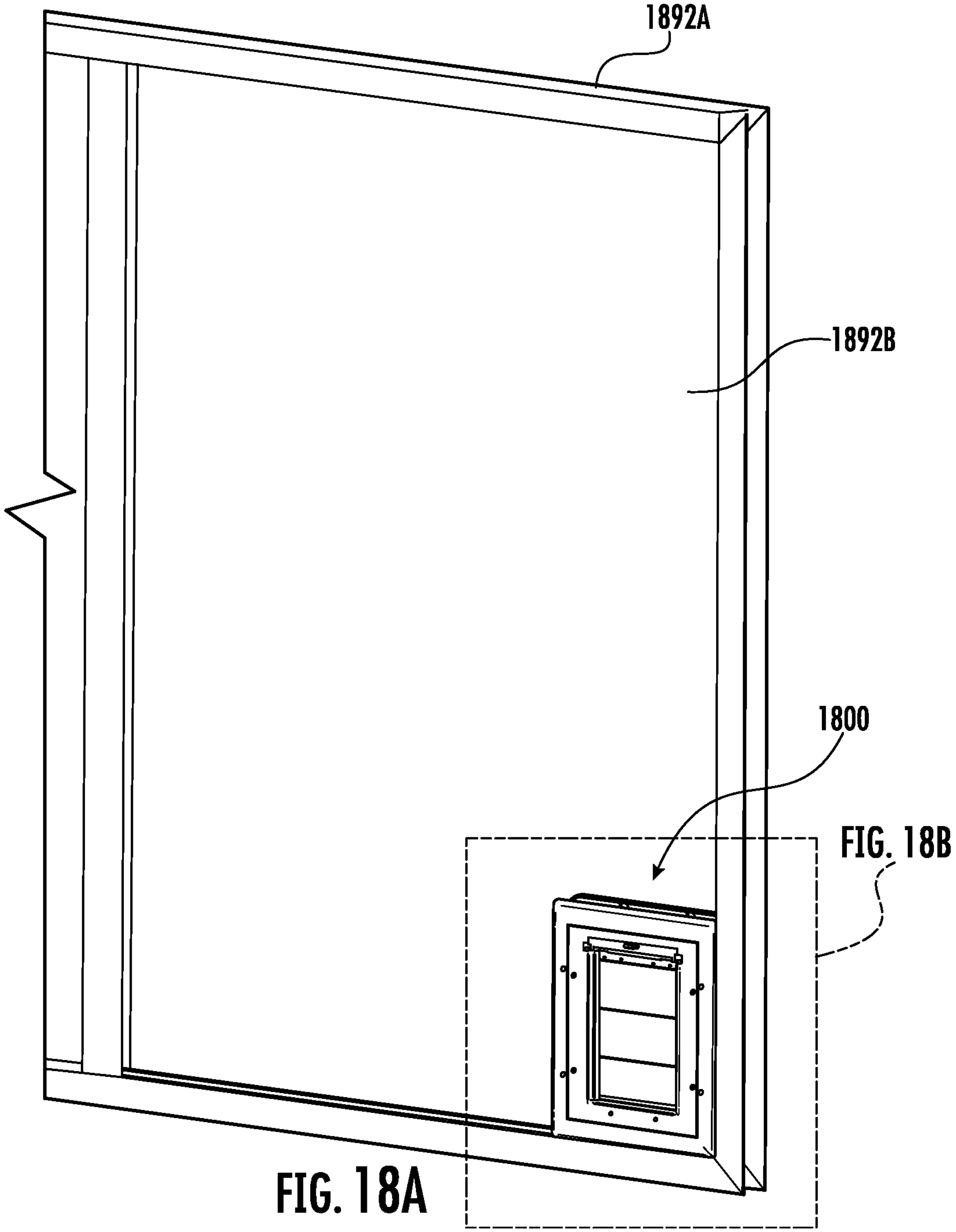
Figure 18B:
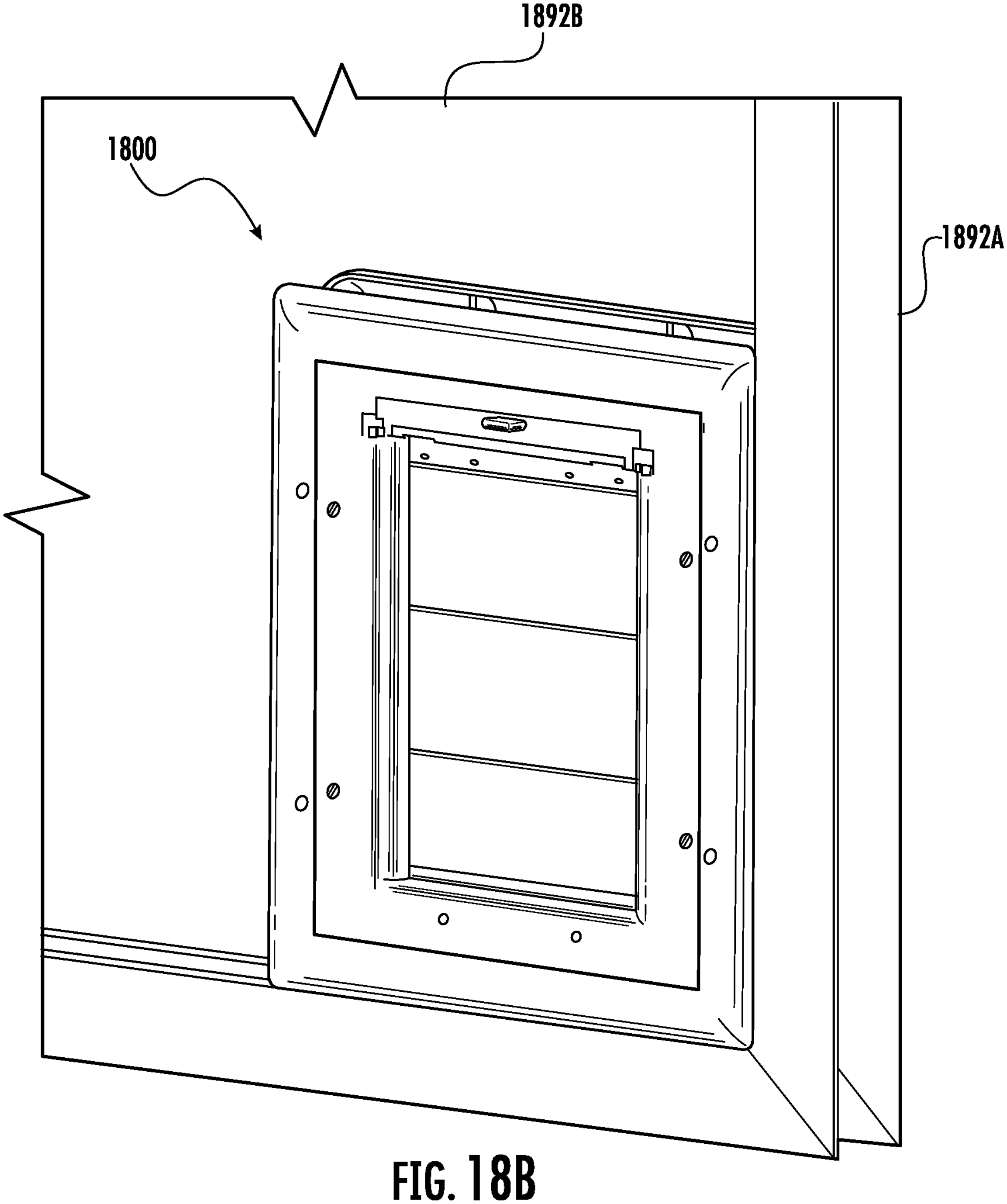
Figure 18C:
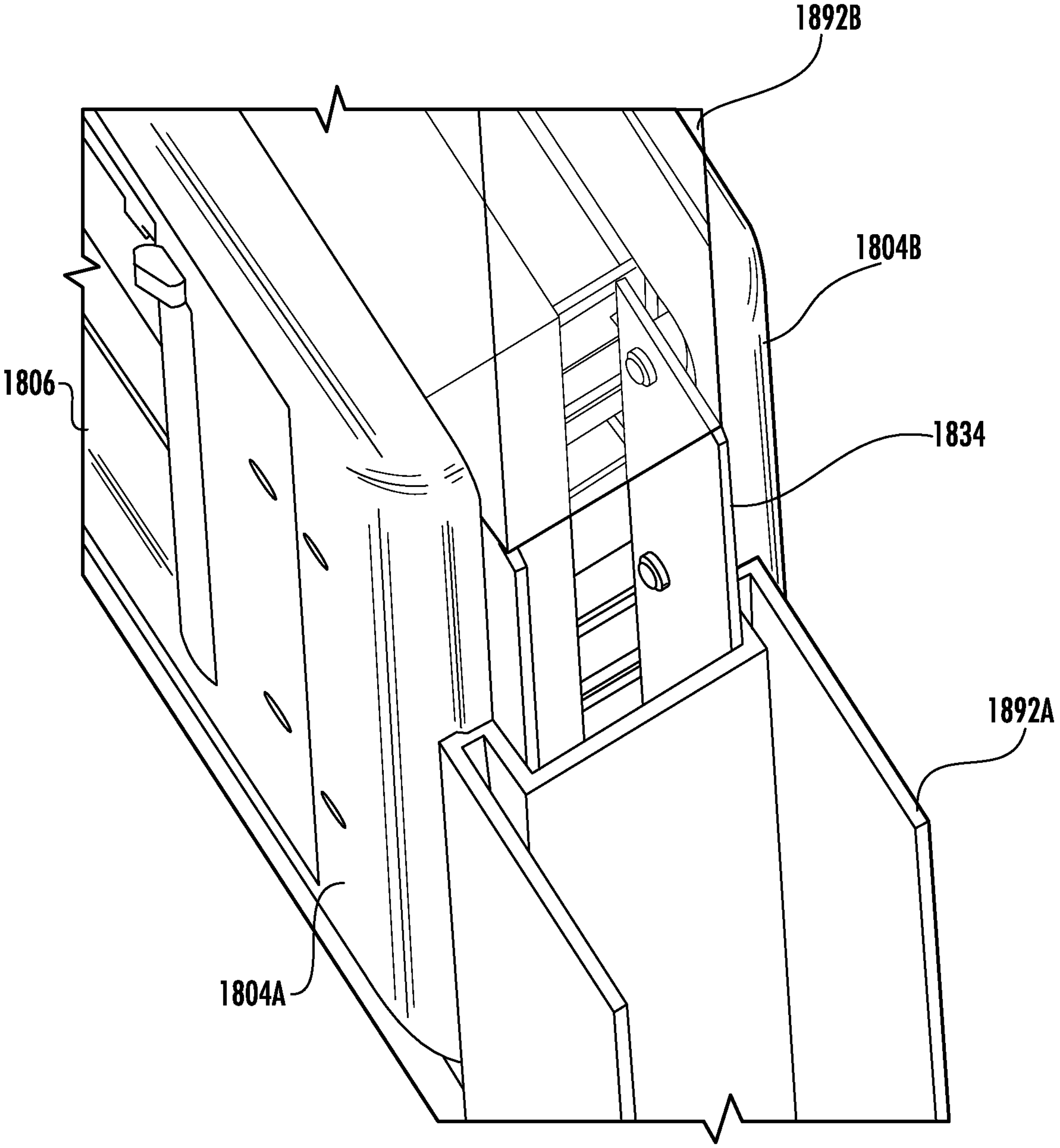
Figure 19B:
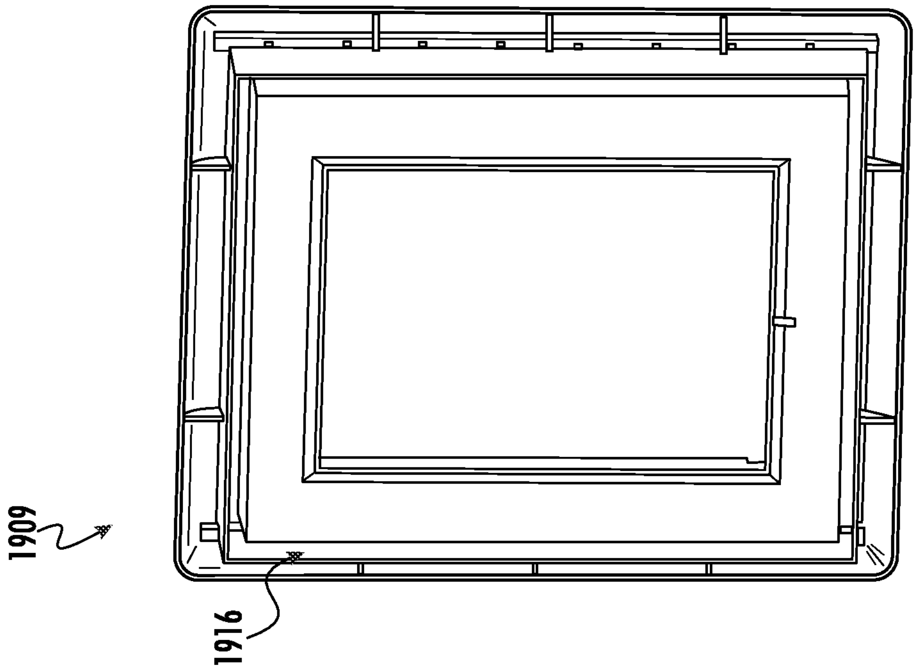
Figure 19A:
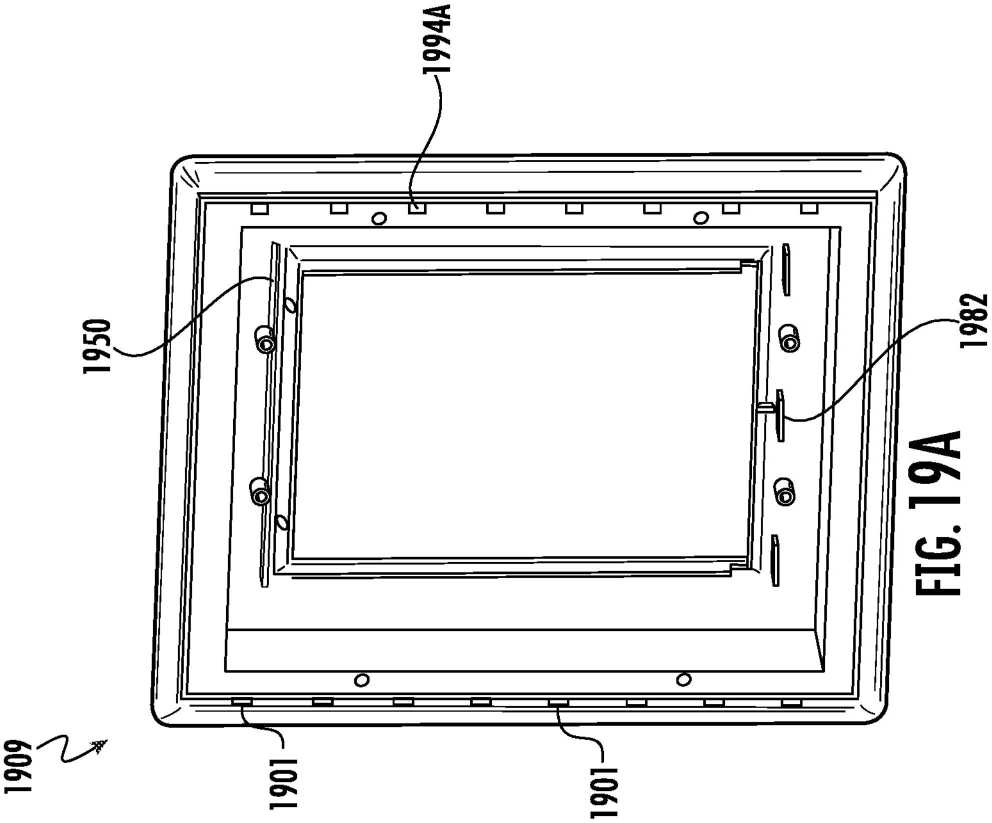
Figure 20A:
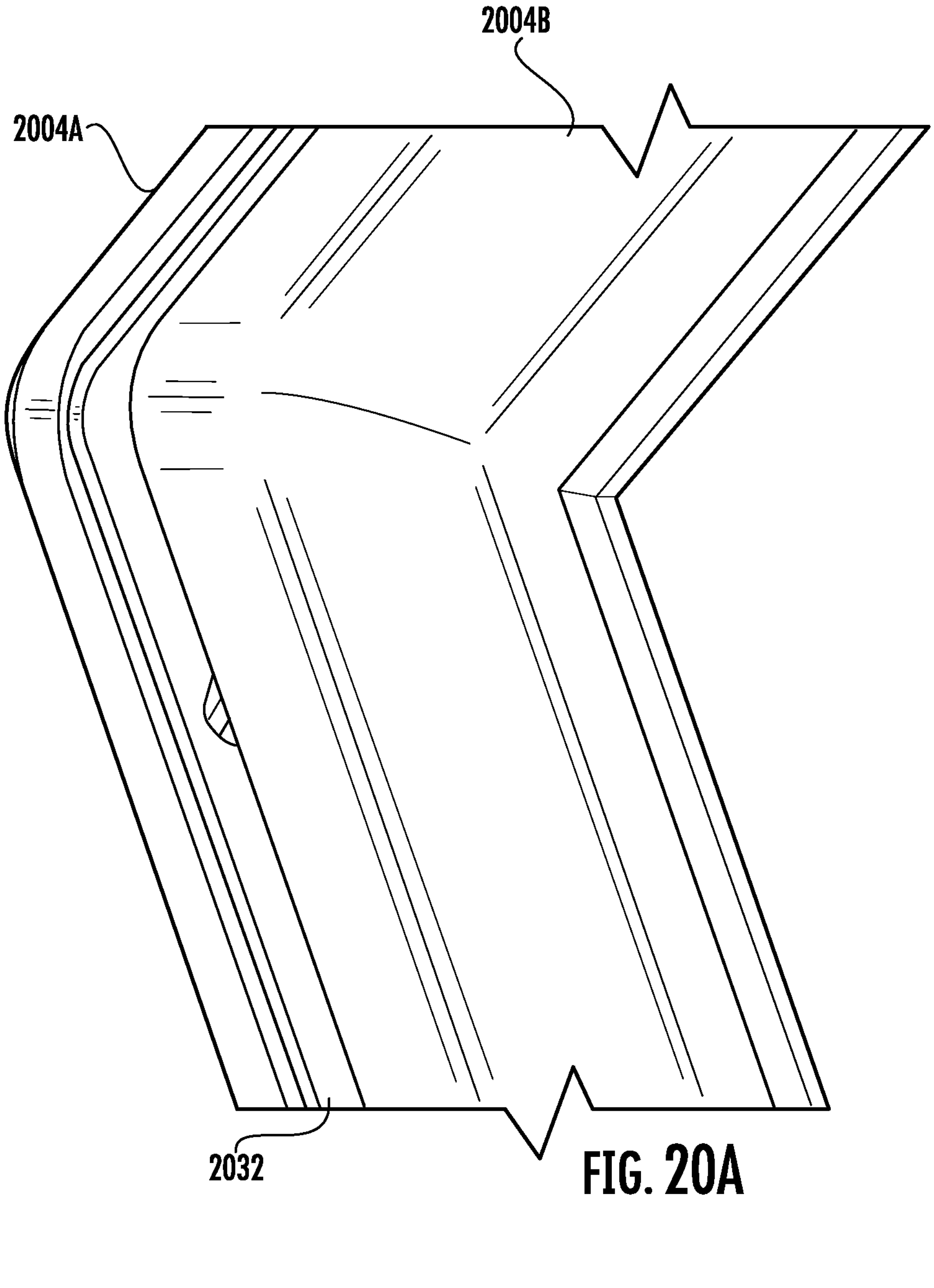
Figure 20B:
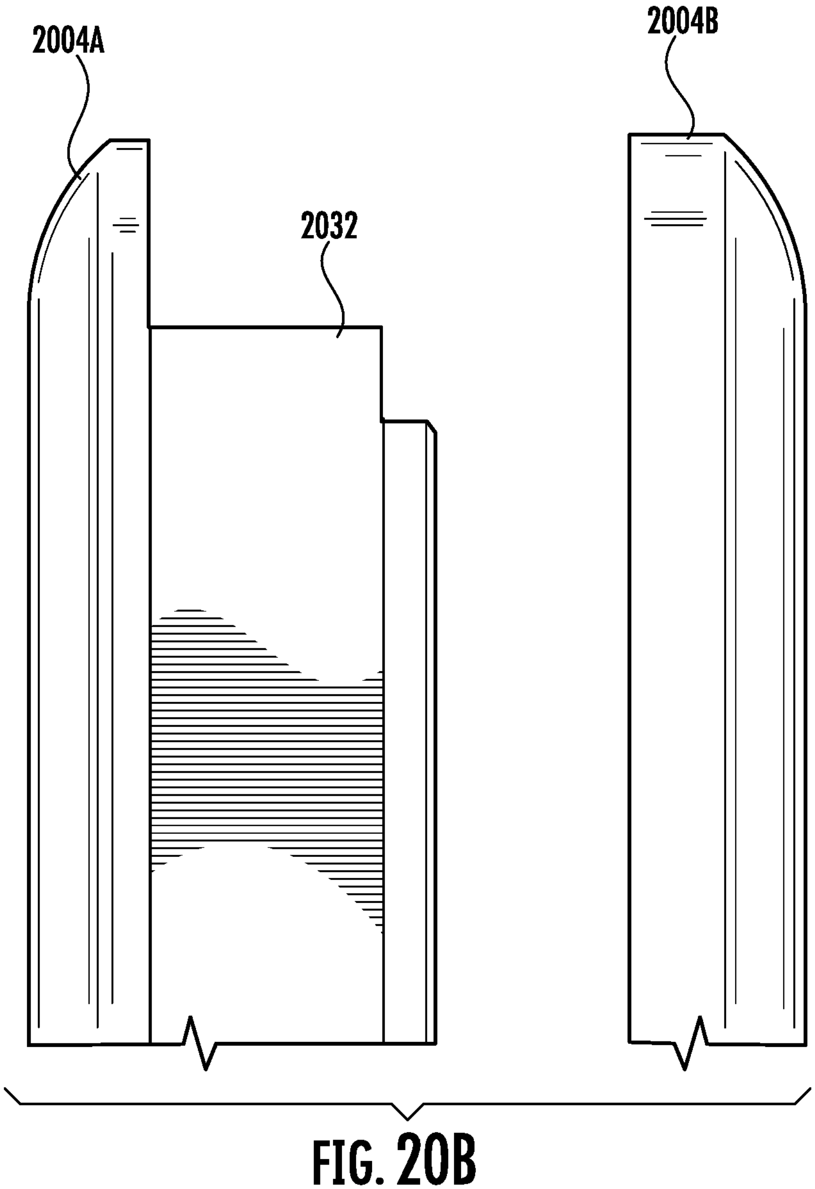
Figure 20C:
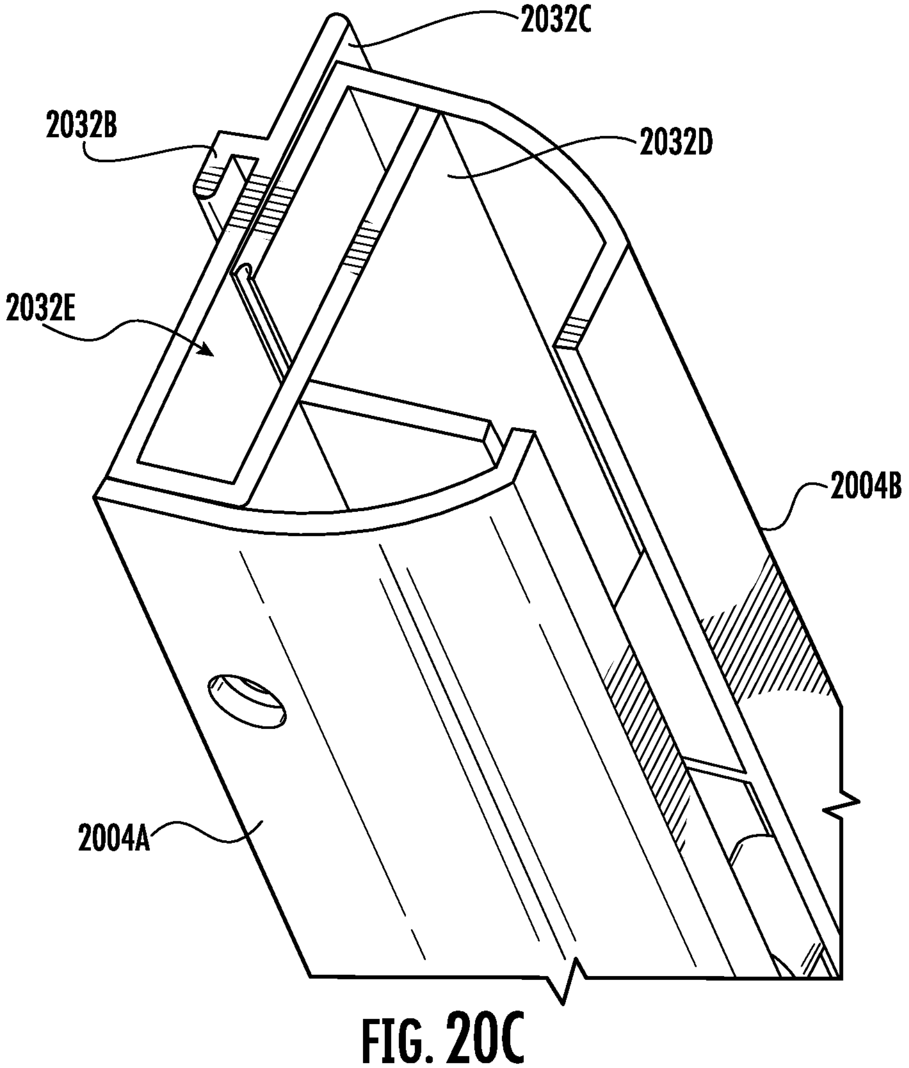
Figure 20D:
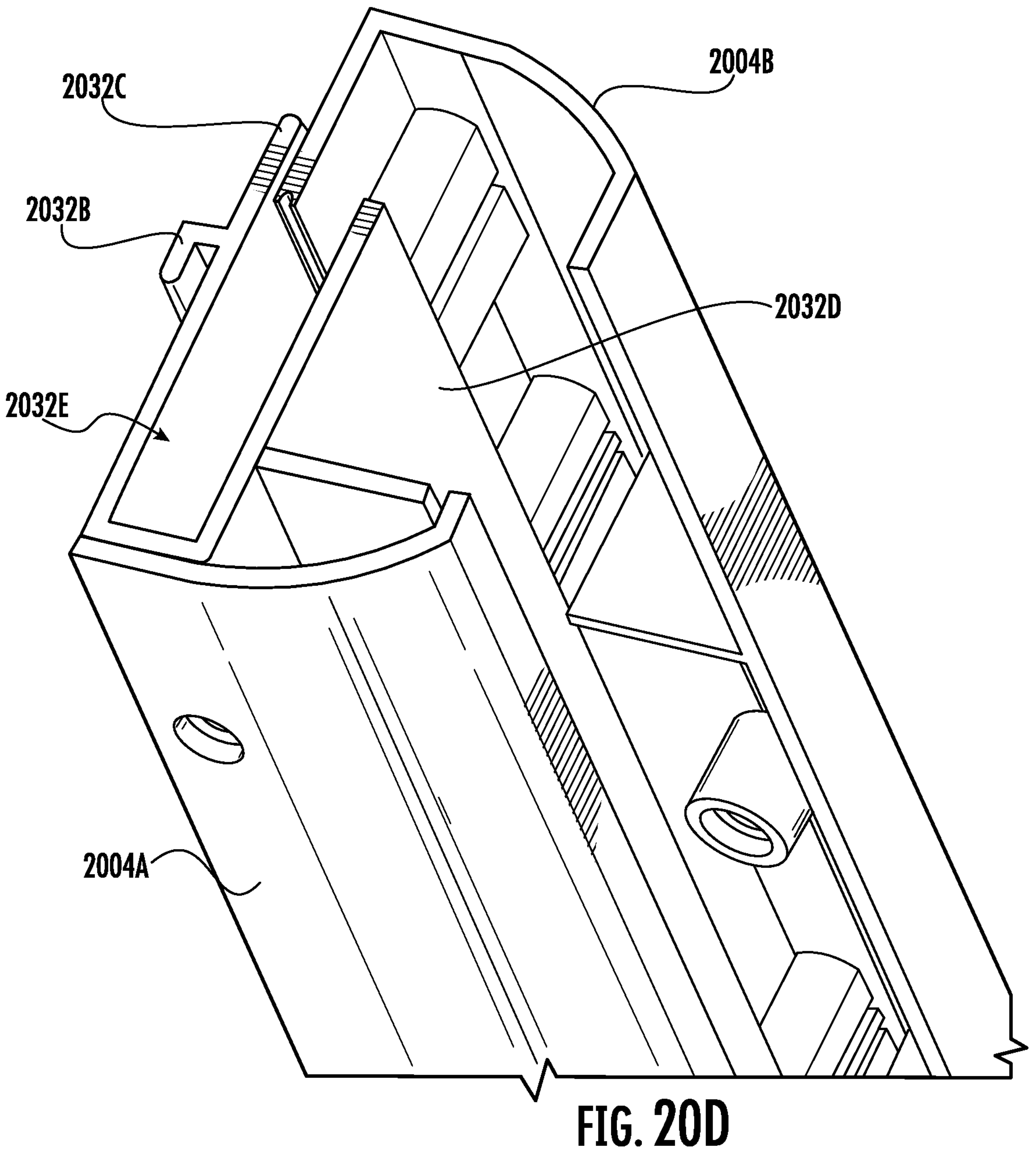
Figure 20E:
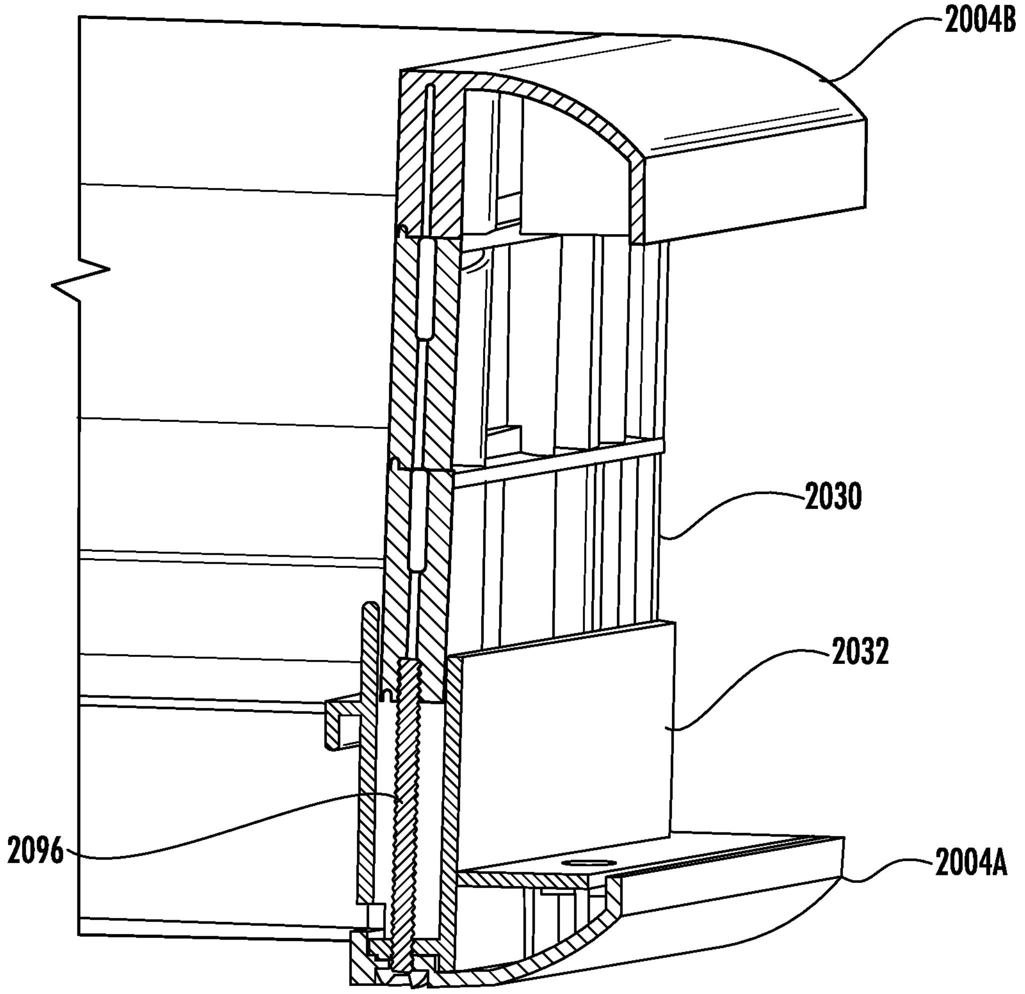
Figure 21A:
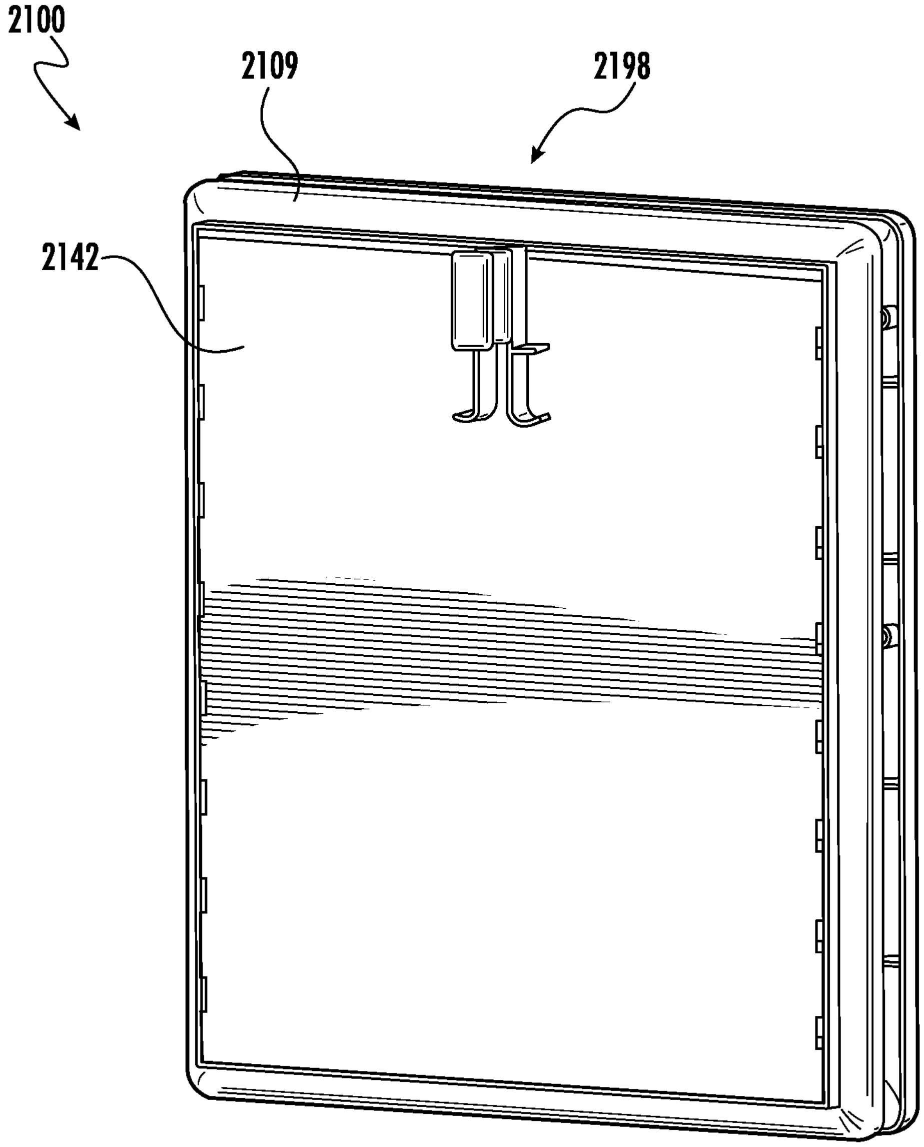
Figure 21B:
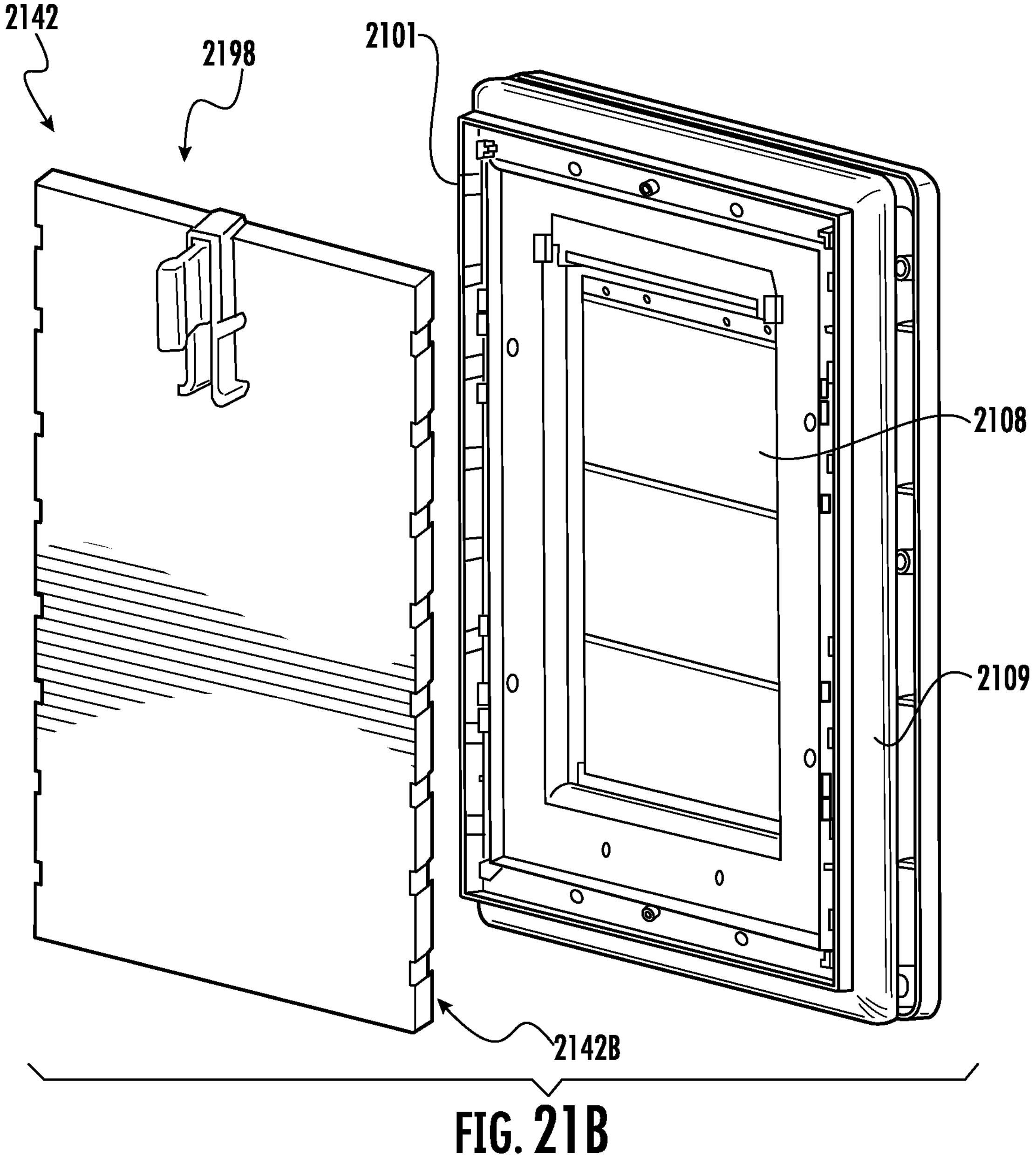
Figure 21C:
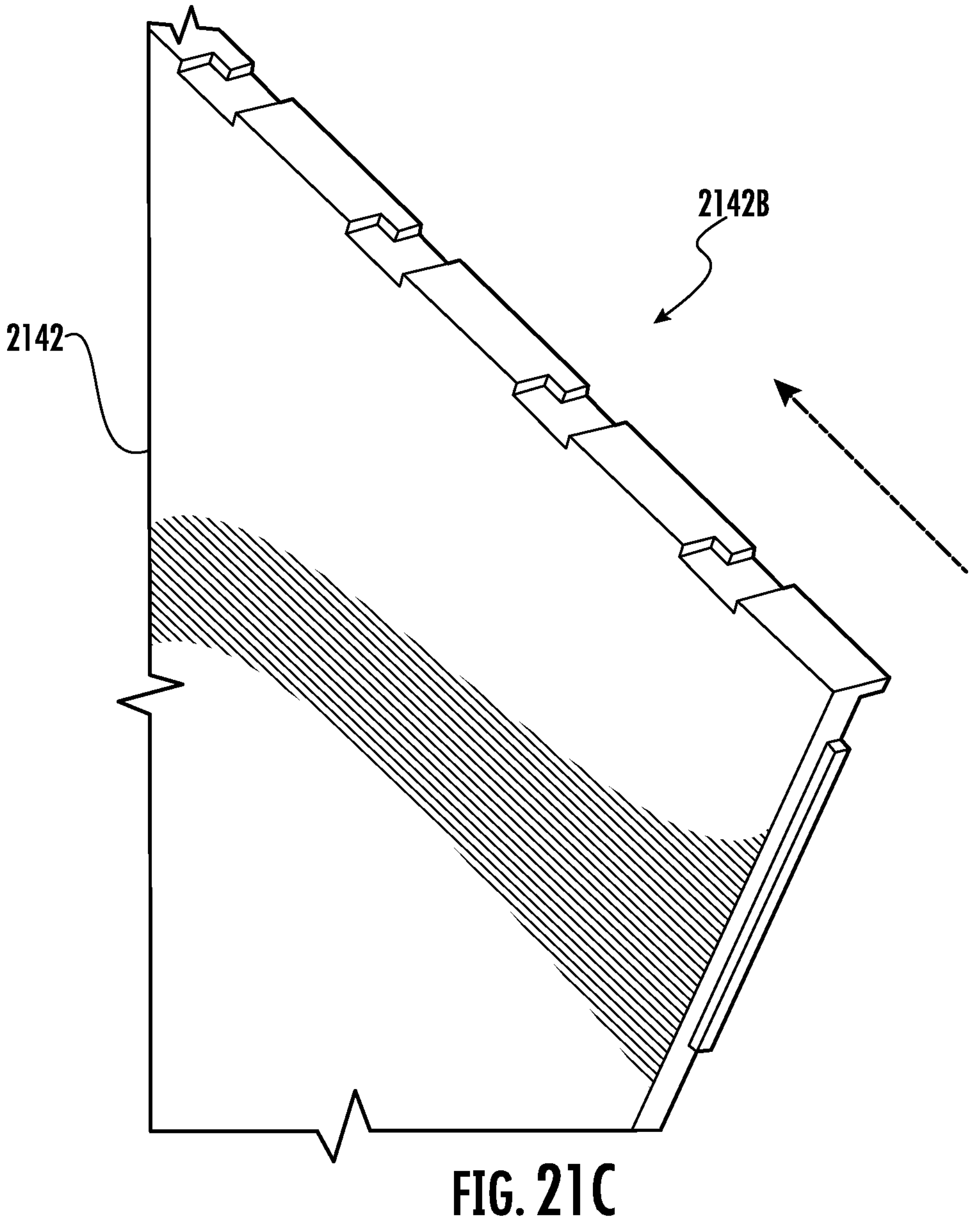
Figure 21D:
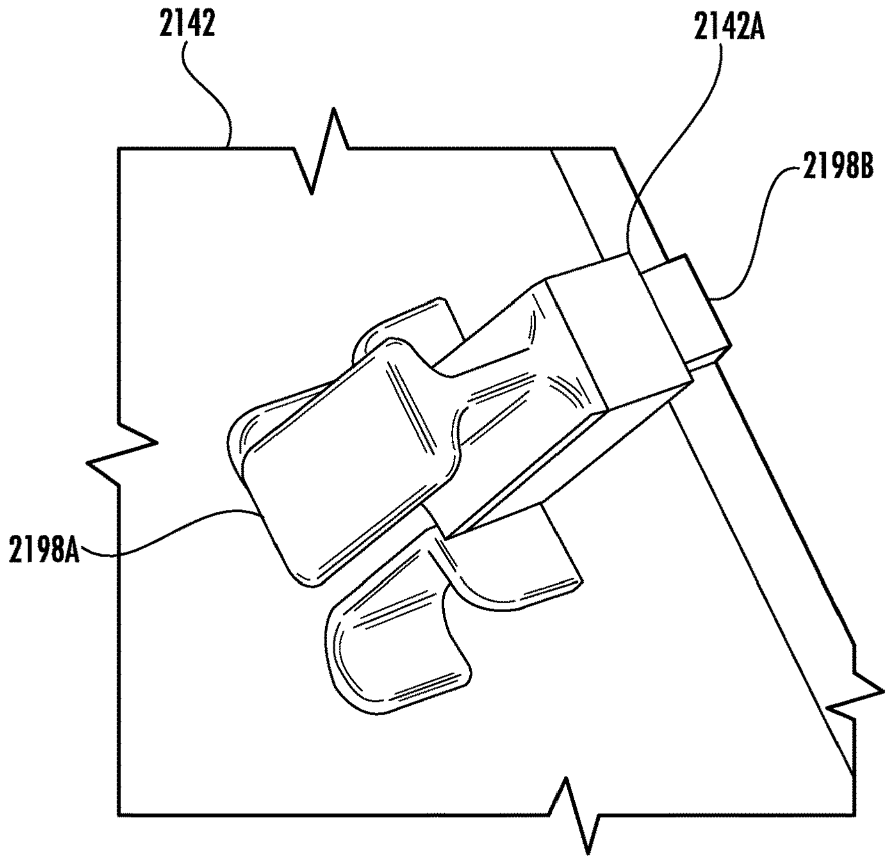
Figure 21E:
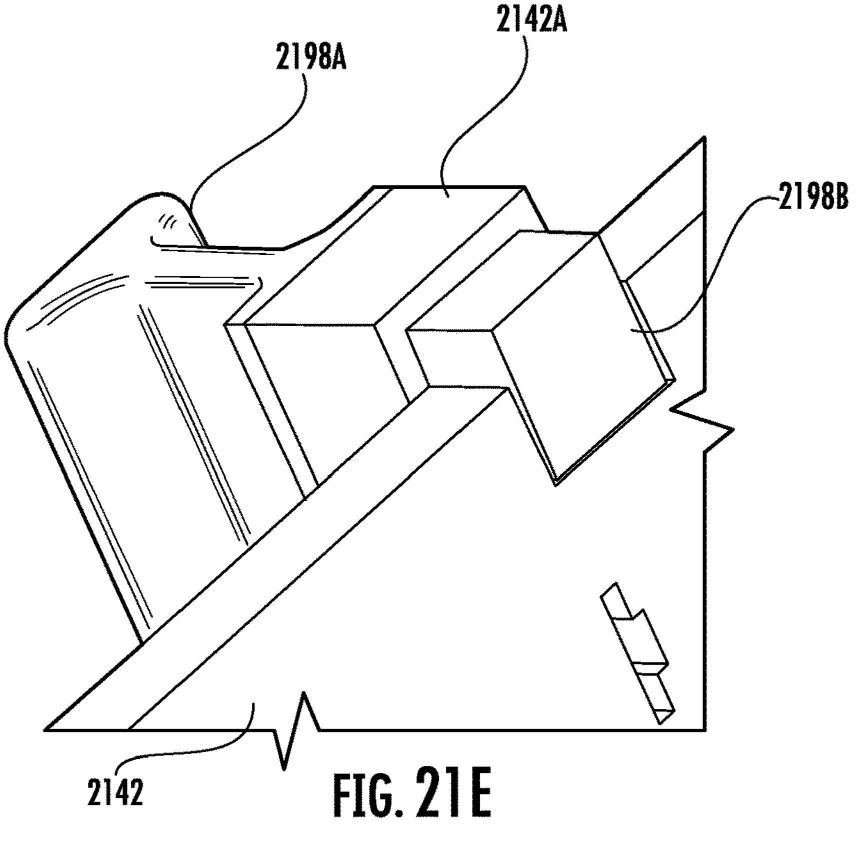
Figure 21F:
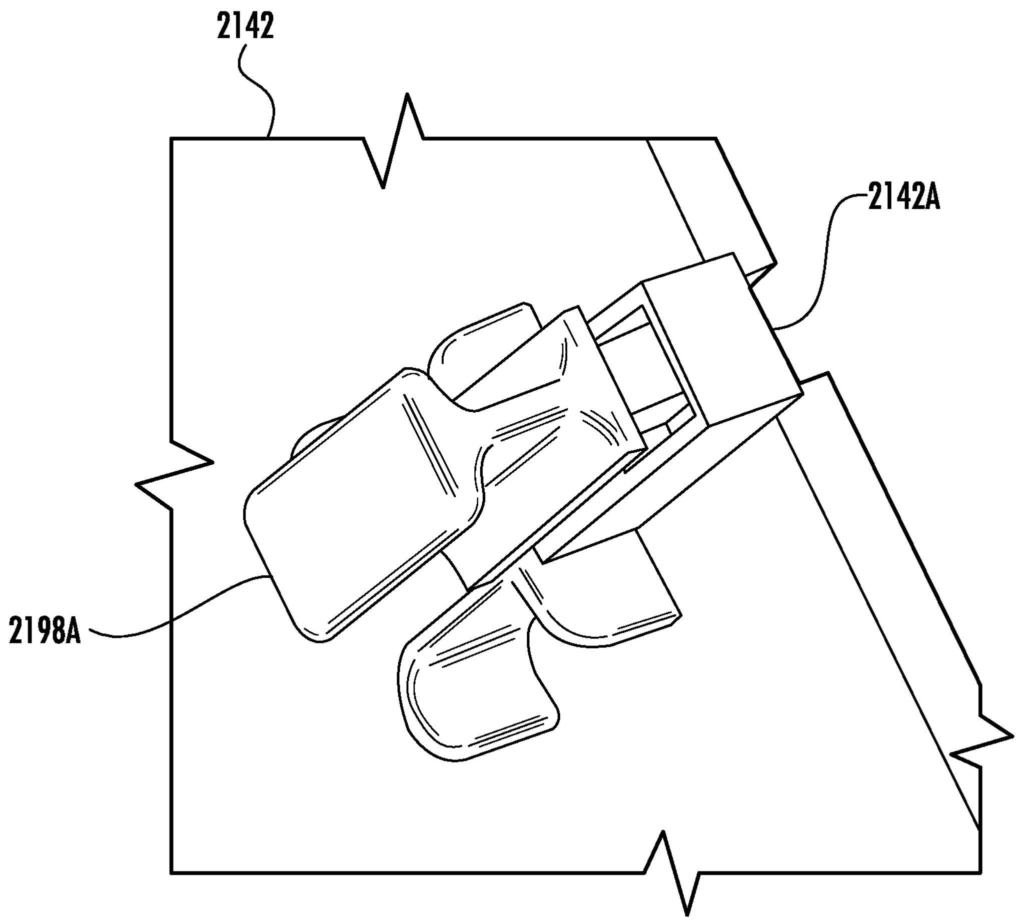
Figure 21G:
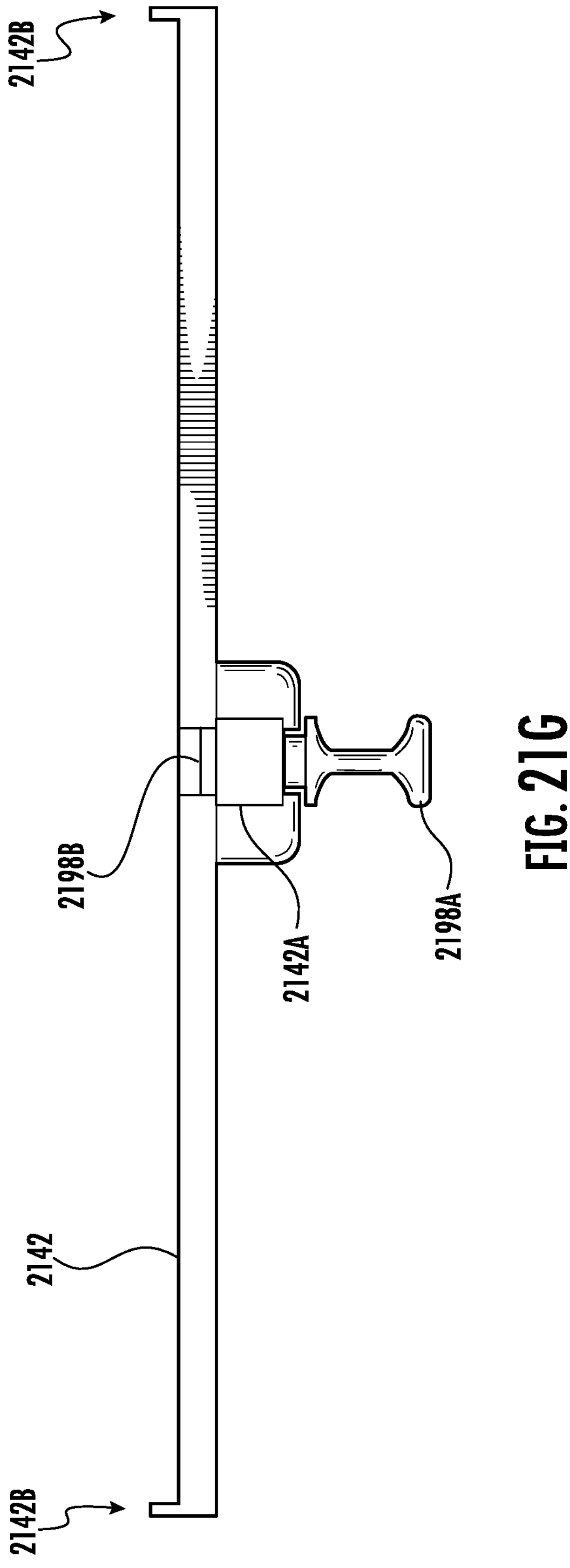
Figure 22:
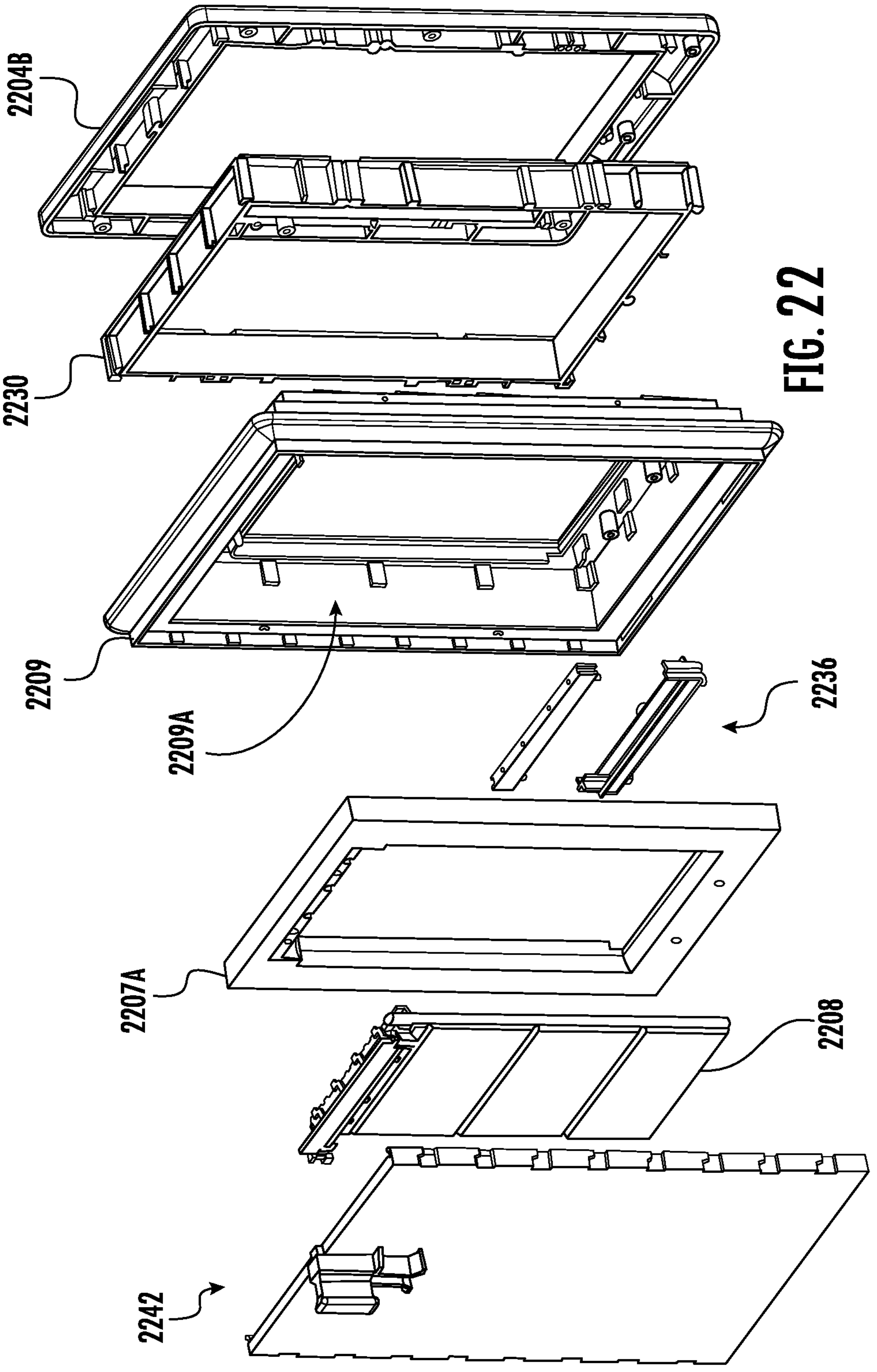

Having thus described the invention in general terms, reference will now be made to the accompanying drawings, which are not necessarily drawn to scale, and wherein:

FIG. 1A illustrates a front perspective view of a pet door assembly installed in a door, in accordance with some embodiments discussed herein;

FIG. 1B illustrates a rear perspective view of the pet door assembly of FIG. 1A installed in a door, in accordance with some embodiments discussed herein;

FIG. 1C illustrates an exploded view of the pet door assembly of FIG. 1A where the core is exploded relative to the remainder of the pet door assembly, in accordance with some embodiments discussed herein;

FIG. 2A illustrates a front perspective view of a core, in accordance with some embodiments discussed herein;

FIG. 2B illustrates a rear perspective view of the core of FIG. 2A, in accordance with some embodiments discussed herein;

FIG. 2C illustrates an exploded perspective view of the core of FIG. 2A, in accordance with some embodiments discussed herein;

FIG. 2D illustrates another exploded view of the core of FIG. 2A where the flap and flap holder are exploded relative to the remainder of the core, in accordance with some embodiments discussed herein;

FIG. 2E illustrates another exploded view of the core of FIG. 2A where the flap and flap holder are exploded relative to the remainder of the core, in accordance with some embodiments discussed herein;

FIG. 2F illustrates an exploded view of a pet door assembly having the core of FIG. 2A, in accordance with some embodiments discussed herein;

FIG. 2G illustrates an exploded view of a pet door assembly having the core of FIG. 2A and additional escutcheon extension frames, in accordance with some embodiments discussed herein;

FIG. 3A illustrates a front perspective view of another core, in accordance with some embodiments discussed herein;

FIG. 3B illustrates an exploded view of the core of FIG. 3A, in accordance with some embodiments discussed herein;

FIG. 3C illustrates another exploded view of the core of FIG. 3A, in accordance with some embodiments discussed herein;

FIG. 3D illustrates a perspective view of a core interior frame, in accordance with some embodiments discussed herein;

FIG. 3E illustrates a perspective view of a core exterior frame, in accordance with some embodiments discussed herein;

FIGS. 3F-3G illustrate varying perspective views of a flap holder, in accordance with some embodiments discussed herein;

FIG. 3H illustrates a side view of the flap holder of FIG. 3F, in accordance with some embodiments discussed herein;

FIG. 3I illustrates an exploded view of a pet door assembly having the core of FIG. 3A, in accordance with some embodiments discussed herein;

FIG. 4A illustrates a front perspective view of a composite frame with a core interior frame installed therein, in accordance with some embodiments discussed herein;

FIG. 4B illustrates a rear perspective view of the composite frame of FIG. 4A, in accordance with some embodiments discussed herein;

FIG. 5A illustrates a front schematic view of a flap, in accordance with some embodiments discussed herein;

FIG. 5B illustrates a top schematic view of the flap of FIG. 5A, in accordance with some embodiments discussed herein;

FIG. 5C illustrates a bottom schematic view of the flap of FIG. 5A, in accordance with some embodiments discussed herein;

FIG. 5D illustrates an enhanced bottom view of the flap of FIG. 5C, in accordance with some embodiments discussed herein;

FIG. 5E illustrates a side schematic view of the flap of FIG. 5A, in accordance with some embodiments discussed herein;

FIG. 5F illustrates a side schematic view of the flap of FIG. 5A where the flap is in an opened state, in accordance with some embodiments discussed herein;

FIG. 5G illustrates a side schematic view of another undesirable flap, in accordance with some embodiments discussed herein;

FIG. 5H illustrates a cross sectional perspective view of the flap of FIG. 5A provided in a core, in accordance with some embodiments discussed herein;

FIG. 5I illustrates a cross sectional side view of the flap of FIG. 5A provided in a core, in accordance with some embodiments discussed herein;

FIG. 5J illustrates an enhanced perspective view of an alternative flap, in accordance with some embodiments discussed herein;

FIG. 6A illustrates an enhanced perspective view of the flap of FIG. 5A, in accordance with some embodiments discussed herein;

FIG. 6B illustrates a perspective view of a flap holder being used to retain the flap of FIG. 6A, in accordance with some embodiments discussed herein;

FIG. 6C illustrates a perspective view of a flap holder of FIG. 6B being used to retain the flap, in accordance with some embodiments discussed herein;

FIG. 7A illustrates a perspective view of a push button assembly having a push button, a shuttle, and a push button housing, in accordance with some embodiments discussed herein;

FIG. 7B illustrates a perspective view of the push button of the push button assembly of FIG. 7A, in accordance with some embodiments discussed herein;

FIG. 7C illustrates a perspective view of the shuttle of FIG. 7A of the push button assembly of FIG. 7A, in accordance with some embodiments discussed herein;

FIG. 7D illustrates a perspective view of the push button housing of the push button assembly of FIG. 7A, in accordance with some embodiments discussed herein;

FIG. 7E illustrates a cross sectional view of the push button assembly of FIG. 7A where the shuttle post in the cam-path of a push button may be seen in a locked position, in accordance with some embodiments discussed herein;

FIG. 7F illustrates an enhanced view of the push button assembly of FIG. 7A where the shuttle post in the cam-path of a push button may be seen in an unlocked position, in accordance with some embodiments discussed herein;

FIG. 7G illustrates a top schematic view of the push button assembly within a core where the push button assembly is in an unlocked position, in accordance with some embodiments discussed herein;

FIG. 7H illustrates a top schematic view of the push button assembly within a core where the push button assembly is in a locked position, in accordance with some embodiments discussed herein;

FIG. 8A illustrates a perspective view of a disk assembly, in accordance with some embodiments discussed herein;

FIG. 8B illustrates a cross sectional view of the disk assembly of FIG. 8A, in accordance with some embodiments discussed herein;

FIG. 8C illustrates an enhanced cross sectional view of the disk assembly of FIG. 8B, in accordance with some embodiments discussed herein;

FIG. 8D illustrates an exploded view of a disk pair, in accordance with some embodiments discussed herein;

FIGS. 8E-8F illustrate perspective views of two different disks that may together form a disk pair, in accordance with some embodiments discussed herein;

FIG. 8G illustrates a perspective view of a first disk component of the disk of FIG. 8E, in accordance with some embodiments discussed herein;

FIG. 8H illustrates a top perspective view of a second disk component of the disk of FIG. 8E, in accordance with some embodiments discussed herein;

FIG. 8I illustrates a perspective view of a spindle, in accordance with some embodiments discussed herein;

FIG. 8J illustrates a perspective view of a hub that is provided in each of the disks of FIGS. 8E-8F, in accordance with some embodiments discussed herein;

FIG. 8K illustrates a bottom perspective view of the second disk component of FIG. 8H, in accordance with some embodiments discussed herein;

FIG. 8L illustrates a perspective view of spring members that are provided in the disks of FIGS. 8E-8F, in accordance with some embodiments discussed herein;

FIG. 8M illustrates a top schematic view of a hub and spring members positioned in a second disk component, in accordance with some embodiments discussed herein;

FIG. 8N illustrates a top view of a hub and spring members that are separated from one another, in accordance with some embodiments discussed herein;

FIG. 8O illustrates a side view of a hub and spring members of FIG. 8N, in accordance with some embodiments discussed herein;

FIGS. 8P-8Q illustrate varying perspective views of a disk strike that is used in the disk assembly of FIG. 8A, in accordance with some embodiments discussed herein;

FIG. 8R illustrates a perspective view of the hub, spring members, and the disk strike, in accordance with some embodiments discussed herein;

FIG. 8S illustrates a side view of a disk where a hub and spring members may be seen, in accordance with some embodiments discussed herein;

FIGS. 8T-8U illustrate varying perspective views of a disk assembly in an opened state, in accordance with some embodiments discussed herein;

FIG. 8V illustrates a top schematic view of the hub, spring members, and disk strike when the disk assembly is in an opened state, in accordance with some embodiments discussed herein;

FIG. 8W illustrates a top view of the disk assembly of FIG. 8A when the disk assembly is in an opened state, in accordance with some embodiments discussed herein;

FIG. 8X illustrates a perspective view of the disk assembly of FIG. 8A when the disk assembly is in a closed state where some portions of the disk assembly are not visible, in accordance with some embodiments discussed herein;

FIG. 8Y illustrates a top schematic view of the hub, spring members, and disk strike when the disk assembly is in a closed state, in accordance with some embodiments discussed herein;

FIG. 8Z illustrates a top view of the disk assembly of FIG. 8A when the disk assembly is in a closed state, in accordance with some embodiments discussed herein;

FIG. 9A illustrates a side view of an alternative hub having a living hinge, in accordance with some embodiments discussed herein;

FIG. 9B illustrates a top view of the hub of FIG. 9A, in accordance with some embodiments discussed herein;

FIG. 10A illustrates a front view of a disk assembly and a push button assembly, in accordance with some embodiments discussed herein;

FIG. 10B illustrates a schematic side view of the disk assembly and push button assembly of FIG. 10A, in accordance with some embodiments discussed herein;

FIG. 10C illustrates a perspective cross sectional view of the disk assembly and push button assembly of FIG. 10A, in accordance with some embodiments discussed herein;

FIG. 10D illustrates an enhanced, schematic side view of the disk assembly and push button assembly of FIG. 10A, in accordance with some embodiments discussed herein;

FIG. 11A illustrates a front perspective view of an anchor frame, in accordance with some embodiments discussed herein;

FIG. 11B illustrates a rear perspective view of the anchor frame of FIG. 11A, in accordance with some embodiments discussed herein;

FIG. 11C illustrates a front perspective view of the anchor frame of FIG. 11A where covers for batteries are removed, in accordance with some embodiments discussed herein;

FIG. 11D illustrates a perspective view of an assembled pet door assembly using the anchor frame of FIG. 11A, in accordance with some embodiments discussed herein;

FIG. 11E-11G illustrate a schematic view of electrical components within a core, in accordance with some embodiments discussed herein;

FIG. 12A illustrates an exploded view of an escutcheon interior frame and other components of the latch interlock assembly provided therein, in accordance with some embodiments discussed herein;

FIGS. 12B-12D illustrate an enhanced view of components of a latch interlock assembly in the escutcheon interior frame, in accordance with some embodiments discussed herein;

FIGS. 12E-12G illustrate varying perspective views of a cam screw, in accordance with some embodiments discussed herein;

FIG. 12H illustrates a perspective view of a latch cam, in accordance with some embodiments discussed herein;

FIG. 13A-13C illustrate perspective views of a sill assembly alongside an escutcheon interior frame similar to the escutcheon interior frame of FIG. 12A, in accordance with some embodiments discussed herein;

FIG. 13D illustrates a perspective view of the sill assembly of FIG. 13A, in accordance with some embodiments discussed herein;

FIG. 13E illustrates a cross-sectional view of the sill assembly of FIG. 13D, in accordance with some embodiments discussed herein;

FIG. 13F illustrates an exploded view of another sill assembly, in accordance with some embodiments discussed herein;

FIG. 13G illustrates an exploded view of yet another sill assembly, in accordance with some embodiments discussed herein;

FIG. 13H illustrates an enhanced cross sectional view of the sill assembly of FIG. 13G, in accordance with some embodiments discussed herein;

FIG. 13I illustrates an enhanced view of the sill assembly of FIG. 13G where features of a drain may be seen, in accordance with some embodiments discussed herein;

FIG. 14A illustrates a schematic view of a ratchet pawl being used to secure an escutcheon exterior frame and an anchor frame, in accordance with some embodiments discussed herein;

FIG. 14B illustrates a perspective view of the ratchet pawl of FIG. 14A being used to secure an escutcheon exterior frame and an anchor frame, in accordance with some embodiments discussed herein;

FIG. 14C illustrates a perspective view of a ratchet pawl of FIG. 14A, in accordance with some embodiments discussed herein;

FIG. 15A illustrates an exploded view of an alternative pet door assembly where escutcheon extension frames have notches that may be configured to engage with a ratchet pawl, in accordance with some embodiments discussed herein;

FIG. 15B illustrates an enhanced perspective view of the escutcheon extension frames of FIG. 15A where notches may be seen, in accordance with some embodiments discussed herein;

FIG. 15C illustrates an enhanced perspective view of the escutcheon extension frames of FIG. 15A where screw holes are positioned in an alternating manner, in accordance with some embodiments discussed herein;

FIGS. 16A-16B illustrate varying perspective views of an escutcheon extension frame, in accordance with some embodiments discussed herein;

FIG. 16C illustrates the escutcheon extension frame of FIGS. 16A-16B alongside an escutcheon exterior frame, in accordance with some embodiments discussed herein;

FIG. 16D illustrates a plurality of escutcheon extension frames installed on an escutcheon exterior frame, in accordance with some embodiments discussed herein;

FIG. 16E illustrates an enhanced view of the escutcheon extension frames and escutcheon exterior frame of FIG. 16D where corners of these components are hidden so that certain features may be made visible, in accordance with some embodiments discussed herein;

FIG. 16F illustrates an enhanced view of a groove and recess of an escutcheon extension frame, in accordance with some embodiments discussed herein;

FIG. 16G illustrates an enhanced view of a tongue and protrusion of an escutcheon extension frame, in accordance with some embodiments discussed herein;

FIG. 17A-17B illustrates schematic views of a core and anchor frame where the corner of the core and anchor frame has been hidden so that certain features may be made visible, in accordance with some embodiments discussed herein;

FIG. 18A illustrates a perspective view of a pet door assembly installed in a glass patio door, in accordance with some embodiments discussed herein;

FIG. 18B illustrates an enhanced view of the pet door assembly of FIG. 18A, in accordance with some embodiments discussed herein;

FIG. 18C illustrates a schematic perspective view of the pet door assembly of FIG. 18A where portions of a frame for the glass patio door are hidden, in accordance with some embodiments discussed herein;

FIG. 19A illustrates a front perspective view of a composite frame, in accordance with some embodiments discussed herein FIG. 19B illustrates a rear perspective view of the composite frame of FIG. 19A, in accordance with some embodiments discussed herein;

FIG. 20A illustrates a perspective view of various components of a pet door assembly, in accordance with some embodiments discussed herein;

FIG. 20B illustrates a side view of various components of a pet door assembly, in accordance with some embodiments discussed herein;

FIG. 20C illustrates a cross sectional view of the components of the pet door assembly of FIG. 20A where the escutcheon exterior frame is in a first position relative to the other components, in accordance with some embodiments discussed herein;

FIG. 20D illustrates a cross sectional view of the components of the pet door assembly of FIG. 20A where the escutcheon exterior frame is in a second position relative to the other components, in accordance with some embodiments discussed herein;

FIG. 20E illustrates a cross-sectional view of the components of the pet door assembly of FIG. 20A where escutcheon extension frames have been added, in accordance with some embodiments discussed herein;

FIG. 21A illustrates a perspective view of a pet door assembly having a composite frame and a locking door, in accordance with some embodiments discussed herein;

FIG. 21B illustrates a perspective view of the pet door assembly of FIG. 21A where the locking door is exploded relative to the other components, in accordance with some embodiments discussed herein;

FIG. 21C illustrates a perspective view of interlock sections on the locking door, in accordance with some embodiments discussed herein;

FIGS. 21D-21E illustrate varying perspective view of a locking assembly in a locked position, in accordance with some embodiments discussed herein;

FIG. 21F illustrates a perspective view of the locking assembly of FIG. 21D in an unlocked position, in accordance with some embodiments discussed herein; and FIG. 21G illustrates a top view of the locking assembly of FIG. 21D in an unlocked position, in accordance with some embodiments discussed herein; and FIG. 22 illustrates an exploded view of a pet door assembly with the composite frame, in accordance with some embodiments discussed herein.

DETAILED DESCRIPTION

Example embodiments of the present invention now will be described more fully hereinafter with reference to the accompanying drawings, in which some, but not all embodiments of the invention are shown. Indeed, the invention may be embodied in many different forms and should not be construed as limited to the example embodiments set forth herein; rather, these embodiments are provided so that this disclosure will satisfy applicable legal requirements. Like reference numerals refer to similar elements throughout. For example, reference numbers 108, 208, 308, etc. may each refer to a flap. Additionally, any connections or attachments may be direct or indirect connections or attachments unless specifically noted otherwise.

Various embodiments of pet door assemblies provided herein may be installed in a variety of places. For example, pet door assemblies may be installed in a wall, a door (e.g. a glass door, a wooden door, etc.) or at another location. FIGS. 1A-1C illustrate a pet door assembly that has been installed in a door. FIG. 1A illustrates a front perspective view of a pet door assembly installed in a door, FIG. 1B illustrates a rear perspective view of the pet door assembly of FIG. 1A installed in a door, and FIG. 1C illustrates an exploded view of the pet door assembly of FIG. 1A where the core is exploded relative to the remainder of the pet door assembly.

The pet door assembly 100 may be installed in the door 102. The pet door assembly 100 may include a core 106 and a flap 108 within the core 106. As can be seen in FIG. 1A, the pet door assembly 100 may include an escutcheon interior frame 104A on an interior side of the door 102. Furthermore, as can be seen in FIG. 1B, the pet door assembly 100 may include an escutcheon exterior frame 104B on the exterior side of the door 102.

Further details regarding the features of the core of a pet door assembly can be seen in FIGS. 2A-2E. FIG. 2A illustrates a front perspective view of a core, FIG. 2B illustrates a rear perspective view of the core of FIG. 2A, and FIG. 2C illustrates an exploded perspective view of the core. Additionally, FIGS. 2D-2E illustrate exploded views of the core of FIG. 2A where the flap and flap holder are exploded relative to the remainder of the core.

Looking first at FIG. 2A, a core 206 is illustrated where the core interior frame 207A is visible. The core interior frame 207A may be configured to be installed on an interior side of a wall or door. Furthermore, as can be seen in FIG. 2B, the core 206 may include a core exterior frame 207B that may be configured to be installed on an exterior side of a wall or a door. Looking back at FIG. 2A, the core 206 may include a fastener 212 and a latch interlock assembly 214, and the fastener 212 and the latch interlock assembly 214 may assist in securing the core 206 with an anchor frame 232. Furthermore, a flap 208 may be provided in the core 206. A push button assembly 210 may also be provided in the core 206, and this push button assembly 210 may be configured to shift between a locked position and an unlocked position. When the push button assembly 210 is in an unlocked position, other components within the core 206 may permit the flap 208 to shift to an opened state. By contrast, when the push button assembly 210 is in a locked position, other components within the core 206 may prohibit the flap 208 from shifting to an opened state.

A groove 206A may be provided at the core exterior frame 207B. The groove 206A may be beneficial to permit easy installation of the core interior frame 207A and the core exterior frame 207B. This groove 206A may engage with a tongue on another component, and these features may permit the core 206 to be easily assembled with another component. The groove 206A may also assist in providing increased security and an improved weather seal.

Looking now at FIG. 2C, other components of the core 206 may be seen. Disks assemblies 218, a vertical cam 222, and a slide cam 224 are illustrated, and these components may interact with the push button assembly 210 to permit or prohibit the flap 208 from being opened. A spindle 220 may be provided in the core 206 to hold a disk assembly 218 in position. Furthermore, a latch cam 214A and a cam screw 214B may be provided, and these may be components of a latch interlock assembly 214 that assists in securing the core 206 with an anchor frame 232. A flap holder 226 may also be provided to retain the flap 208, and the flap holder 226 may be attached to another component within the core 206 (e.g. a portion of the core interior frame 207A or the core exterior frame 207B).

Looking now at FIG. 2D, additional features of the flap holder 226 may be seen. The flap holder 226 may include a recess 228. The recess 228 may be sized in a manner that permits the push button assembly 210 to extend through the recess 228. Furthermore, the flap holder 226 of FIG. 2D may be configured to attach to the core interior frame 207A (see FIG. 2A). A portion of the disk assembly 218 is visible in FIG. 2E with the disk assembly 218 being in a closed state. The flap 208 may be retained in an opening 818A (see FIGS. 8X-8Z) formed by the disk assembly 218. The flap holder 226 may be easily removable and may permit the easy removal of an attached flap 208 without tools or deinstallation of the pet door assembly as a whole.

The core 206 illustrated in FIGS. 2A-2E may be assembled with other components to form a pet door assembly. FIGS. 2F and 2G illustrate exploded views of components that may be assembled with the core 206 to form a pet door assembly. An escutcheon interior frame 204A may be provided alongside an anchor frame 232, escutcheon extension frames 230, and an escutcheon exterior frame 204B. The anchor frame 232 may be an intermediary frame which may attach to the escutcheon interior frame 204A, and this may be the first frame to be installed when a pet door assembly is assembled to a wall or a door. The escutcheon interior frame 204A and escutcheon exterior frame 204B may be portion of the pet door assembly that is visible when the pet door assembly is fully installed. The escutcheon interior frame 204A and escutcheon exterior frame 204B may conceal the cross-section of the mounting surface and provide an aesthetically pleasing outer appearance. These frames may be selected as desired by a customer to obtain the preferred appearance. In some embodiments, the escutcheon interior frame 204A and escutcheon exterior frame 204B may be provided with a variety of colors, finishes, and/or materials so that these frames look as similar to the door or wall material as possible. The core 206 may not change between different pet doors assemblies to permit the core 206 to be mass produced, and the other components (e.g. the escutcheon interior frame 204A, the escutcheon exterior frame 204B, anchor frame 232) may be modified and/or additional components such as the escutcheon extension frames 230 may be added). In some embodiments, the core 206 may be provided in different standard sizes (e.g. a small, medium, and large size) so that a different sized flap may be selected. This may be beneficial to permit the core 206 to be selected based on the size of the pet.

Additionally, glazing flanges 234 may be included in some embodiments as illustrated in FIG. 2F. However, these glazing flanges 234 may be omitted in some embodiments (see, e.g., FIG. 2G). Glazing flanges 234 may be provided to emulate the glass, wood, etc. of a door or a wall when the pet door assembly is installed. While the embodiment illustrated in FIG. 2F includes only one escutcheon extension frame 230, the embodiment of FIG. 2G includes three escutcheon extension frames 230. Any number of escutcheon extension frames 230 may be used, and no escutcheon extension frames 230 may be included in some embodiments.

To assemble the pet door assembly, the anchor frame 232 and escutcheon exterior frame 204B may be installed first at the installation location. The anchor frame 232 and escutcheon exterior frame 204B may be installed from opposite sides of an opening in the wall or door, and the anchor frame 232 and the escutcheon exterior frame 204B may be shifted towards each other so that the material of the wall or the door is captured between the two frames. The core 206 may then be positioned in the anchor frame 232. While a separate anchor frame, escutcheon frames, and core frame are provided in FIG. 2F, only one frame may be provided in place of these frames in some embodiments.

The core used in a pet door assembly may have different features and/or shapes to accommodate the needs of a given user. FIGS. 3A-3I illustrate an alternative core 306 and various components that make up the core 306. FIG. 3A illustrates a front perspective view of another core, FIG. 3B illustrates an exploded view of the core of FIG. 3A, and FIG.

3C illustrates another exploded view of the core of FIG. 3A. Furthermore, FIG. 3D illustrates a perspective view of a core interior frame, and FIG. 3E illustrates a perspective view of a core exterior frame. FIGS. 3F-3G illustrate various views of a flap holder. Furthermore, FIG. 3I illustrates this core 306 alongside other components that may help form a pet door assembly.

FIG. 3A illustrates the core 306 with a flap 308 disposed therein, and FIGS. 3B-3C permit more internal components within the core 306 to be seen. As can be seen in FIGS. 3B-3C, the core 306 may include a core interior frame 307A and a core exterior frame 307B. A sealing bracket 321 may be provided between the core interior frame 307A and the core exterior frame 307B, and the sealing bracket 321 may be configured to provide a surface that a seal 548 (see FIG. 5A) on a flap 508 (see FIG. 5A) may engage with to form an effective seal. Furthermore, the core 306 may include a latch interlock assembly similar to the latch interlock assembly 214, and the latch cam 314A and the cam screw 314B may be a part of the latch interlock assembly for the core 306. The core 306 may also include a flap holder 326 that may be configured to retain the flap 308, and the flap holder 326 may be attached to the core interior frame 307A. The flap holder 326 is attached to the front of the core interior frame 307A, but the flap holder 326 may be attached at other locations. The core 306 may also include a sill assembly 336 to assist in shifting the flap 308 to a closed position and to assist in maintaining an effective seal at the bottom portion of the flap 308.

Looking now at FIG. 3D, the core interior frame 307A is shown in isolation. The core interior frame 307A may include a protrusion 382 proximate to the bottom of the core interior frame 307A. The protrusion 382 may be configured to permit the sill assembly 336 to rest on the protrusion 382. Furthermore, the core interior frame 307A may include a first hole 314C that may be configured to receive a portion of the cam screw 314B (see FIG. 3B).

Turning now to FIG. 3E, the core exterior frame 307B is shown in isolation. The core exterior frame 307B may include a top seal 350. The top seal 350 may serve as an integrated weather seal and may be configured to prevent water, moisture, or other elements from passing. The top seal 350 may be configured to reduce the amount of water, moisture, etc. that enters into a home via the pet door assembly. Furthermore, the core exterior frame 307B may include a second hole 314D that may be configured to receive a portion of the cam screw 314B (see FIG. 3B).

Turning now to FIGS. 3F and 3G, features of the flap holder 326 may be seen. The flap holder 326 may include a recess 328, and the recess 328 may be configured to receive a push button assembly 210 (see, e.g., FIG. 2A) in some embodiments. However, the flap holder 326 may be provided without any recess 328 in some embodiments where no push button assembly is provided. The flap holder 326 may also include a flap holder latch 338 on both ends as illustrated in FIGS. 3F and 3G. The flap holder latch 338 may be configured to assist in engaging and disengaging the flap holder 326 from the remainder of the core 306. Furthermore, as illustrated in the side view of FIG. 3H, the flap holder 326 may include an opening 340 that may be configured to receive a flap 308. The shape and size of the opening 340 and flap holder 326 may vary in other embodiments.

In FIG. 3I, the core 306 is illustrated alongside other components that may together help to form a pet door assembly. A pet door assembly may include a core 306 alongside an escutcheon interior frame 304A, an escutcheon exterior frame 304B, and one or more escutcheon extension frames 330. Furthermore, the pet door assembly may also include an anchor frame 332, glazing flanges 334, and a locking door 342.

In some embodiments, a composite frame may be provided that simplifies the frame assembly, and the composite frame may be used to effectively form a core. FIG. 4A illustrates a front perspective view of a composite frame 409 with a core interior frame 407A installed therein, and FIG. 4B illustrates a rear perspective view of the composite frame 409 of FIG. 4A. The core interior frame 407A may be installed in the composite frame 409 to effectively form a core similar to the core of other embodiments described herein. Furthermore, as illustrated in FIG. 4B, a recess 416 may also be included in composite frame 409. The recess 416 may be configured to receive a portion of another frame such as an extension frame 330 (see FIG. 3I) or an exterior escutcheon frame 304B (see FIG. 3I) in some embodiments. This recess 416 may operate similarly to the recess 2032E formed in the anchor frame 2032 of FIG. 20C.

The pet door assembly may be provided with a core having an improved flap. The flap may be installed without the need for tools, with the flap being easily assembled to a flap holder in a core. The flap may be rigid against bending in the horizontal direction. Furthermore, the flap may be configured to bend in the vertical direction in a controlled manner, with most of the bending at certain elastic stretch zones spaced along the height of the flap. FIGS. 5A-5F illustrate various advantageous features of an example flap. FIG. 5A illustrates a front schematic view of a flap, FIG. 5B illustrates a top schematic view of the flap of FIG. 5A, FIG. 5C illustrates a bottom schematic view of the flap of FIG. 5A, and FIG. 5D illustrates an enhanced bottom view of the flap of FIG. 5C. Furthermore, FIG. 5E illustrates a side schematic view of the flap of FIG. 5A where the flap is in a closed state, and FIG. 5F illustrates a side schematic view of the flap of FIG. 5A where the flap is in an opened state.

Starting with FIG. 5A, a flap 508 is illustrated. The flap 508 may include an attachment portion 560 that may be configured to engage with a flap holder (see, e.g., flap holder 326 of FIG. 3F) so that the flap holder may retain the flap 508. In some embodiments, the flap includes two or more holes at a top of the flap at the attachment portion 560. Rods may extend from the core through the access slots in the flap holder 326, and the rods may be configured to be received in the holes at the attachment portion 560 to restrain the horizontal movement of the flap 508. By doing so, unwanted interference between the flap 508 and the disk assembly or other components may be avoided. A top seal 550 may be provide at the attachment portion 560. A seal 548 is also illustrated on both sides of the flap 508. The seal 548 may be a web seal that may come in contact with another portion of a core. The seal 548 and the top seal 550 may be configured to reduce any air-draft from the outside, and the seal 548 may prevent water, moisture, or other elements from passing. The seal 548 and the top seal 550 may be configured to reduce the amount of water, moisture, etc. that enters into a home via the pet door assembly. The seal 548 and the top seal 550 may also improve insulation in the home, preventing cold or warm air within the home from escaping to the external environment.

Furthermore, the flap 508 may mostly include rigid areas, with these rigid areas being resistant to bending in the horizontal and the vertical directions. However, the flap 508 may include elastic stretch zones 544 that comprise elastic material. Upon the flap 508 shifting to an opened state, deformation of the shape of the flap 508 may largely occur in the elastic stretch zones 544 while other portions of the flap 508 may generally remain flat. By providing the elastic stretch zones 544, bending may occur vertically so that the flap 508 may be opened, but bending in the horizontal direction may be limited. By reducing the amount of bending in the horizontal direction, the flap 508 may remain in the appropriate position after repeated use, an effective seal may be maintained, and the components of the pet door assembly may generally operate effectively for a longer period of time. Reducing bending in the horizontal direction may prevent cross-ventilation leakage through gaps.

Further features of the flap 508 may be seen in FIG. 5D. FIG. 5D permits the seal 548 of FIG. 5A to be seen more clearly. The seal 548 may be positioned on the side of the flap 508, and the seal 548 may extend from the top to the bottom of the flap 508. This seal 548 may be a web seal in some embodiments, but the seal 548 may possess different shapes in other embodiments.

Additionally, the flap 508 may include multiple layers as illustrated in FIG. 5D. The flap 508 includes a first layer 552A, a second layer 552B, and a third layer 552C. The second layer 552B may be disposed in between the other two layers. In some embodiments, the second layer 552B may comprise an elastic and resilient material, and the other layers 552A, 552C may include a more rigid material.

FIGS. 5E and 5F illustrate the flap 508 in a closed state and an opened state respectively. FIG. 5E illustrates a side schematic view of the flap 508 of FIG. 5A where the flap 508 is in a closed state, and FIG. 5F illustrates a side schematic view of the flap 508 of FIG. 5A where the flap 508 is in an opened state. The flap 508 may include horizontal ribs 546 which may extend horizontally across the flap 508. Horizontal ribs 546 may ensure that the rigid material retains its position relative to the center material. In the closed state of FIG. 5E, the flap 508 may be urged downwardly by the force of gravity so that the flap 508 extends vertically. The first layer 552A and the third layer 552C may remain rigid, preventing any significant deformation in areas where the first layer 552A and the third layer 552C are provided. However, elastic stretch zones 544 may be formed in areas where the first layer 552A and the third layer 552C are not provided. Because only the elastic and resilient second layer 552B is provided in these elastic stretch zones 544, the flap 508 may bend vertically within the elastic stretch zones 544. While the elastic stretch zones 544 may stretch on one side of the flap 508 (e.g. the left side of the flap 508 in FIG. 5F), pivot points 544A may be formed on the opposite side of the flap 508.

The elastic stretch zones 544 and the pivot points 544A may tend to urge the flap 508 back towards a closed state. In the embodiment illustrated in FIG. 5F, the material on the left side of the second layer 552B is in tension at the elastic stretch zones 544, and the material on the right side of the second layer 552B at the pivot points 544A is in compression. As a result of these forces, the flap 508 may be more effectively urged back into a closed state.

FIG. 5G illustrates a side schematic view of another undesirable flap 599. The flap 599 includes hinges 597, and these hinges 597 may cause the flap 599 to shift to undesirable limp conditions such as the one illustrated in FIG. 5G. By contrast, as illustrated in FIG. 5F, the flap 508 may avoid such limp conditions due to the elastic stretch zones 544 and the pivot points 544A.

Furthermore, FIGS. 5H-5I illustrate an alternative flap retained within a disk assembly. The core 506 may include a push button assembly 510 that may interact with a disk assembly 518 to permit or prohibit the flap 508 from shifting to an opened state. Furthermore, the flap 508 may engage with a sill assembly 536 as illustrated in FIGS. 5H-5I. The sill assembly 536 may include magnets, and magnets may also be provided proximate to the bottom of the flap 508. As the flap 508 shifts from an opened state back towards a closed state, the magnets of the sill assembly 536 may eventually be attracted to the magnets in the flap 508. Thus, the magnetic attraction between the magnets of the sill assembly 536 and the flap 508 may assist in completing the shift of the flap 508 from the opened state to the closed state. Furthermore, the sill assembly 536 may assist in forming an effective seal between the flap 508 and the core 506 at the bottom surface of the flap 508.

The flap 508 may include multiple rigid segments 509B extending from the top of the flap 508 to the bottom of the flap 508. Gaps may be provided between the rigid segments 509B, and elastic material 509A may connect adjacent rigid segments 509B. The elastic material 509A may form elastic stretch zones in the gaps. The flap 508 may resist horizontal and vertical bending in locations where a rigid segment 509B is provided, and the elastic stretch zones 544 may be configured to permit vertical bending when the flap 508 is opened similar to the vertical bending of the flap 508 shown in FIG. 5F.

Additionally, the second layer of material 552B is illustrated in FIG. 5J. As noted above, this layer 552B may include elastic and resilient material. The layer 552B may include a top seal 550 and horizontal ribs 546. The horizontal ribs 546 may assist in permitting attachment of transparent rigid attachments. These transparent rigid attachments may generally prevent any bending in areas where they are provided. Elastic stretch zones 544 may be provided between the horizontal ribs 546 where no transparent rigid attachment 533 is intended to be provided, and any bending of the flap of FIG. 5J may generally occur in these elastic stretch zones 544. Transparent rigid attachments may provide an added thickness for temperature insulation.

Various embodiments of a pet door assembly may include a flap holder, and FIGS. 6A-6C illustrate the flap holder 626 and/or the flap 608 that it restrains. FIG. 6A illustrates an enhanced perspective view of a flap 608, and FIGS. 6B-6C illustrate varying perspective views of a flap holder 626 being used to retain the flap 608.

The flap 608 may generally be identical to the flap 508 of FIG. 5F. The flap 608 may possess a top seal 650, one or more elastic stretch zones 644, a first layer 652A (alongside a second layer, and a third layer), and a seal 648 on each side of the flap 608. Additionally, the flap 608 may include an attachment portion 660 that may be configured to engage with a flap holder 626. An example attachment portion 660 is illustrated in FIG. 6A in isolation without the flap holder 626 being shown. By contrast, the flap holder 626 is visible in FIG. 6B, and the engagement of the flap holder 626 and the attachment portion 660 is made visible. The flap holder 626 may provide a surface on which the top seal 650 may rest in some embodiments, but the flap holder 626 may engage with the attachment portion 660 in a variety of ways (e.g. engagement using another surface of the attachment portion 660, fasteners such as adhesive, screws, snap fit engagements, etc.). Additionally, as shown in FIG. 6C, the flap holder 626 may include a flap holder latch 638 and a recess 628.

Various embodiments provided herein provide a push button assembly which advantageous features. The push button assembly may assist in locking and unlocking the flap of the pet door assembly, and it may interact with a disk assembly to accomplish this. Furthermore, the push button assembly may provide a visible indication of whether it is in a locked state or an unlocked state. Additionally, the push button assembly may be provided within the core in some embodiments.

FIGS. 7A-7F illustrate various features of an example push button assembly 710, and FIGS. 7G and 7H illustrate the interaction between the push button assembly 710 and other components within the core as the push button assembly 710 shifts from an unlocked position to a locked position.

FIG. 7A illustrates a perspective view of the push button assembly 710 having a push button 754, a shuttle 758, and a push button housing 756. The push button 754 may possess a contact portion 754A that is configured to receive the application of a force from a user. Force applied at the contact portion 754A may cause the push button 754 to shift from an unlocked state to a locked state and vice versa. The push button 754 may also include a column 754B. This column 754B may extend upwardly and engage with another component such as the slide cam 724 (see FIG. 7G). Consequently, movement of the push button 754 may cause similar movement of the slide cam 724 due to the engagement between the slide cam 724 and the columns 754B.

Additionally, the push button 754 may include one or more springs 754C. These springs 754C may come in contact with another portion of the core to generate a force on the push button 754 towards the bottom left in FIG. 7A. To change from an unlocked state to a locked state and vice versa, the force applied by the user at the contact portion 754A must be greater than the force generated by the spring 754C. Thus, the spring 754C may be beneficial to prevent the push button assembly 710 from inadvertently being changed from an unlocked state to a locked state and vice versa.

Furthermore, as illustrated in FIG. 7A, the push button housing 756 may include a track 756A. This track 756A may be configured to receive the shuttle 758. The track 756A may be configured to permit the shuttle 758 to shift along the track 756A. As explained further herein, as the push button 754 shifts, the shuttle 758 may also shift within the track 756A. The track 756A may be configured to permit the shuttle 758 to shift along the track 756A in a direction that is perpendicular to the direction of movement for the push button 754.

FIG. 7B illustrates a top perspective view of the push button 754 in isolation. As noted above in reference to FIG. 7A, the push button 754 may include and contact portion 754A, a column 754B, and a spring 754C. Furthermore, the push button 754 may also include a cam-path 754D. The cam-path 754D may receive a shuttle post 758A (see FIG. 7C) that is connected to the shuttle 758.

FIG. 7D illustrates a perspective view of the push button housing 756 in isolation. As noted above in reference to FIG. 7A, the push button housing 756 may include a track 756A. The track 756A may be configured to permit the shuttle 758 to shift along the track 756A. Furthermore, the push button housing 756 may include a slot 756B, and this slot 756B may be configured to receive the shuttle post 758A of the shuttle 758. By permitting the shuttle post 758A to pass through the slot 756B, the shuttle post 758A may extend to the cam-path 754D of the push button 754.

FIGS. 7E and 7F permits the operation of the cam path 754D and the shuttle post 758A to be more readily understood. In the position illustrated in FIG. 7E, the push button assembly 710 is in a locked state. This position is labelled as position A in FIG. 7F. To shift to an unlocked state, the user may apply force to the contact portion 754A. This force applied at the contact portion 754A may be a momentarily applied. Furthermore, the force applied by the springs 754C may be continuous, and any force applied at the contact portion 754A must overcome the force generated by the springs 754C in the opposing direction.

To the extent the force applied at the contact portion 754A is sufficient, this force may cause the shuttle post 758A to shift towards the left until it comes into contact with the diagonal wall. Upon coming in contact with the wall, the shuttle post 758A may shift diagonally until it reaches position B. To complete the shift to the unlocked state (shifting from position B to position C), the user may simply stop applying any force on the contact portion 754A. By doing so, the springs 754C of the push button 754 may generate movement of the push button 754. Thus, relative to the cam path 754D of the push button 754, the shuttle post 758A will appear to shift towards the right. The walls of the cam path 754D may be configured to guide the shuttle post 758A from position B to position C.

To shift from the unlocked state illustrated in FIG. 7F back to the locked state of FIG. 7E, the user may again simply apply a force to the contact portion 754A of the push button 754. By applying the force, the shuttle post 758A may shift from position C to position D, with the walls of the cam path 754D being configured to guide the shuttle post 758A from position C to position D. Once in position D, the user may stop applying the force on the shuttle post 758A. By doing so, the springs 754C of the push button 754 may generate movement of the push button 754. Thus, relative to the cam path 754D of the push button 754, the shuttle post 758A will appear to shift towards the right. The walls of the cam path 754D may be configured to guide the shuttle post 758A from position D to position A.

Looking now at FIGS. 7G and 7H, the engagement of the push button 754 and a slide cam 724 are shown. In FIG. 7G, the push button 754 is in an unlocked state, and the push button 754 is in a locked state in FIG. 7H. Notably, the columns 754B of the push button 754 may engage with the slide cam 724. Consequently, as the push button 754 shifts, the slide cam 724 may also shift. This movement of the slide cam 724 may assist in causing the disk assembly 818 (see FIG. 8A) to shift between a locked state and an unlocked state and vice versa.

A disk assembly may also be provided that may be configured to either prevent or allow the flap of a pet door assembly to open. The disk assembly may comprise a variety of components, and these components may ensure that the disks are provided in an open or closed position unless the flap changes position. The disk assembly may also function together with a locking button assembly so that the locking button assembly may cause the disk assembly to lock or unlock. In some embodiments, the disk assembly may be provided without the need for any electrical circuitry, and the disk assembly may lock or unlock the flap mechanically. However, the disk assembly may be electronically actuated in some embodiments. FIGS. 8A-8Z illustrate this disk assembly, components of the disk assembly, and the interaction of the disk assembly with other components.

Looking first at FIG. 8A, a perspective view of a disk assembly 818 is illustrated. The disk assembly 818 may comprise one or more disk pairs 862. Furthermore, the disk assembly 818 may be mounted on a spindle 820. Spindle posts 820A may engage with another portion of the core so that the spindle 820 may be held in position. Portions of the disk pairs 862 within the disk assembly 818 may rotate relative to the spindle 820.

FIG. 8B illustrates a cross sectional view of the disk assembly 818 of FIG. 8A, and FIG. 8C illustrates an enhanced cross sectional view of the disk assembly 818 of FIG. 8B where further features may be more readily seen. Looking at FIG. 8C, various components of a disk pair 862 may be seen. Hubs 864 may be provided proximate to the center of the disk pairs 862. The hubs 864 may mounted on the spindle 820, and hubs 864 may be configured to generate rotation of a disk within the disk pair 862. The hubs 864 may be stacked on the spindle 820 so that vertical movement of one hub 864 may cause another adjacent hub 864 to shift as well. The hub 864 may act as a bearing for respective disks of the disk pair 862 to revolve around. Furthermore, the disk pair 862 may include a top disk and a bottom disk. The top disk may include a first disk component 868 and a second disk component 870 while the bottom disk may include a first disk component 868' and a second disk component 870'.

Further features of a disk pair 862 may be seen in the exploded view of FIG. 8D. The disk pair 862 may include a top disk and a bottom disk. The top disk may include a first disk component 868 and a second disk component 870. A hub 864, spring members 865, and a disk strike 866 may be provided in the top disk between the first disk component 868 and the second disk component 870. Additionally, the bottom disk may include a first disk component 868' and a second disk component 870'. A hub 864, spring members 865, and a disk strike 866 may be provided in the bottom disk between the first disk component 868' and the second disk component 870'.

FIGS. 8E and 8F illustrate an assembled top disk and bottom disk respectively. The first disk components 868, 868' may include a bearing 868A, and the second disk components 870, 870' may include a bearing 870A. These bearings 868A, 870A are also illustrated in FIGS. 8G and 8H. Thus, the hub 864 may remain stationary and may engage with the relevant bearing, and the remainder of the top disk or the bottom disk may rotate. Furthermore, a cavity may be provided in the top disk and the bottom disk between a first disk component and a second disk component. This cavity may be configured to permit the disk strike 866 to rotate outside of the cavity in some situations, and the cavity may also permit the disk strike 866 to rotate into the cavity so that the disk strike 866 is generally retained within the volume of the top or bottom disk. The disk strike 866 may be configured to engage with teeth of the hub 864 to restrict the free rotation of the disk strike 866. The top disk and the bottom disk may rotate independently of each other. In one embodiment, the one disk may rotate, and the other disk may remain stationary when the flap is opened the disk that rotates may depend on the direction that the flap is opened.

The disk assembly 818 may be mounted on a spindle, and FIG. 8I illustrates one example spindle 820 that may be used. Spindle posts 820A may engage with another portion of the core so that the spindle 820 may be held in position. Portions of the disk pairs 862 within the disk assembly 818 may rotate relative to the spindle 820. The spindle 820 may also comprise a rail 820B, and the spindle 820 may be oriented so that this rail 820B extends vertically in some embodiments. However, the spindle 820 may be oriented differently in other embodiments. The rail 820B may be received within a cavity 864B (see FIG. 8J) of a hub 864 (see FIG. 8J) so that the hub 864 may be retained on the spindle 820. The rail 820B may be configured to permit the hub 864 to move up and down the rail 820B while preventing the hub 864 from rotating relative to the rail 820B.

Looking now at FIG. 8J and FIG. 8K, further details regarding the hub 864 and the second disk component 870 may be seen. The hub 864 may include a cavity 864B. This cavity 864B may be configured to receive the rail 820B of the spindle 820 as noted above. Furthermore, the hub 864 may include a protrusion 864A, and this protrusion 864A may be configured to engage with a clutch recess 870B of a second disk component 870 (see FIG. 8K). Depending on whether or not the protrusion 864A is engaged with the clutch recess 870B or not, the disk assembly 818 may be in either an unlocked state or a locked state. When the push button assembly 1010 (see FIG. 10A) is in a locked state, this may cause the protrusion 864A to engage the clutch recess 870B. This may prevent rotation of a disk in the disk pairs 862 and prevent a flap from being opened. Alternatively, when the push button assembly 1010 (see FIG. 10A) is in an unlocked state, this may cause the protrusion 864A to avoid engagement with the clutch recess 870B, and this may permit rotation of a disk in the disk pairs 862 and permit the flap to open.

The hub 864 may also include teeth 864C. The teeth 864C may be configured to engage at least partially with the teeth of a disk strike 866 (see FIG. 8R), and this engagement may prevent the free rotation of the disk strike 866 relative to the hub 864. Additionally, the hub 864 may include one or more hinge posts 864D, with two hinge posts 864D provided in the illustrated embodiment. The hinge posts 864D may be configured to engage with spring members 865 (see FIG. 8L) to guide the movement of the spring members 865.

Looking now at FIG. 8L, further features of a spring member 865 may be seen. The spring members 865 may toggle or rotate about hinge posts 864D of the hub 864, and the spring members 865 may do so in a way that ensures that the disk assembly 818 is generally maintained in either in an open state or a closed state without being stuck in an intermediary state. The spring member 865 may include nodes 865C, and the nodes 865C may be configured to engage with another component (e.g. a portion of the first disk component 868 (see FIG. 8G) or the second disk component 870 (see FIG. 8M)) to restrain the spring member 865 from moving vertically. However, the nodes 865C may not inhibit the vertical movement of the hub 864 itself as the hub 864 may move up and down relative to the spring member 865 due to the engagement between the groove 865D and the hinge post 864D. The nodes 865C may prevent the spring member 865 from tipping at an angle even where contact between the hub 864 and the spring member 865 generates a friction force on the spring member 865. The spring member 865 may include an outer post 865A and an inner post 865B. A spring portion 865E may also be provided between the outer post 865A and the inner post 865B to urge the two posts away from each other. The outer post 865A may engage with a groove 870C (see FIG. 8K) of a disk pair such as the first disk component 868 (see FIG. 8G) or the second disk component 870 (see FIG. 8K). Thus, as a result of this engagement, rotation of the spring member 865 may cause the first disk component 868 and the second disk component 870 to rotate as well.

The spring members 865 may generally be permitted to freely rotate. A groove 865D may engage with the hinge post 864D of the hub 864. While the hub 864 may not rotate due to its attachment to the rail 820B of the spindle 820 (see FIG. 8I), the spring member 865 may rotate. The spring member 865 may urge the groove 865D towards the hinge post 864D so that the hinge post 864D is retained within the groove 865D. As a result, the groove 865D and hinge post 864D may remain in contact through rotation of the spring member 865.

FIG. 8M illustrates a top schematic view of a hub 864 and a spring member 865 positioned in a second disk component 870. As illustrated, the outer post 865A of the illustrated spring member 865 may engage with a groove 870C (see FIG. 8K) formed in the interior portion of the second disk component 870. The outer post 865A may engage with the second disk component 870 in other ways, or the outer post 865A may engage with another component such as the first disk component 868 (see FIG. 8G). Furthermore, the spring portion 865E of the spring member 865 may urge the inner post 865B against the hinge post 864D of the hub 864 to ensure that the inner post 865B and the hinge post 864D remain engaged. The teeth 864C and cavity 864A of the hub 864 are also visible in FIG. 8M.

FIG. 8N and FIG. 8O also illustrate a top view and a side view respectively of a hub 864 and spring members 865. Furthermore, FIG. 8S illustrates a side view of a disk where a hub 864 and spring members 865 may be seen. For the purposes of explanation, the hub and spring members are separated from each another in FIGS. 8N and 8O. In particular, FIGS. 8N, 8O, and 8S are helpful to see the shape and interaction between the hinge post 864D and groove 865D. As noted previously, the hub 864 may not rotate relative to the spindle 820 (see FIG. 8I), but the engagement between the hinge post 864D and groove 865D may assist in controlling the movement of the spring member 865 without preventing rotation of the spring member 865 altogether. In some embodiments, the hinge post 864D may effectively serve as a pivot point about which the spring member 865 may rotate. Additionally, the spring member 865 may be prevented from shifting up and down. However, the engagement between the hinge post 864D and the groove 865D of the spring member 865 may generally permit the free movement of the hub 864 in the vertical direction relative to the spring member 865. In other embodiments where the hub and the spring member are connected by a living hinge 972B (see FIGS. 9A-9B), the hub and spring member may be constrained so that the components shift in the vertical direction together.

Furthermore, a disk strike may also be provided, and FIGS. 8P-8Q illustrate varying perspective views of an example disk strike 866. The disk strike 866 may include teeth 866A and one or more rods 866B. In the illustrated embodiment, a rod 866B is provided on the top and bottom of the disk strike 866, and the rods 866B may be configured to extend into a cavity within the first disk component 868 (see FIG. 8G) or the second disk component 870 (see FIG. 8M). The engagement between the rods 866B and the first disk component 868 and/or the second disk component 870 may permit rotation of the disk strike 866 while restricting vertical and horizontal movement.

As the disk assembly shifts from an opened state to a closed state, the flap 508 (see FIG. 5F) may come in contact with a disk strike 866, which may be connected via a rod 866B to the first disk component 868 (see FIG. 8G) and/or the second disk component 870 (see FIG. 8M) of one of the disk pairs. The contact between the flap 508 and the disk strike 866 may cause the disk strike 866 to rotate about the rod 866B. As illustrated in FIG. 8R, disk strike 866 may rotate freely until the teeth 866A of the disk strike 866 engage with the teeth 864C of the hub 864. Once the teeth 864C, 866A come in contact with each other, the force generated by the flap 508 may cause the position of the rod 866B itself to shift. Due to the attachment of the rod 866B to a first disk component 868 (see FIG. 8G) and/or the second disk component 870 (see FIG. 8M), the rod 866B, the first disk component 868, and the second disk component 870 may shift together towards the closed position. Thus, the kinetic energy of the flap 508 is used to generate a force on the disk strike 866, the first disk component 868, and the second disk component 870 so that these components may be returned to the closed state quicker and more reliably. The teeth 864C of the hub 864 may provide leverage to assist in urging the disk strike 866, the first disk component 868, and the second disk component 870 to shift together towards a closed position.

The functionality of disk strikes and operation of the disk assembly are also demonstrated in FIGS. 8T-8Z. FIGS. 8T-8W illustrate various views of the disk assembly when it is in an opened state. FIGS. 8T-8U illustrate varying perspective views of a disk assembly in an opened state. Furthermore, FIG. 8V illustrates a schematic view of the disk strike 866, the spring members 865, and the hub 864 when the disk assembly is in an opened state. FIG. 8W illustrates a top view of the disk assembly when it is in an opened state.

As illustrated, a disk strike 866 for the top disk may be retained within a cavity in the top disk while a disk strike 866 for the bottom disk may protrude out of a cavity in the bottom disk. Thus, the top disk strike will not interfere with the flap as the flap returns to a closed position, but the bottom disk strike will be provided in a position where it will come in contact with the flap. The flap may contact the bottom disk strike 866, creating a force on the bottom disk strike 866. As discussed above in reference to FIG. 8R, this force on the bottom disk strike 866 may be transferred to the first and second disk component of the bottom disk to cause the bottom disk to shift back to a closed position.

The disk strike 866 may be beneficial to permit the flap to more quickly shift between an opened and a closed state. The disk strike 866 may transfer the kinetic energy from the flap to a disk in each disk pair 862 to cause the disk to rotate to an opened state or a closed state.

In the illustrated embodiments of FIG. 8T-8W, the flap has been opened in the exterior direction (e.g. as if a pet is walking outside of the home). This may cause the bottom disk in a disk pair 862 to rotate in the manner illustrated in FIG. 8T-8W. To the extent the flap has been opened in the interior direction (e.g. as if the pet is walking inside the home), the top disk of a disk pair 862 and the disk strike associated with the top disk may rotate instead in a similar manner, and the disk strike associated with the bottom disk may remain tucked away in the cavity of the bottom disk.

FIGS. 8X-8Z illustrate various views of the disk assembly or components thereof when the disk assembly is in a closed state. As illustrated in FIG. 8Z, the disk assembly may restrain the movement of the flap 808 in both directions. The top disk of the disk pair 862 may restrict movement to the left, and the bottom disk of the disk pair 862 may restrict movement to the right. The two disks of a disk pair 862 may effectively form an opening 818A where the flap 808 may be received. The opening 818A may form a "U" shaped "jaw-like" configuration. Furthermore, a seal 548 (see FIG. 5D) on the flap 808 may engage with the disk assembly to create an effective seal, preventing moisture, water, etc, from entering in any gaps between the flap 808 and the disk assembly.

Furthermore, a comparison of FIGS. 8V and 8Y shows how certain components shift as the disk assembly moves from an opened state to a closed state. Between the two states, the spring members 865 have rotated about the hinge post 864D, the disk strike 866 has been rotated, and the position of the rod 866B for the disk strike 866 has shifted.

While the hub 864 and spring member 865 are provided as separate components in some embodiments, an alternative hub 972 may be provided that effectively combines these two components together. FIG. 9A illustrates a side view of the alternative hub 972, and FIG. 9B illustrates a top view of the alternative hub 972.

The alternative hub 972 may have a main body 972A, and this main body 972A may effectively have the same functionality as the hub 864. Furthermore, the alternative hub 972 may have a spring portion 972C, and this spring portion 972C may effectively have the same functionality as the spring member 865. Unlike the hub 864, the alternative hub 972 may include a living hinge 972B, and this living hinge 972B may connect the main body 972A and the spring portion 972C. The living hinge 972B may effectively replace the functionality that the hinge post 864D and groove 865D (see FIG. 8N) provided. However, because the living hinge 972B physically connects the main body 972A and the spring portion 972C, the spring portion 972C will move vertically alongside the main body 972A. The inclusion of the living hinge 972B may be beneficial over other embodiments using separate components to reduce the number of separate parts that must be manufactured. However, providing the spring member 865 and the hub 864 as separate components and engaging the two through the use of the groove 865D and the hinge post 864D may have advantages over the alternative hub 972. The use of separate components may make assembly easier as there may be less difficulty in aligning the components (e.g. the spring portion 972C). Further, wear and tear over time may reduce the reliability of the living hinge 972B, while the use of separate components may alleviate this issue. Furthermore, by using separate components, the spring member 865 will not be required to move in the vertical direction, and reducing the movement of the spring member 865 may restrict the amount of wear and tear on the spring member 865. Additionally, where separate components are used, there may be a lower probability of binding when the separate hub 864 is moved vertically on the rail 820B of the spindle 820.

A push button assembly may be provided as well, with the push button assembly being configured to cause the disk assembly to shift between a closed state and an opened state. FIGS. 10A-10D illustrate various figures that show the interaction between a push button assembly 1010 and a disk assembly 1018.

Looking first at FIG. 10A, a push button assembly 1010 is illustrated alongside a slide cam 1024, a vertical cam 1022 on the left and right side, a disk assembly 1018 on the left and right side, and a sill assembly 1036. The push button assembly 1010 may shift between a locked state and an unlocked state. As the push button assembly 1010 shifts between these states, this may cause movement of the push button assembly 1010 and the slide cam 1024 (e.g. into or out of the page when looking at FIG. 10A). Where the push button assembly 1010 is shifting to a locked state, horizontal movement of the slide cam 1024 may generate a downward force on the vertical cam 1022. This downward force on the vertical cam 1022 may urge each of the hubs 1064 (see FIG. 10B) in a downward direction, causing the protrusion 864A of the hub 864 (see FIG. 8J) to engage with the clutch recess 870B of the second component 870 (see FIG. 8K). This engagement may prevent the second component 870 and the disk assembly 1018 as a whole from rotating.

The bottom surface of the slide cam 1024 may effectively serve as a cam-path, with a front portion (e.g. on the left side in FIG. 10B) of the bottom surface being lower than a back portion (e.g. on the right side in FIG. 10B) of the bottom surface. As the push button assembly 1010 shifts to a locked state, the slide cam 1024 may shift horizontally so that the front portion of the bottom surface for the slide cam 1024 comes in contact with the vertical cam 1022. This will urge the vertical cam 1022 in a downward direction. Where the push button assembly is in an unlocked state, the vertical cam 1022 will instead be in contact with the back portion of the bottom surface for the slide cam 1024, and this will permit the vertical cam 1022 to shift to an elevated position. Where the vertical cam 1022 is in the elevated position, the hubs 1064 (see FIG. 10B) may be provided in an elevated position relative to the locked state, and the protrusion 864A of the hub 864 (see FIG. 8J) may be disengaged from the clutch recess 870B of the second component 870 (see FIG. 8K). Because these components are not engaged, the second component 870 and the disk assembly 1018 may be free to rotate, and the flap may open freely.

FIG. 10C illustrates these components from a perspective cross sectional view, and FIG. 10D illustrates an enhanced, schematic side view of the disk assembly and push button assembly. Specific components of the push button assembly 1010 such as the contact portion 1054A, the columns 1054B, and the spring 1054C of the push button assembly 1010 have greater visibility in FIGS. 10C-10D.

In some embodiments, a spring force may be generated on at least one of the hubs 1064 or the vertical cam 1024 to prevent the protrusion 864A (see FIG. 8J) of the hub 1064 from engaging with the clutch recess 870B of the second disk component 870 (see FIG. 8K). The spring force may be provided in the upward direction on at least one of the vertical cam 1024 or one of the hubs 1064. By doing so, the disk assembly and pet door assembly as a whole may remain in an unlocked state unless sufficient force is provided to overcome the spring force. However, the downward force caused by the slide cam 1024 in the locked position will be sufficient to overcome the spring force to shift the disk assembly and pet door assembly to a locked state.

An anchor frame having electrical components may also be provided in some embodiments. The anchor frame and the exterior escutcheon frame may be the first frames that are connected to a wall or a door when the pet door assembly is assembled in some embodiments, and the anchor frame may interlock with a core frame. FIGS. 11A-11D illustrate various features of an example anchor frame 1132 having electrical components or the anchor frame 1132 in use with other components of the pet door assembly. FIGS. 11A and 11C illustrate a front perspective view of an anchor frame 1132, with battery covers 1132F being removed in FIG. 11C. FIG. 11B illustrates a rear perspective view of the anchor frame 1132 of FIG. 11A. Additionally, FIG. 11D illustrates a perspective view of an assembled pet door assembly using the anchor frame 1132 of FIG. 11A.

As illustrated in FIG. 11C, a battery cover 1132F may be provided, and this may be moved to add or remove batteries from within the anchor frame 1132. The batteries may provide power for electrical components within the anchor frame 1132 and/or other components of the pet door assembly (e.g. the core). In some embodiments, eight 9-volt batteries may be provided, but any number of batteries or type of batteries may be used. However, in other embodiments, the anchor frame 1132 or the pet door assembly may receive electrical power from other sources such as an electrical wire connected to a power outlet. Furthermore, the batteries and battery cover 1132F may be provided in another component or at another location in some embodiments. Additionally, FIG. 11B illustrates a recess 1132E within the anchor frame 1132, and this recess 1132E may be configured to receive a portion of an escutcheon exterior frame 1104B or an escutcheon extension frame 1130 (see, e.g., FIGS. 20C-20E). While the anchor frame 1132 may be provided with a fixed size in some embodiments, the recess 1132E may allow for variations in the depth of the pet door assembly. The recess 1132E may be configured to permit the position of the escutcheon exterior frame 1104B and any attached escutcheon extension frames 1130 to be adjusted so that the pet door assembly may be provided with an appropriate depth. This may enable precise depths to be accomplished without the need for customization during manufacturing, allowing for standard components to be provided at lower costs. Furthermore, FIG. 11D illustrates the anchor frame 1132 installed alongside an escutcheon exterior frame 1104B and an escutcheon extension frame 1130.

Various electrical components may be provided in the core itself, and FIGS. 11E-11G illustrate a schematic view of electrical components within the core. For example, the core may have electrical contacts 1174 on both sides, and similar electrical contacts may be provided on the anchor frame 1132. When these electrical contacts touch each other, an electrical circuit may be formed, and electrical current may flow from the batteries to components within the core. The electrical contacts may increase the ease of assembly, avoiding the need for any complicated wiring between the anchor frame 1132 and the core to provide electrical current to the core. However, other approaches may be taken for providing electrical current to the core or to other components within the pet door assembly. Electrical contacts 1174 may be provided on both sides of the core, and electrical current may flow from the electrical contacts 1174 through a wire to one or more circuit boards 1176. These circuit boards 1176 may be printed circuit boards (PCB) in some embodiments, but other electrical circuitry may serve as a circuit board.

In some embodiments, the circuit boards 1176 may enable communication with an electronic remote software interface so that the pet door assembly may be monitored. For example the circuit board 1176 may be configured to permit a remote software interface to monitor whether the pet door assembly is locked or unlocked, and the circuit board 1176 may be configured to permit a user to lock or unlock the pet door assembly via a remote software interface in some embodiments. In some embodiments, the circuit board 1176 may be configured to use pet radio-frequency identification (RFID), Bluetooth, or some other similar form of communication to identify authorized pet access in conjunction with electronic circuitry. Where an authorized pet has been identified, the circuit board 1176 may be configured to cause the pet door assembly to shift to an unlocked state, and this may be done by actuating movement of an actuator cam similar to actuator cam 1180. This approach may require communication between the circuit board 1176 or another component within the pet door assembly with a collar on the pet having the ability to communicate through RFID communication, Bluetooth, etc. Additionally or alternatively, the circuit board may be configured to permit monitoring via the Internet of Things (IoT). The circuit board 1176 may also be configured to receive signals regarding burglar alarms, and the circuit board 1176 may be configured to lock the pet door assembly following the receipt of a burglar alarm signal. The circuit board 1176 may also communicate with computers and smart phones equipped with proprietary software and may receive software updates. In some embodiments, a memory device may be provided alongside the circuit board, and a user interface may also be provided to permit adjustments to the operation of the pet door assembly.

Looking now at FIGS. 11E-11F, an actuator cam 1180 is illustrated. The actuator cam 1180 may generate a force similar to a force manually applied to the push button 1154 so that the pet door assembly may be remotely locked. The actuator cam 1180 may be attached to a circuit board 1176, and this circuit board 1176 may be connected to the slide cam 1124. The circuit board 1176 may receive a command from a remote user to lock the pet door assembly. The actuator cam 1180 may assist in controlling whether the pet door assembly is in a locked or unlocked state. As illustrated in FIGS. 11E-11F, the circuit board 1176 may be configured to cause the actuator cam 1180 to rotate to engage the contact 1179. Where this engagement occurs between the actuator cam 1180 and the contact 1179, this engagement may urge the circuit board 1176 and the attached slide cam 1124 away from the contact 1179 (towards the bottom left direction in the embodiment illustrated in FIG. 11G). This generated motion in the slide cam 1124 may lock disk assemblies 1018 (see, e.g., FIG. 10B) and may cause the push button 1154 to shift to a closed position. In some embodiments, the actuator cam 1180 may be actuated to engage the push button 1154 only momentarily to cause movement of the slide cam 1124, and the actuator cam 1180 may then return to a resting position that is not engaged with the contact 1179. An example of the actuator cam 1180 in its resting position is illustrated in FIG. 11G. Once the pet door assembly is in a locked state, one may shift the pet door assembly back to an unlocked state by manually pressing the push button 1154 to manually override the locked state. However, in other embodiments, the pet door assembly may be shifted to an unlocked position using the actuator cam 1180 for example, the actuator cam 1180 may be shifted in a reverse direction to engage another contact to urge the pet door assembly to an unlocked position. Alternatively, a separate actuator cam may be provided to shift the pet door assembly to an unlocked position.

Another feature that may be provided in the pet door assembly is a latch interlock assembly. The latch interlock assembly may help improve the ease of assembly for the pet door assembly, allowing for the easy securement of the core with an anchor frame. FIGS. 12A-12H illustrate various features of the latch interlock system.

Looking first at FIG. 12A, an exploded view is provided of a core interior frame 1207A and other components provided therein. As illustrated, the core interior frame 1207A may have a first hole 1214C, and this first hole 1214C may be configured to receive a portion of a cam screw 1214B. A latch cam 1214A may also be provided that may interact with the cam screw 1214B.

The latch cam 1214A and cam screw 1214B may be more easily viewed in the enhanced views of FIGS. 12B and 12C. When the cam screw 1214B is initially placed in the first hole 1214C, the cam screw 1214B may rest within a cavity of the latch cam 1214A in a manner that prevents the latch cam 1214A from protruding out of the side of the core interior frame 1207A. However, the cam screw 1214B may be rotated (e.g. by a screwdriver) and the cam screw 1214B may urge the latch cam 1214A outwardly so that it protrudes farther outside of the core interior frame 1207A. By doing so, the latch cam 1214A may engage a portion of an anchor frame (see, e.g., 232, FIG. 2F) to restrict the movement of the anchor frame relative to the core. Notably, the cam screw 1214B may be received in a second hole 314D of a core exterior frame 307B (see FIG. 3B).

In some embodiments, the cam screw 1214B may be configured to be rotated while engaged in latch cam 1214A to slide the latch cam 1214A outward to interfere with an anchor frame (see, e.g., 232, FIG. 2F). The cam screw 1214B of FIG. 12A may be rotated a maximum amount of 180 degrees between a locked an unlocked position, but the cam screw 1214B may be rotated a greater or lesser amount in other embodiments.

FIG. 12D also illustrates the cam screw 1214B without any latch cam 1214A being visible. A stop 1214E may be provided in the core interior frame 1207A that may be configured to come in contact with a screw stop 1214F on the cam screw 1214B to restrict further rotation of the cam screw 1214B in the clockwise direction (when viewed from the perspective shown in FIG. 12D). Another similar stop may be provided in the core interior frame 1207A that may be configured to come in contact with the screw stop 1214F on the cam screw 1214B to restrict further rotation of the cam screw 1214B in the counterclockwise direction (when viewed from the perspective shown in FIG. 12D). The cam screw 1214B of FIG. 12A may be rotated a maximum amount of 180 degrees between the two stops in some embodiments. Furthermore, the core interior frame 1207A may possess multiple detents 1214H, and these detents 1214H may be configured to engage with a latch protrusion 1214J of the latch cam 1214A (see FIG. 12H) to retain the latch cam 1214A relative to the core interior frame 1207A. Additionally, the cam screw 1214B may include a cam portion 1214G which may have an asymmetrical shape or may be offset from the central axis of the cam screw 1214B. FIGS. 12E-12G also illustrate varying perspective views of a cam screw 1214B in isolation, and these views permit the shape of the cam portion 1214G to be seen.

The cam portion 1214G of the cam screw 1214B may engage with the cam receiver 1214K of the latch cam 1214A, which is illustrated in FIG. 12H. Based on the rotational position of the cam screw 1214B, the latch cam 1214A may be shifted in different horizontal positions. Thus, rotation of the cam screw 1214B may cause an enlarged part of the cam portion 1214G to contact the walls of the cam receiver 1214K, and this may urge the latch cam 1214A outwardly so that it will engage with an anchor frame (see, e.g., 232, FIG. 2F). Additionally, looking now at FIG. 13A, the core interior frame 1307A may also include another stop 1305 which may come in contact with the latch cam 1314A to restrict horizontal movement of the latch cam 1314A towards the interior of the core. The cam screw 1314B is also illustrated alongside the latch cam 1314A in FIGS. 13A-13B.

A sill assembly may also be provided. The sill assembly may include magnets to assist in urging the flap to shut and to maintain an effective seal between the flap and the sill assembly. An example sill assembly 1336 and core interior frame 1307A are illustrated in FIG. 13A-13C. The core interior frame 1307A may include one or more protrusions 1382 proximate to the bottom of the core interior frame 1307A, and the protrusions 1382 may be configured to permit the sill assembly 1336 to rest on the protrusions 1382 as illustrated in FIG. 13B.

Furthermore, the sill assembly 1336 may include a drain 1384. Similarly, the core exterior frame 1307B may include a drainage slit 1386. Water, moisture, etc. may move from the flap 508 (see FIG. 5A) and/or other components to the drain 1384 or the drainage slit 1386 so that these elements may be released into the external environment. By doing so, less of these elements may be retained in the flap 508 (see FIG. 5A) or in the pet door assembly generally, and less of these elements may enter into a home.

Further features of the sill assembly 1336 may be seen in FIGS. 13D-13E. FIG. 13D illustrates a perspective view of the sill assembly 1336, and FIG. 13E illustrates a cross-sectional view of this sill assembly 1336. As noted previously, the sill assembly 1336 may include a drain 1384, and this drain 1384 may have an opening 1384A where fluids such as water may exit. In some embodiments, channels 1384B (see FIG. 13I) may extend across the sill assembly 1336 where fluids such as water may collect, and these channels 1384B may be sloped in a manner that causes these fluids to flow to the opening 1384A of the drain 1384 so that these fluids may be removed. The drain 1384 and channels 1384B may be configured to prevent fluids from contaminating the one or more corresponding cavities.

Additionally, the sill assembly 1336 may include a sill frame 1336A and a magnetic sill 1336B. As can be seen in the cross-sectional view of FIG. 13E, the magnetic sill 1336B may include one or more magnets 1336C. Two magnets 1336C are provided in the illustrated embodiment. Magnets within the flap 508 (see FIG. 5A) may engage with the magnets 1336C of the sill assembly 1336. This magnetic engagement may cause the flap 508 (see FIG. 5A) to straighten so that it may shift to a completely closed position.

Furthermore, the magnetic sill 1336B may include one or more pistons 1336D that may be received within corresponding cavities 1336E of the sill frame 1336A. In the illustrated embodiment, two pistons 1336D and two cavities 1336E are illustrated. The pistons 1336D may operate through viscous chemistry with a corresponding cavity 1336E to self-adjust and inhibit rapid up-down movement as the flap 508 (see FIG. 5A) is opened. Viscous material such as automobile gasket sealant may be provided in the cavities 1336E to cause the pistons 1336D to shift slowly. The pistons 1336D may always be retained in the cavities 1336E, and the pistons 1336D may be configured to block the viscous material from exiting the cavities 1336E. This slow moving action of the sill assembly may aid in providing an effective seal at the bottom of a flap 508 (see FIG. 5A). The slow moving action of the sill assembly may permit adjustments based on properties such as thermal expansion or contraction in the flap 508 while preventing rapid movement that may cause an increased amount of wear and tear over time. The pistons 1336D also act to maintain absolute horizontal alignment of the magnetic sill 1336B eliminating any rocking movement left, right, forward, and back.

The magnetic sill 1336B may have calibrated vertical movement. An allowable predetermined range of vertical movement for the magnetic sill 1336B within the sill cavity may be dictated by the anticipated thermal expansion and contraction of the flap material.

FIG. 13F illustrates an exploded view of another similar sill assembly. Like the sill assembly 1336 of FIG. 13E, the sill assembly of FIG. 13F may include a drain 1384, a sill frame 1336A, a magnetic sill 1336B, and magnets 1336C within the magnetic sill 1336B. While the general features of the sill assemblies of FIGS. 13E and 13F are similar, the shape and size of these features differ.

FIG. 13G illustrates an exploded view of yet another sill assembly, and FIG. 13H illustrates an enhanced cross sectional view of the sill assembly of FIG. 13G where certain features may be more easily seen. Like the sill assemblies of FIGS. 13E and 13F, the sill assembly of FIG. 13G may include a drain 1384, a sill frame 1336A, a magnetic sill 1336B, and magnets 1336C within the magnetic sill 1336B. While these general features of the sill assemblies of FIGS. 13E, 13F, and 13G are similar, the shape and size of these features differ. Additionally, the sill assembly of FIG. 13G may include a disk pin 1388A and a disk pin spring 1388B.

The disk pin spring 1388B may be retained in a cavity 1336F. The disk pin spring 1388B may urge the disk pin 1388A upward to bring the disk pin 1388A into contact with hubs 1064 (see FIG. 10B) of the disk assembly 1018 (see FIG. 10B), and this may assist in providing an upward force on the hubs 1064. This upward force may assist in disengaging protrusions 864A of the hub 864 (see FIG. 8J) from the clutch recess 870B (see FIG. 8K) until the push-button assembly 1010 (see FIG. 10A) is shifted to a locked state.

FIG. 13I illustrates an enhanced view of the sill assembly of FIG. 13G. In the view of FIG. 13I, a drain 1384 may be seen. An opening 1384A may extend through a portion of the sill assembly to the drain 1384, and a channel 1384B may extend horizontally across a top surface of the sill assembly. The channel 1384B may be sloped so that any water or other fluids within the channel 1384B will flow down the slope towards the opening 1384A and out of the drain 1384.

In some embodiments, a ratchet pawl may be provided to assist in securing frames of the pet door assembly together. The ratchet pawl may permit the depth of the pet door assembly to be adjusted without requiring multiple length screws. FIGS. 14A-14C illustrate an example of such a ratchet pawl 1490. FIG. 14A illustrates a schematic view of the ratchet pawl 1490 being used to secure an escutcheon exterior frame 1404B and an anchor frame 1432, and FIG. 14B illustrates a perspective view of the ratchet pawl 1490 being used to secure an escutcheon exterior frame 1404B and an anchor frame 1432. Furthermore, FIG. 14C illustrates a perspective view of a ratchet pawl 1490 in isolation.

Looking first at FIG. 14C, various features of the ratchet pawl 1490 may be seen. The ratchet pawl 1490 may include a spring 1490B that may be configured to generate a force on the ratchet pawl 1490. Furthermore, the ratchet pawl 1490 may include notches 1490A that may engage with other components such as the notches 1432A (see FIGS. 14A-14B) of the anchor frame 1432. Furthermore, the ratchet pawl 1490 may comprise a screw 1490C that may be used to further secure the ratchet pawl 1490 once the ratchet pawl 1490 has been placed in the desired position.

FIGS. 14A-14B further illustrate the features of the ratchet pawl 1490 in use. As illustrated in FIG. 14A, an escutcheon interior frame 1404A, an escutcheon exterior frame 1404B, and an anchor frame 1432 may be provided. In the illustrated embodiment, the anchor frame 1432 includes notches 1432A. The ratchet pawl 1490 may be positioned in a manner to permit the notches 1490A of the ratchet pawl 1490 to engage with the notches 1432A of the anchor frame 1432. To the extent the ratchet pawl 1490 remains loose, the ratchet pawl 1490 may be advanced upwardly (when viewing from the perspective illustrated in FIG. 14A) so that the notches 1490A engage a higher notches 1432A of the anchor frame 1432. The spring 1490B of the ratchet pawl 1490 may engage with the walls around a track 1403 in the escutcheon exterior frame 1404B, and this engagement of the spring 1490B may tend to urge the ratchet pawl 1490 in the downward direction (when viewing from the perspective illustrated in FIG. 14A). Thus, the spring 1490B may tend to urge the notches 1490A, 1432A together to tighten the engagement between the ratchet pawl 1490 and the anchor frame 1432. Finally, the screw 1490C may be secured to the ratchet pawl 1490 to further secure the ratchet pawl 1490 when the ratchet pawl 1490 has been placed at the desired position (e.g. when the notches 1490A are placed in a tightened position).

While the ratchet pawl 1490 is being used to assist in engaging the escutcheon exterior frame 1404B and the anchor frame 1432 in the embodiment illustrated in FIGS. 14A-14C, the ratchet pawl may be used to assist in engaging other components. For example, the ratchet pawl 1490 may be used to assist in engaging the escutcheon interior frame 1504A and an escutcheon extension frame 1530 (see FIG. 15A).

FIGS. 15A-15C illustrate escutcheon extension frames 1530 having notches 1530A that may be configured to engage with notches 1490A of the ratchet pawl 1490 (see FIGS. 14A-14C). FIG. 15A illustrates an exploded view of an alternative pet door assembly where escutcheon extension frames have notches that may be configured to engage with a ratchet pawl, and FIG. 15B illustrates an enhanced perspective view of the escutcheon extension frames of FIG. 15A where notches may be seen. Additionally, FIG. 15C illustrates an enhanced perspective view of the escutcheon extension frames of FIG. 15A where screw holes are positioned in an alternating manner.

Looking at FIG. 15A, various components of an example pet door assembly 1500 are illustrated. These components may include an escutcheon interior frame 1504A, an escutcheon exterior frame 1504B, a core 1506, an anchor frame 1532, and one or more escutcheon extension frames 1530. In the illustrated embodiment, four escutcheon extension frames 1530 are provided, but another number of extension frames may be used in other embodiments. Notably, the escutcheon extension frames 1530 may include notches 1530A, and the notches 1530A may generally be aligned with each other so that a ratchet pawl 1490 (see FIGS. 14A-14C) may easily advance along the track formed by the notches 1530A.

Furthermore, the escutcheon extension frames 1530 may include screw holes 1530B as illustrated in FIG. 15A. Additionally, the escutcheon extension frames 1530 may include labels to indicate the orientation of each escutcheon extension frame 1530. The escutcheon extension frames 1530 may be installed so that a first frame is provide in an upright orientation, the second frame is provided in an inverted orientation, the third frame is provided in an upright orientation, and so forth. The orientation of the frames may continue in this alternating pattern, and the labels may assist in orienting the frames appropriately. By orienting the frames in this manner, the screw holes 1530B in adjacent frames may be offset from each other so that the screw holes 1530B do not interfere with each other. This offset in the screw holes 1530B is also visible in FIG. 15C.

Another example escutcheon extension frame is illustrated in FIGS. 16A-16E. FIGS. 16A-16B illustrate varying perspective view of an escutcheon extension frame 1630 in isolation. Unlike the escutcheon extension frames 1530 illustrated in FIGS. 15A-15C, the escutcheon extension frames 1630 may be provided without any notches 1530A (see FIG. 15A). However, the escutcheon extension frames 1630 may include a first set of screw holes 1630B and a second set of screw holes 1630C.

Where multiple escutcheon extension frames 1630 are used as illustrated in FIG. 16D, the escutcheon extension frames 1630 may be installed so that a first frame is provide in an upright orientation, the second frame is provided in an inverted orientation, the third frame is provided in an upright orientation, and so forth. The orientation of the frames may continue in this alternating pattern. When this pattern is taken, the first set of screw holes 1630B may be offset from each other in adjacent frames to avoid interference when screws are inserted into the screw holes 1630B. However, even where the alternating pattern is taken for the escutcheon extension frames 1630, the second set of screw holes 1630C may remain aligned. In this way, a single, large screw may be inserted into the second set of screw holes 1630C to assist in securing the escutcheon extension frames 1630 together. Additionally, FIGS. 16C and 16D illustrate the escutcheon extension frame 1630 alongside an escutcheon exterior frame 1604B, and these components may be attached together as illustrated in FIG. 16D.

Looking now at FIG. 16E, another view is provided that allows the engagement between adjacent escutcheon extension frames 1630 to be seen. FIG. 16E illustrates an enhanced view of the escutcheon extension frames and escutcheon exterior frame of FIG. 16D, and a corner portion of these frames is removed so that the engagement between adjacent escutcheon extension frames 1630 may be more easily seen. As illustrated, the escutcheon extension frames 1630 may include a tongue 1631A and a groove 1631B. The tongue 1631A of one escutcheon extension frame 1630 may be inserted in the groove 1631B of another escutcheon extension frame 1630 to ensure that the frames are positioned appropriately. The engagement of the tongue 1631A with a groove 1631B may also insure an effective water seal. Once positioned appropriately, screws may be inserted into the screw holes 1630B to secure the adjacent escutcheon extension frames 1630 together. The escutcheon exterior frame 1604B may also include a groove that may be used to assist in positioning an escutcheon extension frame 1630 relative to the escutcheon exterior frame 1604B. This groove of the escutcheon exterior frame 1604B may be similar to the groove 1631B.

FIG. 16F illustrates an enhanced view of a groove 1630E and recess 1630F of an escutcheon extension frame 1630. Additionally, FIG. 16G illustrates an enhanced view of an escutcheon extension frame 1630. Looking at FIG. 16G, a groove 1630E and recess 1630F may be seen on the right side of the escutcheon extension frame 1630. Furthermore, a tongue 1630D and protrusion 1630G may be seen on the left side of the escutcheon extension frame 1630. Multiple escutcheon extension frames 1630 may be stacked relative to one another so that the tongue 1630D of one escutcheon extension frame 1630 may be received in the groove 1630E of an adjacent escutcheon extension frame 1630. Furthermore, when the escutcheon extension frames 1630 are stacked, the protrusion 1630G may be received in the recess 1630F. These features permit escutcheon extension frames 1630 to be easily assembled.

Furthermore, features assisting in the engagement between the core and the anchor frame are illustrated in FIG. 17A-17B. These figures illustrate schematic views of a core 1706 and anchor frame 1732 where the corner of the core 1706 and anchor frame 1732 has been cut out so that certain features may be made visible. As illustrated, the anchor frame 1732 may include a tongue 1732B, and the tongue 1732B may be received within the groove 1706A of the core 1706. These features may permit the core 1706 and the anchor frame 1732 to be easily assembled, and these features may also provide increased security and an improved weather seal.

The pet door assemblies described herein may be installed in a variety of locations. For example, FIG. 1A illustrated the pet door assembly 100 installed within a wooden door 102. However, pet door assemblies may be installed in other locations such as a glass patio door or a glass window. FIGS. 18A-C illustrate an example pet door assembly 1800 installed in a glass patio door 1892B, with FIG. 18A providing a perspective view and with FIG. 18B providing an enhanced view. The pet door assembly 1800 may be installed proximate to the frame 1892A of the glass patio door 1892B, but the pet door assembly 1800 may be installed at other locations such as in a wall or some other structure.

To install the pet door assembly 1800 in a glass patio door 1892B, the glass may be cut (pre-tempered) at a desired position (e.g. the lower corner of the glass). The cut of the glass may be sized to match the size of the anchor frame 1732 (see FIGS. 17A-17B) or another component. The frames of the pet door assembly 1800 may then be added to the glass patio door 1892B at the location of the cut. Glazing flanges 1834 may be provided to help ensure that the pet door assembly 1800 and glass patio door 1892B are sealed appropriately. Glazing flanges 1834 may also be configured to strengthen attachment of the pet door assembly 1800 with the glass patio door 1892B.

FIG. 18C illustrates a schematic perspective view of the pet door assembly of FIG. 18A where portions of a frame 1892A for the glass patio door 1892B are hidden. This permits the glazing flanges 1834 of the pet door assembly 1800 to be seen. As illustrated, once the pet door assembly 1800 is appropriately installed, the outer surfaces of the glazing flanges 1834 may be flush with the surfaces of the glass of the glass patio door 1892B. In this way, the glazing flanges 1834 may fit appropriately in the frame 1892A of the glass patio door 1892B. This may be beneficial to ensure that the pet door assembly 1800 and glass patio door 1892 are sealed appropriately to prevent insects, water, moisture, etc. from entering. In some embodiments, one glazing flange 1834 may be attached to an anchor frame, and another glazing flange 1834 may be attached to the escutcheon exterior frame 1804B, but the glazing flanges 1834 may be attached to other components in other embodiments.

A core 1806, an escutcheon interior frame 1804A, and an escutcheon exterior frame 1804B are also illustrated in FIG. 18C. The glazing flanges 1834 may be disposed between the escutcheon interior frame 1804A and the escutcheon exterior frame 1804B, and the glazing flanges 1834 may even be fastened directly to these frames in some embodiments as illustrated.

Additionally, FIGS. 19A and 19B permit a composite frame 1909 to be seen. This frame 1909 may be provided in a basic version of the pet door assembly. While other pet door assemblies may provide a separate anchor frame, escutcheon frame, and exterior core frame, the composite frame 1909 integrates certain features of these various frames into a single frame. FIG. 19A illustrates a front view of the composite frame 1909, and FIG. 19B illustrates a rear view of the composite frame 1909. As illustrated in FIG. 19A, the composite frame 1909 includes protrusions 1901 around its internal perimeter. These protrusions 1901 may be configured to engage with interlock sections 2142B of a locking door 2142 (see FIG. 21B). FIG. 19A also permits a protrusion 1982 to be seen, and this protrusion 1982 may be configured to provide a position where a sill assembly (see, e.g., 1336, FIG. 13A) may be retained. Further, FIG. 19A permits a top seal 1950 to be seen, and this top seal 1950 may come in contact with another component installed in the composite frame 1909 to prevent insects, water, moisture, etc. from continuing further through the pet door assembly and/or the home of the user. The top seal 1950 may also help prevent any air draft from forming. Finally, FIG. 19B illustrates a recess 1916, and this recess 1916 may be configured to receive a portion of another frame such as an extension frame 330 (see FIG. 3I) or an anchor frame 332 (see FIG. 3I) in some embodiments.

Skipping ahead to FIG. 22, an exploded view is illustrated of a pet door assembly having a composite frame 2209 similar to the composite frame 1909 of FIGS. 19A and 19B. The pet door assembly may include a locking door 2242, a flap 2208, a core interior frame 2207A, a sill assembly 2236, the composite frame 2209, one or more escutcheon extension frames 2230, and an escutcheon exterior frame 2204B. As noted above, while other pet door assemblies may provide a separate anchor frame, escutcheon frame, and exterior core frame, the composite frame 1909 integrates certain features of these various frames into a single frame. To install the pet door assembly using the components illustrated in FIG. 22, any escutcheon extension frames 2230 that are included may be attached together and may be attached to the escutcheon exterior frame 2204B. The composite frame 2209 may be positioned on an interior side of a structure (e.g. a door, a wall, etc.), and the escutcheon exterior frame 2204B and any escutcheon extension frames 2230 that are included may be positioned on the exterior side of the structure. In this way, the structure may be sandwiched or captured between the escutcheon exterior frame 2204B and the composite frame 2209. Then, the sill assembly 2236 may be inserted into an opening 2209A in the composite frame 2209. This opening 2209A may face the interior side of the composite frame 2209. Additionally, the core interior frame 2207A may also be inserted into the opening 2209A. Furthermore, the flap 2208 may be attached to the core interior frame 2207A, and the locking door 2242 may be selectively used where one desires to prevent a pet from using the door. The components of the pet door assembly illustrated in FIG. 22 may be installed in other orders in other embodiments.

The connection of various frames the make up the pet door assembly is further illustrated in FIGS. 20A-20E. FIG. 20A illustrates a perspective view of various components of a pet door assembly, and FIG. 20B illustrates a side view of various components of a pet door assembly. These components include an escutcheon interior frame 2004A, an escutcheon exterior frame 2004B, and an anchor frame 2032.

In some embodiments, the frames may enable one to easily adjust the depth of the pet door assembly using only manufactured parts. Examples of such frames may be seen in the cross sectional views of FIGS. 20C-20E. FIG. 20C illustrates a cross sectional view of the components of the pet door assembly of FIG. 20A where the escutcheon exterior frame is in a first position relative to the other components, and FIG. 20D illustrates a cross sectional view of the components of the pet door assembly of FIG. 20A where the escutcheon exterior frame is in a second position relative to the other components. FIG. 20E illustrates a cross-sectional view of the components of the pet door assembly of FIG. 20A where escutcheon extension frames have been added. Notably, the anchor frame 2032 may include a tongue 2032B, a first wall 2032C, and a second wall 2032D. The first wall 2032C and the second wall 2032D may generally extend parallel to each other so that a recess 2032E is formed between the two walls. The first wall 2032C may also extend farther than the second wall 2032D. The height of the second wall 2032D may be sufficiently high to insure a safe screw depth for the screw 2096.

To appropriately install a pet door, the depth of the pet door may need to be precisely set. Various embodiments of the pet door assembly provided herein may permit this depth to be tailored to a particular door. A portion of the escutcheon exterior frame 2004B may be slid into the recess 2032E, and the escutcheon exterior frame 2004B may be adjusted to the desired position. For example, the escutcheon exterior frame 2004B of FIG. 20D is extended out farther than the escutcheon exterior frame 2004B of FIG. 20C. This feature may permit the depth of the pet door assembly to be easily adjusted to meet any potential size requirements, and the screw 2096 (see FIG. 20E) may secure the anchor frame 2032 relative to the other frames once the frames have been positioned as desired. The tongue 2032B may be configured to engage a groove 1706A of a core 1706 (see FIG. 17A) to assist in the positioning of the escutcheon exterior frame 2004B and the core 1706 relative to each other. The recess 416 of FIG. 4B may operate similarly to the recess 2032E formed in the anchor frame 2032 of FIG. 20C.

Where the pet door assembly needs to be adjusted for use in a wall or door having a large thickness, extension frames may be necessary. Where this is the case, escutcheon extension frames 2030 may be used in the assembly. To the extent escutcheon extension frames 2030 are used, a portion of an escutcheon extension frame 2030 may be received in the recess 2032E formed in the anchor frame 2032. A screw 2096 may assist in securing the escutcheon extension frames 2030, the escutcheon interior frame 2004A and the anchor frame 2032 together.

A locking door may also be used in some embodiments. The locking door may be provided with interlock sections that require movement in two directions for the locking door to be removed. When placed into position onto the frame, the locking door may interlock with minimal downward movement to firmly lock into place. The locking door may comprise rigid material so that, when engaged, the locking door will not bend in any direction if pushed.

FIGS. 21A-21G illustrate one example locking door 2142. FIG. 21A illustrates a perspective view of a pet door assembly 2100 having a locking door 2142 assembled into the pet door assembly 2100. As illustrated, a lock assembly 2198 may be provided in the locking door 2142, and various features of the lock assembly 2198 will be discussed further below. The locking door 2142 may be positioned adjacent to a composite frame 2109, and the locking door 2142 may engage with the composite frame 2109 when the lock assembly 2198 is in a locked state.

FIG. 21B illustrates the pet door assembly with the locking door 2142 exploded relative to the remainder of the pet door assembly. The locking door 2142 may include a plurality of interlock sections 2142B along the side of the locking door 2142. These interlock sections 2142B may engage with protrusions 2101 extending from the composite frame 2109. The flap 2108 of the pet door assembly is also visible in FIG. 21B. When the locking door 2142 is positioned and locked in the pet door assembly, the locking door 2142 may block access to the flap 2108, preventing a pet from exiting through the flap 2108. This may be beneficial in the evenings or at other times.

The locking door 2142 may be configured to be inserted horizontally into an opening within the composite frame 2109 to enable the interlock sections 2142B of the locking door 2142 to receive the protrusions 2101 of the composite frame 2109. By doing this, minimal vertical movement is required for the locking door 2142 in some embodiments, this vertical movement may be limited to instances where the protrusions 2101 shift upwardly into the interlock sections 2142B to lock the locking door 2142. Where other locking doors have been used, these locking doors are typically shifted into a locking position by simply shifting the locking door downwardly in a vertical direction through an opening in a pet door frame. In some embodiments, a locking door may be inserted into an opening within an anchor frame, and interlock sections on the locking door may engage with protrusions on the anchor frame to cause the locking door to be placed in a locked state.

FIG. 21C illustrates a perspective view of interlock sections 2142B on the locking door 2142. The interlock sections 2142B may be configured to receive the protrusions 2101 of the composite frame 2109. When the protrusions 2101 are retained in the interlock sections 2142B, the locking door 2142 may be retained in a locked position. When locked, the protrusions 2101 may rest in the upper left portion of the interlock sections 2142B (from the perspective shown in FIG. 21C). The force of gravity and/or other forces may retain the protrusions 2101 in this position so that the locking door 2142 may remain locked. To unlock the locking door 2142, the locking door 2142 must first be lifted in the direction of the arrow in FIG. 21C, and then the locking door 2142 may be removed by shifting the locking door 2142 horizontally so that the protrusions 2101 are removed from interlock sections 2142B. Thus, removal of the locking door 2142 requires movement in two directions. As can be seen in FIG. 21C, protrusions may be provided at the bottom surface of the locking door 2142 (see bottom right part of locking door 2142 in FIG. 21C). The protrusions may be configured to engage with slots on the bottom edge of the frame in some embodiments.

The locking assembly 2198 may also be provided, and this locking assembly 2198 may prevent the locking door 2142 from being raised when the locking assembly 2198 is in a closed state. By doing so, the protrusions 2101 may remain in the upper portions of the interlock sections 2142B, causing the locking door 2142 to remain locked. FIGS. 21D-21E illustrate varying perspective view of a locking assembly 2198 in a locked position. FIG. 21F illustrates a perspective view of the locking assembly 2198 of FIG. 21D in an unlocked position. FIG. 21G illustrates a top view of the locking assembly 2198 of FIG. 21D where the locking assembly 2198 is shifting between a locked and unlocked state.

The locking assembly 2198 may include a knob 2198A and a locking extension 2198B. The locking extension 2198B may be configured to extend through a receiving portion 2142A of a locking door 2142. This receiving portion 2142A may possess a cavity where the locking extension 2198B may be received. In the locked position, the locking extension 2198B may extend past the receiving portion 2142A as illustrated in FIGS. 21D-21E. When the locking extension 2198B is in this position, the locking extension 2198B may be disposed between the locking door 2142 and a wall of the composite frame 2109. To the extent one attempts to lift the locking door 2142 up to disengage the interlock sections 2142B, the locking extension 2198B may contact the composite frame 2109 to prevent this disengagement from happening.

In FIG. 21F, the locking assembly 2198 is provided in an unlocked position. The locking extension 2198B may generally be retained within the cavity of the receiving portion 2142A. Thus, to the extent one attempts to lift the locking door 2142 up to disengage the interlock sections 2142B, the locking extension 2198B will not provide any interference and the locking door 2142 may be lifted freely.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

That which is claimed:

1. A pet door having increased modularity, comprising:

a flap;

a core frame that is configured to hold the flap;

an interior frame that is configured to be positioned in an interior portion of a structure;

an exterior frame that is configured to be positioned in an exterior portion of the structure; and three or more extension frames provided between the interior frame and the exterior frame, wherein each extension frame is added to increase the depth of the pet door, wherein each of the extension frames includes a screw hole, wherein a first extension frame of the three or more extension frames is provided in an upright position, wherein a second extension frame of the three or more extension frames is positioned adjacent to the first extension frame, wherein the second extension frame is provided in an inverted position that is rotated 180 degrees relative to the upright position, wherein a third extension frame of the three or more extension frames is positioned adjacent to the second extension frame, wherein the third extension frame is provided in an upright position, wherein the screw hole of the first extension frame is offset from the screw hole of the second extension frame, wherein the screw hole of the second extension frame is offset from the screw hole of the third extension frame.

2. The pet door of claim 1, further comprising an anchor frame, wherein the pet door is configured to be assembled by:

installing the anchor frame at the structure;

installing the exterior frame on the exterior portion of the structure;

inserting the core frame into the anchor frame after the anchor frame has been installed; and installing the interior frame.

3. The pet door of claim 1, further comprising a push button assembly, wherein the push button assembly is configured to shift between a locked state and an unlocked state, wherein the flap is configured to remain locked to prevent the flap from being opened when the push button assembly is in a locked state, wherein the flap is configured to be unlocked to permit opening of the flap when the push button assembly is in an unlocked state.

4. The pet door of claim 3, further comprising a first disk assembly and a second disk assembly, wherein the push button assembly is configured cause the first disk assembly and the second disk assembly to lock the flap when the push button assembly is in a locked state.

5. The pet door of claim 1, wherein the flap includes:

two or more rigid segments extending vertically, wherein gaps are provided between the two or more rigid segments;

elastic material connecting adjacent rigid segments of the two or more rigid segments;

wherein elastic stretch zones are provided in the gaps, wherein the flap resists horizontal and vertical bending in locations where a rigid segment is provided, wherein the elastic stretch zones are configured to permit vertical bending when the flap is opened.

6. The pet door of claim 1, wherein the core frame includes a flap holder, wherein the flap holder is configured to receive and hold the flap without any tools required during installation.

7. The pet door of claim 6, wherein the core frame includes two or more rods, wherein the flap includes two or more holes at a top of the flap, wherein the two or more rods are configured to be received in the two or more holes to restrain the horizontal movement of the flap.

8. The pet door of claim 1, wherein the interior frame is configured to match the appearance of the structure in which the interior frame is installed or an alternate desired appearance, wherein the interior frame is configured to be used with a specific core frame type.

9. The pet door of claim 1, further comprising a circuit board; and an actuator cam, wherein the pet door is configured to be locked or unlocked by a remote operator, wherein the circuit board is configured to receive a locking command from a remote operator, wherein the circuit board is configured to cause actuation of the actuator cam, wherein the actuator cam is configured to cause the pet door to shift to a locked state in the actuated position.

10. The pet door of claim 1, further comprising a latch interlock assembly having a latch cam and a cam screw, wherein the latch cam and the cam screw are positioned in the core frame, wherein the cam screw has a cam portion that has an asymmetrical shape relative to a central axis of the cam screw, wherein the cam screw is configured to be rotated using a tool, wherein the cam portion is configured to engage with the latch cam upon rotation of the cam screw to cause a portion of the latch cam to extend out of the core frame, wherein the portion of the latch cam extending out of the core frame is configured to engage with another frame.

11. The pet door of claim 1, further comprising two glazing flanges, wherein the pet door is installed in a glass structure, wherein the glass structure is a glass patio door or a window, wherein the glazing flanges are configured to rest flush with the surfaces of the glass of the glass structure once the pet door is installed, wherein the glazing flanges are configured to ensure that an effective seal is provided between pet door and glass structure, wherein the glazing flanges are configured to strengthen attachment of the pet door with the glass structure.

12. The pet door of claim 1, further comprising a sill assembly with one or more pistons that are configured to shift within one or more corresponding cavities, wherein the sill assembly includes a sill magnet that is configured to attract a flap magnet, wherein magnetic attraction between the sill magnet and the flap magnet is configured to urge the one or more pistons into the one or more corresponding cavities to seal the flap regardless of an amount of thermal expansion or contraction in the flap, wherein the sill assembly includes viscous material in the one or more corresponding cavities, wherein the pistons are configured to block viscous material from exiting the one or more corresponding cavities, wherein the sill assembly includes a drain and a channel extending to the drain, wherein the channel extends along the length of the sill assembly, wherein the channel is sloped downwardly to cause fluids to extend in the channel towards the drain, wherein the drain and the channel are configured to prevent fluids from contaminating the one or more corresponding cavities.

13. The pet door of claim 1, further comprising an anchor frame defining an opening with protrusions provided in the opening; and a locking door having interlock sections, wherein the locking door is configured to be inserted horizontally into the opening within the anchor frame to enable the interlock sections of the locking door to receive the protrusions of the frame, wherein the interlock sections of the locking door are configured to receive the protrusions to enable the locking door to be shifted to a locked state.

14. A modular pet door for use with a structure having an interior portion, an exterior portion and defining an opening, the modular pet door comprising:

an interior frame that is configured to seat on the interior portion of the structure;

an exterior frame that is configured to seat on the exterior portion of the structure and coupled to the exterior frame; and a core assembly having a flap, wherein the core assembly is coupled to the interior frame, wherein the flap is operable between an open position and closed position disposed over the opening, the core assembly configured to permit operation of the flap, and further comprising a push button assembly, wherein the push button assembly is configured to shift between a locked state and an unlocked state, wherein the flap is configured to remain locked to prevent the flap from being opened when the push button assembly is in the locked state, wherein the flap is configured to be unlocked to permit opening of the flap when the push button assembly is in the unlocked state, and further comprising a first disk assembly and a second disk assembly, wherein the push button assembly is configured to cause the first disk assembly and the second disk assembly to lock the flap when the push button assembly is in the locked state, wherein the push button assembly is mechanically linked to a disk-based locking mechanism disposed on opposing vertical sides of the flap;

wherein the push button assembly is fixedly mounted to a slide cam housed within the interior frame, the slide cam configured to translate actuation of the push button assembly into mechanical force applied to disk hubs; and wherein the push button assembly includes a pair of integrated forward-biased spring legs that press against a rear frame wall of the interior frame, the spring legs maintaining constant forward pressure on the slide cam to return the slide cam to a rest position after actuation, and wherein a subsequent push of a button of the push button assembly causes the slide cam to return to an initial position and is configured to allow the disk hubs to shift upward into an unlocked position, disengaging a clutch mechanism and permitting rotational movement of the first and second disk assemblies.

15. The modular pet door of claim 14, wherein the flap comprises a vertically extending flexible member having a plurality of cutout regions, a plurality of rigid segments disposed on opposing sides of the flexible member and aligned with the cutout regions, and a plurality of elastic stretch zones positioned between the rigid segments.

16. The modular pet door of claim 15, wherein the flap further includes an integrated weather seal comprising a web seal and a lateral edge seals extending beyond the rigid segments.

17. The modular pet door of claim 14, and further comprising a modular and interchangeable interior frame configured to engage with the interior frame.

18. The modular pet door of claim 14, and further comprising an extension frame positionable between the interior frame and the exterior frame.

19. The modular pet door of claim 18, wherein the extension frame includes a plurality of extension frames, each extension frame of the plurality of extension frames configured to incrementally address an installation depth between the interior frame and the exterior frame.

20. The modular pet door of claim 19, wherein each extension frame is fastened to an adjacent extension frame or the exterior frame.

21. The modular pet door of claim 20, wherein each extension frame includes a set of off-centered screw holes and corresponding mounting posts arranged to allow one of the extension frames to be rotated and nest with an adjacent extension frame in an interlocking configuration.

22. The modular pet door of claim 20, wherein each extension frame is fastened to an adjoining extension frame or the exterior frame using mounting screws prior to installation into the structure.

23. The modular pet door of claim 14, wherein the core assembly includes a locking assembly operable between a locked state and an unlocked state.

24. The pet door of claim 14, wherein the first and second disk assemblies are mechanically linked to the flap and rotate in synchronized motion with the flap, the first and second disk assemblies configured to selectively permit or restrict movement of the flap based on an engaged state or a disengaged state to lock or unlock the flap.

25. The pet door of claim 14, wherein the core assembly includes two or more alignment pins, and wherein the flap includes two or more corresponding holes located in a top portion of the flap and oriented perpendicular to an exterior-facing surface of the flap, the alignment pins configured to engage the holes to restrict lateral movement of the flap.

26. The pet door of claim 14, further comprising a movable sill assembly positioned beneath the flap and configured to maintain a sealed interface between a bottom edge of the flap and a corresponding bottom edge of one of the interior and exterior frames; the sill assembly including a sill housing and a sill magnet member, the sill magnet member being vertically movable within the sill housing and magnetically coupled to a magnet embedded in the flap, the sill magnet member and the sill housing configured to include integrated piston elements comprising a male piston component on the sill magnet member and a corresponding female cavity within the sill housing, the integrated piston elements defining a vertical range of movement sufficient to accommodate thermal expansion and contraction of the flap.

27. The pet door of claim 26, wherein the piston elements further include viscous damping material retained within the female cavity to inhibit rapid vertical displacement of the sill magnet member during opening and closing of the flap.

28. The pet door of claim 27, wherein the piston elements are configured to maintain horizontal alignment of the sill magnet member, the piston cavity sealed to prevent the loss of viscous material and to isolate it from environmental contaminants.

29. The pet door of claim 26, wherein the movable sill assembly further includes an integrated drainage feature comprising a channel extending along a length of the sill housing and terminating in a drainage slit, the channel being downwardly sloped to direct away from the sill magnet member and piston cavity.

30. The pet door of claim 14, and comprising a circuit board operably coupled to the core assembly to receive commands and to lock and unlock the flap based on the commands.

31. A modular pet door for use with a structure having an interior portion, an exterior portion and defining an opening, the modular pet door comprising:

an interior frame that is configured to seat on the interior portion of the structure;

an exterior frame that is configured to seat on the exterior portion of the structure and coupled to the exterior frame; and a core assembly having a flap, wherein the core assembly is coupled to the interior frame, wherein the flap is operable between an open position and closed position disposed over the opening, the core assembly configured to permit operation of the flap, the pet door further comprising a push button assembly, wherein the push button assembly is configured to shift between a locked state and an unlocked state, wherein the flap is configured to remain locked to prevent the flap from being opened when the push button assembly is in the locked state, wherein the flap is configured to be unlocked to permit opening of the flap when the push button assembly is in the unlocked state, and further comprising a first disk assembly and a second disk assembly, wherein the push button assembly is configured to cause the first disk assembly and the second disk assembly to lock the flap when the push button assembly is in the locked state, each of the first and second disk assembly includes an upper disk component; a lower disk component; and a hub captured between the upper and lower components, wherein the hub is configured to slide vertically along a spindle fixed within a side of the interior frame, the upper and lower disk components configured to constrain the hub from rotating;

wherein the hub includes a clutch mechanism configured to engage a gear interface on the lower disk component, and engagement of the clutch mechanism with the gear interface constrains rotational movement of the associated first and second disk assembly when the corresponding hub is in a locked position;

wherein pressing the push button assembly to the locked position causes each of the hubs to shift downward, engaging the clutch mechanisms with the gear interfaces and preventing disk assembly rotation to lock the flap in place; and wherein pressing the push button assembly to the unlocked position causes each of the hubs to shift upward, disengaging the clutch mechanisms with the gear interfaces and permitting the disk assemblies to rotate in response to movement of the flap.

32. The pet door of claim 31, wherein each of the first and second disk assembly further comprises a plurality of toggle springs operably coupled to the hub via hinge joints, each of the toggle springs being configured to bias the disk assembly into one of two stable positions including an open position or a closed position;

wherein each toggle spring is retained between the upper and lower disk components and includes a spring node and a spring post and configured to constrain horizontal displacement of the hub while permitting vertical movement to enable controlled engagement and disengagement of the clutch mechanisms with the gear interfaces.

33. The pet door of claim 32, and further comprising a disk strike mechanism configured to interact with the toggle springs to accelerate transition between the open and closed positions of the disk assemblies during flap movement; wherein the disk strike mechanism is positioned between the upper and lower disk components and is configured to rotate outward from a face of each disk assembly in response to flap actuation; and wherein, upon return of the flap from the open position, the disk strike mechanism engages the toggle spring.

34. The pet door of claim 32, wherein each disk assembly further comprises a race bearing surface positioned between the upper and lower disk components.

35. The pet door of claim 32, wherein a spring pressure mechanism is provided to bias the disk assemblies into one of two stable positions, the spring pressure mechanism comprising a spring element located at a bottom of the disk assemblies and embedded within a sill portion of the core assembly; wherein the spring element exerts an upward force along the spindle to maintain consistent pressure on the disk hubs.

* * * * *